(12) United States Patent
Selimis et al.

(10) Patent No.: US 8,769,127 B2
(45) Date of Patent: Jul. 1, 2014

(54) CROSS-DOMAIN SOLUTION (CDS) COLLABORATE-ACCESS-BROWSE (CAB) AND ASSURED FILE TRANSFER (AFT)

(75) Inventors: Nikolas A. Selimis, Rockville, MD (US); Joshua O. Testerman, Owings Mill, MD (US); Jamie A. Lafleur-Vetter, Marriottsville, MD (US); Thomas M. Ruoff, Davidsonville, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1146 days.

(21) Appl. No.: 11/705,031

(22) Filed: Feb. 12, 2007

(65) Prior Publication Data

US 2007/0282951 A1 Dec. 6, 2007

Related U.S. Application Data

(60) Provisional application No. 60/771,901, filed on Feb. 10, 2006, provisional application No. 60/897,246, filed on Jan. 25, 2007.

(51) Int. Cl.
*G06F 15/16* (2006.01)
*G06F 15/173* (2006.01)

(52) U.S. Cl.
USPC ............................ 709/229; 709/223; 709/227

(58) Field of Classification Search
USPC ........ 709/203, 223, 227, 229; 370/352; 707/1
See application file for complete search history.

(56) References Cited

U.S. PATENT DOCUMENTS

| | | | |
|---|---|---|---|
| 7,089,586 B2* | 8/2006 | Kilgore ........................... | 726/13 |
| 7,730,157 B2* | 6/2010 | Baratto et al. ................. | 709/217 |
| 2002/0112181 A1* | 8/2002 | Smith ............................ | 713/201 |
| 2003/0191799 A1* | 10/2003 | Araujo et al. ................. | 709/203 |
| 2004/0243537 A1* | 12/2004 | Wang et al. ....................... | 707/1 |
| 2006/0209794 A1* | 9/2006 | Bae et al. ....................... | 370/352 |
| 2007/0180081 A1* | 8/2007 | Okmianski et al. ........... | 709/223 |

* cited by examiner

*Primary Examiner* — Aaron Strange
(74) *Attorney, Agent, or Firm* — Tarolli, Sundheim, Covell & Tummino LLP

(57) ABSTRACT

Systems and methods for providing a cross-domain, remote terminal secure browse capability are disclosed. The Collaborate-Access-Browse (CAB) Cross-Domain Solution (CDS) enables high-side users to browse low-side material with the same privileges as any other low-side user. The Assured File Transfer (AFT) CDS allows the high-side user to initiate file transfers from the low side to the high side so the browser-found data can be manipulated on the high side if needed. AFT provides for a bi-directional file exchange. High-side users can also initiate a file exchange from their high side to the low side, assuming the file contains only the appropriately classified information.

14 Claims, 36 Drawing Sheets

CROSS-DOMAIN SOLUTION (CDS) COLLABORATE-ACCESS-BROWSE (CAB) AND ASSURED FILE TRANSFER (AFT)

CROSS-REFERENCE TO RELATED APPLICATIONS

This application claims priority from U.S. Provisional Patent Application Ser. No. 60/771,901, filed Feb. 10, 2006, and from U.S. Provisional Patent Application Ser. No. 60/897,246, filed Jan. 25, 2007, both of the disclosures of which is hereby incorporated by reference in their entirety.

BACKGROUND OF THE INVENTION

1. Field of the Invention

The invention relates generally to a secure, cross-domain information exchange capability. The Collaborate-Access-Browse (CAB) Cross-Domain Solution (CDS) component enables high-side users to browse low-side material with the same privileges as any other low-side user. The Assured File Transfer (AFT) CDS allows the high-side user to initiate file transfers from the low side to the high side so the browser-found data can be manipulated on the high side if needed. AFT provides for a bi-directional file exchange. High-side users can also initiate a file exchange from their high side to the low side, assuming the file contains only the appropriately classified information.

2. Description of Related Art

In the late 1990s, the Joint Chiefs of Staff (JCS) procured a Cross-Domain Solution (CDS) to permit users on the Joint Staff Integrated Network-Top Secret (JSIN-T) to communicate with users on the Joint Staff Integrated Network-Secret (JSIN-S). This component-based solution, termed Cyber-Shield, provided JCS with operational functionality to permit connectivity. In early 2005, the CyberShield device became inoperative. Other component-based solutions that have been identified as possible replacements have failed to provide the needed security functionality for the overall system. The JCS challenged the National Security Agency (NSA) with providing a solution to furnish the applicable security while not impinging on current business practices (e.g., unrestricted browsing using HTTP and sharing files between domains).

SUMMARY OF THE INVENTION

Systems and methods for providing a cross-domain, remote terminal secure browse capability are disclosed. In one embodiment, the Collaborate-Access-Browse (CAB) Cross-Domain Solution (CDS) component enables high-side users to browse low-side material with the same privileges as any other low-side user. In one embodiment, a second component, the Assured File Transfer (AFT) CDS allows the high-side user to initiate file transfers from the low side to the high side so the browser-found data can be manipulated on the high side if needed. AFT provides for a bi-directional file exchange. High-side users can also initiate a file exchange from their high side to the low side, assuming the file contains only the appropriately classified information.

One embodiment includes a cross-domain information exchange system comprising a client, a translator, a guard associated with the client and the translator, and a terminal server associated with the translator. The guard is configured to communicate with the client and the translator over a first protocol and the translator is configured to communicate with the terminal server over a second protocol. The first protocol is a Virtual Desktop Protocol (VDP) that is configured to provide remote, securable virtualization of a graphical user desktop to the client and the second protocol may be a commercially available standard desktop protocol.

Another embodiment is a cross-domain file exchange system comprising a first client, a second client and a guard associated with the first client and second client. The guard is configured to provide secure bi-directional file transfer between the first client and second client.

As will be realized, this invention is capable of other and different embodiments, and its details are capable of modification in various obvious respects, all without departing from this invention. Accordingly, the drawings and descriptions are to be regarded as illustrative in nature and not as restrictive.

DETAILED DESCRIPTION OF THE INVENTION

This section provides a high-level description of the CAB Browse system, identifying what functionality is provided to users. It provides an overview of the major components of the CAB Browse system: the high-side Client, the Guard, the Translator, the Terminal Server and the Virtual Desktop Protocol (VDP). Descriptions of the individual components that make up the CAB system are covered in their respective sections below.

Figure 1:
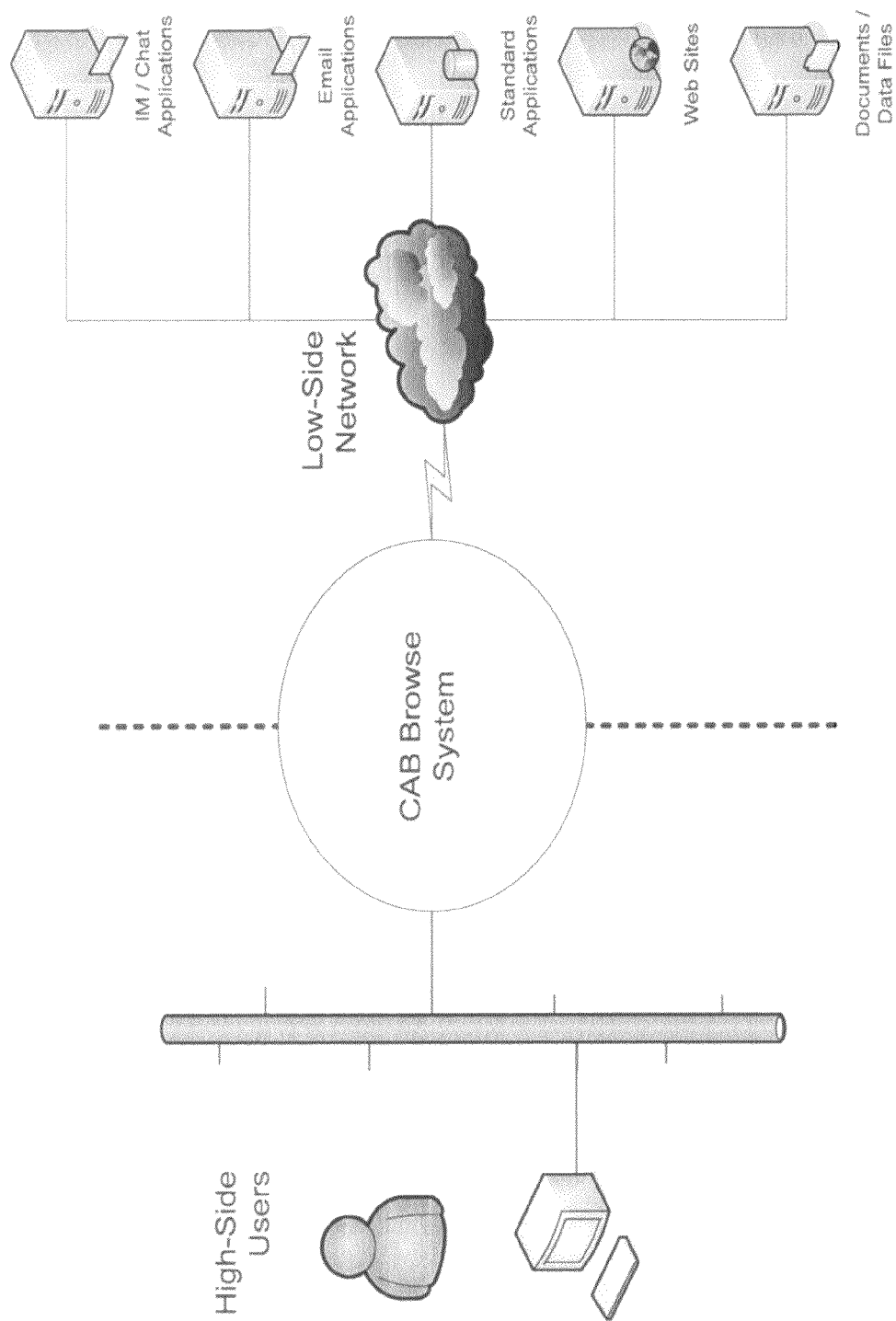
FIG. 1 shows an example of a high-level functional view of the CAB system.

In this embodiment, FIG. 1 shows an example of a high-level functional view of the CAB system. CAB is a cross-domain solution that reflects the need for communications among different security level domains. For example, as the number of joint coalition efforts in which the US participates continues in increase, the number of different classification levels and networks to which users need access continue to grow. CAB, as the leading CDS solution, offers technology that is directed at addressing the needs of U.S. warfighters and the Intelligence community.

In this embodiment, a CDS solution preferably requires that content, services and applications of a lower clearance domain be available to users on a domain of a higher security clearance (high-side users). This need is in conflict with present system designs, whose security features were designed to make sharing of information across domains virtually impossible. While unidirectional communication from lower to higher domain networks is possible, a CDS solution should address the bi-directional communications needs of today's environment. Careful control of cross-domain communications should ensure that only appropriate content is exchanged.

Figure 2:
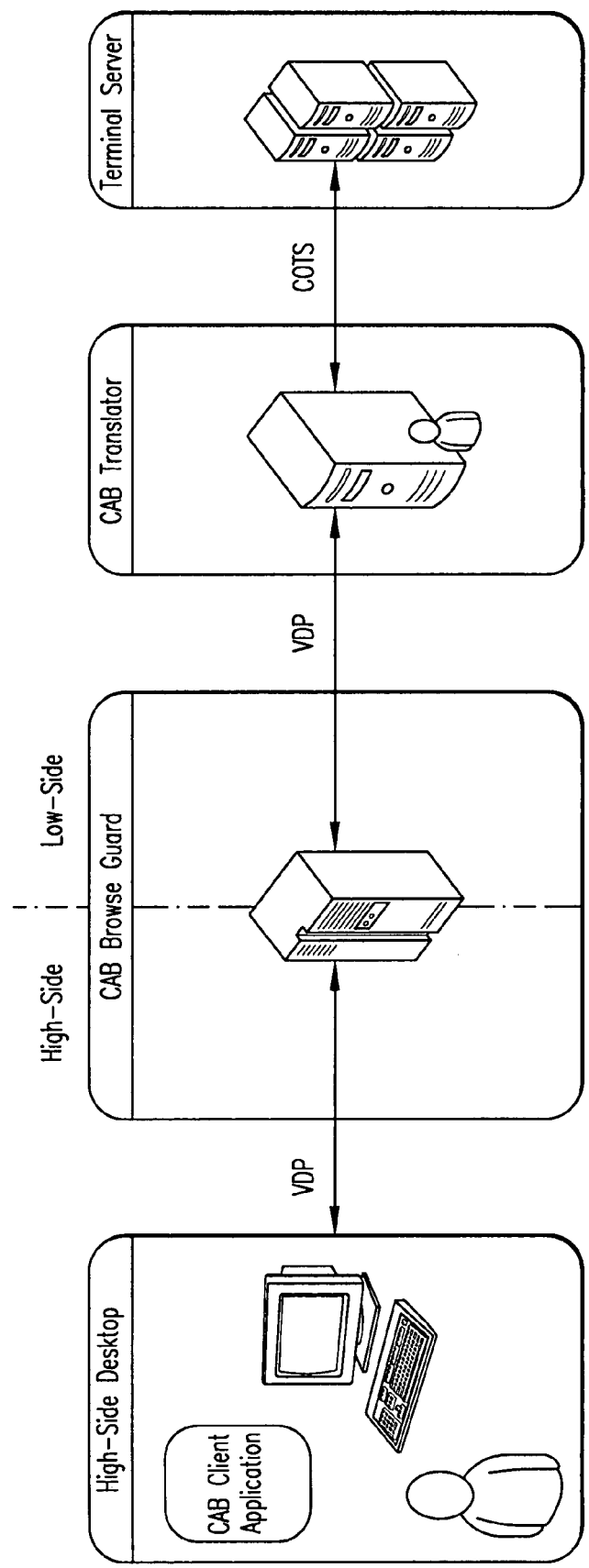
FIG. 2 shows an example of a high-level system overview of the CAB system.

In this embodiment, accomplishing this requires a set of mechanisms to ensure that high-side users are protected from low-side threats and malicious intent. Not only must the system protect the high-side users, but it should also make certain that of higher-level domain's information does not unintentionally reach the low-side domain Referring to FIG. 2, at the highest level of one embodiment, CAB may consist of five primary system components:
CAB Client Application
CAB Browse Guard
CAB Translator
Terminal Server
Virtual Desktop Protocol (VDP)

These primary components work together to present a high-side user with a virtualized low-side presence.

In this embodiment, the CAB Client may be designed to run as an application or applet on an existing high-side workstation. Using this Client, and no additional hardware or network infrastructure, each user can obtain access to a low-side CAB Terminal Server session. Once a high-side user has authenticated through the Guard and established a session, they can access all low-side applications, resources and services that have been configured for use on the Terminal Server. It is the role of the CAB Client to present the virtual low-side session in a manner that closely resembles a native low-side session, and supports intuitive and responsive interaction with that session.

In this embodiment, in order to virtualize the low-side session, the Client is responsible for:
  Rendering the low-side screen shots that are received from
    the Translator/Terminal Server (via the Guard)
  Capturing mouse events from the high-side mouse and
    conveying them to the Translator/Terminal Server (via
    the Guard)
  Capturing keyboard input from the high-side keyboard and
    conveying it to the Translator/Terminal Server (via the
    Guard).

In this embodiment, at the same time, the CAB Client preferably implements methods to isolate the high-side desktop environment from the Client process, i.e., sandboxing technology. For example, the CAB Client preferably does not have write access to the high-side workstation hard drive, and preferably does not receive inadvertent mouse and keyboard events intended for other high-side applications.

In one embodiment, the CAB Browse Guard is preferably a cross-domain high-assurance device designed to enforce secure communications between a high-side CAB Client and a low-side Translator/Terminal Server. The Guard may be designed to communicate only over the VDP protocol, and may not accept communications over any other. The Guard can receive new VDP connections preferably only from the high-side network, preventing any unsolicited communications from the low side.

In this embodiment, the primary steps taken by the Guard to ensure secure communications can preferably include:
  Support authentication and control of all connections and
    user accounts
  Perform format validation of all VDP messages, to ensure
    that only VDP-compliant communications are passed
  Perform further validation of VDP content—to ensure, for
    example, that image data is free of extensible fields, and
    mouse coordinates are within the expected range
  Perform stateful validation of all VDP messages, to pass
    only those VDP messages, which are appropriate at that
    stage of a VDP session. (Ensure, for example, that
    authentication occurs before mouse clicks are sent.)
  Perform a dirty word/clean word search of all text-based
    content that passes from high-to-low
  Perform anomaly detection and pattern detection to identify possible security issues
  Log all security-related events and anomalies
  Support auditing of sessions, to include the ability to record
    and play back sessions.

In this embodiment, the CAB Translator is responsible for proxying and converting between the commercial desktop protocol and the VDP protocol. Because of the differences between the two protocols, proper translation preferably consists of more than simple semantic and format substitutions. The Translator can incorporate the required logic to behave as a commercial desktop protocol Client when speaking to other commercial desktop protocol components (i.e., the Terminal Server) and may behave as a VDP server when speaking to other VDP components (i.e., the CAB Browse Guard).

In this embodiment, the CAB Terminal Server component preferably provides a low-side multi-user platform on which all of the low-side presences will physically reside. It may consist of a commercial off-the-shelf (COTS) platform that supports remote thin-client connections.

The Terminal Server platform is preferably connected to the low-side network. This means that the Terminal Server can be configured—without any CAB-specific training- to support any applications, resources and protocols natively available on that network.

In this embodiment, because native commercial terminal server protocols are not suitable for high assurance, cross-domain communications, the Virtual Desktop Protocol (VDP) may be used. VDP—developed to meet the needs of CAB—may be is an application-level protocol for remote, securable virtualization of a graphical user desktop on to a distant computer Client. VDP is a more secure replacement for standard commercial remote desktop protocols. VDP may be designed to be a very lightweight, yet extensible protocol, without most of the risks inherent in the more complex remote desktop protocols. Because the VDP protocol preferably provides no channels for risky activities such as file sharing and portable code execution, it can be easily secured through simple protocol enforcement and anomaly detection. The simplicity of the VDP protocol may also support real-time content inspection for such purposes as dirty word searches.

In this embodiment, the VDP may be comprised primarily of a small set of pre-defined data channels each handling specific tightly formatted message types. Messages may generally be transmitted using fixed-format messages, with some support for Type, Length, Value (TLV) encoding to ensure a common exchange format that is well formed, flexible and extensible. The concept of virtual channels may also be integrated into VDP to ensure that custom channels can be later defined and plugged into the protocol as it matures and grows based on foreseen and unforeseen new requirements and features.

Next, each of the components will be described in more detail.

CAB Client

In this embodiment, the CAB Client may be an application that is resident on a high-side user's workstation that provides access to a session on a low-side CAB Terminal Server. In a preferred embodiment, the main functionality of the CAB Client is to provide the high-side user with ability to interact with all of the low-side Terminal Server applications as seamlessly as possible. The Client preferably supports all native functionality provided by those low-side applications.

In this embodiment, the Client may accomplish this by only displaying graphical duplications of low-side applications. The Client itself does not run any direct applications on the Terminal Server (all interaction is transmitted to the Guard using VDP). Instead, the screen graphics of the low-side session may be transmitted to the high-side monitor and are interpreted and displayed by the Client.

In this embodiment, another function that the Client may provide is a final layer of defense in protecting the high-side computer. While, the Guard and Translator provide the majority of the security functionality of CAB, the Client may be a final stopgap for high-side users from low-side threats.

In this embodiment, in providing all of these functions, the Client preferably has a minimal amount of impact on the high-side platform in the areas of performance, configuration and maintenance.

Figure 3:
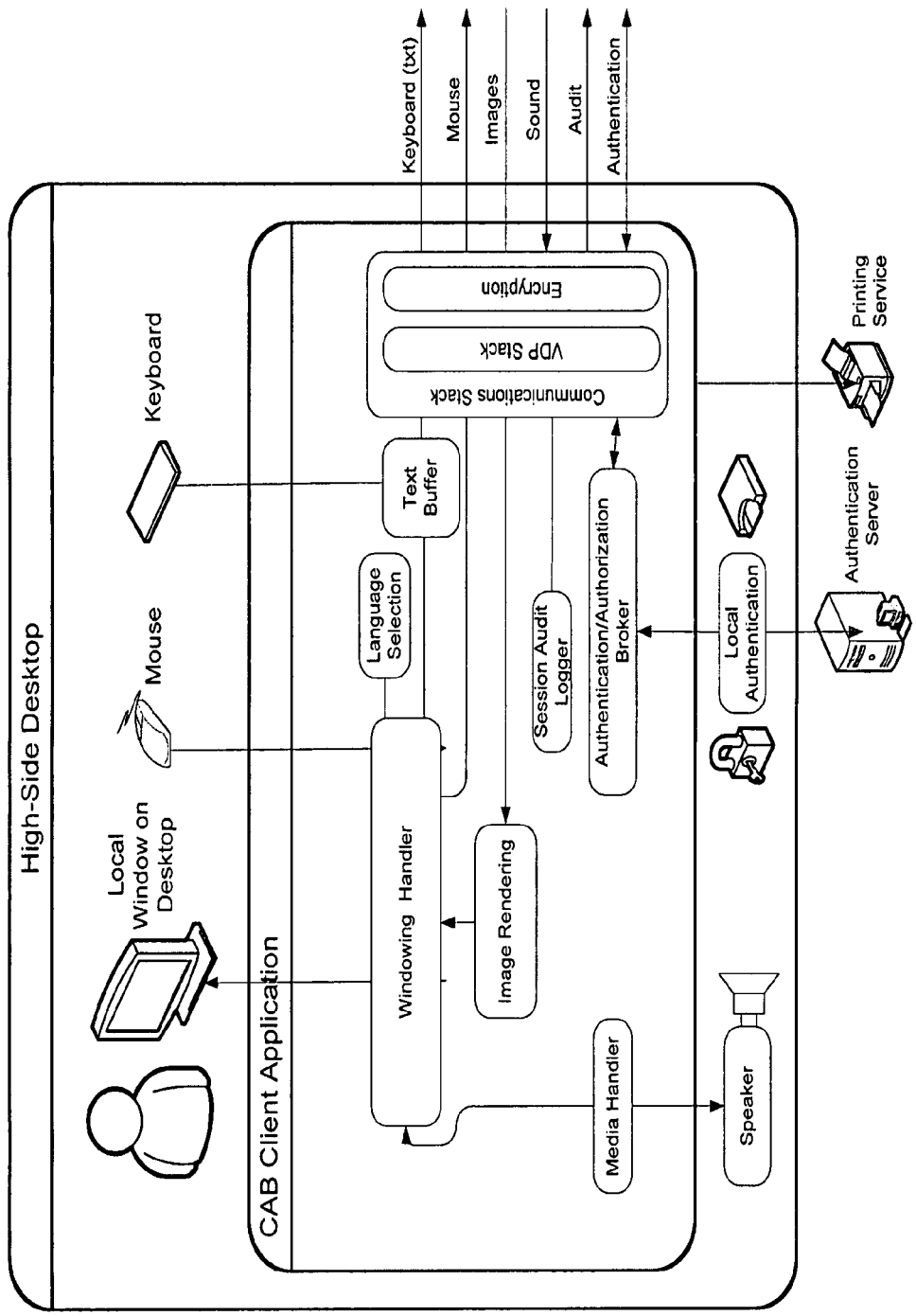
FIG. 3 shows an example of the high-level architecture of the CAB client.
Figure 4:
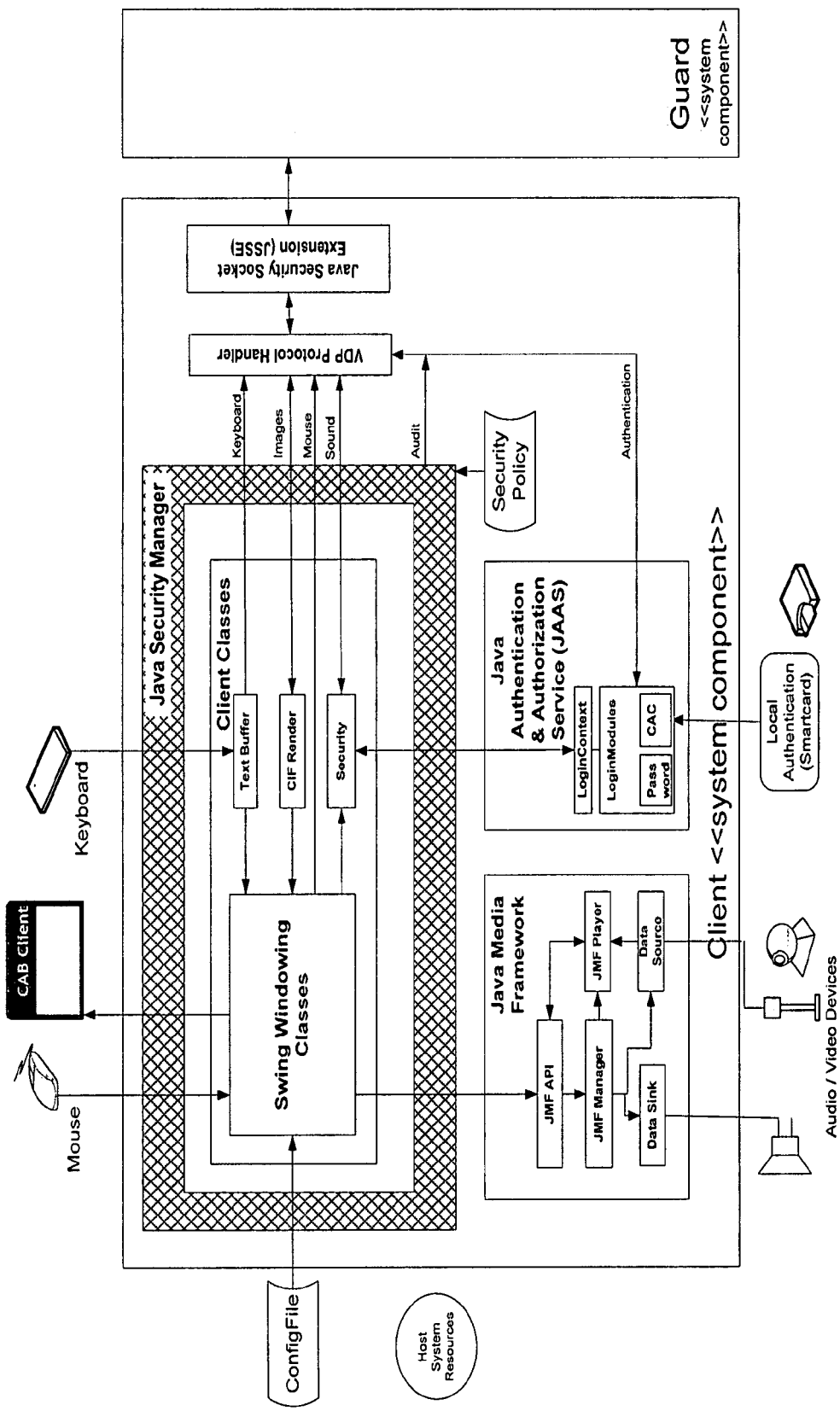
FIG. 4 shows an example of a low-level block diagram of the CAB client.

An example of a high-level architecture of one embodiment of the CAB Client is shown in FIG. 3. FIG. 4 shows a more detailed example of the CAB Client architecture in this embodiment.

In this embodiment, fundamental features desired for the CAB Client were support for user-friendly interfaces, strong security and low development, and deployment overhead. CAB preferably uses Java as the Client's development platform. Java offers a rich set of development features that are beneficial in using it for Client development.

First, there is Java's platform independence. Java runs on all relevant operating systems, including Windows, MacOS, UNIX and Linux. While one embodiment of the Client may be targeted at the Windows platform, using Java means that other embodiments can support other platforms with minimal porting. The pervasive nature of Java adoption also supports the goal of minimizing deployment issues. Most workstations already have some version of a Java Virtual Machine (JVM) loaded, thus maximizing technical acceptance and minimizing technical difficulties.

Second, Java offers many advanced Graphical User Interface (GUI) components and graphical capabilities. For example, the Swing toolkit, a GUI component kit used in the development of windowing components, is a core Java API. Swing is one of the most comprehensive GUI frameworks available and it comes packaged with the Java Development Kit (JDK). Swing provides a complete set of GUI components ranging from buttons and text fields to tables, trees and styled text editors. Swing also maintains a clean separation between the GUI components and model objects that are viewed on screen. The Swing components do not rely on the native graphical elements (called widgets) of the operating system; instead, Swing components are painted using graphic primitives such as lines, rectangles and text. The painting is delegated to a look and feel plug-in that can imitate the operating system's native look and feel. Java GUIs can look the same on all operating systems or they can emulate the native look.

Security was also a component in the selection of Java. Java was designed with security in mind, with security checking built into the libraries and virtual machine. While trust is placed in the high-side user, the Java sandbox restricts code from performing many activities that allow access to sensitive areas of the computer. Java security relies on three prongs of defense to perform load- and run-time checks to restrict filesystem and network access as well as access to browser internals. A more complete discussion on security will be presented in later sections.

In addition to the above, Java has many inherent functions that lends it to being used as the Client's foundation language. Such functions include automatic memory management and strong typecasting.

In this embodiment, one decision that has ramifications on the development of the Client is the choice of the Java Development Kit (JDK). JDK is the software package that enables a programmer to make use of the Java language. All known versions of JDK contain compilers, interpreters, and a host of class libraries called packages. Packages are essentially directories of subprograms (called classes) that are grouped according to their functionality.

For one embodiment of CAB development, JDK 1.5.0 (also known as JDK 5.0) was chosen. JDK 1.5 is a feature release of the Java platform and was released in November 2004. It contains many bug fixes and additional features and enhancements in many functional areas.

The decision to select Java makes support for various operating systems and hardware platforms much easier than any other programming technology. However, as with any other application, there are differences in the way programs behave among varieties of even the same operating system. Thus, in various, non-limiting embodiments, the Client may be supported and tested against the following high-side user operating systems: Windows XP (SP1) or higher, Windows 2000, MacOS, UNIX and Linux.

In this embodiment, the CAB client software may be partitioned into two libraries. The common library contains software of a general purpose that may be used in multiple applications, such as in both the client GUI and the administration GUI(s). The client library contains software specific to the CAB Client, such as code supporting the specification of client preferences.

In this embodiment, within each library, the software is further divided into packages of related components. For example, all of the custom software that manages client security may reside in the security package.

Figure 5:
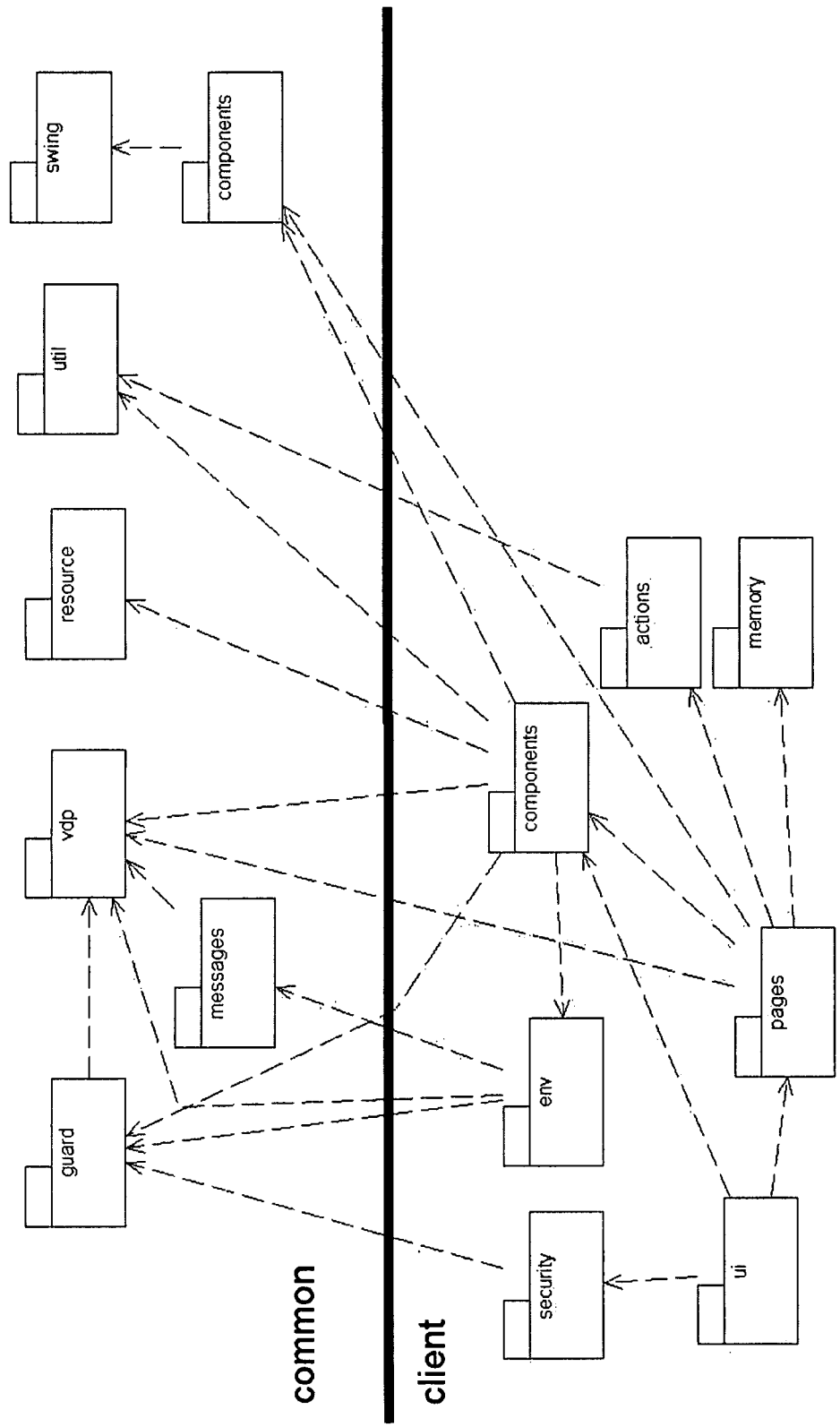
FIG. 5 shows an example of main packages and subpackages of the CAB client software.

Examples of the main packages in both libraries are shown in FIG. 5, and are described in subsequent sections. The arrows in FIG. 5 show the use of one package by another. For example, the "ui package" uses software from both the Client and the common libraries' components packages.

In this embodiment, within each main package may be sub-packages, which may be grouped according to functionality. Some reallocation of the various packages and the classes within them may occur during implementation.

Figure 6:
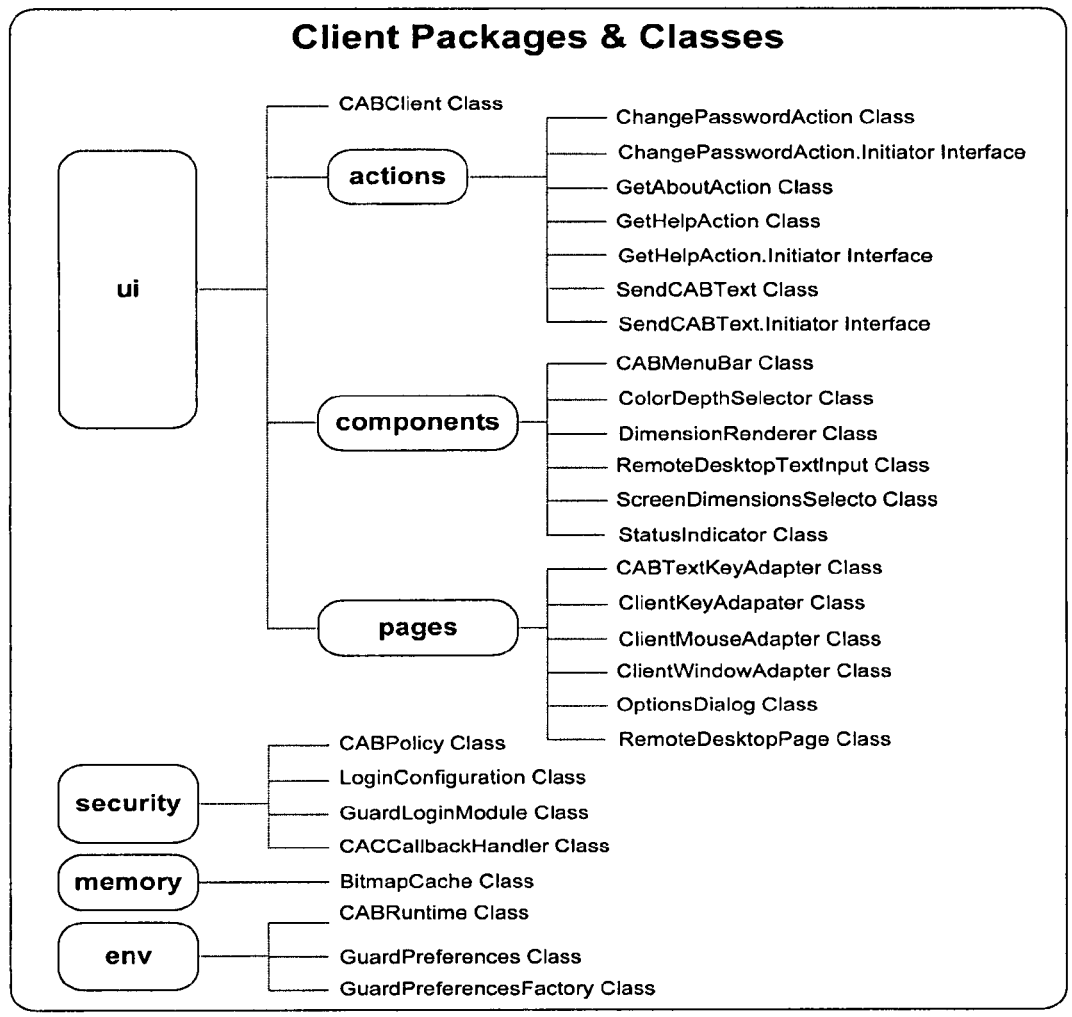
FIG. 6 shows an example of CAB Client package structure.

In this embodiment, the Client package may contain sub-packages and classes whose functionalities are specific to the client application. An exemplary embodiment is shown in FIG. 6.

In this embodiment, descriptions of each of the sub-packages contained in the main Client package are shown below:

| Client Package And Subpackages | |
|---|---|
| Package | Description |
| ui | This package contains the main class of the Collaboration and Browse client, which can be run from the command line via the Java command and provides controlled access from a high-side user to a low-side system. |
| ui.actions | Provides actions for the CAB client. Actions are implementations of javax.swing.Action (created by extending javax.swing.AbstractAction) that encapsulate the attributes of actionable display elements (such as UI buttons) and the processing performed as a result of clicking those elements. Actions in this package implement the following pattern: If an action in this package requires data from the initiating component, the action should define an Initiator interface that the initiating component can use to provide that data. |
| ui.components | Provides custom UI components for the CAB client. These components group related elements, such as configuration settings, which can then be assembled into pages, which are in turn defined in package client.ui.pages. |
| ui.pages | Provides custom display pages for the CAB client. These pages are largely assembled from components in package client.ui.components. |
| Security | Provides classes for supporting CAB security by plugging in to the Java Authentication and Authorization Service (JAAS). JAAS provides a framework for implementing custom login mechanisms, security policies, et al. |
| memory | Provides memory management for the CAB application. Display elements such as fonts are cached on the Client the first time they are received from the server and for efficiency, subsequent requests from the server reference the cached elements. |
| env | Provides classes for accessing attributes of the CAB client application's environment, such as to which guard the application is making requests and what are the preferences in effect for that guard. |

In this embodiment, descriptions of the classes and interfaces contained in main Client package are given in the table below:

| Classes of the Client Package | |
|---|---|
| Class/Interface | Description |
| CABClient | The CAB client application class. |
| ChangePasswordAction.Initiator | Interface for a class which initiates the ChangePasswordAction action, such as a UI component containing a button to which this action is an ActionListener. |
| GetHelpAction.Initiator | Interface for a class which initiates the GetHelpAction action, such as a UI component containing a button to which this action is an ActionListener. |
| SendCABTextAction.Initiator | Interface for a class which initiates the SendCABTextAction action, such as a UI component containing a button to which this action is an ActionListener. |
| ChangePasswordAction | Implementation of javax.swing.Action that responds to user requests to change their password. |
| GetAboutAction | Implementation of javax.swing.Action that responds to user request for information about the CAB client. |
| GetHelpAction | Implementation of javax.swing.Action that responds to user requests for help. |

-continued

| Classes of the Client Package | |
|---|---|
| Class/Interface | Description |
| SendCABTextAction | Implementation of javax.swing.Action that sends a text string (as opposed to individual keystrokes) to the Guard. |
| CABMenuBar | The menu bar for the main CAB Client window. |
| ColorDepthSelector | UI component for choosing the color depth for the CAB Client. |
| DimensionRenderer | Renders a java.awt.Dimension to the screen. |
| RemoteDesktopTextInput | Provides a field for entering text and a button for requesting that the text be sent to the VDP server. |
| ScreenDimensionsSelector | Display component for selecting the screen dimensions. |
| StatusIndicator | Indicator of the status of the connection to the Guard. |
| CabTextKeyAdapter | Manages key input on the remote desktop frame when CAB-style text input is enabled. |
| ClientKeyAdapter | Responds to key events when the remote desktop has focus. |
| ClientMouseAdapter | Class for handling mouse events when the RemoteDesktopPage has focus. |
| ClientWindowAdapter | Repaints the remote desktop if the client window is reactivated, and cleans up when the window is closed. |
| OptionsDialog | Display component for selecting display options. |
| RemoteDesktopPage | The window that displays the remote desktop. |
| CABPolicy | Implements the security policy for the CAB Client. |
| CACCallbackHandler | Implementation of a javax.security.auth.callback.CallbackHandler to interact with a CAC card to get user credentials for login. |
| GuardLoginModule | Implementation of javax.security.auth.spi.LoginModule, which delegates authentication of a user to a CAB Guard. |
| LoginConfiguration | Concrete implementation of javax.security.auth.login.Configuration that improves security by defining the login configuration in code instead of in a JAAS configuration file. |
| BitmapCache | A cache of bitmaps received from the Guard. |
| CABRuntime | Provides access to dynamic attributes of the CAB environment. |
| GuardPreferences | Extension of java.util.pref.Preferences that provides access to user preferences retrieved from the Guard. |
| GuardPreferencesFactory | Implementation of java.util.prefs.PreferencesFactory that supports the use of the guard as the store for user preferences. |

Figure 7:
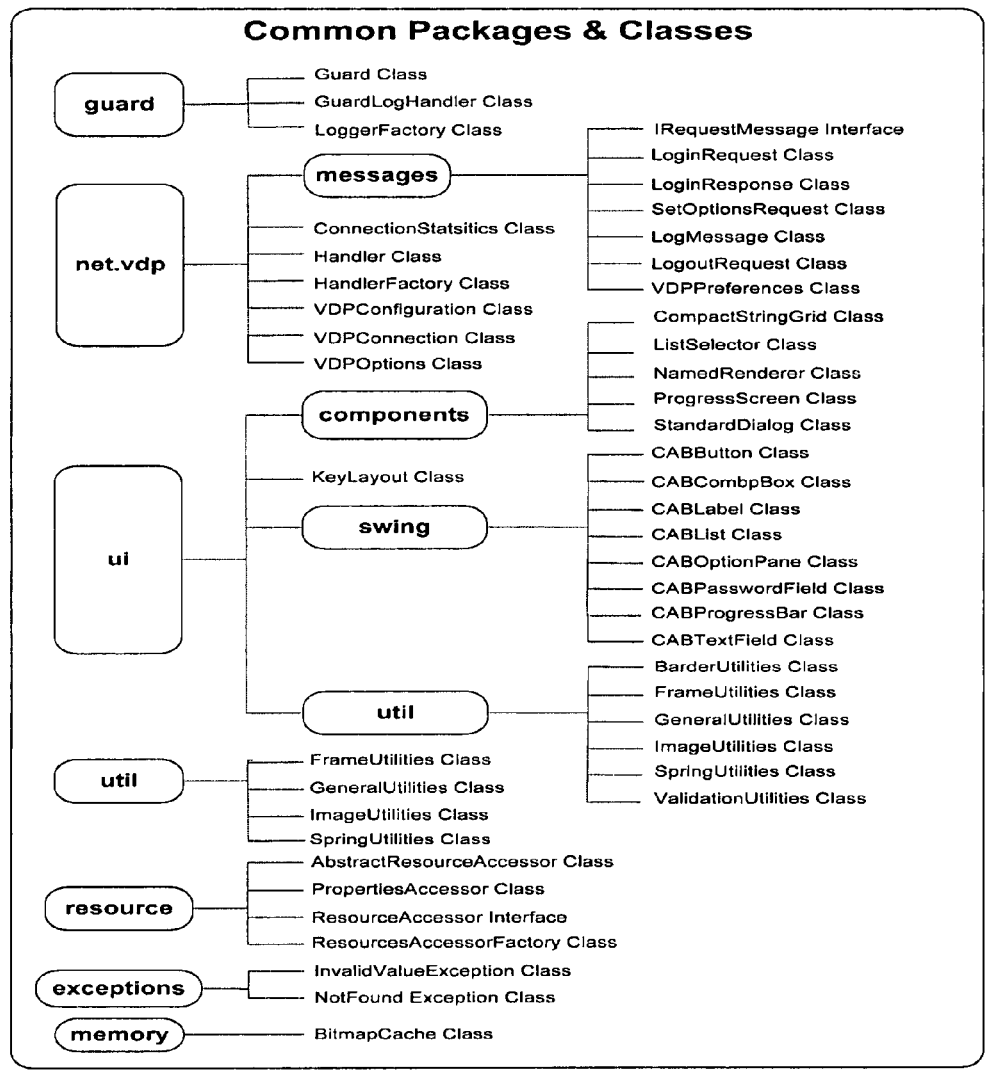
FIG. 7 shows an example of CAB Client common package structure.

Shown in FIG. 7, for example, the Common package may contain sub-packages and classes whose functionality are not specific to the client application, and so may eventually be used by other applications.

In this embodiment, descriptions of each sub-package contained in the main Client package are shown below:

| Client Common Package and Subpackages | |
|---|---|
| Package | Description |
| guard | Contains classes that provide an abstract representation of interfaces with the Guard. The Guard class represents the Guard itself, whereas the GuardLogHandler and LoggerFactory classes plug into the java.util.logging framework to provide a mechanism to send log messages to the Guard. |
| net.vdp | Provides classes for a Java protocol handler supporting VDP. |
| net.vdp.messages | Classes representing the messages exchanged between the CAB Client and VDP server. All request messages contain constructors and/or mutators that allow the message elements, such as username and password in a login request, to be set. All request messages also implement the IRequestMessage interface to provide a toBytes method that expresses the message as a byte array in the format used by the VDP protocol for that request type. All response messages contain a constructor that takes a byte array in the format sent by the VDP server, and provide accessors for accessing the message elements. |
| ui | Provides user interface classes of general value (i.e., that are not specific to a particular application, such as the CAB Client, but may be used by multiple UI applications). |

-continued

| Client Common Package and Subpackages | |
| --- | --- |
| Package | Description |
| ui.components | Classes that provide abstractions on top of the Java AWT/Swing classes. |
| ui.swing | Provides classes that wrap Swing components to standardize display attributes such as text fonts. |
| ui.util | Provides utility classes for constructing user interfaces. |
| util | Provides general utility classes. |
| resource | Provides classes for accessing resources, including support for localized/internationalized resources such as text strings in java.util.ResourceBundles. In order to accommodate the possibility that the storage location (such as flat file, database, or remote server) for resources may change (if not now, possibly in the future), we use a factory ResourceAccessorFactory to create a concrete class (implementing the ResourceAccessor interface) for the storage mechanism in use. For example, resource definitions for the CAB Client initially exist as properties files, so the ResourceAccessorFactory will instantiate a PropertiesAccessor object, which implements ResourceAccessor, for accessing those resource definitions. However, if the future resource definitions were to reside on the Guard, a GuardResourceAccessor class, which would also implement ResourceAccessor, could be created for accessing those resources, and ResourceAccessorFactory would be configured to create and provide a GuardResourceAccessor object. |
| exceptions | Defines custom exceptions for the Collaboration and Browse software. |
| memory | Provides memory management for the CAB application |

In this embodiment, descriptions of the classes and interfaces contained in the Common package are given in the table below:

| Classes of the Client Common Package | |
| --- | --- |
| Classes/Interface | Description |
| Guard | A Collaboration and Browse guard. |
| GuardLogHandler | Sends log entries to the Guard. |
| LoggerFactory | Singleton factory that provides java.util.Logger instances to support logging and auditing for the Collaboration and Browse software. |
| ConnectionStatistics | Statistics about a VDP connection. |
| Handler | Extension of java.net.URLStreamHandler that provides connections to Virtual Desktop Protocol servers. |
| HandlerFactory | Implementation of java.net.URLStreamHandlerFactory that allows access to a VDP protocol handler without requiring that the java.protocol.handler.pkgs system property be modified. |
| VDPConfiguration | The configuration supported by the VDP server. |
| VDPConnection | Extension of java.net.URLConnection for a connection to the VDP server. |
| VDPPreferences | VDP settings for the user |
| IRequestMessage | Interface for any message to be sent to a VDP server. |
| LoginRequest | A request to log in to a guard. |
| LoginResponse | The response to a VDP login. |
| LogMessage | A log message to send to the guard. |
| SetOptionsRequest | Sends a request to set user-selectable VDP options. |
| VDPPreferences | The VDP settings for the user. |
| KeyLayout | Key layouts for various languages. |
| CompactSpringGrid | A JPanel that is laid out as a spring grid of 2 columns by n rows, with column one being a label for a component and column 2 being the component. |
| ListSelector | UI component for displaying a list of selections in a scrollable JList. |
| NamedRenderer | Displays to a cell an object that implements Named. |
| ProgressScreen | UI containing a busy indicator (with message) and a Cancel button to display, and an action to perform during the display (and the completion of which results in the end of the display). |
| StandardDialog | This class implements a standard data entry dialog with "Ok" and "Cancel" buttons. |
| CABButton | JButton wrapper that standardizes various attributes such as label font. |

-continued

Classes of the Client Common Package

| Classes/Interface | Description |
| --- | --- |
| CABComboBox | JComboBox wrapper that standardizes display attributes such as text font. |
| CABLabel | JLabel wrapper that standardizes display attributes such as text font. |
| CABList | Wrapper for a javax.swing.JList which standardizes display attributes such as text font. |
| CABOptionPane | JOptionPane wrapper that standardizes display attributes such as text font. |
| CABPasswordField | Wrapper for JPasswordField to standardize attributes such as fonts. |
| CABProgressBar | Wrapper for JProgressBar to standardize attributes for display. |
| CABTextField | JTextField wrapper that standardizes display attributes such as text font. |
| BorderUtilities | Utility methods for working with Swing borders. |
| FrameUtilities | Utility methods for working with frames. |
| GeneralUtilities | Miscellaneous UI utility methods; |
| ImageUtilities | Utility methods for working with images. |
| SpringUtilities | A 1.4 file that provides utility methods for creating form- or grid-style layouts with SpringLayout. |
| ValidationUtilities | Utility methods for validating user input. |
| Named | Interface for any UI component that has a name that can be rendered to a display. |
| Debug | Utility methods supporting debugging. |
| Debug.StackFrameText | Provides access to the components of the string describing the stack frame. |
| FileUtilities | Utility methods for manipulating files. |
| ResourceAccessor | Interface for classes that provide access to resources such as property files. |
| AbstractResourceAccessor | Abstract class providing access to resources such as property files. |
| PropertiesAccessor | Configuration settings defined in properties files. |
| ResourceAccessorFactory | Provider of an AbstractResourceAccessor appropriate to the storage mechanism in use for resources. |
| InvalidValueException | Exception indicating that an invalid value was used. |
| NotFoundException | Exception indicating that something was not found. |

The following sections describe relationships among the classes. Complete descriptions of all class interrelationships are not presented, but would be readily apparent to one of skill in the art.

Figure 8:
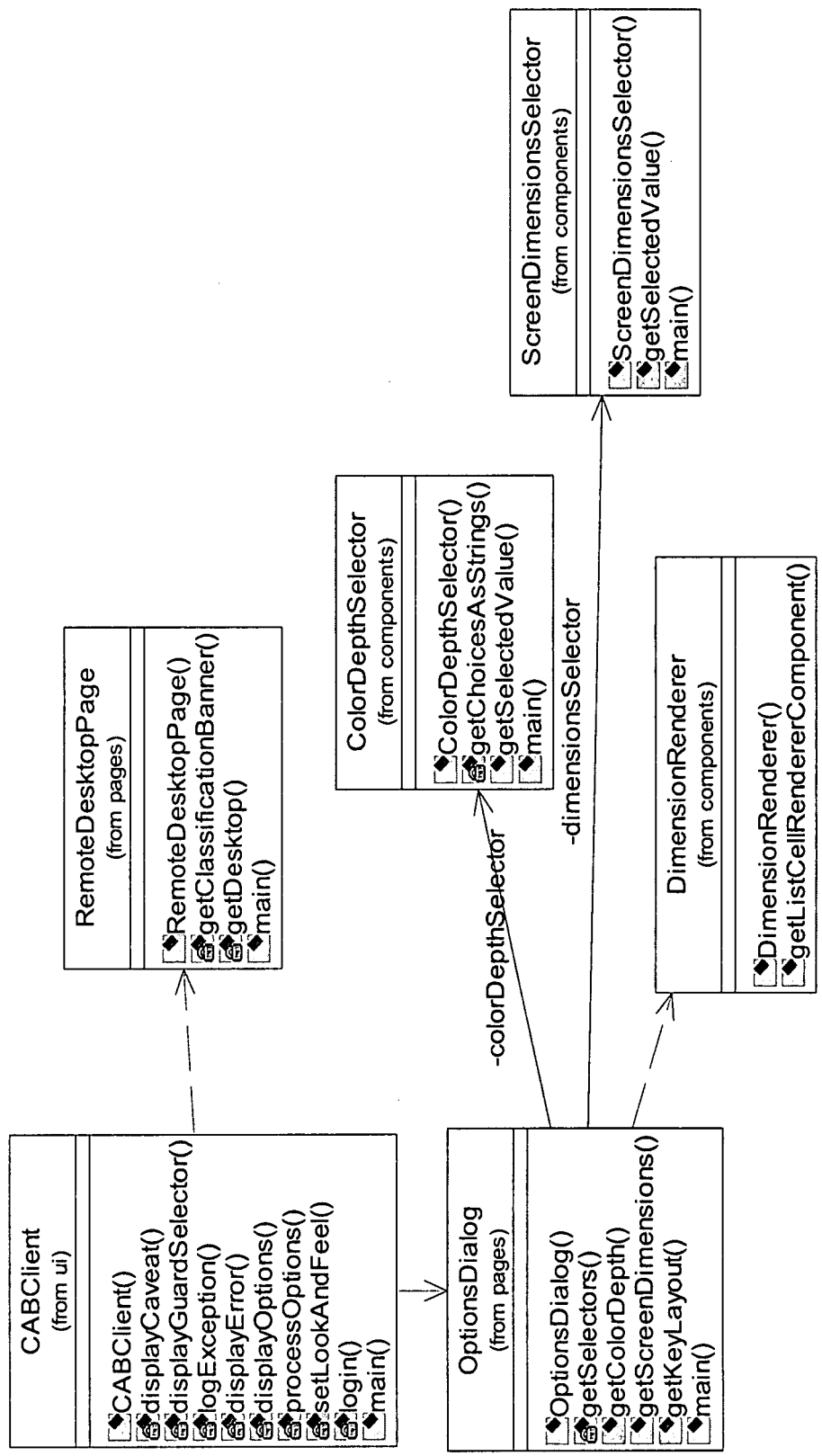
FIG. 8 shows an example of CAB Client display components.
Figure 9:
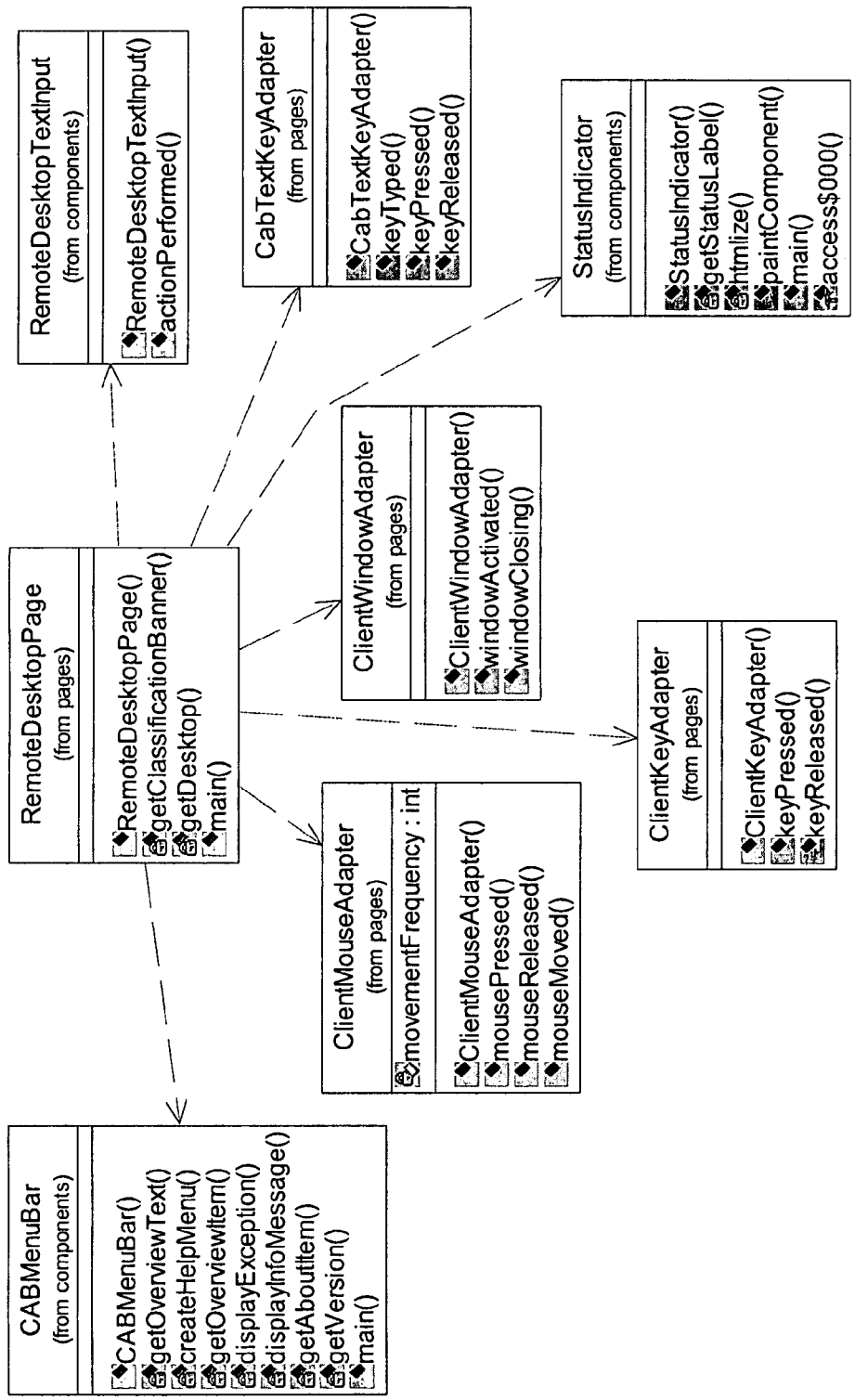
FIG. 9 shows an example of CAB Client remote desktop display components.

FIGS. 8 and 9 show examples of the primary classes involved in displaying the client UI application in one embodiment.

In this embodiment, the CABClient class may contain the main method that is used to run the application. It orchestrates the display of the initial screens that allow the user to select the Guard to connect to and the display options to use (a screen to enter username and password is displayed as a result of using the JAAS framework as discussed in a subsequent section. Once the user is authenticated, the RemoteDesktopPage is instantiated and assumes responsibility for all interaction with the user.

In one embodiment, the RemoteDesktopPage (FIG. 9) presents a screen containing the following elements:

A menu bar that allows the selection of functions such as changing the password or displaying help.

A classification banner showing the classification of the low-side system to which the application is connected.

The bulk of the remote desktop page is comprised of the desktop on the low-side system. The classes involved in managing the desktop include various adapters that intercept user actions such as mouse clicks and send them to the low-side system.

A bar at the bottom of the page contains the text box and send button for CAB-style input (if enabled), and a status indicator that shows a summary status of the connection and which, if clicked, pops up a more detailed status display.

Security Architecture

Java's security model is one of the language's architectural features that make it an appropriate technology for the CAB Client, as disclosed in one embodiment. Java provides a customizable "sandbox" in which each Java program runs. A Java program must operate only inside its sandbox. An application can do many things within the boundaries of its sandbox, but it cannot take any action outside those boundaries. The sandbox can prohibit many activities. Examples of prohibited actions include:

Reading or writing to the local disk

Making a network connection to any host, except those allowed

Creating new processes

Loading a new dynamic library

Directly calling a native method.

To make sure the sandbox has no leaks, Java's security model involves every aspect of its architecture. The fundamental components responsible for Java's security are:

Java Virtual Machine—By enforcing structured access to memory, the Java Virtual Machine yields programs that prohibit the use of unstructured memory access (a requirement for malicious intent such as buffer overflows). Thus, a hacker cannot predict where in memory data is being stored by looking at the class file. Other functions of the JVM, type safe reference casting, automatic garbage collection and arrays bounds checking, all contribute to stronger security.

Class Verifier—Enables code to be verified up front, rather than on the fly as the code is executed, which prevents uncontrollable crashes.

Class Loader—Responsible for importing binary data that defines the running program's classes and interfaces, the Class Loader architecture has the capability to prevent the loading of untrusted classes that declare themselves to be part of a trusted library.

Security Manager—Enables a custom security policy for Java applications.

Of the four major security tenants list above, only the last two, Class Loader and the Security Manager, are customizable to address specific security concerns.

Based on the initial threat model with which we are working, customization of the security policy are sufficient.

Security Policy

In this embodiment, a security policy defines restrictions such as what system resources an application can access. The Java API may enforce the custom security policy by asking the security manager for permission to take any action before it does something that potentially is unsafe. For each potentially unsafe action, there is a method in the security manager that defines whether that action is allowed by the sandbox. The implementation of these methods is what defines the custom security policy of the application.

In this embodiment, the main objective of the CAB Client security policy may be to prevent the following events:

Reading from unspecified host-based files
Writing to any host-based file
Deleting any unauthorized host-based files
Accessing or modifying system properties
Thread modifications (change priority, stopping)
Opening connections to only a specified set of Guard addresses and port numbers
Creation of a new class loader
Creating new processes
Causing the application to exit
Loading any dynamic libraries
Waiting for a connection on a specified local port number (client should never accept CAB requests).

In this embodiment, the java.security.Policy class may support a security policy that can be specified via a configuration file. Placing this policy in a file raises the possibility that if the file system is compromised then the policy can be compromised. For one embodiment of CAB, this may be avoided by implementing a security policy in a custom extension of java.security.Policy. This may also provide extensibility in that a custom security policy class may also loaded the policy from a trusted source, such as from the Guard.

Authentication

In this embodiment, in addition to utilizing the features inherent of the Java security architecture, CAB may also leverage other built-in mechanisms that Java provides for authenticating users.

JAAS is a pluggable framework that allows, among other things, the specification of a customized authentication mechanism. JAAS authentication may be performed in a pluggable fashion. This permits Java applications to remain independent from underlying authentication technologies. New or updated authentication mechanisms can be plugged in without requiring modifications to the Client application itself. JAAS authorization extends the existing Java security architecture that uses a security policy to specify what access rights are granted to executing code.

In this embodiment, since authentication of the CAB high-side user occurs at the Guard, we can effectively leverage JAAS in the Client implementation.

JAAS may also allow for flexible support of potential high-side user's Common Access Cards (CAC).

In this embodiment, there are three elements in the use of JAAS:

GuardLoginModule implements javax.security.auth.spi.LoginModule, which provides a standard API for authenticating a user. For CAB this module can delegate the authentication to the Guard.

LoginConfiguration extends java.security.auth.login.Configuration, which lets us specify which LoginModule implementations we support (in our case, GuardLoginModule).

CACCallbackHandler implements javax.security.auth.callback.CallbackHandler, which defines a standard API for accessing user credentials. For non-certificate-based login (i.e., interactive entry of a username and password by a user and verified directly by the Guard), no custom CallbackHandler implementation is needed because a UI callback handler is provided by Sun.

Figure 10:
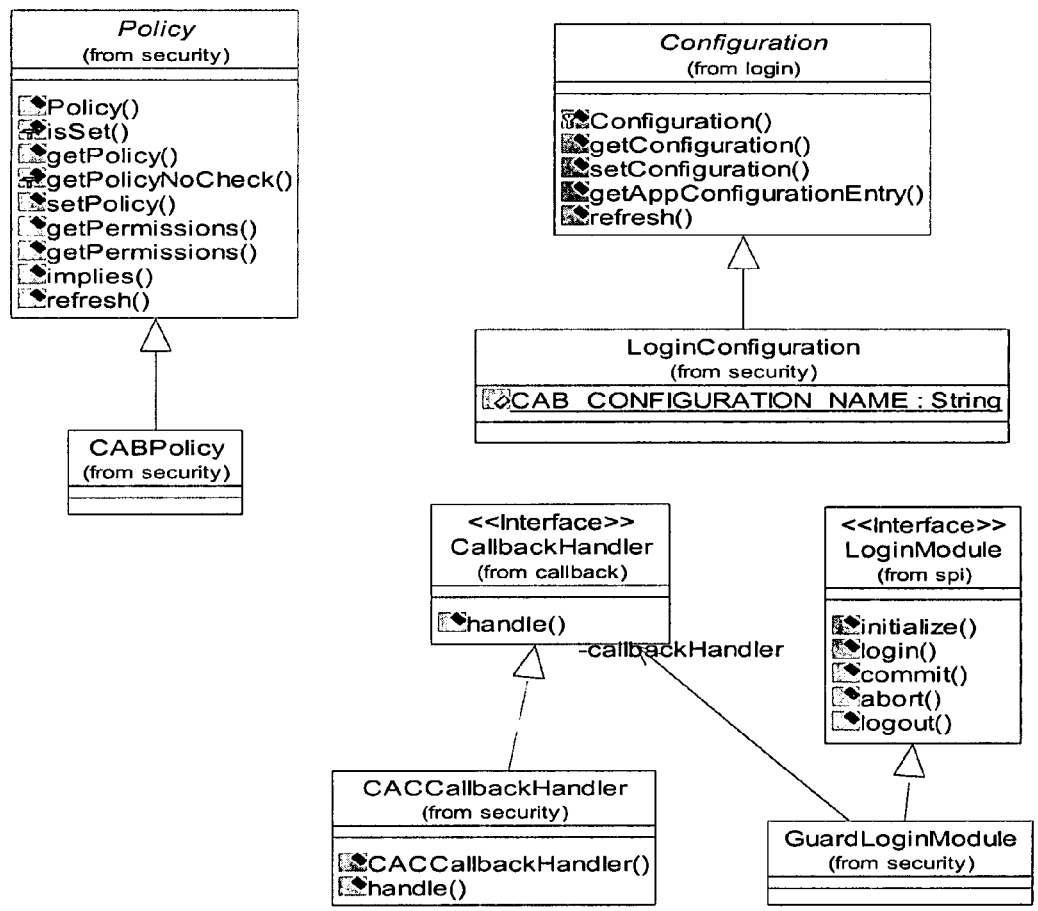
FIG. 10 shows an example of CAB Client security classes.

FIG. 10 shows examples of the elements that the CAB Client uses.

GUI Design

In this embodiment, a goal of the GUI design is to make the CAB Client application as familiar to the user as possible, employing the techniques of other windows-based applications. This familiarity aids the user in successful use of the application and decreases learning time.

Figure 11:
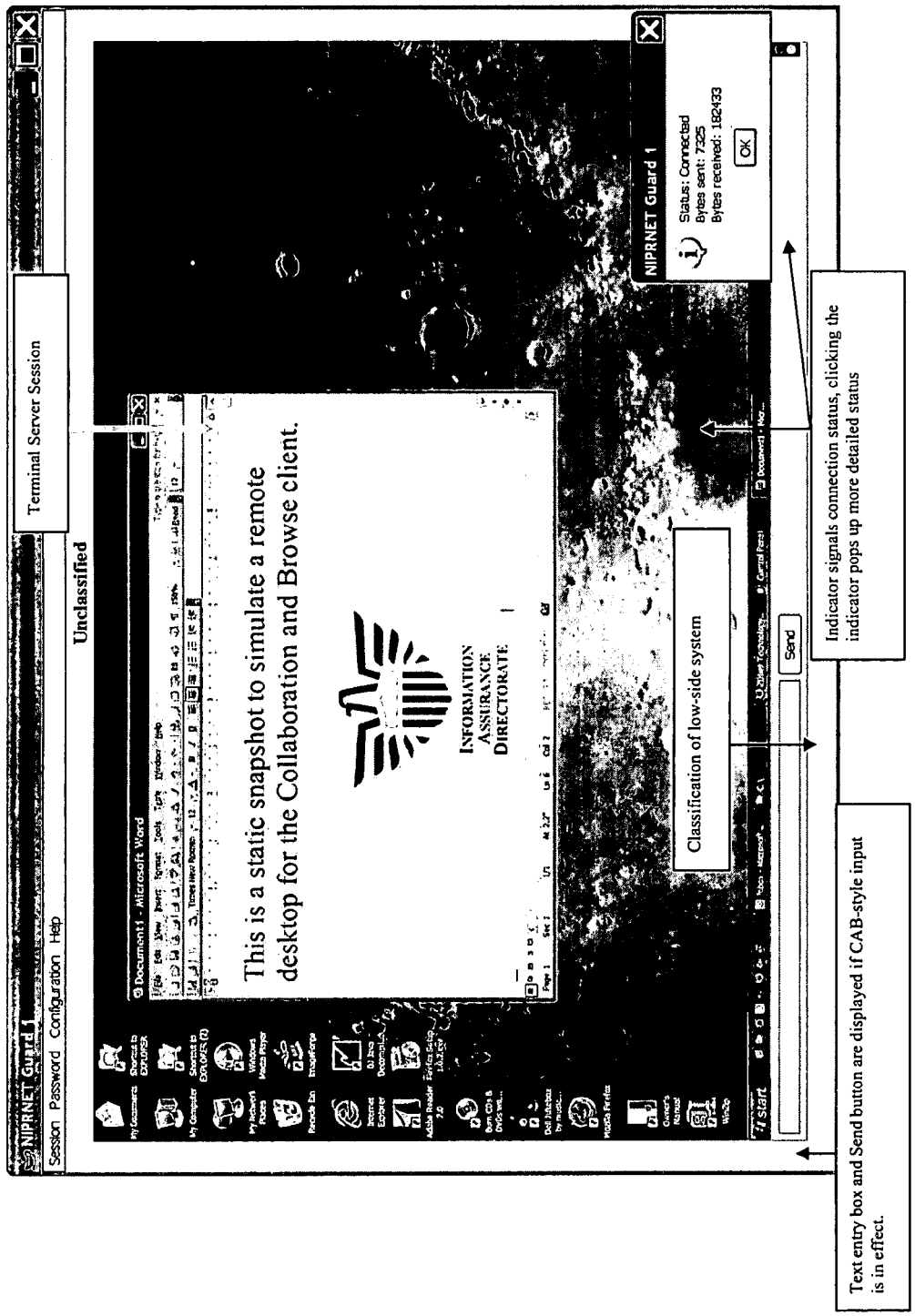
FIG. 11 shows an example of a CAB Client window.

An exemplary embodiment for the CAB Client screen design, after a user has successfully logged in, is shown in FIG. 11. The larger inner frame of the Client is the remote desktop running on the low-side Terminal Server. The intention is to minimize any other frames around this inner frame to maximize the screen size of the remote desktop. The parameters of the Remote Desktop frame (such as screen resolution, color depth) may be user-selectable during the login process.

In one embodiment, the Client's lower frame is where an optional text entry box would be displayed if this option is enabled by the Guard during Client startup. The intent of the text box is act as a typing area for all user interactions. Anything typed, or cut and pasted, appears in the text box and allows the user to visually review the content before it is sent to the Guard for inspection. This is a measure to prevent inadvertent disclosure. The user sends the text by using the send button next to the text box.

Also on the lower frame may be a connection health monitor/indicator. In one embodiment, while there is an active connection to the Guard, the indicator light is green. If connectivity to the guard is disconnected, the indicator is red. For more detailed information, a user can click on the indicator to pop open another window that contains more statistics.

The upper frame of the Client may show the classification banner of that Client session. The text and the banner color are configurable items received from the Guard during the start-up process.

Figure 12:
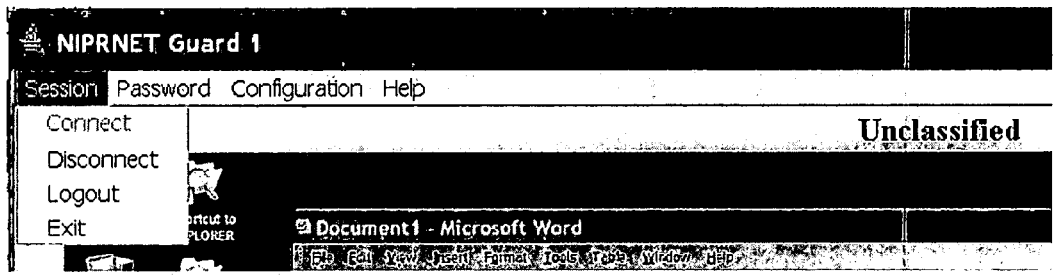
FIG. 12 shows an example of CAB Client session menu selections.

In this embodiment, located on top of the classification banner may be the main Client menus. The main menu can house most functions that can be performed by the user. The first Client menu is the Session menu, shown, for example, in FIG. 12.

In one embodiment, the three options for this menu are Disconnect, Reconnect and Logout. If the user selects Disconnect, only the Client is closed, but the session remains open. If Reconnect is selected, a disconnected session can be resumed. This supports the requirement for a user to use the same session at a different workstation. If the user selects Logout, the user is logged out from both the high and low side and the session; the session is completed and torn down.

Figure 13:
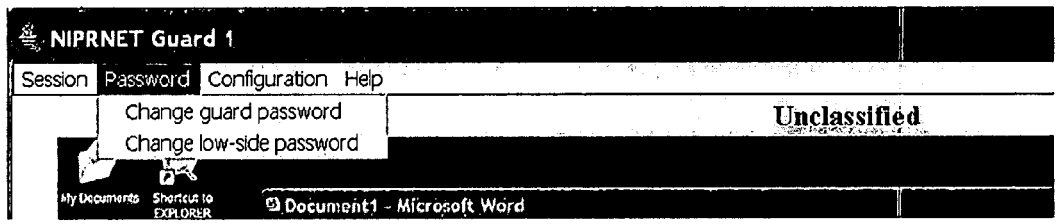
FIG. 13 shows an example of CAB Client password menu selections.

In this embodiment, the second Client menu addresses the functionality of changing passwords and is shown, for example, in FIG. 13. The user can change both high side and low-side passwords. When the user wants to change the guard password, the user selects the first menu. This changes the password on the Guard. Because the Guard supports password aging, this same mechanism is used when a user is requested to update a password. In either case, the Guard will determine if the password is accepted or denied and send a notification back to the Client. This menu option is only valid when Guard passwords are used, not when a directory service or PKI is being used on the high side. For those cases, to change their password, the user would change it through the directory service and the menu will either be grayed out or not shown.

In this embodiment, the second function of the password menu may be used if the user wants to notify the Guard of a change in the Terminal Server password. Since users may update their password directly on the Terminal Server (if policy allows), it is the responsibility of the high-side user to inform the Guard that the Terminal Server password has changed. The function of the "change low-side password" button is to push the new Terminal Server password to the Guard by having the user enter the Terminal Server password again. This enables a single high to low sign-on capability. If the user does not push the update to the Guard, the user will still be able to log into the Terminal Server (through the regular Windows login screen on the Terminal Server). However, it will not be automatic after logging on to the high side.

Figure 14:
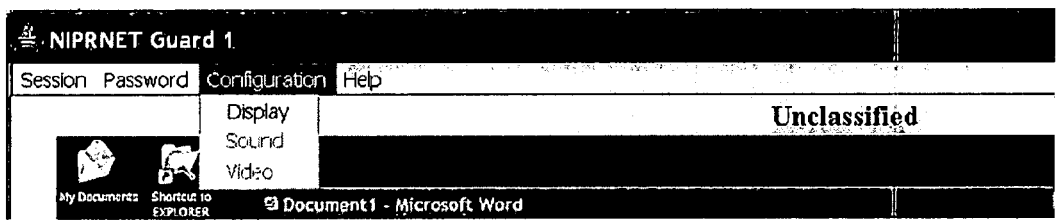
FIG. 14 shows an example of CAB Client configuration menu selections.

In this embodiment, an example of a third menu, Configuration, is shown in FIG. 14. Configuration displays the current configuration settings for display, sound and video. Many of these options are set as Guard configuration items and may not be user-definable.

Figure 15:
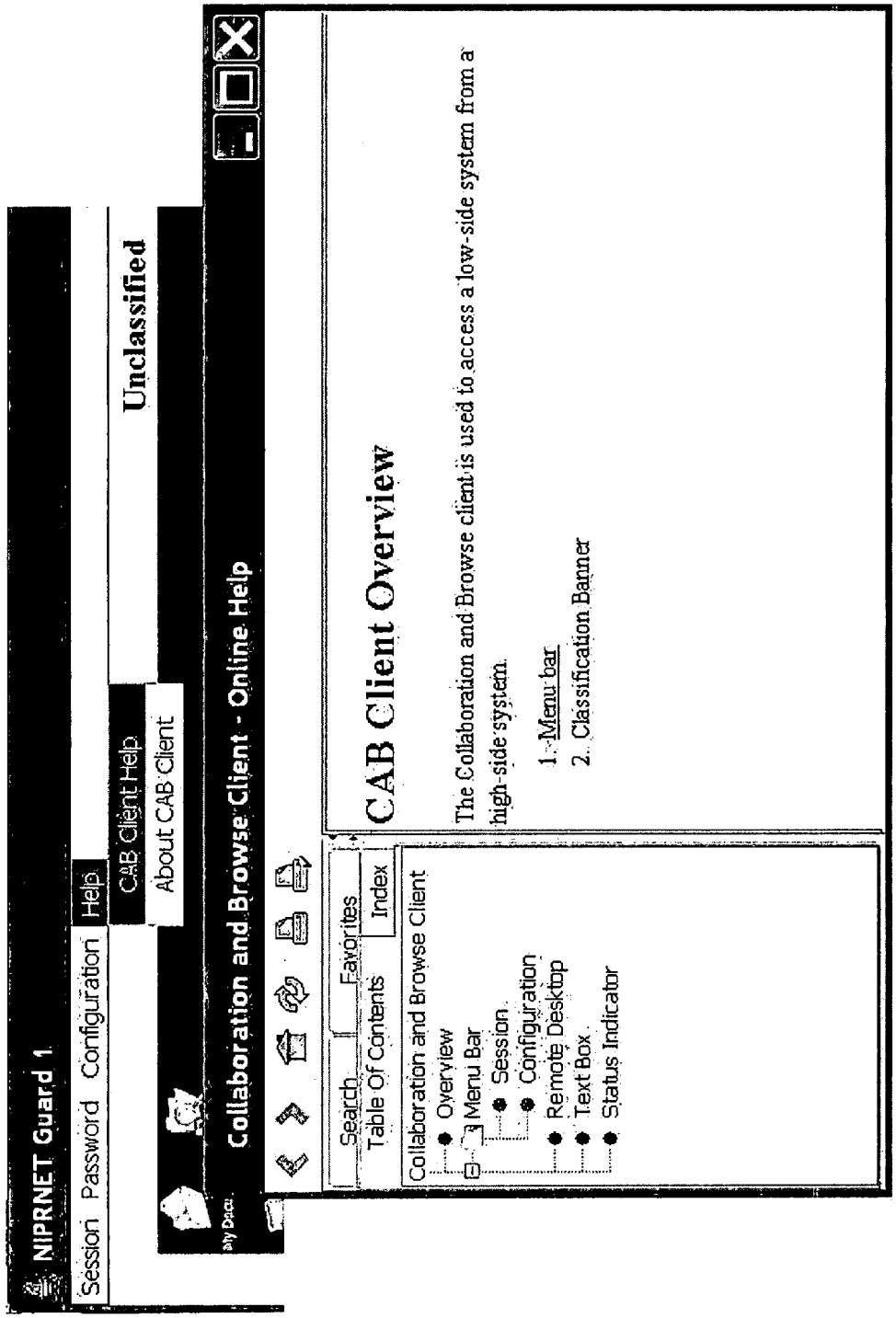
FIG. 15 shows an example of CAB Client Help menu selections.

In one embodiment, the last menu present is Help, shown in FIG. 15. The CAB Client Help can shows various help topics associated with the CAB Client. The About CAB Client may show the software version of the Client.

In one embodiment, another feature is the mechanism in which the users apply Windows key combinations to the Terminal Server session. For instance, if a user wishes to display the task manager in the remote session, pressing ALT-CTRL-DEL in the Client application, or anywhere else for that matter, only brings up the Task Manager on the local host.

Configuration and Deployment

In one embodiment, each Client application may be installed in the Java Archive (JAR) file format. This enables the bundling of multiple files into a single archive file. The JAR file can contain all of the class files and auxiliary resources associated with the Client application. The JAR file format provides many benefits:

Security: digitally signing the contents can prevent the tampering of the JAR file Compression: for efficient storage Package Sealing: Packages stored in JAR files can also be sealed so the package can enforce version consistency. Sealing a package within a JAR file means that all classes defined in that package must be found in the same JAR file Package Versioning: A JAR file can hold data about the files it contains, such as vendor and version information Portability: The mechanism for handling JAR files is a standard part of the Java platform's core API.

Client Distribution

In this embodiment, for high-side administrators, there may be two scenarios for distributing the Client: manually or automatically. In the manual case, the high-side administrator would have to install the Client on each high-side workstation. This leads to long installation and is prone to the wrong version being used.

In this embodiment, in the automatic situation the admin, can push out the Client with an application management system such as Microsoft SMS.

In this embodiment, the Client application can also be written as an applet. Changing the Client to an applet allows the Client to be included in an HTML page (located on the Guard). When a high-side user uses a Java technology-enabled browser to view a page that contains the Client applet, the applet's code is transferred to the high-side user's system and is executed by the browser's JVM. This eliminates the need for distribution and assures that high-side users get the most current copy every time the program is used. In order for the Client applet to work, browser support is needed from the Guard.

In this embodiment, the installation of the Client on a high-side workstation may be accomplished using an installer. The installer may include the proper version of the JRE.

Configuration

In this embodiment, the CAB Client software may access site-specific configuration data needed by the Client, such as text for a login banner and the network addresses of the CAB Guards from files with specified format and with a known filename that resides in a known location for each user.

In this embodiment, this file may be configurable by an administrator and will be part of the configuration process.

Guard Component

Figure 16:
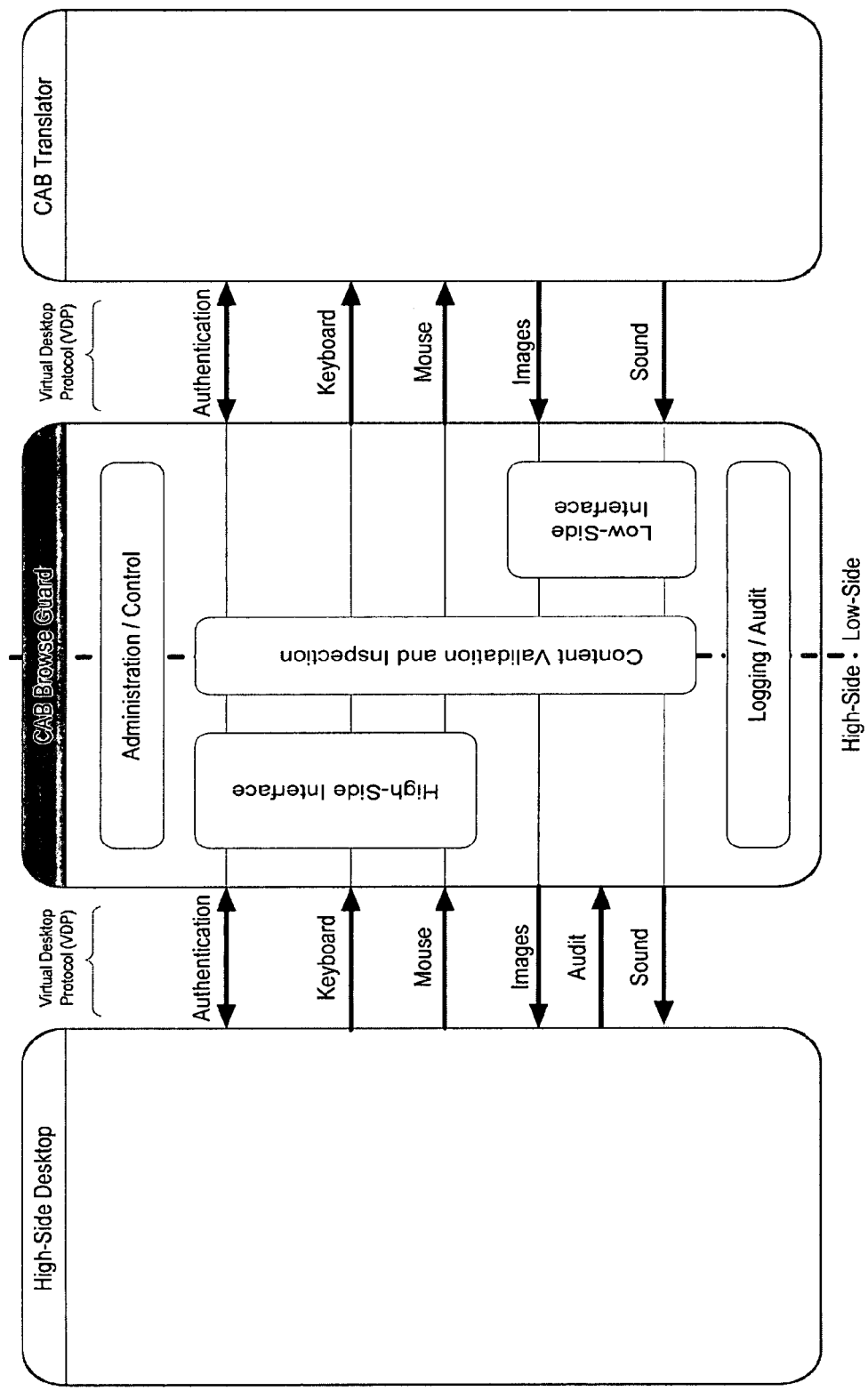
FIG. 16 shows an example of a functional view of the Guard.

In one embodiment, the primary purpose of the CAB Browse Guard is to enforce the security policy of the CAB system, and to securely pass valid VDP data between domains. The Guard is located at the boundary point between the high-side domain and the low-side domain. When a user on the high side wants to browse to resources on a low-side domain, the Guard creates a connection between the high-side user and the CAB Translator on the low side. The result is a connection to the low-side Terminal Server where the user can run applications (e.g., Web browser) on the low side and view the output in the high-side domain. FIG. 16 shows a functional view of the Guard Component.

In this embodiment, because the Guard preferably only passes well-formed VDP messages, and preferably only after strictly enforcing the format and content of each message, the data reaching the high-side Client should be free of any high-threat content. The only content preferably passing upward through the Guard is a graphical representation of the low-side desktop. Mobile code and malicious content are preferably not sent to the high side.

In this embodiment, the only data preferably transferred from the high side to the low side of the Guard preferably consists of well-formed keyboard events and mouse events. The Guard performs "dirty word" searches upon all entered text. In addition, the Guard can be configured to allow certain words or phrases based upon a "clean word" list. This content-checking capability greatly reduces the inadvertent leaking of sensitive data into the low-side domain.

Guard Component Architecture

Figure 17:
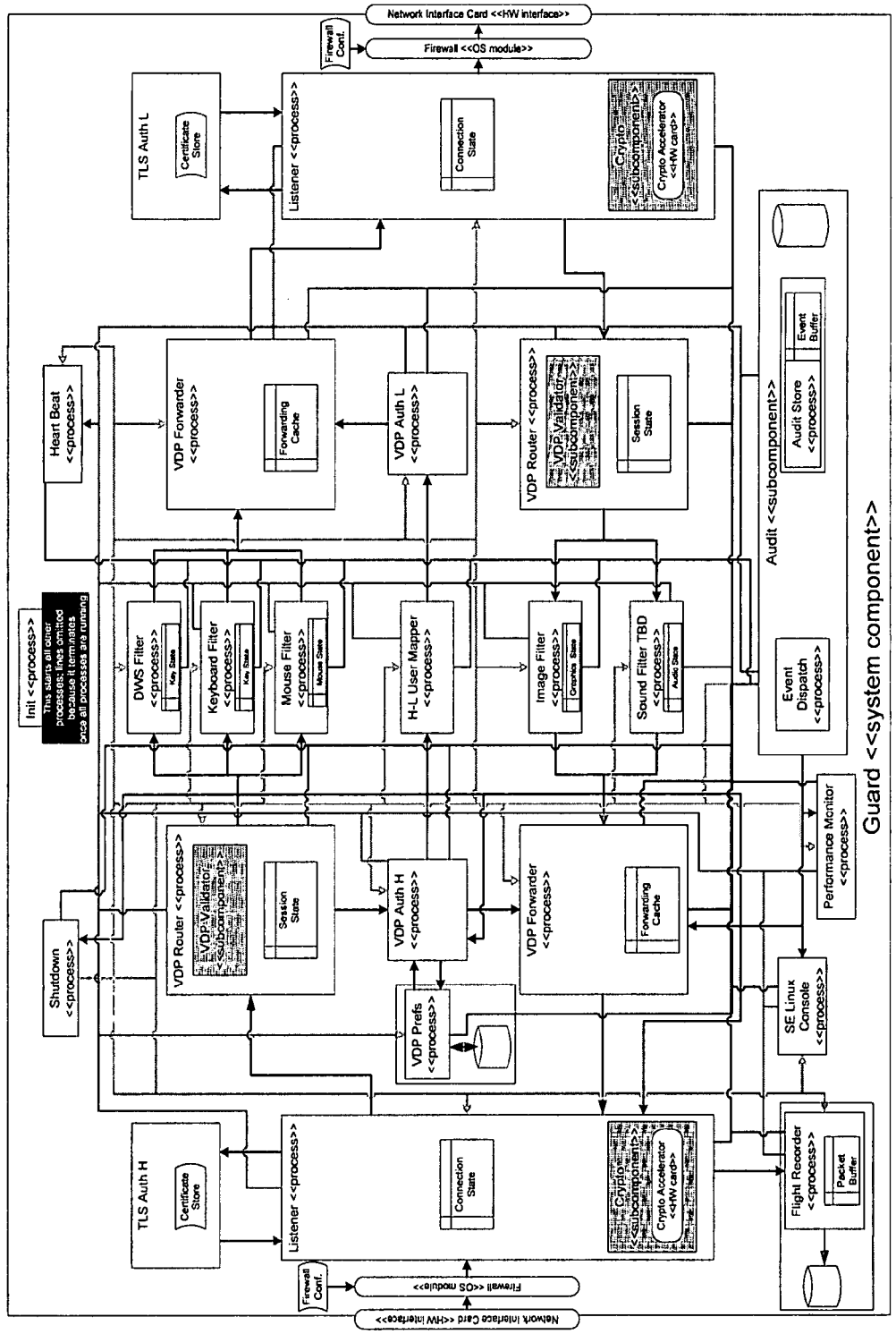
FIG. 17 shows an example of Guard architecture.

In this embodiment, an example of the CAB Guard architecture is illustrated in FIG. 17. The Guard may include many interconnected major subcomponents and subsystems such as:

Operating System and Environment Subcomponents
    System Initialization Process (labeled "Init")
    Operating System (not shown)
    SELinux Security Policy (not shown)
    Heartbeat Monitor
    Performance Monitor
    Shutdown Monitor
    Wire Protocol/IPC mechanisms (represented by the arrows)
Audit and Event Management Subcomponents
    Audit Subcomponent
    Flight Recorder Subcomponent
Authentication Subsystem
    High-Side TLS Authentication ("TLS Auth H")
    High-Side Interface Listener Subcomponent ("Listener")
    High-Side User Authentication Subcomponent ("VDP Auth H")
    High-Side User Preferences Subcomponent ("VDP Prefs")
    High/Low User Mapper Subcomponent ("H-L User Mapper")
    Low-Side User Authentication Subcomponent ("VDP Auth L")
    Low-Side TLS Authentication Subcomponent ("TLS Auth L")
    Low-Side Interface Listener Subcomponent ("Listener")
    Cryptographic Accelerators ("Crypto Accelerator")
Inspection and Filter Subcomponents
    Dirty Word Search Filter ("DWS Filter")
    Keyboard Filter
    Mouse Filter
    Image Filter
    Sound Filter
VDP Communications Subsystem
    VDP Router (high-side and low-side)
    VDP Forwarder (high-side and low-side)
    Administration and Configuration Subcomponent (not shown).

Each of these subsystems and subcomponents will be addressed below following the same organizational structure used above.

Operating System and Platform-Related Considerations

In this embodiment, as in most software systems, the Operating System is responsible for interfacing with system hardware and resources, and controls access to objects and resources running within the system. In high-assurance and security-centric devices and environments, such as the CAB Guard and Translator, the Operating System may become a component in securing the flow of information while maintaining the separation of sensitive data. The CAB system may make use of the SELinux Operating System, with its Mandatory Access Controls, to enforce process and data separation and least privilege concepts.

In this embodiment, the CAB system's SELinux platform may be based on a custom installation of Red Hat Enterprise Linux 4 Advanced Server (RHEL 4 AS) with SELinux in order to secure each component of the system. The inclusion of SELinux into RHEL 4 AS allows the operating system to have fine-grained control over every component in the system allowing the operating system to grant least privilege to every component in the system. The Operating System used by CAB may contain only a subset of the standard packages, as required specifically for CAB. This minimalist install eliminates excess code and possible exploits in the system.

Performance-Related Design Considerations

In this embodiment, Guard subcomponents may be designed to be thread-safe with minimal contention. Because real-world performance bottlenecks are often not understood until code is tested, the design makes heavy use of loose coupling, or reducing the degree to which subcomponents depend on one another. Loose coupling facilitates performance tuning by enabling new, better implementations of components and Interprocess Communications (IPCs) to be introduced. Loose coupling is a common best practice during system and component design.

Safety, Security, and Privacy Design Considerations

In this embodiment, the Guard component may be responsible for enforcing the extensive set of cross-domain security requirements applied to the CAB system. All subcomponents of the Guard may be designed with these requirements in mind. It is not possible to present a concise discussion of security considerations; this entire component has been designed specifically to meet a broad set of security requirements. Instead, security considerations are discussed throughout this document. In the simplest form, the highest-level security goals for the Guard are:

Sensitive information should not be inappropriately disclosed.
    The integrity of the environments, particularly the high-side environment, should not be compromised.

In this embodiment, these overall security goals may be met by a combination of the Guard operating system and the Guard applications, each of which has a set of security requirements and a security policy. Some aspects of security are enforced by both the operating system and the applications, while other aspects are enforced only by one.

In this embodiment, the guard-application security goals, which may be primarily enforced through the correct functioning and configuration of the guard applications, are preferably that:

Only well-formed VDP packets may pass through the guard.
    Only authorized users may connect to the Guard.
    Information passing through the Guard is filtered to prevent inadvertent disclosure of information.

In this embodiment, the guard applications' security goals can be enforced by the guard applications; while the operating system security policy indirectly supports the goals by ensuring that data flows through the system only in the permitted manner.

Subcomponents

Figure 18:
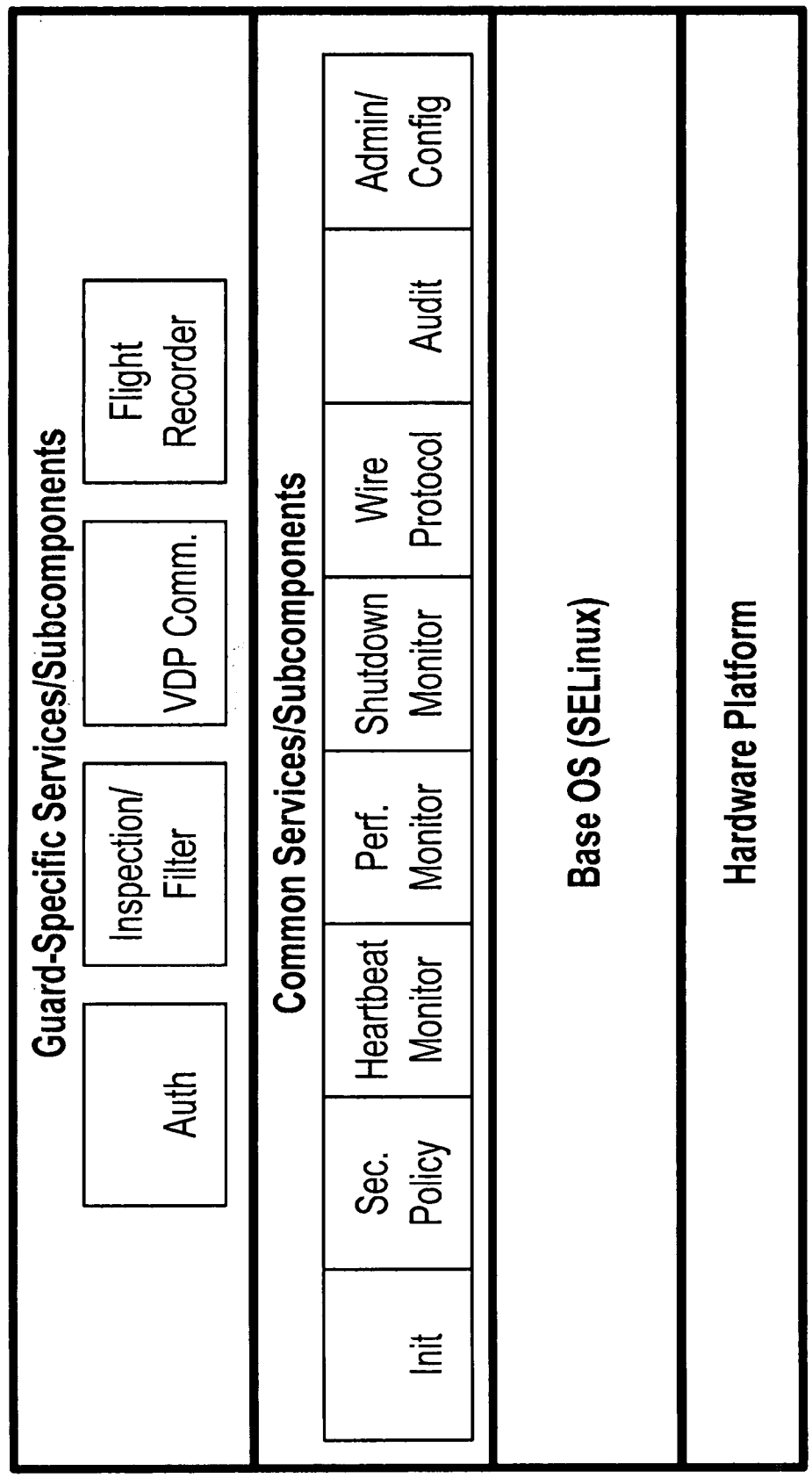
FIG. 18 shows an example of Guard core and common subcomponents.

The following sections describe the various subcomponents of the CAB Guard. As will be shown later, many of these same subcomponents are shared with the CAB Translator. FIG. 18 presents an example of an organized view of one embodiment of the CAB Guard subcomponents, identifying which subcomponents are shared with the Translator.

As stated above, the operating system may play a role in security data flows in any cross-domain solution. Additionally, the cross-domain data flow operations are preferably built upon a foundation of supporting services. This section addresses many of those services and the Guard subcomponents that provide them.

System Initialization
    Heartbeat Monitor
    Performance Monitor
    Shutdown Monitor.
System Initialization Subcomponent In this embodiment, the System Initialization subcomponent (also referred to as the CABInit process) may work with the system monitoring subcomponents (heartbeat monitor, performance monitor, and shutdown monitor) to establish, maintain and monitor the state of the Guard and Translator system components. The System Initialization subcomponent may consist of system integrity checks, file integrity checks and the startup sequence.

In this embodiment, this subcomponent may be primarily responsible for verifying that the system is in a trusted state at startup. During the boot sequence, the System Initialization subcomponent may perform a series tests, including:

Inspect the integrity of key files on the system using cryptographic checksums

Verify that all required devices—and no others-have been created

Verify that no unknown processes are running on the system

Ensure that there are no rollback logs from the Configuration File Commit utility.

In this embodiment, once the tests have verified that the Guard or Translator is in a trusted state, the CABInit process may start all Guard-specific processes. In one embodiment, once all processes required by the system are launched, the System Initialization subcomponent is no longer required; the CABInit process exits, leaving the monitoring subcomponents to monitor system health.

Design Decisions and Considerations

In one embodiment, the Initialization subcomponent is charged with verifying that the system is in a trusted state before activating the CAB components. If the system detects an anomaly such as a file that fails an integrity check, the system preferably immediately aborts initialization. Initialization halts all processing and then either puts the system into a maintenance mode or completely shuts the system off by powering it down. Because an anomaly of this sort should never happen while the system is booting, there is no attempt to automatically repair or recover the process or file. Such recoveries preferably are done manually by an administrator.

Performance-Related Design Considerations

In this embodiment, preferably, the operating system and environment subcomponents are designed to be as efficient as possible. However, security is a greater concern and many of the elements only run during startup and shutdown, making performance less critical. The file integrity check, for example, verifies that critical system files have not been tampered with by computing a cryptographic checksum—a somewhat resource-expensive operation. Because the file integrity check only runs at startup, performance is not a critical concern.

Security and Privacy Design Considerations

In this embodiment, establishing and verifying a secure, known system state is a goal of the System Initialization subcomponent. Because the initialization process may include the invocation and coordination of most of the CAB subcomponents, it is very powerful. The principle of minimality dictates that the most powerful components should preferably be the smallest. Therefore, initialization has been decomposed into several pieces to mitigate the risk of complexity. In one embodiment, the decomposition consists of creating multiple small initialization elements and assigning each one the absolute minimum of privileges needed and by limiting communication with other components using the underlying SELinux security policy. For example, the file integrity checks preferably need to read files spanning multiple security domains, and therefore execute in a separate domain from the CABInit process from which they are invoked. In one embodiment, the domain in which the CABInit process executes does not require all of the privileges required by the file integrity checks; instead the integrity checks perform domain transfers upon execution, and complete their execution with the appropriate privileges.

Subcomponent Details

In one embodiment, the CABInit process subcomponent is the first CAB subcomponent to start during system boot. Its tasks include verifying integrity by checking the signatures of all CAB-related files in the system, verifying that/dev contains only the device files needed for CAB, and verifying that only necessary processes are running in the system. If any of the verification tasks return a failure error code or detect an anomaly, then CABInit preferably notifies Audit (if available, otherwise, it logs to a file) and shuts the system down. Once the integrity checks have verified that the system is in a trusted state, it is safe to start up the remainder of the CAB processes. Each CAB process may be executed by CABInit, thereby causing a SELinux domain transition allowing each process to transition into its domain. In one embodiment, when all CAB processes have been started successfully, the CABInit process uses the common Wire Protocol to send the shutdown monitor all of the process IDs of the processes it has initialized. Once CABInit has delivered the process IDs, it has completed all of its responsibilities and exits leaving the heartbeat monitor, performance monitor and shutdown monitor to monitor system health.

In one embodiment, the file integrity verification mechanism used by CAB is supplied by the open-source file integrity tool Samhain. Additional integrity checks performed by CABInit may be developed to meet the very specific needs of CAB.

In one embodiment, CABInit initializes the Guard processes in the following order:
1. Samhain and other Integrity Checks
2. Heartbeat Monitor
3. Audit Subsystem
4. Shutdown Monitor
5. Performance Monitor
6. High-Side Listener
7. Low-Side Listener
8. High-Side VDP Router
9. Low-Side VDP Router
10. High-Side VDP Authentication
11. Low-Side VDP Authentication
12. High/Low User Mapper
13. VDP Preferences
14. Dirty Word Search Filter
15. Keyboard Filter
16. Mouse Filter
17. Image Filter.

In this embodiment, as an implementation point, because the CABInit child processes preferably remain functioning after their parent process exits, each CAB process preferably becomes a process group leader. This may be achieved by calling the setsid( ) function after CABInit has forked the new process, but before that process calls execv( ). The setsid( ) function makes the calling process into a process group leader and ends the parent-child relationship with the CABInit process, allowing it to become autonomous.

Operating System

In this embodiment, the operating system may interface with system hardware and control objects and resources running in the system. For example, in a self-protected environment, such as the CAB Guard, the operating system may be a component in securing the flow of information and maintaining the separation of sensitive data. In one embodiment, the CAB Guard and Translator are based on a custom installation of Red Hat Enterprise Linux 4 Advanced Server (RHEL 4 AS), with SELinux enforcement enabled. The inclusion of SELinux into RHEL 4 AS enables the operating system to have fine-grained control over every subcomponent within the system and permits the operating system to enforce least privilege. The operating system used by CAB may contain only the subset of standard packages that are required for CAB-specific functions, thereby eliminating excess code and greatly reducing the potential for system exploits.

In this embodiment, the Linux iptables firewall may be a CAB operating system subcomponent. It secures the CAB network interfaces, providing the first line of defense against unauthorized use. Linux iptables may use the Netfilter framework inside the Linux kernel to determine which packets are allowed into the system based on their source and target addresses, ports and network protocol. The iptables configuration may limit inbound and outbound connections to those needed for CAB subcomponents.

Design Decisions and Considerations

In this embodiment, security is an important aspect of the operating system subcomponent because the operating system allocates and controls resources. A failure in the operating system could violate the integrity of the CAB security model, resulting in contamination or unauthorized disclosure of data. Because the CAB system can processes highly sensitive data, when unexpected behavior occurs, the system may enter a maintenance mode so that the system can be verified. Once an administrator has corrected any problems and verified system integrity, CAB can resume production mode.

Installation Considerations

In one embodiment, the CAB system employs a custom installation of RHEL 4 AS having only the packages required for CAB. The installation process uses a modified Red Hat Kickstart script. After the system has been installed, a hardening script executes. The script addresses the specific Guard and Translator needs.

Firewall Selection

In one embodiment, Linux iptables serves as CAB's software firewall because it is a secure and configurable tool, tightly integrated into the Linux kernel. Enabling iptables requires no kernel or system modifications. Only the rules must be configured, and those rules can be readily optimized specifically for CAB.

Interface-Related Design Considerations

In one embodiment, in order to function correctly, the CAB components depend on services provided by the operating system, such as domain separation and control over data flows. In addition, CAB may use the operating system's boot and initialization procedure to start the CAB Initialization process, which in turn starts the various Translator or Guard components. When the CAB system shuts down or transitions into maintenance mode the CAB shutdown process preferably invokes the operating system's power management subsystem to enable the machine to physically turn off or reboot.

Performance-Related Design Considerations

In this embodiment, a customized version of RHEL 4 AS built specifically for an embodiment of CAB is a stripped down version containing the minimum set of packages and processes. In addition to providing security, it improves performance. The CAB operating system may also use a standard SELinux kernel, performance-tuned for the CAB system.

Safety, Security, and Privacy Design Considerations

In one embodiment, RHEL 4 AS with SELinux may be the primary mechanism for enforcing separation of system objects into protected domains, thereby providing safety, security and privacy. Objects in one domain can only access objects in another domain if those are explicitly permitted to do so. Therefore, information cannot be transferred between domains except through well-known mechanisms specified in the system's policy.

Flexibility, Availability, and Maintainability Design Considerations

In this embodiment, the CAB operating system is designed for high availability. Excluding scheduled maintenance time, a properly configured and maintained CAB system should preferably sustain uptimes in excess of 99.95%.

In this embodiment, in order for the system to be maintainable there preferably is a mechanism for installing and updating the packages on the system. For example, RHEL 4 AS uses the RPM package management system for maintaining groups of files on the system. RPM on the CAB system can preferably only be accessed by a system administrator in the CAB maintenance mode policy.

Directory Layout

In this embodiment, to facilitate system administration, CAB may use the standard Linux directory structure. Configuration files, executables, and log files are stored in intuitive locations within the/etc,/usr, and/var directories.

Configuration Files

In one embodiment, CAB configurations files are in/etc/cab. This methodology follows the UNIX convention of placing configuration files in the/etc directory. Inside the /etc/cab directory are the subdirectories "active" and "staging."

Executable Files

In one embodiment, CAB executable files that do not perform administrative tasks are located in/usr/cab/bin. This includes all Guard and Translator binary components.

Administrative Executables

In one embodiment, CAB administration executable files are in/usr/cab/sbin (e.g., any applications that modify or commit changes to configuration files).

Libraries and Headers

In one embodiment, CAB libraries files are in/usr/cab/lib, and all CAB header files are in/usr/cab/include. Source and header files may only be available on development CAB systems and may not be included in any production systems.

Temporary Files

In this embodiment, CAB temporary files may be in the/var/cab/tmp directory. Each CAB application may have a separate subdirectory accessible only to its domain.

Firewall Configuration

In one embodiment, the CAB firewall restricts incoming traffic and outgoing traffic to allow only VDP traffic and time-synchronization where appropriate. In one embodiment, the Guard firewall rules support Client VDP traffic, Translator VDP traffic and high-side-trusted Network Time Protocol. In another embodiment of the CAB Guard, which includes client-certificate support, it may have access to a high-side Certificate Authority (CA) certificate revocation lists (CRL). Preferably, all other traffic is implicitly blocked. Exemplary Guard rules are presented below:

| | | Guard Firewall Rules | | |
|---|---|---|---|---|
| Interface | Direction | Protocol | IP Addresses | Notes |
| High | Inbound TCP | VDP TLS | Individual Client IP addresses or networks | Prescribed by site policy; single IP address more restrictive but harder to maintain |
| High | Inbound/Outbound UDP | Network Time Protocol (NTP) | Single NTP server | Necessary for time synchronization; recommended deployment on secure switched network |
| High | Outbound TCP | TLS | Certificate Authority | Future - for support of certificate revocation lists (CRL) |
| Low | Outbound TCP | VDP TLS | Only available translators | Likely direct connections |

SELinux Security Policy

In one embodiment, the CAB system enables secure transfer of information between separate domains of differing classifications. Any failure in the security of the system could expose sensitive data to an adversary, or inadvertently allow a valid user to gain increased privileges. The SELinux operating system security policy may be an element in preventing security failures and providing a secure data flow. The security policy may limit the damages caused by the possible failure of any one of the components by following the principle of least privilege to separate and contain each process into an individual domain with only the privileges that it requires to perform its task.

In this embodiment, the operating system security policy enforces a set of security goals that protect the operating system and guard applications. These security goals may be distinct from the application security considerations discussed above. The security policy, at the highest level, provides basic protection for the system, hardens the CAB application environment, and supports the security policy of the guard applications. It may be constrained by the overall system requirements for both security and functionality. In one embodiment, exemplary operating system security goals (OS-1 through OS-6) are that:

1. All operating system security goals are enforced solely by operating system security mechanisms.
2. Information cannot flow between the high-side and low-side networks except through the guard applications.
3. Information flowing between the high-side and low-side networks must pass through the appropriate guard applications in the correct order.
4. There is appropriate assurance of security of the operating system and guard applications.
5. The administrative functions require a minimum of privilege and are separated into appropriate roles.
6. The operating system, particularly the security enforcement mechanism, must protect itself from tampering and bypass.

In this embodiment, such exemplary security goals support overall CAB security requirements and the security policy of the guard applications. These security goals will be met primarily through a custom SELinux policy. The SELinux policy may consist, conceptually, of two components: the base policy and application policy. The base policy may provide policy covering the operating system and associated resources and services. The application policy may provide policy covering the CAB-specific applications and services. These two components are combined to create the overall SELinux policy for the system. The following paragraphs will describe how the operating system security goals will be met by the operating system security policy. In one embodiment, in addition to the SELinux policy, best practices for Linux security configuration will be used, including a standard Linux discretionary access control policy, iptables firewall configuration, and other common security features of Linux.

OS Security Goal 1

In this embodiment, the first exemplary operating system security goal is a security meta-goal, stating that all operating system security goals should be met by operating system security mechanisms. The SELinux policy will attempt to enforce all of the subsequent security goals without relying on the correct functioning of user-space applications. This greatly reduces the trust placed in the applications, potentially simplifying application code. Additionally, this provides a stronger enforcement of the security goals and removes the need to consider application code when evaluating the system for the operating system security policy. The application code is still security-critical and should be evaluated in terms of the application security policy and overall system security.

OS Security Goal 2

In this embodiment, the separation of the high-side and low-side networks should be maintained by the Guard except through the appropriate guard applications. This goal directly supports the overall security requirements of CAB. The SELinux policy will prevent the flow of information between the two networks except as allowed through OS-3. SELinux provides effective, fine-grained control over the overt flow of information through the system, allowing a policy to be created that controls what applications can communicate with the network interface and how information can flow between applications.

OS Security Goal 3

In this embodiment, in order to enforce the guard-application security policy, it is preferably that information flowing between the high-side and low-side networks pass through the correct guard applications in the correct order. The combination of this security goal and OS-2 allows the SELinux policy to guarantee that no information can flow between the two networks that has not passed through the guard applications, allowing the guard applications to correctly enforce the transfer security policy. The SELinux policy language is uniquely suited to enforce this type of security goal.

OS Security Goal 4

In this embodiment, in addition to supporting the security policy of the guard application, the operating system security policy may provide appropriate assurance for the overall security of the system. This may be accomplished primarily through the creation of a strict least-privilege SELinux policy for all components of the system including the guard applications. A least-privilege policy provides assurance that the security goals of the system will be met, even in the event of application errors or compromise. In particular, a least-privilege policy may limit the potential damage from a compromise, including reducing or removing the possibility of privilege escalation. A carefully crafted least-privilege policy may limit an application to only those actions required to function correctly, regardless of whether the application is correctly functioning or has been compromised.

OS Security Goal 5

In this embodiment, system administration, by definition, requires additional privileges beyond those needed for normal operation. The creation of secure administrative functions is, therefore, challenging. The operating system security policy may separate the administrative functions into a set of appropriate roles, which each have the minimum privileges required. The SELinux policy language has support for role-based access control (RBAC). Though different from other RBAC mechanisms, the SELinux RBAC policy may allow the creation of the administrative roles and strongly limit them to the minimum privilege required. Additionally, SELinux policies can include runtime configuration, allowing the creation of two policy configurations: production and maintenance. Transition between these configurations can be securely controlled. In the production configuration, used during normal operation, many or all of the administrative functions may be disabled. In contrast, the maintenance configuration may disable network access and the guard applications, preventing the flow of information through the system, but allow access to administrative functions.

OS Security Goal 6

In this embodiment, the final exemplary operating system security goal is self-protection. In order to effectively enforce the other security goals, the system preferably should protect itself from both tampering and bypass. The SELinux policy may protect important operating system resources, including the SELinux policy, the kernel image and boot loader, configuration files, kernel configuration interfaces and raw device files.

Design Decisions and Considerations

In one embodiment, because the CAB system uses SELinux and its strong mandatory access control (MAC) mechanism, the security policy is written in the SELinux policy language. There may be two major modes for the CAB security policy: a production mode and a maintenance mode. When the system is in production mode, it inspects traffic, and allows valid traffic to cross domains. When the system is in maintenance mode, there are administrative components operating with special privilege. Because some administrative components could compromise system robustness and policy and because a remote attacker would want to use these components to bypass security mechanisms, it is important that powerful components are out of reach during live system operation. During production mode, all CAB traffic-related components are preferably operational, but most administrative tools are preferably disabled.

In this embodiment, likewise, when CAB is in administrative mode, an administrator might need to modify configuration that can only be reading during production mode. Moreover, the administrator has no need for network traffic to flow across the network interfaces or for traffic-related components to execute. To accomplish this separation the CAB Guard and CAB Translator may each have two partitioned policies, each configured specifically for the tasks necessary to perform in either production or maintenance mode.

In this embodiment, the SELinux Security Policy is not a piece of software—it is a configuration that defines how the SELinux operating system protects the CAB Guard and Translator components. The policy is a manifestation of the architectural design of the system; subcomponents can preferably communicate only with those subcomponents necessary for to perform their function. Subcomponents may rarely be granted read and write operations to individual resources. Subcomponents may rarely have bi-directional communication with other subcomponents—and those that do may be minimal and among the most trusted.

Interface-Related Design Considerations

In this embodiment, the Security Policy may use SELinux policy Booleans to enable the Initialization component to enable or disable core communications capabilities, such as access to the network interface cards. In one embodiment, the Security Policy enforces one-way IPC channels between processes by defining unique types for each IPC. For example, the domain sending the IPC message only has write; the domain receiving the IPC message has only read.

Flexibility, Availability, and Maintainability Design Considerations

In this embodiment, the CAB Guard and Translator components may each contain two separate security policies, one for maintenance mode and one for production mode. The production policy has two states, enabled and disabled, controlled by the value of an SELinux Boolean. When the Boolean is TRUE, the network interfaces may be permitted to send and receive data. This virtual switch allows the CAB system to complete the startup of all CAB processes and to verify that the system is ready to handle sessions before traffic can flow through the system.

In this embodiment, when the SELinux operating system first boots up, it may load the production policy with the Boolean set to the default value, FALSE. The maintenance policy, on the other hand, preferably does not permit the network Boolean to be TRUE, thereby disabling the operational system startup. This allows that the system can be administered in the absence of any cross-domain traffic or traffic-passing processes. The following table shows available states in an exemplary security policy:

| | Security Policy - Available States | |
|---|---|---|
| | Network Boolean = False | Network Boolean = True |
| Production Mode | Enables CAB subcomponents to initialize in a secure state. Network activity is disabled, preventing any outside dataflow before all subcomponents are confirmed operational. Most maintenance operations are prevented. | Enables traffic during normal run-time operations. This state allows CAB subcomponents to interoperate, and allows selected subcomponents to access the network. Most maintenance operations are prevented. |
| Maintenance Mode | The Network Boolean is always false in Maintenance Mode. Most of the CAB subcomponents cannot operate. | Not applicable. Network activity cannot be enabled. |

| Security Policy - Available States | |
|---|---|
| Network Boolean = False | Network Boolean = True |
| Only those subcomponents required for maintenance and forensics are permitted. Network activity is disabled. | |

Subcomponent Details

In one embodiment, a set of primary security domains for the Guard and the Translator have been identified. Those primary security domains within the Guard include:

Filter domains (containing each of the content filter processes)

VDP2RDP domain (contains VDP2RDP processes)

Audit domains (several domains containing audit-related processes)

Administrative domains (several domains containing administrative and configuration processes)

Heartbeat Monitor domain (containing the system-monitoring functions)

Performance Monitor domain (containing the system-monitoring functions)

Other domains to be added, as needed.

In one embodiment, at some point during the SELinux boot cycle the policy is loaded by the kernel. From that point on, policy is enforced. The system then continues with the startup process, including a set of integrity checks and the startup of each CAB-specific process. If at any point an error is detected, the system may transition into maintenance mode for the administrator's inspection. After all of the CAB processes have started, the SELinux Boolean for networking is switched to TRUE, and the system is ready for sessions to be processed through the system. When the system is ready to shut down or enter maintenance mode, either as the result of an error or an administrator's initiation, the system transitions the security policy accordingly.

Heartbeat Monitor

In this embodiment, the Heartbeat Monitor, along with the Performance Monitor, may be responsible for ensuring that processes on the CAB system are functioning properly and have the resources required to function effectively.

In one embodiment, the Heartbeat Monitor is the first process started by the CAB Initialization Process because it needs to be available when each of the other CAB processes starts running. The heartbeat monitor may be capable of receiving three types of messages:

A message stating that a process has just started running

A message reporting that the process is still running

A message notifying the heartbeat monitor that the process is shutting down.

In this embodiment, once a message is received, the heartbeat monitor can update a table that records the state of processes. The table may consist of two fields, a field for the current state of the process and a field for the last time it was updated. Periodically, the heartbeat monitor can check its table to preferably make sure that every running process has an entry in the table with a recent timestamp. Once a process starts up, it preferably notifies the heartbeat monitor that the process is running and that it should start expecting to receive heartbeats periodically. While the system is running, the heartbeat monitor preferably monitors the table, and if a process has a timestamp that exceeds the defined heartbeat period, it may be assumed that the process is no longer able to function. In the case where a process chooses to exit cleanly, the process preferably sends a shutdown message that notifies the heartbeat monitor that the process is explicitly exiting and that it should no longer expect to receive heartbeats. If however, a heartbeat is received after the process has sent a shutdown message, then that may be an indication that something has gone wrong and the process was unable to shutdown. Not receiving a heartbeat in a reasonable time period and receiving a heartbeat from a process that should have shutdown may be events that will result in the system being shut down.

Design Decisions and Considerations

Performance-Related Design Considerations

In one embodiment, the heartbeat monitor process can use IPC, via the shared Wire Protocol, to receive the heartbeat from the CAB processes. The IPC used by the heartbeat monitor preferably limits blocking so that performance hits resulting from sending and receiving heartbeats will have minimal impact on overall system performance.

Subcomponent Details

In one embodiment, after the basic CAB processes are up and running and the system is ready to start accepting connections, it is the heartbeat monitor's job to notify audit that the system is ready. Audit will create a record in the audit log and based on the policy notify the shutdown monitor to change the Boolean value and allow access to the network interfaces.

In this embodiment, the heartbeat monitor can consist of two threads in addition to the CAB control threads. The first thread may block on an IPC mechanism and wait for messages to process. Once a message is received, the thread may update the state table with the information conveyed in the message. The IPC method used for the heartbeat may be wrapped within the common Wire Protocol. Monitored processes are able to send messages without needing to block and wait for the heartbeat monitor to process the message. The second thread may be responsible for monitoring the state table and ensuring that all processes contain heartbeat entries that are current. If a problem is detected, this thread may be responsible for notifying the audit subsystem of an error resulting in the shutdown of the system.

In one embodiment, the heartbeat monitor starts up and enters the running state where it receives messages from processes announcing that they have started up. Once processes have started up, the system waits to receive heartbeats. If a heartbeat is not received within the specified time, the message is overdue and a message is sent to audit. Once audit is notified, the heartbeat monitor waits for a message from the Shutdown Monitor instructing the process to shutdown. The heartbeat monitor then transitions to shutdown and exits. Otherwise, when the shutdown monitor receives a shutdown message, the heartbeat monitor transitions from the receive-Heartbeat state to the shutdown state and exits.

Interfaces

In one embodiment, the heartbeat monitor may be used by the Guard and Translator system components. In each case, the heartbeat monitor can receive data from numerous processes on the system via the shared Wire Protocol. The first message sent to the heartbeat monitor may be a message containing the process id and the process type. This may be one-way communication channel, where the heartbeat monitor will only receive data.

In this embodiment, in addition to receiving heartbeat messages, the heartbeat monitor can also interface with the Audit and Shutdown subcomponents. The table below identifies each heartbeat monitor interface in one exemplary embodiment:

Heartbeat Monitor - Interfaces

| Subcomponent | Interface Description |
|---|---|
| Audit | This subcomponent sends audit messages directly to the Audit subcomponent, using the common Wire Protocol. This is one-way communication. |
| Shutdown Process | Upon execution, this subcomponent registers with the Shutdown Process, using the common Wire Protocol. Once registered, the heartbeat monitor listens (using the Shutdown Thread and a blocking read) for shutdown commands from the shutdown process. This is one-way communication. |
| All Monitored Processes | Upon execution, each monitored process uses the common Wire Protocol to provide regular heartbeat messages to the heartbeat monitor. This is one-way communication. |

Performance Monitor

In this embodiment, the purpose of the performance monitor process in one embodiment is to monitor system performance and to verify that the system remains within operating parameters. If a system component runs out of resources and is unable to run properly, the system preferably shuts down. If the performance monitor detects a problem, it may notify Audit, which can generate an audit record, and Audit may inform the shutdown monitor that it needs to shut down the system.

In this embodiment, the Performance Monitor may be executed as part of the Initialization Process, and enters its running state. The performance monitor may be divided into two threads. One thread may receive performance statistics from processes and store them in a table, while another thread may periodically process information provided by other processes along with information it collects from the system. The data may then be compared to a threshold. If the system is running above the system limits, audit may be notified of a failure and the system preferably shuts down. Under normal conditions, where no thresholds are exceeded, the Performance Monitor may continue to execute until it receives a shutdown message from the Shutdown Monitor.

Design Decisions and Considerations

Performance-Related Design Considerations

In this embodiment, the Performance Monitor process may use IPCs, by means of the shared Wire Protocol, to receive the performance messages from CAB processes. The IPCs used by the monitor preferably limits blocking so that performance hits resulting from sending and receiving messages will have minimal impact on overall system performance.

Subcomponent Details

In one embodiment, the performance monitor obtains its information from system utilities and from session data sent to it by the audit event dispatcher. The system and kernel facilities used by the top and ps command line utilities may be used to report most of the system's information. The performance monitor may query for system statistics that include CPU utilization, real and virtual memory utilization, the number of processes and their state, and load averages. The kernel network interface ioctls may be used to report on information such as the number of packets sent and received, the number of errors, and the number of dropped packets over the high and low interfaces.

In this embodiment, information about sessions may be received from the Audit Event Dispatcher. When session-specific Audit events occur (such as a user beginning a new session, etc.), the Audit Event Manager may be alerted and information about that event may be passed to the performance monitor. In one embodiment, it is the monitor's responsibility to store information about each event so that it can derive statistics such as the number of sessions currently on the system, the total number of sessions, and which users are associated with which session. The performance monitor may contain various variables and data structures to maintain these statistics. There may be a variable that represents the current number of sessions. This number may be incremented each time a new session event is received and decremented each time a session end event is received. Another variable may contain the total number of sessions since startup. This variable may be incremented each time a new session event is received.

In one embodiment, these statistics may periodically be written to file for later analysis. The file format may consist of a series of numbers in csv format, for example, with one line representing one period of time. The numbers may represent statistics from CPU utilization to the number of sessions. Information about the current mapping of users to sessions is intended for administrative purposes and may not need to be exported to the file.

In one embodiment, the Performance Monitor may contain three threads in addition the CAB control threads like the heartbeat monitor. One thread may receive data from the Audit Event Dispatcher and update the statistic variables, while the second thread may periodically write the data in the variables to the data file. The third thread may wait for requests for information from the administration tools that require information about users, and which sessions are associated with those users.

Interfaces

In this embodiment, the Performance Monitor may be used by the Guard and Translator system components. In both cases, the Performance Monitor may receive data from many of the other processes within the system component. The processes may use the shared Wire Protocol to connect to the Performance Monitor and begin sending messages containing performance data. Each message may have a type associated with it identifying what type of performance data the message contains. In the case of sessions, the message may contain a session id and a session event and session statistics. The session event may specify if a new session has started up or shut down. In some cases, the session statistics may remain blank, such as in the case when a session starts up. In other cases, such as when a session shuts down, the session statistics may contain information about the session such as bytes of information passed, or length of the session. This is preferably a one-way communication channel through which the Performance Monitor will receive data.

In this embodiment, in addition to receiving performance messages, the Performance Monitor may also interface with the Audit and Shutdown subcomponents. The table below identifies each Performance Monitor interface in one exemplary embodiment:

Performance Monitor - Interfaces

| Subcomponent | Interface Description |
| --- | --- |
| Audit (receiving performance data) | The Audit subcomponent relays performance data to the performance monitor, using the common Wire Protocol. This is one-way communication, over an IPC independent from that used to send Audit data. Through this interface, monitored processes communicate indirectly with Performance Monitor, with Audit as the intercessor. |
| Audit (sending Audit data) | This subcomponent sends audit messages directly to the Audit subcomponent, using the common Wire Protocol. This is one-way communication. |
| Heartbeat Monitor | Upon execution, this subcomponent utilizes the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |

Shutdown Monitor

In one embodiment, the Shutdown Monitor is responsible for making changes to the state of the system. It may constantly wait for a state change event, arriving through the common Wire Protocol, and then responds to it.

In this embodiment, the state change message may contain a number signifying to what state the system should transition.

In this embodiment, the Shutdown Monitor may initiate transitions to one of four system states:

Production Policy with Network Boolean set to TRUE
Production Policy with Network Boolean set to FALSE
Maintenance Policy
Power Off.

In one embodiment, the Production policy state grants privileges to the CAB components allowing them to run while the policy restricts the abilities of maintenance and configuration utilities. Certain configuration tasks cannot and should not be run while the system is processing sessions and this policy ensures this. The Production policy also may have two states controlled by a SELinux Boolean, which determine when to activate networking.

In this embodiment, the Network Boolean may be an SELinux-related policy switch that either permits (TRUE state) or denies (FALSE state) network connectivity for the system. The default value for the Network Boolean is FALSE, which allows for the CAB processes to start up safely before allowing connections. In one embodiment, only after the system has verified that it is ready to receive connections does the Boolean value get changed and network connectivity is permitted.

In one embodiment, the Maintenance policy state may be designed to allow privileges that are required for performing maintenance on the system. The system may transition into Maintenance mode when initiated by an authorized administrator, or when directed by policy in response to specific error conditions. The Shutdown Monitor may receive messages instructing it to transition into maintenance mode from the Audit subsystem or the administrator's shutdown utility.

In one embodiment, the Power Off policy state shuts the system down completely without transitioning into maintenance mode. When a severe error occurs, the Audit Subsystem preferably sends a message to the Shutdown Monitor instructing it to power the system off. The administrative shutdown command can also send a power-off message to the Shutdown Monitor when an administrator would like to completely shut down the system.

In one embodiment, if the system is transitioning into maintenance mode or powering off, the Shutdown Monitor preferably sends messages indicating to each process that they are to shut down and the monitor will send them though each processes' IPC connection to the Shutdown Monitor.

In one embodiment, the initialization phase starts out by initializing variables and verifying that the system has adequate resources to start up the process.

In this embodiment, after initialization, two threads may be created. The first thread receives a list of process IDs from CABInit that the monitor needs to notify in the event of a shutdown. Certain processes associated with sessions may start up and shut down while the system is running. In order for these processes to work with the Shutdown Monitor, a process ID preferably will have to be added and removed from the Shutdown Monitor while the system is running. If another process in the system creates processes, it is the responsibility of that process to make sure that Shutdown is told what processes it needs to shut down. Likewise, when a process shuts down, Audit notifies the shutdown monitor and based on the message, the shutdown monitor either removes the ID of that process, or shuts down the system.

In one embodiment, the processes that require shutdown notification may be placed into a notification table (or "process vector"). The order in which the processes are shut down is not critical; however, the audit subsystem preferably needs to be shut down last so that it can continue to receive audit events as long as possible. Note that the security policy's Network Boolean is set to FALSE before shutdown commences, preferably ensuring that no data enters or exits the system during shutdown.

In this embodiment, the second thread that may be created after initialization is a thread that waits for state change messages. If a "shutdown" or "change to maintenance mode" message is received, the monitor preferably sets the Network Boolean, notifies the Audit Process that the Boolean has been changed, and then proceeds to notify all processes in the notification table to shut down.

In this embodiment, if the state change message simply requests a change of the Network Boolean, the change may be made, Audit is notified and it continues waiting for messages.

In one embodiment, once the processes have been notified, the system shuts down the system by transitioning into maintenance mode or running /sbin/init and powering the system off.

Design Decisions and Considerations
Implementation Decisions

In this embodiment, for processes to be able to interact with the Shutdown Monitor, each process will preferably have been linked to a library that contains special functions for setting up the mechanisms that interface with the initialization subsystem. The library may contain functions that a program will call while it is starting up. The functions will create and control threads and setup IPC communication between the process and the Shutdown Monitor. The shutdown control thread establishes an IPC channel with the Shutdown Monitor, and blocks on read waiting for a message from the Shutdown Manager informing the process that it needs to shut down. When such a message is received, the process may call a shutdown function, which will clean up the Shutdown Monitor thread allowing the process to then return normally.

Subcomponent Details

In this embodiment, changing the Network Boolean value is straightforward. In one embodiment, the process can open the appropriate Boolean file in the/selinux partition and set the value to 1 or 0 depending on the context. The shutdown process may run in a domain that allows write access to the Boolean file.

In this embodiment, transitioning to maintenance mode and powering off may be more complicated. In one embodiment, first it sets the network interface Boolean to FALSE so that no data can move through the session as components are shutting down. If the Boolean is not set to FALSE, it may result in partially processed data going through the system and interface. Second, the Shutdown Monitor preferably sends a message to every process in the system informing them that the system is shutting down and that they must terminate.

In this embodiment, the shutdown monitor may be aware of every process because it preferably receives a list of process IDs from any process that execs new processes. As stated in the Initialization section, the CABInit process may send all of the process IDs of the processes it has created to the shutdown monitor before exiting. If another process in the system creates processes, it can be the responsibility of that process to make sure that shutdown is told what processes it needs to shutdown.

In one embodiment, after the CAB processes have terminated, the system may either transition into maintenance mode or continue the shutdown process to turn off the system. If the system is transitioning into maintenance mode, it may first wait for all of the CAB processes to terminate. The shutdown monitor may then execute the load_policy command which will load the maintenance policy on to the system. If the system is shutting down, the shutdown monitor may execute /sbin/init and switch to runlevel 0 instead of calling the load_policy command.

Interfaces

In this embodiment, the Shutdown Monitor may be used by both the Guard and Translator system components. In both cases, the Monitor can accept an IPC connection from, and send data to, many of the other processes within the system component. Each process can utilize the shared Wire Protocol to connect to the Shutdown Monitor and begin listening for a shutdown message. This preferably is a one-way communication channel, where the Shutdown Monitor preferably only sends data. The processes monitored by the Shutdown Monitor may include:

Heartbeat Process
Audit Subsystem
Performance Monitor
High-Side Listener
Low-Side Listener
High-Side VDP Router
Low-Side VDP Router
High-Side VDP Authentication
Low-Side VDP Authentication
High/Low User Mapper
VDP Preferences
Dirty Word Search Filter
Keyboard Filter
Mouse Filter
Image Filter.

In this embodiment, in addition to sending shutdown messages to monitored processes, the Shutdown Monitor may also interface with the Audit and Heartbeat Monitor subcomponents. The table below identifies Shutdown Monitor interface in one exemplary embodiment:

| Shutdown Monitor - Interfaces | |
|---|---|
| Subcomponent | Interface Description |
| Audit (receiving shutdown messages) | Shutdown Monitor receives shutdown messages from the Audit subsystem, via the common Wire Protocol. More specifically, the Audit Event Manager determines when a shutdown should be initiated, and sends the appropriate shutdown event to the Shutdown Monitor. This is one-way communication. |
| All Monitored Processes | Upon execution, each monitored subcomponent registers with the Shutdown Process, using the common Wire Protocol. Once registered, Shutdown Monitor is able to send shutdown commands to the subcomponents. This is one-way communication. |
| Audit (sending audit messages) | This subcomponent sends audit messages directly to the Audit subcomponent, using the common Wire Protocol. This is one-way communication. |
| Heartbeat Monitor | Upon execution, this subcomponent uses the common Wire Protocol to provide regular heartbeat messages to the heartbeat monitor. This is one-way communication. |

Wire Protocol/IPC Mechanisms

In one embodiment, a Wire Protocol may define the format of messages passed via interprocess communication. Major RPC systems (e.g., CORBA, DEC RPC, Java RMI, and COM) define a wire protocol. The CAB system may use a wire protocol to define the binary message format for IPC calls between components, so that each component writer need not define a new message format for passing traffic or control messages. A good wire protocol implementation for CAB has the properties listed in the table below (additional desirable properties less important to CAB are language and platform neutrality).

| Wire Protocol - Desired Implementation Properties | |
| --- | --- |
| Property | Notes |
| Transport-independence | Enable transport design decisions based on other criteria, such as performance and security |
| Lightweight | Do not perform unnecessary operations, such as conversion to a neutral format, when calls remain resident on the same hardware |
| Code generation support | Minimize development effort |
| Synchronous/asynchronous calls | Support one-way calls to disable mutual dependencies between sender and receiver |
| Robust | Ensure that data and semantic errors are detectable |

In this embodiment, the CAB CDS system also prefers tightly controlled interaction between system components, and assured one-way IPC paths. Therefore, the transport used by the wire protocol preferably is one-way and securable via SELinux security policy. Many RPC systems include a global registry application, i.e., an intermediary, and often require two-way communication. A global registry may conflict with the design goals of one-way communications and minimal coordination between subcomponents. Another aspect of the wire protocol implementation in one embodiment is that it provides automatic encoding and decoding of message data, or "marshalling."

Design Decisions and Considerations

In one embodiment, the wire protocol framework may include an Interface Definition Language (IDL) and an IDL compiler. The IDL compiler produces client proxy code and server-side stub code that the developer can customize. The client proxy code may perform marshalling and sends the one-way, asynchronous message to the server. The server-side framework receives the message, unmarshalls all parameters, and makes a call to the server-side function implementation.

Details of IDL and Marshalling (Encoding and Decoding)

In this embodiment, marshalling consists of representing data in a format independent of the address space, network and system where it originates. In one embodiment, address-space independence is preferred—each process preferably has a separate, private address space to ensure one-way data flows.

In this embodiment, the marshalling process defines the way in which those higher-level data objects are encoded by the sender (client) application and decoded by the receiver (server) application. A developer may complete several to use IPC:

Create an Interface Definition Language (IDL) File.
Compile the IDL File into client proxy and server stub code (.h and .c files).
Add client code to invoke the proxy functions.
Add server code to the server stub code to service the messages.
Specify the transport for messages.

In this embodiment, IDL may consist of definitions for interfaces, procedure calls and structured data. The interfaces group procedure calls in to a logical, uniquely identifiable container. Each procedure call may consist of a list of parameters and a return value. Each parameter has a data flow direction (in, out, or in/out) and generic type, such as integer, floating point, or text string, or structure data type. There might also be additional modifiers, such as "one-way," to indicate one-way call semantics. Structured data groups multiple data elements into one entity (such as a "C struct").

In one embodiment, although CAB uses an RPC framework defined in several standards, such as CORBA's IIOP, OSF DCE, RMI, and COM, it may not include classic RPC return-value semantics. In classic RPC, calls are synchronous and can include return values and output parameters. CAB subsystems may not use return values or output parameters because of one-way data security restraints. Instead, CAB IDL may define strictly one-way data flow using the IDL procedure keyword "one-way," "void" return values, and only "in" parameter modifiers. To enforce run-time one-way communication, the SELinux Policy may require that IPCs are unidirectional. Taken together, data flow from a client application to the servicing application (server) may travel in one direction, and there is preferably not a response data flow.

In one embodiment, once the IDL compiler generates the proxy and stub code and the developer has implemented the server-side code, the application can be built. The actual binding between client and server preferably occurs at runtime. In one embodiment, in a directory readable by the client, the server creates an IPC file writable only to that client, as defined by the SELinux Security Policy. The wire protocol library provides a function for the client application to obtain write-access to the IPC and a function for the server application to create and obtain read-access to the same IPC. The IPC file name and path may be configured in the CAB configuration directory.

In this embodiment, at run-time, the wire protocol library may perform the copying of marshalled data to the transport on the client side, and copying and unmarshalling the data in the server's address space.

Interfaces

In one embodiment, the CAB Wire Protocol implementation interfaces directly with the selected IPC/RPC transport. UNIX-style domain sockets may be the candidate IPC because they have a high throughput and because the SELinux policy language defines fine-grained control over them.

Preferably, almost every subcomponent and element within the CAB Guard and Translator uses the Wire Protocol.

Audit and Event Management Subcomponents

This section covers the full-time audit functions and the on-demand "flight recording" capabilities of CAB. In one embodiment, the Audit and Event Management subcomponents define the audit interface, security event management processing, event management policy, audit data recording and analysis, and system forensic capability.

Audit Subcomponent

In this embodiment, the Audit subcomponent supports diagnostic logging and security event auditing. In one embodiment, it primarily consists of a client interface element, various persistent repositories, and a central server element for aggregating and correlating all Guard events. (The Translator may implement the same Audit subcomponent, configured to properly handle Translator events.) The elements of Audit may be broken into multiple packages.

In this embodiment, diagnostic logging is preferred to develop CAB components. It also can provide wellness metrics not captured by security requirements, but necessary for overall system maintenance. Diagnostic logging may be tightly associated with an application's security domain, as generally, a holistic system view is not necessary.

In this embodiment, security event auditing, on the other hand, preferably provides a complete picture of system security events, as observed by all system components. Event auditing satisfies security requirements for a secured, tamperproof record of security-relevant system events. In one embodiment, there is no requirement for event correlation.

Design Decisions and Considerations
Interface-Related Design Considerations

In this embodiment, there are several considerations for the Audit interface:
Simplicity for clients
Extensibility for new events and types
Extensibility for new destinations
Extensibility for new transports
Concurrency for multiple threads and processes
Support for administrative tools.

In this embodiment, to simplify client usage, the core auditing interface may offer three levels of data abstraction: data element, generic event record, and specialized event record. Orthogonal concerns such as event destination may be separated from the data interface.

In this embodiment, the Audit interface may be designed to cooperate with other common system components, such as session management and common processing. Audit clients do not need to carry out synchronization of data, as the client interface may provide synchronization under the covers.

Performance-Related Design Considerations

In this embodiment, all Audit elements may be designed to be thread-safe with minimal contention. Because real-world performance bottlenecks are often not understood until code is tested, the design makes use of loose coupling. Loose coupling facilitates performance tuning by enabling new, better implementations of components and IPCs to be introduced.

Database Design Decisions

In one embodiment of the Audit subcomponent, it uses a simple text-oriented output file, with custom-delimited fields. To support future analysis and visualization, the Audit Store employs data normalization. One embodiment supports normalization and indexing by using strong typing and unique identifiers of events.

Security and Privacy Design Considerations

One embodiment of the Audit subcomponent is designed for partitioned security domains. The primary security issues include:
Integrity of audit data
One-way transmission of audit data from multiple, partitioned client security domains to a single audit server
Configuration of client diagnostic policy by a system administrator
Configuration of audit server policy by a system administrator
Viewing of audit data by a different security administrator
Separation of event management from data store recording.

In this embodiment, some design principles to meet these security issues include least privilege and minimality. The audit server's audit store writer may operate in a security domain that enables it to write persistent data to disk with an "audit data type." The Log and Forensic administrators are permitted to read the persistent data having "audit data type." In one embodiment, a separate "audit configuration" type identifies configuration files modifiable solely by a Policy Administrator.

Flexibility, Availability, and Maintainability Design Considerations

In this embodiment, the Audit subcomponent may be instrumental in system maintainability. Security event and diagnostic data support developers and administrators who need to understand the system function.

In this embodiment, the Audit subcomponent may be flexible. It may support in-process and inter-process aggregated logging. The design also supports future development by enabling different persistent stores and transports to be incorporated without affecting the overall implementation.

In this embodiment, the Audit subcomponent may have implications for system availability. Audit trails are preferably tamperproof and guaranteed to occur for security-relevant events. Therefore, the Audit component may become a bottleneck that can affect availability or a target for a denial-of-service attack. Audit components may be designed to be contention-free as much as possible so that multiple clients can simultaneously record their events asynchronously.

Subcomponent Details

The following sections describe the elements of the Audit subcomponent.

Audit Data

In this embodiment, the Audit Data element may provide the essential data model for Audit events and the operations to manipulate it. In one embodiment, the data model consists of data types, core kinds of data present in Audit records, and the taxonomy of events. The operations may consist of functions for manipulating fields, accessing common fields, and working with field types. It depends on session data defined in the Common::Session package and the safe, portable common types defined in the Common::Types package. The core objects are AuditField and AuditRecord. Helper objects include AuditRecordWrapper and AuditRecordIterator.

In this embodiment, an Audit Record may be essentially a container of multiple fields, some always present, some frequently used, and some specific to the component generating the record. The table below presents examples of the varying level of commonality. The Container and Wrapper interfaces facilitate levels of commonality of fields while supporting software reuse.

| Audit Event Fields - Commonality | |
|---|---|
| Commonality | Example |
| Always | process ID, component ID, timestamp, status code |
| Frequently Used | session ID, inspection success value |
| Specific | Dirty Word Search matching word, Authenticator user name |

Audit Client

In one embodiment, the AuditClient package may provide the core client capabilities for any system application or component to provide diagnostic logging and event auditing. Both diagnostic logging and event auditing require the capture of different types of values and persistence. Diagnostic logging may be provided only on development systems, and may not be included on production systems. Diagnostic logging need only be local to a specific application—however, a consolidated log could be useful for diagnosing cross-process issues. Security-event auditing should be consolidated to provide a system-wide view of security-related issues. In one embodiment, these crosscutting concerns are addressed by a single client interface, following the Proxy and Bridge patterns, that allows different event categorization (i.e., diagnostic vs. security) and modular destination (i.e., local file vs. audit server via IPC).

In this embodiment, the AuditClient may implement an abstract interface that defines the behavior of any Guard component that needs user session state. In one embodiment, it may consist of the following operations:

CreateRecord: create a simple record with or without user session data

AuditClient: initialize the subsystem, invoked at application startup

InitSession: associate user session data necessary for AuditRecord creation

CloseSession: release resources associated with user session data

GetName: return the name of the component, i.e., "AuditClient"

GetSession: get the session state.

In this embodiment, the AuditClient may also rely on an IAuditDestination interface, implemented as a logging capability or security-event destination.

Record Wrappers

In this embodiment, writing code to generate logging and auditing events may be repetitive. The code also can appear as noise because it appears so frequently. Record Wrappers may address both concerns, and are preferably used by the CAB Audit subcomponent.

Audit Format

In this embodiment, audit events written to unstructured text files may have a format independent of the destination to which they are written. One embodiment of the Guard can support binary or XML format. To separate format from structure, the Audit Format element may delegate formatting to encoders. One embodiment of the Guard supports ASCII, with a custom delimiter. The delimiter may be configured as a comma, for compatibility with Comma Separated-Value (CSV) format files. The ASCIIEncoder encodes the multiple types, encoding binary data types in Base-64 (MIME) format.

Event Destinations

In this embodiment, system events are preferably logged locally in their domain to facilitate early development, to a centralized repository for one embodiment, and to multiple guards in other embodiments. In order to support multiple destinations, there may be a single destination interface to be realized through local and inter-process destinations. The Destinations component may define the interface for writing an audit destination in the IAuditDestination interface.

One embodiment of the Guard need only provide text-based persistence of Audit data. Other embodiments may feature audit reduction and analysis, and therefore, a more structured persistent store may be implemented. The TextPersistentStore supports server persistence for auditing and client-side-only persistence for logging.

In this embodiment, in order to support session administration, the Audit Repository process also may maintain the live session list, including user name, session ID, priority, logon time, and other relevant data. The format may be in XML, to enable access from administrative utilities, using the CAB Configuration File capabilities.

Audit Repository/Audit Persistence

In this embodiment, the Audit Repository may be the CAB process that writes audit messages to the persistent audit data store. Audit messages may be received from the Event Manager.

Event Manager/Event Dispatch

In one embodiment, the Event Manager is the CAB process that receives audit messages from Audit Clients throughout the system. Once an audit message is received, it is the responsibility of the Event Manager to perform Event Dispatch.

In this embodiment, the Event Dispatch function provides a policy-driven capability to respond to security-relevant events. When an Audit Client (any CAB process with audit capabilities) detects an auditable event, it may send the event to the Event Manager, without regard for how that event should be treated. The Event Manager may perform Event Dispatch by applying its Event Policies to the new event and determining which actions should occur. The table below identifies the types of actions that may occur in one exemplary embodiment:

| Audit Event Action Objects | | |
| --- | --- | --- |
| Action Object | Purpose | Service |
| LogoutAction | Terminate the active session. | High-Side VDP Sender |
| GuardShutdownAction | Shutdown the Guard. | Shutdown |
| ConsoleAlertAction | Display an alert for administrator. | Console Alert |
| MetricAction | Capture a performance metric. | Performance Monitor |
| AccountLockoutAction | Lock a user's account. | Authentication |
| AuditAction | Record an event persistently. | Audit Repository |

In this embodiment, the Audit Event Manager may constitute the server element in the audit client to audit server relationship. Audit clients can include any CAB process that uses the Audit Client libraries to send audit messages to the Event Manager.

Audit Alerts

In this embodiment, the Alert element may provide an interface for generating alerts to an administrator. One embodiment provides a console-based alerter. Another embodiment may define additional alerts, such as those to pop-up windows, alarms, etc.

Administration

In this embodiment, initial administration of the Audit subcomponent may consist of specifying parameters in appropriate configuration files.

Flight Recorder Subcomponent

In one embodiment, the Flight Recorder subcomponent records user sessions when a user performs a suspicious action, or at other times as specified by the policy. When a suspicious event occurs, the Audit Event Manager notifies the interface listener to begin sending copies of session packets to the Flight Recorder. An Administrator will then have the opportunity to watch the session live (shadowing) or replay the session later. In one embodiment of the CAB system, there may be no built-in shadow or replay mechanism. In another embodiment, these features may be present.

Design Decisions and Considerations

Decision to Develop or Reuse

In this embodiment, because VDP is a completely new protocol, there is currently no software package that knows how to record VDP sessions and play them back. As a result, the Flight Recorder is newly developed. The Flight Recorder may use the VDP library to interpret VDP packets.

Interface-Related Design Considerations

In one embodiment of the CAB system, Flight Recorder may only interact with the Interface Listener and Audit subsystems. When a security event warrants flight recording, the Listener receives a message from the Audit Event Dispatch subcomponent indicating that a session must be recorded. The Interface Listener sends all packets associated with a session to the Flight Recorder to be recorded.

In this embodiment, when a packet with a matching session ID enters the Interface Listener, a copy of the packet is sent to the Flight Recorder. The Flight Recorder writes the packet into its data store. In another embodiment, an administrative interface enables the Forensic Administrator to replay the session directly on the Guard.

Performance-Related Design Considerations

In this embodiment, the Guard may not be able to record all user sessions while maintaining acceptable performance. Therefore, in one embodiment, the Flight Recorder is intended to record a session when an event has triggered the recording of data. The main performance concern is that every packet of a graphics-intensive session is preferably recorded to disk. The Flight Recorder may use tunable memory buffers to store packets and then periodically write the buffers to the data store to prevent overwhelming the disk with write requests.

Subcomponent Details

In one embodiment, once the Flight Recorder starts up, it waits for session packets from the High-Side Listener. Once a packet is received, the Flight Recorder processes it and goes back to waiting for another packet. The Flight Recorder receives both inbound and outbound messages from the High-Side Listener. If the wait for packets is interrupted or the receive fails, the Flight Recorder enters an error state and shuts down. During healthy operation, the Flight Recorder waits for a system shutdown event.

Flight Recorder Timing

In one embodiment, the Flight Recorder includes a timestamp with each recorded packet. Timing may be a part of the Flight Recorder, because without a concept of when packets were received, the session playback function would not include the natural pauses, and the entire session would pass in a matter of seconds.

The Data Store

In this embodiment, the Flight Recorder may store recorded sessions into the /var/cab/flightrecorder directory. Inside of this directory, each session may be contained in an individual file. Each file's name may consist of the session id, date, and time that the recording of the session began allowing the administrator to quickly locate the correct session for replay. In order to maintain performance and prevent lost packets, the Flight Recorder may buffer all writes using a tunable memory buffer. If the buffer cannot handle the packet flow, an event may be logged so that the Guard can make a policy-driven response.

Interfaces

In this embodiment, within the Guard system component, the Flight Recorder may interface with several other subcomponents. The table below provides a description of these interfaces in one exemplary embodiment:

| Flight Recorder - Internal Guard Interfaces | |
|---|---|
| Subcomponent | Interface Description |
| High-Side Listener | When initialized, Flight Recorder connects to the High-Side Listener (via the common Wire Protocol). While recording is active, the Listener sends a copy of inbound and outbound VDP traffic to Flight Recorder. This is one-way communication. |
| Hard Disk (write) | This subcomponent writes directly to the hard disk, creating and appending to session-specific recorder files. |
| Initialization Process | Initialization Process launches this subcomponent, using an 'exec' call. No communications are established between this subcomponent and the Initialization Process. |
| Heartbeat Monitor | Upon execution, this subcomponent uses the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |
| Audit Subsystem (sending audits) | This subcomponent sends audit messages directly to the Audit subcomponent, using the common Wire Protocol. This is one-way communication. |

Safety, Security, and Privacy Design Considerations

In this embodiment, the Flight Recorder and Session Data Store may be isolated in individual security domains so that other processes are prevented from accessing the recorded session data. In one embodiment, the Flight Recorder process may write to the Session Data Store, and the forthcoming playback and offloading tools may read the session data. In one embodiment, additional backup and cleanup functions receive appropriate access.

Authentication Subsystem

This section describes the CAB authentication subcomponents, with an emphasis on the Guard. In this embodiment, there may be two aspects of authentication: user-to-Guard and user-to-Terminal Server (through the Translator). User-to-Guard authentication can occur in two phases: TLS authentication (performed during the TLS handshake) and user authentication (performed after the TLS handshake). These two phases are handled by two separate groups of components.

In this embodiment, the Guard may provide a certificate that the Client uses to authenticate the Guard. In one embodiment, the Guard may not perform TLS Client authentication, i.e., the Guard does not require a client certificate. In another embodiment, CAB may be configurable to preferably require the user to supply a valid certificate, such as from a Comman Access Card (CAC) or certificate held in a client workstation.

In one embodiment, the Guard user authentication subsystem may consist of three subcomponents: the High-Side Authentication subcomponent, the Low-Side Authentication subcomponent, and the High/Low Authentication Mapper. The High-Side Authentication subcomponent authenticates the Client user to the Guard via a user ID and password pair. Additional authentication mechanisms may be included in other embodiments. The High/Low Authentication Mapper may map the high-side user ID to the low-side user ID presented to the Terminal Server (through the Translator). The Low-side Authentication subcomponent manages and passes the low-side password necessary to authenticate to the Terminal Server on behalf of the Client user.

In one embodiment, in order to perform the complete low-side authentication, the Guard maintains low-side Client user credentials and settings. The settings include screen resolution, color depth, keyboard layout, and any other settings presented during normal Terminal Server authentication. The Guard also can maintain password and connection statistics (e.g., last successful login and password expiration).

Design Decisions and Considerations

Component Design Decisions

In this embodiment, user authentication to the Guard is preferably to ensure that only authorized users can use the CAB system. Furthermore, confidentiality services are preferable to protect session traffic from eavesdropping. In order to address these issues, one embodiment of CAB uses a two-phase authentication process.

In one embodiment of CAB, TLS provides confidentiality services for session traffic and authentication of the Guard for the Client user (i.e., that the Guard "is who it says it is."). In another embodiment, the Guard may support the use of TLS to authenticate the Client users, via certificates. The encryption algorithms for confidentiality and authentication services may be implemented through dedicated cryptographic accelerator cards on the Guard and Translator.

In this embodiment, in addition to TLS handshaking, one embodiment of CAB preferably has the high-side user provide a user ID and password to complete the authentication process. In other embodiments, CAB may include other user authentication techniques, such as the use of biometric data. In one embodiment that does not use PKI, user IDs and passwords are preferably used to authenticate Client users to the Guard. In other embodiments, the use of passwords may not be necessary.

Interface-Related Design Considerations

In this embodiment, the Authentication subsystem may communicate with other components via one-way, asynchronous IPC, keeping with the overall Security Policy.

In this embodiment, the Authentication subsystem may use Commercial off-the-shelf (COTS) APIs to communicate with the crypto accelerator cards. The decision on which API to use depends on what is provided with the crypto card selected for CAB. The crypto card API used may, for example, either be one supplied by the accelerator card vendor or RSA's PKCS #11 (also known as Cryptoki).

Performance-Related Design Considerations

Operations involving asymmetric cryptography are very computationally-intensive, and performing such computations in software may put an excessive burden on the Guard and Translator CPUs. Furthermore, symmetric cryptography may be used for connections into and out of the Guard and Translator. In this embodiment, given the volume of data being encrypted, it is preferable to have optimized hardware perform the cryptography. As is common practice in high-load network servers, CAB may be designed to take advantage of specialized cryptographic hardware.

Database Design Considerations

In this embodiment, the Authentication subsystem may maintain certificates, user IDs, passwords, user settings, and user preferences. Because of the sensitivity of the data in question, it is preferably to store the data securely and efficiently.

In this embodiment, user passwords may be encrypted to protect them from compromise. For example, strong password requirements stipulate that passwords may not be reused over certain periods of time and that a new password must be sufficiently different from previous passwords (e.g., a rule might be "no more than four characters are the same from a previous password"). These stronger rules require that new passwords be compared in plain text form, and therefore, it is not possible to use of one-way cryptographic hashes. Therefore, the Guard preferably uses encryption and has an encryption key. In order to have secure key management, the Guard preferably maintains a password decryption key, which is preferably loaded on to the Guard at boot time.

In this embodiment, session encryption occurring at both the high- and low-side interfaces is transient, and therefore need not be persisted in a cryptographic database.

Safety, Security, and Privacy Design Considerations

In this embodiment, because the Guard and Translator authentication components control access to the system and manage highly sensitive data, they are preferably in tightly controlled security domains. The SELinux Security Policy may provide domain separation and control over the direction of data flows between components.

In this embodiment, separate cryptographic operations may take place at the high-side and low-side interfaces, each interface transmitting data at a different level of security. For this reason, the Guard preferably has one cryptographic accelerator card for each security level. To protect the sensitivity of data, these cards are preferably certified to the FIPS140-2 standard.

One embodiment of CAB supports at a minimum 1024-bit RSA for key exchange and digital signatures, SHA-256 for hashing, and AES for confidentiality (128 bit blocks in CBC mode). Another embodiment may be "Suite B" compliant.

In this embodiment, because TLS supports virtual connections, it is possible for the Guard and Translator to have one TLS network connection for multiple virtual user sessions.

Flexibility, Availability, and Maintainability Design Considerations

In this embodiment, the Authentication subcomponent may generate "heartbeat" signals at regular intervals, as defined by the heartbeat monitor subsystem. In one embodiment, if any subcomponent of the authentication subsystem were to terminate, the heartbeat signals would cease, thereby indicating a serious problem to the heartbeat monitor. Likewise, if any authentication subcomponent detects a condition rendering it unable to continue processing, it would shut down immediately, triggering the heartbeat monitor to initiate system shutdown.

4.2.3.2 Subsystem Details

Figure 19:
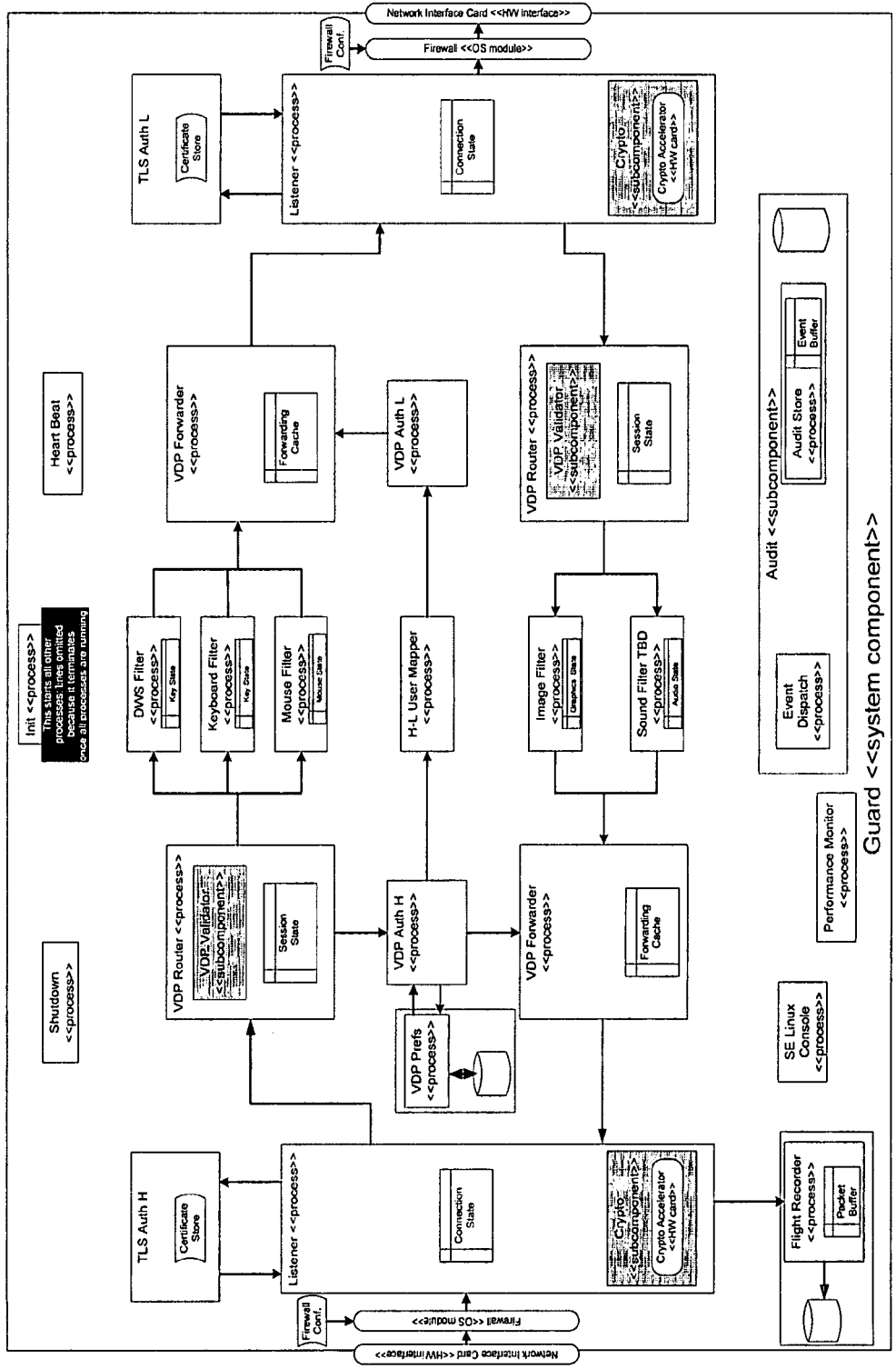
FIG. 19 shows an example of Guard authentication architecture.

In this embodiment, FIG. 19 shows an example of the Authentication subsystem and its interactions within the Guard. The arrows in the figure represent the data pathways used for authentication-related messages and events.

High-Side TLS Authentication Subcomponent

In one embodiment, the High-Side TLS Authentication subcomponent comprises the code performing the TLS authentication for the high-side Client connection (via the TLS handshake). In one embodiment, this subcomponent may simply maintain access to the Guard's certificate, as no Client certificates may be supported. In another embodiment, this subcomponent may become an active process, maintaining Client certificates and authenticating Client TLS authentication requests.

High-Side Interface Listener Subcomponent

In one embodiment, the High-Side Interface Listener subcomponent implements the TLS protocol on the high-side network interface. It performs TLS handshakes, encrypts and decrypts VDP packets, and creates cryptographically strong unique session identifiers for each connection.

High-Side User Authentication Subcomponent

In one embodiment, the High-Side User Authentication subcomponent processes VDP authentication packets. It may receive packets from the high-side VDP router, verifies user IDs and passwords, and sends responses to the high-side VDP forwarder for transmission to the Client. After a user's credentials are authenticated, it transmits available session settings (e.g., available screen resolutions and color depths) to the Client and awaits an acceptable response. In order to read user settings and update data such as last logon time, it preferably has bi-directional communications with the User Preferences subcomponent, which maintains preferences and policy settings.

In one embodiment, once the negotiation of settings has been completed and the other Guard components are ready to process session traffic, the High-Side User Authentication subcomponent notifies the High/Low User Mapper, which initiates the low-side authentication process by sending a low-side user ID number to the High/Low User Mapper.

In this embodiment, if the client user wishes to change the low-side password stored on the Guard, this subcomponent may send a message containing the user ID number and the new low-side password to the High/Low User Mapper.

High-Side User Preferences Subcomponent

In one embodiment, the High-Side User Preferences subcomponent supports the High-Side User Authentication subsystem by providing a persistent store of client user preferences and settings. Settings can include screen resolution, color depth, keyboard layout, language, and any other VDP-specific preferences. In addition, this subcomponent may store the classification string and banner color associated with the low-side Terminal Server, which is displayed in the client window.

In this embodiment, the High-Side User Preferences subcomponent may also manage the "profiles" associated with users. A profile represents a grouping of preferences and policy settings to associate with a class of users. It can define the permissible preference values, such as screen resolution, color depth, and keyboard type; the priority of the user's session; and the policy for security-relevant events, such as how to respond to a dirty word entered by the user (e.g., "enable flight recorder" or "lock account").

In one embodiment, when a user initiates a session, there is a negotiation over preferences. If no preferences are associated with a given user, the default values are used. The preferences are sent back to the Client, which either accepts them or sends back its new preferences. If the Client's chosen preferences are consistent with the profile assigned to the user, the process of low-side authentication may begin.

High/Low User Mapper Subcomponent

In one embodiment, the High/Low User Mapper subcomponent maintains the non-attributable relationship between high-side and low-side user identities. It maps the high-side user IDs to low-side user IDs, using, for example, a lookup table. For each high-side user ID number, there may be a one-to-one mapping to a distinct low-side user ID number. The Mapper, therefore enables high and low Authentication subcomponents to translate from high-side to low-side user identity, while remaining unaware of the user IDs themselves.

In one embodiment, the Mapper receives authentication-related messages from the High-Side User Authentication subcomponent, and sends authentication-related messages to the Low-Side User Authentication subcomponent.

Low-Side User Authentication Subcomponent

In one embodiment, the Low-Side User Authentication subcomponent performs authentication with the Terminal Server by way of the Translator. It receives messages from the High/Low User Mapper, and forwards VDP messages through the Low-Side VDP Forwarder subsystem.

In one embodiment, when the High/Low User Mapper sends an authentication message, the Low-Side User Authentication subcomponent begins the process of low-side authentication by sending a VDP message containing the low-side user ID and password to the Low-Side VDP Forwarder. This VDP Forwarder sends the message to the Low-Side Interface Listener, which in turn 1) initiates a TLS connection with the Translator and 2) sends the VDP authentication message to the Terminal Server.

In this embodiment, while the Low-Side User Authentication subcomponent is similar to the High-Side User Authentication subcomponent, it differs in that its authentication with the low-side Terminal can fail without terminating all session communication (in fact, terminal service COTS protocols do not always provide sufficient notification). If the password is not valid, the client user simply sees a login dialog, which requires a second, manual authentication via standard VDP keyboard events.

Low-Side TLS Authentication Subcomponent

In one embodiment, the Low-Side TLS Authentication subcomponent provides the authentication support for the Low-Side Interface Listener. It is analogous to the high-side interface listener. It communicates bi-directionally with the Low-Side Interface Listener, maintaining the Guard low-side certificate supplied in the TLS handshake. Every low-side session will have a separate TLS connection with the Translator.

Low-Side Interface Listener Subcomponent

In one embodiment, the Low-Side Interface Listener subcomponent implements the TLS protocol on the low-side network interface. It performs TLS handshakes, encrypts and decrypts VDP packets, and initiates new network sessions with the Translator.

Cryptographic Accelerator

In one embodiment, the CAB system uses TLS to provide confidentiality, integrity, non-repudiation, and authentication services between high-side Clients and the Guard, and between the Guard and the Translator. Under the expected network loads the Guard is responsible for communicating across a large number of encrypted links. Given that asymmetric cryptography is computationally expensive and that numerous symmetric cryptographic operations would further burden the Guard CPU(s), the CAB Guard may employ specially designed cryptographic accelerator cards to free up core Guard processing for VDP protocol inspection.

In this embodiment, the Guard may have separate Interface Listener processes on the high side and low side interfaces because each process must have its own cryptographic accelerator. Additionally, the differing security domains of the connected networks make it preferably that no single process is permitted to communicate with both interfaces.

In this embodiment, cryptographic accelerator cards perform the cryptographic portions of TLS authentication. In order to determine which accelerator best meets the needs of the Guard, the following exemplary criteria can be used for evaluation:

Performance—Support hundreds of simultaneous sessions

Support—Sold by a vendor that provides timely technical support, driver updates, and new firmware releases Algorithm support—AES, 1024-bit RSA (1024-bit), and SHA-256

Extensible—Programmable or firmware-upgradeable to support new algorithms in the future (e.g., Suite B algorithms)

Price—A price point that supports numerous Guard and Translator instances.

The following table shows exemplary cryptographic accelerators:

Authentication Subsystem - Candidate Cryptographic Accelerator Cards

| Card | Vendor | Features | Notes |
| --- | --- | --- | --- |
| ProtectServer Orange | Eracom | RSA (4096-bit), DSA, DH, AES, 3DES, IDEA, CAST-128, RC2, RC4, RNG, HMAC | Tamper-resistant FIPS 140-1 level 3 Linux support |
| nForce PCI 1600 | nCipher | RSA/DSA (1024-bit, maybe more?), DH, 3DES, CAST, AES-Rijndael, ARC4 | FIPS 140-2 level 2 Linux support Suite B supported with firmware update |
| S2010 PCI-X accelerator | Corrent | RSA (1024-bit), DH, HMAC, RNG, 3DES, AES | OpenSSL support PCI-X slot required Linux support |
| Nitrox XL NPB Accelerator (CN1230-350-NBP) | Cavium Networks | RSA/DSA (1024-bit), DH, RNG, 3DES, AES | OpenSSL supported w/Cavium's TurboSSL mods Linux support |

Data Sequence Diagrams

In this embodiment, the TLS protocol and VDP authentication may both have complicated handshakes. This section presents the interactions between the Guard subsystems and the operations in the TLS protocol.

In this embodiment, the TLS protocol may allow for either the creation of new TLS sessions or the resumption of old sessions. During session creation, both sides can exchange keys, perform mutual authentication, and negotiate the cipher suite (encryption and hashing algorithms) that both sides use to protect communications. Client authentication in TLS may be optional, and one embodiment of CAB may not support Client TLS authentication to the Guard.

Figure 20:
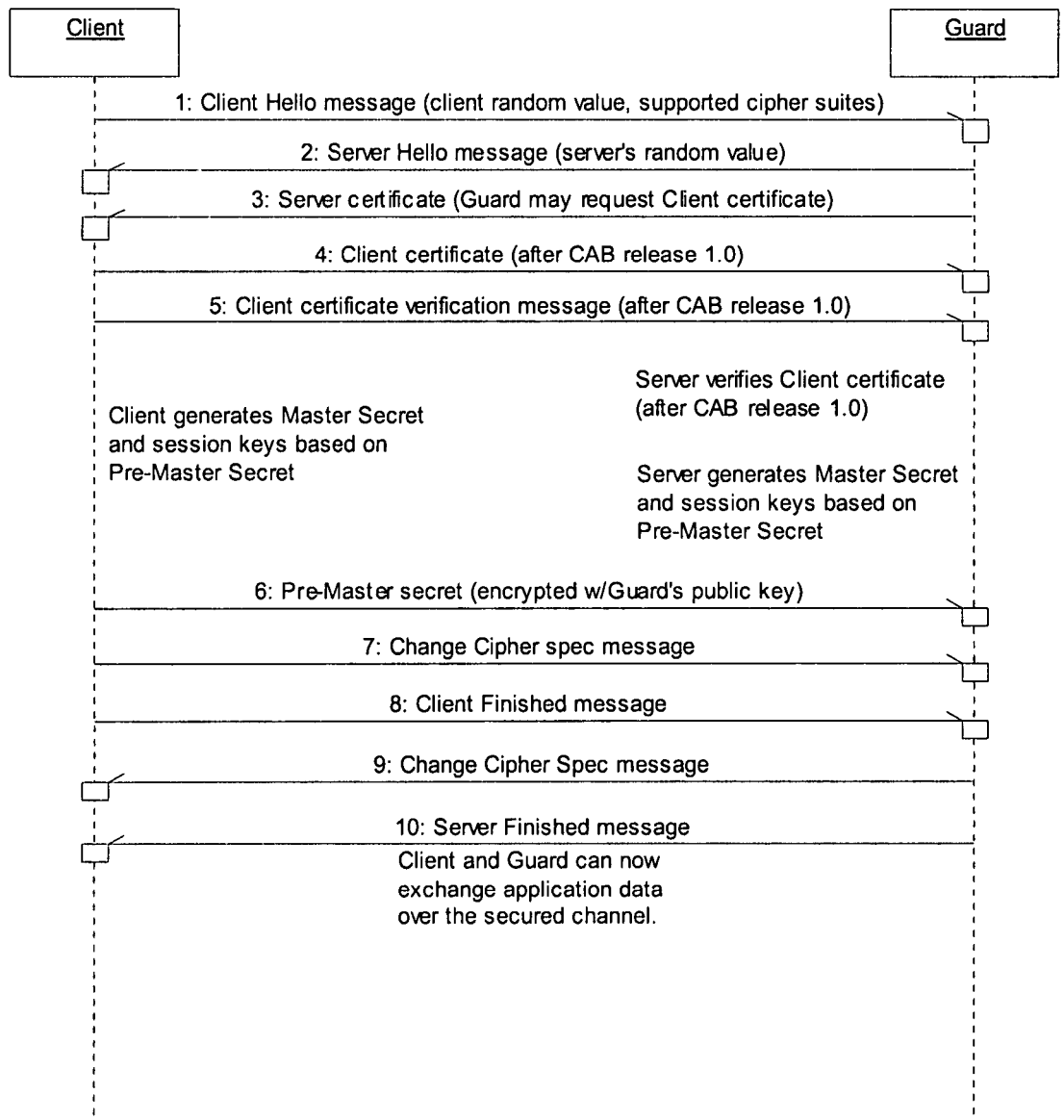
FIG. 20 shows an example of a sequence diagram of the TLS handshake protocol.

In one embodiment, the Client may not supply a certificate to the Guard, as no PKI infrastructure may exist for verifying the certificate. In another embodiment, however, the Client can use its certificate to authenticate to the Guard. FIG. 20 shows a TLS Handshake protocol sequence.

In one embodiment, Client authentication would take place after the Client sends its certificate to the Guard. The Guard would first check to see that the Client's certificate was properly signed by a valid certificate authority. Next, the Client would sign a hash of all TLS handshake messages sent up to that point, and then send that signature to the Guard. Using the certificate supplied by the Client, the Guard would verify the signature. If the signature fails verification, the Guard would not proceed with the connection, and a message is logged to the audit subsystem.

Figure 21:
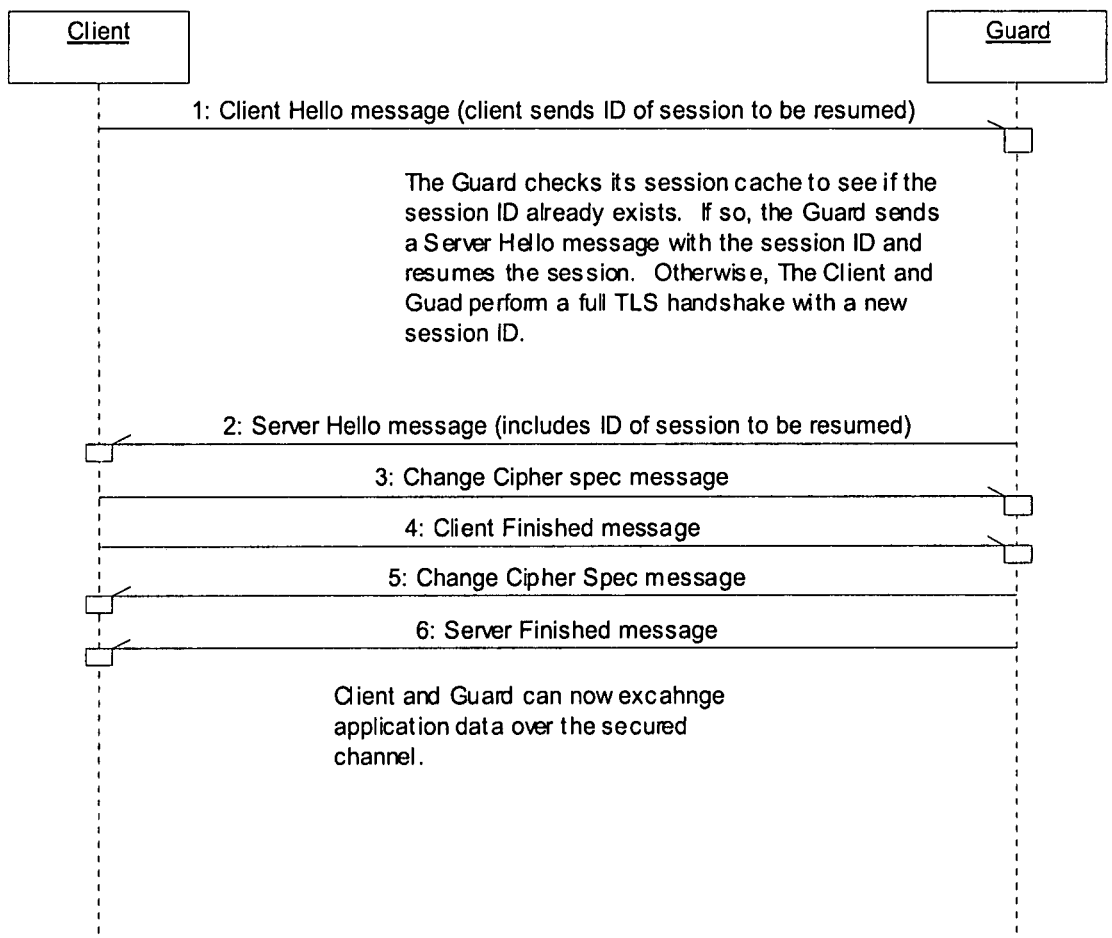
FIG. 21 shows an example of a sequence diagram of TLS session resumption.

In this embodiment, TLS supports session resumption, which would permit the Client to reconnect to the Guard using a previously used session ID. If the Guard supports this capability, it is recommended that session IDs have a short life span, so as to limit the time period in which a session may be resumed. FIG. 21 presents the TLS Handshake session resumption sequence.

Figure 22:
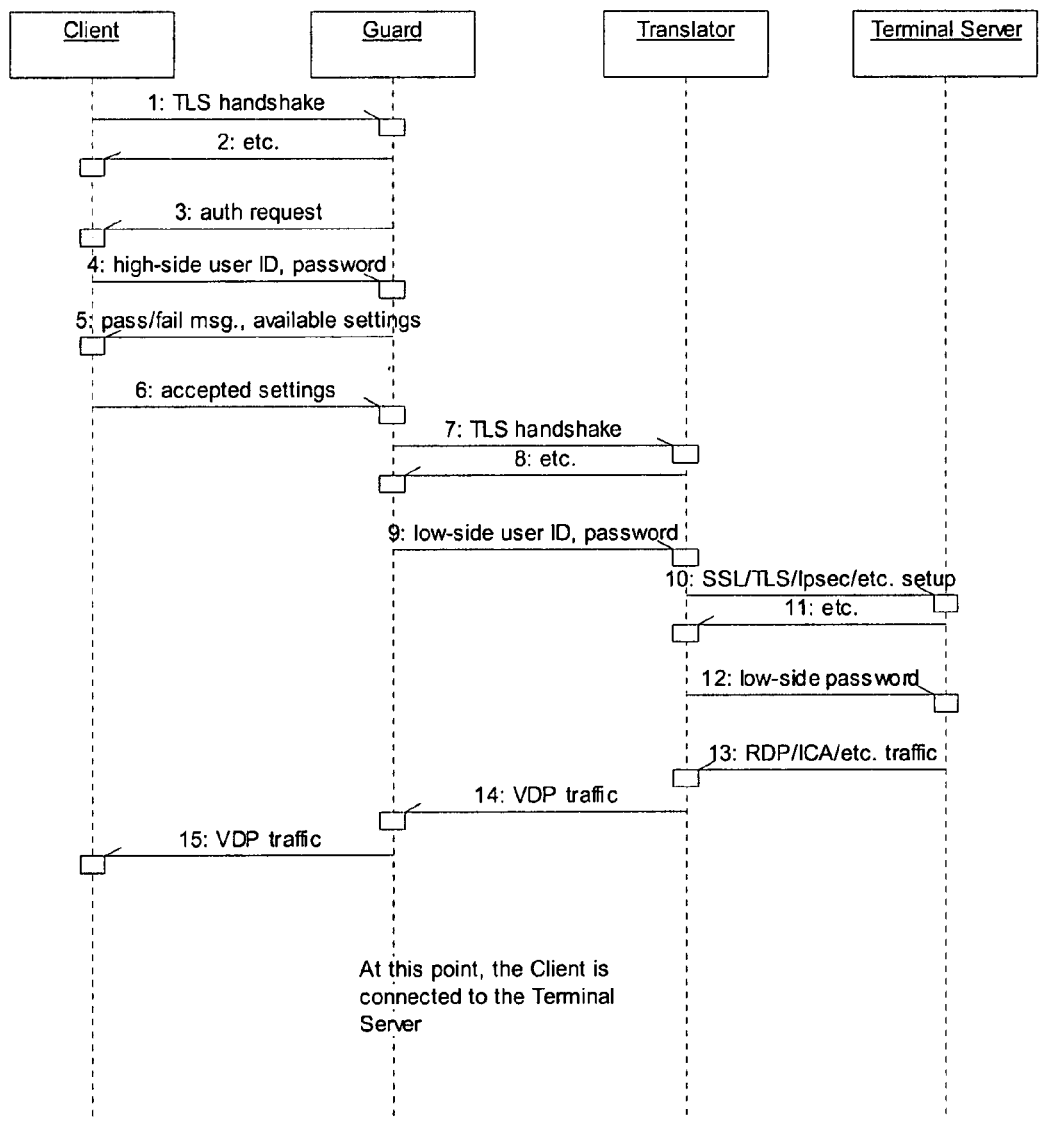
FIG. 22 shows an example of a sequence diagram of an overall authentication process.

An example of the overall process of authenticating a Client user for one embodiment is presented in FIG. 22. There may be two parts to Client authentication: TLS and user. For one embodiment, the Guard utilizes the user's ID and password for authentication. Other embodiments may use other authentication mechanisms, such as PKI and biometric data, for example.

Interfaces

In this embodiment, the Authentication Subsystem may consists of multiple subcomponents that communicate internally and externally. Examples of subcomponents and their message flow are presented in the table below:

Authentication Process - Interfaces

| Subcomponent | Messages From | Message To |
| --- | --- | --- |
| High-Side TLS Authentication | High-Side Interface Listener | High-Side Interface Listener |
| Low-Side TLS Authentication | Low-Side Interface Listener | Low-Side Interface Listener |
| High-Side User Authentication | User Preferences, High-Side VDP Router | User Preferences (reply), High-Side VDP Forwarder, High/Low User Mapper |
| Low-Side User Authentication | High/Low User Mapper | Low-Side VDP Forwarder |
| High/Low User Mapper | High-Side User Authentication | Low-Side User Authentication |

In this embodiment, the multi-step authentication process may consist of multiple message flows internal to the Guard. Once a high-side user has authenticated to the Guard, messages may be sent to each of the Guard components to notify them that the user has successfully authenticated.

In one embodiment, for complete authentication, it is preferably that a user's desired preferences are compatible with the user's assigned profile. Once the high-side user has valid selected settings (screen resolution, color depth, etc.), the High-Side User Authentication subcomponent stores these preferences in the User Preferences subcomponent for subsequent logons. Next, the High-Side User Authentication subsystem sends a "new session established" message with the user preferences to the High-Side VDP Forwarder, which, in turn forwards the message on to the High-Side Interface Listener.

In one embodiment, the High-side Interface Listener sends a VDP session-initiated message to the Client, which waits for final VDP traffic from the Translator (by way of the Guard). The Listener also forwards the "new session established" message to the High-Side VDP Router, and then on to each of the inspection engines (Dirty Word Search, Keyboard Filter, and Mouse Filter). The message continues to the Low-Side VDP Forwarder, Low-Side Interface Listener, then to the Low-Side inspection engines (Image). Once all subcomponents are ready for the new session, as communicated by the round-robin IPC internal to the Guard, the final stage of session initialization occurs.

In one embodiment, the High-Side Authentication subcomponent sends a message to the High/Low Mapper. The Mapper forwards a message to the Low-Side Authentication subcomponent, which crafts a VDP packet consisting of the low-side user ID and password. The VDP packet is forwarded to the Low-Side VDP Forwarder. The Forwarder sends the packet to the Low-Side Interface Listener, which initiates the TLS connection with the Translator.

Inspection and Filter Subcomponents

Common Inspection Engine Framework

In one embodiment, the CAB Guard employs a small set of individual filter subcomponents, each designed to inspect a specific type of VDP content: mouse events, keyboard events, and image-related content. While each filter specializes in its intended content, they share a set of core functionality. To provide efficient development, system-wide interoperability, each filter may use the Common Inspection Engine Framework. Common operations such as threading, audit event generation, and heartbeat monitoring are handled by the framework.

Design Decisions and Considerations

Interface-Related Design Considerations

In this embodiment, the Common Inspection Framework may provide the shell for inspection functions. In one embodiment, it receives control and data messages from the VDP Router and sends control and data messages to the VDP Forwarder. It hides these and other details from the inspection engine algorithms, permitting the inspection developer to focus on the inspection algorithms.

Performance-Related Design Considerations

In this embodiment, the Common Inspection Framework may provide a high-performance invocation mechanism for inspection algorithms. It maintains dedicated reader and writer threads to reduce IO latency between external subsystems and a pool of worker threads through which actual inspection occurs. Because performance characteristics are difficult to deduce during design, the interface is flexible to hide threading details from inspection functions. By using thread pools, there is opportunity to tune the inspection engines based on empirical analysis.

Security and Privacy Related Design Considerations

In this embodiment, the Common Inspection Framework may be designed to enable each inspection engine to operate in a separate process, supporting the principle of minimality. It uses the Session Management elements to maintain session separation. When an inspection function indicates there is at least one inspection violation (a function could observe multiple violations), the framework can block the violating traffic, if policy dictates for that session. It may also generate an audit event for each violation.

Flexibility, Availability, and Maintainability Design Considerations

In this embodiment, the Common Inspection Framework may be designed to be flexible. It provides a rich and straightforward interface for inspection engines, so that new inspection engines can tap the auditing, threading, and session management capabilities already developed.

Subcomponent Details

IInspectionEngine

In one embodiment, IInspectionEngine defines the interface that inspection engines must implement in order to be invoked by the Common Inspection Framework.

InspectionMgr

In this embodiment, the InspectionMgr may coordinate the Common Inspection Framework activity. It maintains and reads data and control traffic from the VDP Router invokes the inspection engine, via IInspectionEngine, logs events, and blocks or forwards traffic to the VDP Forwarder.

Administration

In this embodiment, the Common Inspection Framework may be administered via configuration files. The configuration parameters include thread pool tuning parameters, engine name, and the identifiers for the VDP Router and Forwarder (to specify high or low).

Dirty Word Search Filter

In one embodiment, the Dirty Word Search (DWS) component inspects character-oriented input to identify words that should not be disseminated from high to low to domains. The Dirty Word Search is like other inspection components in that it preferably uses some kind of overall user session state to validate a specific keyboard event. It may plug into the overall Inspection Engine Framework. Issues such as threading, event generation, and heartbeat monitoring may be handled by the framework.

One embodiment of Dirty Word Search performs a naïve inspection of session characters, using a modified Aho-Corasick text matching algorithm. If a dirty word is detected, then the packet can be discarded. Because actual packet discarding is a policy-driven aspect, the Dirty Word Search does not actually drop a packet, per se; it merely signals that an event has occurred.

Design Decisions and Considerations

Decision to Develop or Reuse

In this embodiment, the Dirty Word Search component can reuse the Inspection, Session Management, Process/Threading Framework, and Transaction Processing components developed for the Guard. Its design may reuse elements of research-validated keyword-matching algorithms based on the seminal Aho-Corasick paper.

Component Design Decisions

In one embodiment, the Dirty Word Search component reflects object-oriented analysis and design methodology on a procedural C programming language platform. An object-oriented approach facilitates reuse and future-proofs. The State Machine and Flyweight design patterns may be employed.

Interface-Related Design Considerations

In this embodiment, the Dirty Word Search component may have minimal interface-related concerns. Because it is an inspection component, it may behave similarly to other inspection components, to facilitate administration and development. The Dirty Word Search component, by way of the Inspection Engine, generates Audit messages that comply with the Audit format, uses configuration files that comply with the Configuration File component and implements the necessary interfaces to work in the Inspection Engine framework.

Performance-Related Design Considerations

In this embodiment, the Dirty Word Search component may be designed so that it has no discernable impact on user response time. Therefore, it may use an efficient optimization of the Aho-Corasick multiple-pattern-matching algorithm, optimized for single-octet languages.

One embodiment could support full Unicode UTF-32, quad-octet encodings by using a pattern matching algorithm akin to those used in anti-virus scanners. Dictionary representation is separated from session state to allow that multiple user sessions could share the same dictionary. Because real-world performance bottlenecks are often not understood until code is tested, the design can make use of loose-coupling, including the separation of the algorithm from overall inspection engine. Loose coupling facilitates performance tuning by enabling new, better implementations of components to be introduced.

Safety, Security, and Privacy Design Considerations

In one embodiment, the Dirty Word Search component carries out a single-context per-character inspection method—multiple character strings are treated as successive single-character events. As with other Guard applications, the Dirty Word Search may execute in a separate domain. It may have one-way input for character events, one-way decision output to indicate success or failure, and IPC interfaces with various supporting system components, such as the Audit and Initialization components. Exemplary security issues may include:

Complete detection of dirty words in the context of a single application session without factoring mouse cursor movement.

Integration with Guard components to ensure consistent response to security-relevant events.

Accurate detection of dirty words when a clean word is possible (e.g., suppose "secret" is dirty and "secretary" is not; it would not be possible to determine a clean word is present until an "a" is sent—long after "secret" might be sent).

Provision for detecting simple substitutions, in which the substituted character maps to one other character (e.g., the number zero for the letter "o").

Flexibility, Availability, and Maintainability Design Considerations

One embodiment of the Dirty Word Search component preferably supports multiple languages, each with its own search algorithm. Unicode enables the representation of any widespread written language, represented by up to four bytes. Efficient Aho-Corasick implementations rely on constant-time lookup of node transitions, which in Unicode could potentially include $2^{32}$ possibilities. Because the original Aho-Corasick design calls for single-character nodes, its tree structure is preferably modified because of scalability problems. Instead a "trie" structure may be used. A trie does not represent every transition with a new node. Rather, multiple transitions can point to the same node, reducing memory footprint.

In this embodiment, to support multiple algorithms, the algorithm may be implemented as a separable module, upgradeable at system patch time.

Subcomponent Details

In this embodiment, highlights of the assumptions of the Dirty Word Search, separate from the core implementation of the Aho-Corasick algorithm variant: can include:

A dirty word results in a security event unless a clean word immediately follows.

An entire clean word is preferably consumed in order for a security event not to be triggered.

Policy blocks result in a termination state.

In this embodiment, given these assumptions, there are states to distinguish between a dirty word's detection and session termination.

RuntimeDictionary

In one embodiment, the RuntimeDictionary is a state machine representation of all dirty and clean words in the dictionary. States are represented by a CharacterState object. Because a single Unicode character could be one of $2^{32}$ values, it is not feasible to store all transitions in a $2^{32}$-element array. Therefore, a word may be represented as a sequence of bytes. The two bytes indicate transitions to other states; subsequent bytes are preferably matched from a linked list.

CharacterNode

In this embodiment, a CharacterNode can represent a state of the RuntimeDictionary. It contains the first byte of the Unicode representation, transitions to other CharacterNode states, and a flag indicating a dirty word match.

SessionCharacterProcessor

In this embodiment, the SessionCharacterProcessor object may store the state needed to capture character-oriented entry of words and processes characters. A purpose is to invoke state transitions in the RuntimeDictionary. It maintains a stack of characters entered by the user, to access previous state when a backspace is pressed and a reference to the CharacterState used in the search algorithm state machine.

DictionaryReader

In this embodiment, the DictionaryReader may use the Configuration component to read and update the RuntimeDictionary.

DirtyWordSearchEngine

In this embodiment, the DirtyWordSearchEngine may be a simple function that extracts the character or string data from part of the VDP packet and passes it to the SessionCharacterProcessor for evaluation.

SubstitutionCode

In this embodiment, a SubstitutionCode uniquely substitutes for another character, such as "3" for "e," or identifies a command, such as backspace or left-cursor movement.

Administration

In this embodiment, Administration of this component may be accomplished through the system's configuration files. The Guard Policy Administrator—or possibly a more specific Dirty Word Search Policy Administrator—creates and modifies policies governing the behavior of components on the Guard, including the Dirty Word Search Filter. The Policy Administrator, therefore, controls the policy-specific configuration items, such as the dirty word and clean word lists. The Policy Administrator can also control auditing behavior and resource allocation related to the filter, and can determine the responses of the filter to suspicious events. The capabilities of Policy Administrator may be tightly controlled, and should be assumed by a properly trained individual.

Interfaces

In this embodiment, within the Guard system component, the Dirty Word Search Filter process will interface with several other subcomponents. The table below provides a description of some exemplary interfaces:

| | DWS Filter - Internal Guard Interfaces |
|---|---|
| Subcomponent | Interface Description |
| High-Side VDP Router | This subcomponent receives information from the High-Side VDP Router, via the common Wire Protocol. The bulk of the data received consists of VDP character events; however, configuration and session setup information is also received over the same channel. This is one-way communication. |
| Low-Side VDP Forwarder | This subcomponent sends information to the Low-Side VDP Forwarder, via the common Wire Protocol. The bulk of the data sent consists of VDP character events; however, configuration and session setup information is also sent over the same channel. This is one-way communication. |
| Initialization Process | The Initialization Process launches this subcomponent, using an 'exec' call. No communications are established between this subcomponent and the Initialization Process. |
| Configuration | This subcomponent reads configuration information from the Administration and Configuration subcomponent, using the interfaces provided by the Administration and Configuration subcomponent. This is one-way communication. |
| Heartbeat Monitor | Upon execution, this subcomponent utilizes the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |
| Audit | This subcomponent sends audit messages directly to the Audit subcomponent, using the common Wire Protocol. This is one-way communication. |

Keyboard Filter

In one embodiment, the Keyboard Filter inspects VDP keyboard data to ensure that keystroke messages are consistent with the acceptable use of a keyboard by a client application. It is preferably to distinguish its behavior from that of the Dirty Word Search component, which processes text character events—a higher level of abstraction.

In this embodiment, the Keyboard Filter may be like other inspection components in that it preferably uses some kind of overall user session state to validate specific events. To provide this, the Keyboard Filter can plug into the Common Inspection Engine Framework. Like other Inspection and Filter components, the Keyboard Filter can employ individual session states for each user.

One embodiment of Keyboard Filter performs token bucket rate limiting. If an average or burst threshold is reached, the token, a keystroke, is discarded. In the context of keyboard inspection, discarding means the generation of a security event and potential packet discarding. Because actual packet discarding is a policy-driven aspect, the Keyboard Inspector does not actually drop a packet, per se; it merely creates an error object that the Inspection Engine Manager processes. The Inspection Engine Manager, in turn signals that an event has occurred.

In this embodiment, an exemplary Keyboard Inspector workflow for keyboard inspection may be as follows:
  A scan code arrives. Keyboard Filter retrieves scan code history.
  The new scan code is added to the history, with a fresh timestamp.
  The token bucket rate-limiter algorithm is applied to determine if an excessive keystroke threshold has been reached.
  Update the session's status, by adding to the Keyboard Filter's custom status data, and return the result to the Inspection Engine Manager.

Design Decisions and Considerations

Decision to Develop or Reuse

In this embodiment, the Keyboard Filter may reuse the Inspection, Session Management, Process/Threading Framework, and Transaction Processing components developed for the Guard. Its design may reuse the token bucket rate limiter algorithm.

Component Design Decisions

In this embodiment, the Keyboard Filter may reflect object-oriented analysis and design methodology. An object-oriented approach facilitates reuse and future-proofs many design decisions that cannot be determined during the initial design activities. The Flyweight design pattern may be employed.

Interface-Related Design Considerations

In this embodiment, the Keyboard Filter may have minimal interface-related concerns. Because it is an inspection component, it may behave similarly to other inspection components to facilitate administration and development. In one embodiment, the Keyboard Filter, by way of the Inspection Engine, generates Audit messages that comply with the Audit format, uses configuration files that comply with the Configuration File component, and implements the necessary interfaces to work in the Inspection Engine framework.

Performance-Related Design Considerations

In this embodiment, the Keyboard Filter component may be designed so that it has no discernable impact on user response time. It may provide administrator-tunable rate limits. Because real-world performance bottlenecks are often not understood until code is tested, the design can make use of loose coupling, including the separation of the algorithm from the overall inspection engine. Loose coupling facilitates performance tuning by enabling new, better implementations of components and to be introduced.

Database Design Considerations

In this embodiment, this component may have no database design considerations. The keyboard layout may be simple enough to be defined in a static file.

Safety, Security, and Privacy Design Considerations

In one embodiment, the Keyboard Filter component carries out a single-keystroke inspection method—multiple keystrokes in a message are represented as multiple invocations of the algorithm. In one embodiment, keyboard switching within a session may not be supported in the Keyboard Filter. As with other Guard applications, the Keyboard Filter may execute in a separate domain. It may have a one-way input for scan code events, one-way decision output to indicate success or failure, and IPC interfaces with various supporting system components, such as the Audit and Initialization components. Exemplary security issues include:

Detection of unsupported scan codes

Detection of excessive average and burst typing rates

Integration with Guard components to ensure consistent response to security-relevant events.

Flexibility, Availability, and Maintainability Design Considerations

In one embodiment, the Keyboard Filter preferably supports multiple keyboards. It is preferably extensible to support additional inspection algorithms with minimal impact to design.

Subcomponent Details

KeyPress

In one embodiment, the Keypress object stores the keyboard scan code and timestamp. In one embodiment, the Keyboard Inspector preferably only identifies typing-rate anomalies. Therefore, it need only have a queue of timestamps. However, for diagnostic purposes, it is useful to have the scan code as well, such as logging the first keystroke that occurred in an anomaly.

KeyboardReader

In one embodiment, the KeyboardReader uses the Configuration component to read and update the RuntimeDictionary.

KeyboardInspector

In one embodiment, the KeyboardInspector is a simple function that extracts the scan code from the VDP packet and passes it to the KeyboardConfig for evaluation.

Administration

In this embodiment, administration of this component can be accomplished through the system's configuration files. The Guard Policy Administrator—or possibly a more specific Keyboard Policy Administrator—creates and modifies policies governing the behavior of components on the Guard, including the Keyboard Filter. The Policy Administrator, therefore, controls the policy-specific configuration items, such as the keyboard layout, scan codes, and permissible typing rate in one embodiment. The Policy Administrator can also control auditing behavior and resource allocation related to the filter, and can determine the responses of the filter to suspicious events. The capabilities of Policy Administrator may be tightly controlled, and should only be assumed by a properly trained individual.

Interfaces

In this embodiment, within the Guard system component, the Keyboard Filter process may interface with several other subcomponents. The table below provides a description of exemplary interfaces:

| Keyboard Filter - Internal Guard Interfaces | |
| --- | --- |
| Subcomponent | Interface Description |
| High-Side VDP Router | This subcomponent receives information from the High-Side VDP Router, via the common Wire Protocol. The bulk of the data received consists of VDP keyboard events; however, configuration and session setup information is also received over the same channel. This is one-way communication. |
| Low-Side VDP Forwarder | This subcomponent sends information to the Low-Side VDP Forwarder, via the common Wire Protocol. The bulk of the data sent consists of VDP keyboard events; however, configuration and session setup information is also sent over the same channel. This is one-way communication. |
| Initialization Process | The Initialization Process launches this subcomponent, using an 'exec' call. No communications are established between this subcomponent and the Initialization Process. |
| Configuration | This subcomponent reads configuration information from the Administration and Configuration subcomponent, using the interfaces provided by the Administration and Configuration subcomponent. This is one-way communication. |
| Heartbeat Monitor | Upon execution, this subcomponent utilizes the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |
| Audit | This subcomponent sends audit messages directly to the Audit subcomponent, using the common Wire Protocol. This is one-way communication. |

KeyboardState

In one embodiment, the KeyboardState object maintains the state necessary to conduct keystroke anomaly detection, including the active keyboard and the queue of Keypress objects.

KeyboardConfig

In one embodiment, a KeyboardConfig maintains the keyboard configuration parameters. Because multiple sessions might use the same kind of keyboard, the read-only KeyboardConfig is shared across sessions Mouse Filter In one embodiment, a purpose of the mouse filter subcomponent is to take mouse events associated with a given session and perform a set of inspections to verify that those events do not contain any anomalies that might adversely affect the Terminal Server or the Client. These inspections will be largely transparent to the Client user.

In this embodiment, the Mouse Filter may be like other filtering subcomponents in that it preferably uses some kind of overall user session state to validate specific events. To provide this, the Mouse Filter may plug into the Common Inspection Engine Framework.

Design Decisions and Considerations

Decision to Develop or Reuse

In this embodiment, much of the Mouse Filter's functionality may be virtually identical to that of other filter components (such as the image filter subcomponent, etc.). This will permit the reuse of certain features, such as the following:

State table and connection information storage

Auditing and blocking mechanisms

Inbound and outbound IPC mechanisms for transporting VDP data and internal control messages Rate limiting and prioritization of data on a per-user basis.

In this embodiment, the Common Inspection Engine Framework may be employed as a wrapper for the Mouse Filter. The wrapper may handle those functions that are required by inspection engines, while leaving the Mouse Filter engine to focus on inspecting mouse events.

Component Design Decisions

In this embodiment, several factors affect the design of the Mouse Filter subcomponent, including:

The need for protection between the low-side and high-side domains (via inspection, tightly controlled data flows, etc.)

The ability to understand the format of VDP mouse packets

The ability to differentiate mouse events associated with different sessions and users, and to perform the appropriate actions on that data.

Interface-Related Design Considerations

In this embodiment, the Mouse Filter subcomponent may employ CAB's common Wire Protocol and IPC mechanism for receiving data from the High-Side VDP router, and sending data on to the Low-Side VDP Packetizer. In addition, these IPC mechanisms may be used for transmitting control information, such as session IDs, packet IDs, and session state. The Mouse Filter subcomponent may also use the common IPC mechanism to communicate with the Audit subsystem. Utilizing SELinux enforcement of the IPC mechanisms canl ensure that the direction of data flows is strictly controlled, and that data can cross the domain boundary in a tightly controlled fashion.

Performance-Related Design Considerations

In this embodiment, the transmission of mouse events may consume very little bandwidth, compared to image or sound data, so performance may not be as large a concern as it is with image or sound data. On the other hand, a major portion of the user's experience is directly affected by how fast user input events are sent through the Guard and system. Thus, mouse input events are preferably processed as efficiently and quickly as possible to ensure that there is no lag between user input and the resulting visual response.

Database Design Considerations

In this embodiment, the Mouse Filter subcomponent may not require a database to store connection information. Instead, it may maintain a connection table containing relevant information about each connection (session ID, user ID, session state, screen size, etc.) in memory.

In this embodiment, the Mouse Filter subcomponent may require access to policy information in order to determine how to handle anomalies. Policy information may be obtained via the Administration and Configuration subcomponents. Based on policy settings, the Mouse Filter may block and/or log certain types of anomalies. One embodiment of the filter may also need to identify patterns in mouse movements in order to detect side channel communications (e.g. the Ouija board scenario, etc.). The mouse inspection component may also provide fine-grained control over throughput, in order to give preference to certain users over others.

Safety, Security, and Privacy Design Considerations

In this embodiment, the Mouse Filter subcomponent may reside in its own security domain. SELinux may ensure that data can only be read in from the IPC shared with the high-side VDP Router. Similarly, data may only be written to the IPCs shared with the low-side VDP Packetizer and the Audit component. This may prevent data flows from moving in unintended directions, thereby tightly mediating the interactions between the high-side and low-side domains.

Flexibility, Availability, and Maintainability Design Considerations

In this embodiment, the Mouse Filter subcomponent may support availability by generating a "heartbeat" at regular intervals, allowing the Heartbeat Monitor subcomponent to monitor overall system health. If the Mouse Filter subcomponent dies or enters an illegal state, the heartbeat should cease, thereby indicating a serious problem to the heartbeat monitor.

Subcomponent Details

In this embodiment, the Mouse Filter subcomponent may consist primarily of a mouse filter engine, and the Common Inspection Engine Framework wrapper. The mouse filter engine may contain a pool of threads that will perform the actual inspection of mouse events, which should allow higher throughput. The wrapper will handle functions common to all filters (IPC communications, session data management, VDP library functions, etc.), and may be reusable. The wrapper may consist of a number of threads in order to perform its tasks. For example, the wrapper may include reader and writer threads for IPC communications, a heartbeat thread for system health monitoring, etc.

In this embodiment, VDP packets containing mouse event data may be forwarded on to the mouse filter engine, along with information about the connection (session ID, etc.). The mouse filter engine may be responsible for inspecting the following types of events:

Mouse movement events

Drag-and-drop events

Scroll wheel events

Raw mouse button press-and-release events

Interpreted mouse click events (single, double, and triple clicks).

In this embodiment, in order to perform these operations, the mouse filter engine may need to be able to parse VDP data to identify the mouse event to be inspected, and thus the type of inspection to be performed. The mouse filter engine may then analyze the event, and determine whether the data passes or fails inspection. Note that proper analysis of some events may depend on session-specific settings like screen size. In essence, the mouse filter engine will be checking for improper field lengths, invalid values, illegal coordinates, etc.

In this embodiment, in addition to format and data validation, the mouse filter engine may need to do basic anomaly detection. Anomalies that are preferably detected by the mouse filter engine include:

Mouse coordinates out of the range of the screen

Mouse movements that exceed the threshold regulating event frequency or mouse movement speed Mouse movement packets received when movement is disabled Mouse click and scroll packets received when unsupported or disabled (Scrolling and third mouse button are optionally supported)

Mouse click packets received in the wrong input mode:
> Raw mode supports generic press and release click events
>> Interpreted mode supports client detected single, double, and triple click events.

In this embodiment, if an event passes all checks, it may then be passed to the low-side VDP Forwarder. Otherwise, the Mouse Filter may notify the Audit subsystem of the failure, and then use the current policy to determine whether to pass the offending mouse event. The Audit subsystem may be responsible for coordinating additional actions, such as closing down the current session or locking out the user.

Administration

In this embodiment, the Guard Policy Administrator can create and modify policies governing the behavior of components on the Guard, including the Mouse Filter. The Policy Administrator can thereby control auditing behavior and resource allocation, and can also determine the responses of the filter to suspicious events. The role of Policy Administrator may have limited abilities, and should preferably only be assumed by a highly vetted individual.

Interfaces

In this embodiment, within the Guard system component, the Mouse Filter may interface with several other subcomponents. The table below shows examples of these interfaces:

| Mouse Filter - Internal Guard Interfaces | |
| --- | --- |
| Subcomponent | Interface Description |
| High-Side VDP Router | This subcomponent receives information from the High-Side VDP Router, via the common Wire Protocol. The bulk of the data received consists of VDP mouse events; however, configuration and session setup information is also received over the same channel. This is one-way communication. |
| Low-Side VDP Forwarder | This subcomponent sends information to the Low-Side VDP Forwarder, via the common Wire Protocol. The bulk of the data sent consists of VDP mouse events; however, configuration and session setup information is also sent over the same channel. This is one-way communication. |
| Initialization Process | This Initialization Process launches this subcomponent, using an 'exec' call. No communications are established between this subcomponent and the Initialization Process. |
| Configuration | This subcomponent reads configuration information from the Administration and Configuration subcomponent, using the interfaces provided by the Administration and Configuration subcomponent. This is one-way communication. |
| Heartbeat Monitor | Upon execution, this subcomponent utilizes the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |
| Audit | This subcomponent sends audit messages directly to the Audit subcomponent, using the common Wire Protocol. This is one-way communication. |

Image Filter

In this embodiment, this section describes the elements in the CAB Guard that inspect image data and image-related operations that are sent from the low-side CAB Terminal Server to the high-side CAB Client. When image data is transmitted from the low-side Terminal Server, it is the responsibility of the Guard to ensure that such image data is properly formed, and will not pose any threat to the high-side Client. In one embodiment, the image inspection methodology will consist primarily of message format verification and field validation, which together ensure that no malformed or dangerous image data traverses the Guard. Other embodiments may offer more complex inspections, such as checking for the existence of steganographic content.

In this embodiment, the Image Filter subcomponent may be like other filter subcomponent in that it preferably uses some kind of overall user session state to validate specific events. To provide this, the Image Filter may plug into the Common Inspection Engine Framework.

Design Decisions and Considerations

Decision to Develop or Reuse

In this embodiment, much of the Image Filter subcomponent's functionality may be virtually identical to that of other inspection components (such as the Mouse Inspection subcomponent, etc.). This may permit the reuse of certain features, such as the following:
> State table and connection information storage
> Auditing and blocking mechanisms
> Inbound and outbound IPC mechanisms for transporting VDP data and internal control messages
> Rate limiting and prioritization of data on a per-user basis.

In this embodiment, the Common Inspection Engine Framework may be utilized as a wrapper for the Image Filter. The wrapper may handle those functions that are required by inspection engines, while leaving the Image Filter engine to focus on inspecting mouse events.

Component Design Decisions

In this embodiment, several factors may affect the design of the Image Filter subcomponent, including:

> The need for protections between the low-side and high-side domains (via inspection, tightly controlled data flows, etc.)
> The need for the rapid inspection of large quantities of image data and operations
> The ability to understand VDP drawing commands and caching requests that contain bitmaps defined by Common Image Format (CIF)
> The ability to differentiate data associated with different sessions and users, and to perform the appropriate actions on that data.

Interface-Related Design Considerations

In this embodiment, the Image Filter subcomponent may employ CAB's common Wire Protocol and IPC mechanism for receiving data from the High-Side VDP router, and sending data on to the Low-Side VDP Packetizer. In addition, these IPC mechanisms may be used for transmitting control information, such as session IDs, packet IDs, and session state. The Image Filter subcomponent may also utilize the common IPC mechanism to communicate with the Audit subsystem. Utilizing SELinux enforcement of the IPC mechanisms may ensure that the direction of data flows is controlled, and that data can preferably only cross the domain boundary in a tightly controlled fashion.

Performance-Related Design Considerations

In this embodiment, performance may be a consideration for the Image Filter subcomponent, considering the quantities of data that it will be required to handle. For this reason, the Image Filter may require a variety of optimization techniques, including loop unrolling, inline assembly, efficient branching, caching, etc.

Database Design Considerations

In this embodiment, the Image Filter subcomponent may not require a database to store connection information. Instead, it may maintain a connection table containing relevant information about each connection (session ID, user ID, session state, client screen resolution and color depth, etc.) in memory.

In this embodiment, the Image Filter subcomponent may require access to policy information in order to determine how to handle anomalies. Policy information may be obtained via the Administration and Configuration subcomponents. Based on policy settings, the Image Filter may block and/or log certain types of anomalies. One embodiment of the filter may also provide fine-grained control over throughput, in order to give preference to certain users over others.

Safety, Security, and Privacy Design Considerations

In this embodiment, the Image Filter subcomponent may reside in its own security domain. SELinux may ensure that data can only be read in from the IPC shared with the high-side VDP Router. Similarly, data may be written to the IPCs shared with the low-side VDP Packetizer and the Audit component. This may prevent data flows from moving in unintended directions, thereby tightly mediating the interactions between the high-side and low-side domains.

Flexibility, Availability, and Maintainability Design Considerations

In this embodiment, the Image Filter subcomponent may support availability by generating a "heartbeat" at regular intervals, allowing the Heartbeat Monitor subcomponent to monitor overall system health. If the Image Filter subcomponent dies or enters an illegal state, the heartbeat should preferably cease, thereby indicating a serious problem to the heartbeat monitor.

Subcomponent Details

In this embodiment, the Image Filter subcomponent may consist primarily of an image filter engine, and the Common Inspection Engine Framework wrapper. The image filter engine may contain a pool of threads that can perform the actual inspection of image data and operations, while the wrapper will handle functions common to all filters (IPC communications, session data management, VDP library functions, etc.). Note that the image filter engine may be replicated into a number of separate threads in order to increase throughput.

In this embodiment, VDP packets containing image data and operations may be forwarded on to the image filter engine, along with information about the connection (session ID, etc.) It may be preferable for the Image Filter subcomponent to maintain some state about sessions for the purposes of auditing and/or blocking traffic associated with a given user or session. The image filter engine may be responsible for inspecting the following exemplary VDP drawing commands and operations:

Raw image data in VDP CIF; this includes 8-, 15-, 16-, and 24-bit images

Palette updates

Cursor updates

CIF clear and pattern clear operations

Screen copy operations

Cache copy operations

Cached cursor draw operations

Cached text draw operations

Various other cache operations, including cursor cache, screen cache, bitmap cache, and font cache operations.

In this embodiment, in addition to basic format and anomaly detection, the image filter engine preferably ensures that any packets it receives are valid for the current session's capabilities. Each user session may permit some subset of drawing commands, caching operations, and parameters (i.e., screen size). If any packets are received containing operations or parameters that are not supported by the capability set, the image filter preferably takes appropriate action. Actions may include dropping the packet and logging an audit event for the occurrence.

In this embodiment, in order to perform these operations, the image filter engine may need to be able to parse VDP data to identify the type of data to be inspected, and thus the type of inspection to be performed. The image filter engine may then inspect the data, and determine whether the data passes or fails inspection. The image filter engine may, for example, be checking for:

Sizes or coordinates out of the range of the screen

Color depths other than that expected for the current session

Improperly formatted VDP packets

Parameters with improper lengths or invalid values

Caching indexes that do not correspond to valid cache entries

Unsupported or invalid caching operations.

In this embodiment, if the data passes all checks, it may then be passed to the high-side VDP Forwarder. Otherwise, the Image Filter may notify the Audit subsystem of the failure, and then use the current policy to determine whether to pass the offending event. The Audit subsystem may be responsible for coordinating additional actions, such as closing down the current session or locking out the user.

Administration

In this embodiment, the Guard Policy Administrator can create and modify policies governing the behavior of components on the Guard, including the Image Filter. The Policy Administrator can thereby control auditing behavior and resource allocation, and can also determine the responses of the filter to suspicious events or data. The role of Policy Administrator may have limited abilities, and preferably should be assumed by a highly vetted individual.

Interfaces

In this embodiment, within the Guard system component, the Image Filter may interface with several other subcomponents. The table below shows examples of these interfaces:

Image Filter - Internal Guard Interfaces

| Subcomponent | Interface Description |
| --- | --- |
| Low-Side VDP Router | This subcomponent receives information from the Low-Side VDP Router, via the common Wire Protocol. The bulk of the data received consists of VDP image data and operations; however, configuration and session setup information is also received over the same channel. This is one-way communication. |
| High-Side VDP Forwarder | This subcomponent sends information to the High-Side VDP Forwarder, via the common Wire Protocol. The bulk of the data sent consists of VDP image data and operations; however, configuration and session setup information is also sent over the same channel. This is one-way communication. |
| Initialization Process | Initialization Process launches this subcomponent, using an 'exec' call. No communications are established between this subcomponent and the Initialization Process. |
| Configuration | This subcomponent reads configuration information from the Administration and Configuration subcomponent, using the interfaces provided by the Administration and Configuration subcomponent. This is one-way communication. |
| Heartbeat Monitor | Upon execution, this subcomponent utilizes the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |
| Audit | This subcomponent sends audit messages directly to the Audit subcomponent, using the common Wire Protocol. This is one-way communication. |

Sound Filter

In one embodiment, CAB supports audio content transferred from the low-side Terminal Server to the high-side Client.

In one embodiment, the Sound Filter preferably ensures that such data is properly formed, and will not pose any threat to the high-side Client. In one embodiment, the audio inspection methodology may consist primarily of message format verification and field validation, which together may ensure that no malformed or dangerous audio data traverses the Guard.

In this embodiment, the Sound Filter subcomponent may be like other filter subcomponent in that it preferably maintains some kind of overall user session state to validate specific events. To provide this, the Sound Filter may plug into the Common Inspection Engine Framework.

VDP Communications Subsystem

In this embodiment, the VDP Communications Subsystem performs Guard routing and forwarding functions. It may consist of three subcomponents: the VDP Router, VDP Forwarder, and Session Management interface.

In one embodiment, the VDP Router receives VDP packets from the Network Listener and routes them to the next location. The VDP Forwarder receives VDP packets from Guard components and forwards them to the Network Listener for network transmission. There may be high and low VDP Routers and Forwarders. The VDP Router and Forwarder may be designed to perform fast routing of data between Guard components, while maintaining session coherency, session prioritization and one-way data flow policy.

In this embodiment, the Session Management interface may define the common operations used for synchronizing session information across the VDP Router, VDP Forwarder and other Guard components.

Design Decisions and Considerations

Decision to Develop or Reuse

In one embodiment, the VDP Communications component reuses the Process/Threading Framework, Wire Protocol, and Transaction Processing components developed for the Guard. It provides common interfaces so that other components can communicate with it.

Component Design Decisions

In one embodiment, the VDP Communications component reflects object-oriented analysis and design methodology on a procedural C programming language platform. An object-oriented approach may facilitate reuse and may future proof many design decisions that cannot be determined during the initial design activities. It may use the Bridge pattern to separate threading concerns and to support loose coupling with which it communicates with the components.

Interface-Related Design Considerations

In this embodiment, the VDP Communications Component may define interfaces for components in the inspection path. The interfaces may include sending and receiving from the Network Listener and inspection engines. In one embodiment, both packet flow and control interfaces may flow in a unidirectional manner, either strictly high-to-low or low-to-high, without direct feedback channels. The VDP Communications component may generate Audit messages that comply with the Audit format, uses configuration files that comply with the Configuration File component, and implements the necessary interfaces to work in the Inspection Engine framework.

Performance-Related Design Considerations

In this embodiment, the VDP Communications component may be designed so that it has no discernable impact on user response time with multiple simultaneous sessions. It may be designed so that different threading models can be employed. To reduce contention, lock-free algorithms may be employed for passing data across threads. Because real-world performance bottlenecks are often not understood until code is tested, the design may make heavy use of loose coupling, including the separation of IO from and packet verification and reordering processing. Loose coupling facilitates performance tuning by enabling new, better implementations of components to be introduced.

Safety, Security, and Privacy Design Considerations

In this embodiment, the VDP Communications Component may play a role in the one-way pipeline between Network Listeners of different levels. Packet data and control messages preferably flow in one direction. Exemplary flows are presented in the table below:

| VDP Communications Subcomponent Packet and Control Flow | | |
|---|---|---|
| VDP Communications Sub-Component | Packet and Control from | Packet and Control to |
| High-Side VDP Router | High-Side Network Listener | Inspection Engines, High-Side Authenticator, Client Logger |
| Low-Side VDP Forwarder | Inspection Engines, Low-Side Authenticator | Low-Side Network Listener |
| Low-Side VDP Router | Low-Side Network Listener | Inspection Engines |
| High-Side VDP Forwarder | Inspection Engines, High-Side Authenticator, Event Manager | High-Side Network Listener |
| Session Management | Control from all session-related components | Control to all session-related components. |

Subcomponent Details

In this embodiment, the VDP Communications subsystem may consist of three subcomponents: the VDP Router, VDP Forwarder and Session Management interface.

VDP Router

In one embodiment, the VDP Router executes core VDP protocol verification and routes the packets to the next Guard component for processing. The VDP Router receives packets from the Network Listener, which has preferably ensured that the VDP header is valid and that the packet has been read from the network. The VDP Router may use the VDP Reference Implementation to perform validation functions, to execute VDP protocol state transitions and to identify the type of VDP packet received. If validation succeeds, then the VDP Router forwards the packet to the next Guard component based on packet type.

In one embodiment, there may be two running instances of the VDP Router: high-side (client-receive) and low-side (translator-send). The high-side router forwards packets to the VDP Authenticator, high-to-low inspection engines, and the VDP Logger. The low-side router forwards packets to the low-to-high inspection engines.

VDPRouterServer

In this embodiment, the VDPRouterServer may receive packet and control IPC messages from the Network Listener. It places all packets in a per-session queue for inspection by the VDPVerifier. It may be a very small component to minimize IO latency with the Network Listener.

VDPRouterSessionState

In one embodiment, the VDPRouterSessionState may consist of common user session state and an additional inbound packet queue. The packet queue may assure that packets are assigned per-user sequence numbers in order of arrival at the Guard.

VDPVerifier

In one embodiment, the VDPVerifier performs VDP protocol verification and packet prioritization, sequencing, and routing. It can extract packets from the per-session queues in priority order. Once extracted, it can use the VDP Reference implementation to verify the packet and determine the packet's type. If the packet is valid, it is assigned the next sequence number.

In one embodiment, the VDPVerifier maintains a mapping of packet type to destination processor, i.e., the next Guard component to receive the packet for processing. Destinations may be managed by a configuration file. The VDPVerifier may queue the packet into the appropriate destination, using the prioritization associated with the user's session state.

In this embodiment, because there may be two running instances of the VDP Router, with different target components, there may be different configuration files and security policies that dictate the flow of communication.

VDPPacketProcessorClient

In one embodiment, the VDPPacketProcessorClient makes the IPC call to the packet processor, sending higher priority packets first.

VDP Forwarder

In one embodiment, the VDP Forwarder receives packets from the inspection engines and forwards them to the Network Listener for transmission across the network. Because session inspection is spread across processes, it preferably reorders the packets before they are transmitted. It may use a sequence number generated by the VDP Router.

In this embodiment, there may be two running instances of the VDP Forwarder: low-side (translator-send) and high-side (client-receive). The low-side forwarder may send packets to the low-side Network Listener. The high-side forwarder may send packets to the high-side Network Listener.

VDPReordererServer

In one embodiment, the VDPReordererServer receives IPC messages from Guard components that can forward a packet. It places packets in a per-session priority queue for reassembly.

VDPReorderer

In one embodiment, the VDPReorderer reads packets in sequence-number-order from the session priority queue and places them in an outbound packet queue for forwarding to the Network Listener.

VDPForwarderClient

In one embodiment, the VDPForwarderClient reads packets from the outbound packet queue and sends an IPC to the Network Listener.

Session Management

In one embodiment, the Session Management component may consist of an encapsulated in-process service for managing sessions. It processes control messages, defines interfaces for specialized control messages (e.g., "Notify Translator") and provides extensible session state management.

SessionState

In this embodiment, a SessionState object may maintain core shared session state and provides extensibility for applications that need to store additional, local state (e.g., the Dirty Word Search stores a list of keystrokes on a per-session basis).

It provides synchronization capabilities so that applications can have safe access to data. SessionState may be accessed through the SessionTable.

SessionTable

In this embodiment, a SessionTable may provide guarded access to SessionState. It hides the storage details of data, so that application writers do not need to worry about coding to a specific data structure API.

SessionManager

In this embodiment, a SessionManager may provide the core session control functions. It can receive session control messages from an IPC provided by the application using it. It may support additional session control IPCs by providing an interface to the SessionTable. The Session Manager may be essentially a lightweight service that receives control messages via IPC, performs local operations (i.e., initially add or remove a session), and forwards the request if the message has been received for the first time.

INotifyTranslator

In this embodiment, an INotifyTranslator interface may define the message sent in final-stage session initiation. It may use the IPC provided by the application using it. Applications preferably implement this interface if they wish to send or receive final-stage session initiation control messages.

IConnectionReceived

In this embodiment, an IConnectionReceived interface may define the message sent in early-stage session initiation, before any VDP traffic has been forwarded by the High-side Listener. It may use the IPC provided by the application using it. Applications preferably implement this interface if they wish to send or receive early-stage session initiation control messages.

Administration and Configuration Subcomponent

In one embodiment, the Administration and Configuration subcomponent provides the administrative utilities, configuration files, system status reporting, and run-time interfaces for CAB administration. It provides a partitioned, policy-enforced environment for system administration. Each administrative role permits a high degree of control to the system's administrator's area of concern.

In one embodiment, the system administration functions may be command-line based. Administrators edit configuration files using a text editor and issue a commit command, which invokes the transactional configuration update. To support administration, the Administration and Configuration subcomponent provides diagnostic and performance reports.

Design Decisions and Considerations

Decision to Develop or Reuse

In this embodiment, the administration functions of CAB have been designed to minimize dependencies on proprietary software or concepts. In one embodiment, administration of the CAB system relies on standard SELinux system commands such as tar, bzip2, and cp to generate backups and export data. The configuration files can be readily edited with standard text editors like vi. The subcomponents that validate configuration data may be modular and reused through the system. The configuration file format, XML, for example, is a commonly accepted standard, simplifying administration and enabling integration with existing XML utilities.

In one embodiment, the performance monitor functions use data collected from the command line utilities top and ifconfig, data derived from files in the/proc file system, and information provided by other CAB subcomponents. The Performance Monitor may be the primary source of CAB data. Additionally, the Audit subsystem can provide live session data.

Performance-Related Design Considerations

In this embodiment, the administrative and performance reporting functions may have very little impact on overall system performance. They are intended to provide live snapshot data. Periodically, the performance reporting functions contact system utilities, read from files in the/proc file system, and aggregate data received from CAB components. Data processing may be performed as it is collected, and therefore can be minimal and spread out over time. In one embodiment, deeper analysis (e.g., audit reduction), which is more resource-intensive, should preferably be carried out off-line.

Database Design Considerations

In one embodiment, configuration data—including user data—resides in text-based XML files. In another embodiment, database functionality may be used instead of text-based XML files.

Safety, Security, and Privacy Design Considerations

In one embodiment, the administration and performance reporting functions can use the SELinux policy to provide security for the system. Security requirements dictate that administrative roles are preferably partitioned (e.g., policy and auditing roles are separate). The policy can confine the administrative roles, utilities, and configuration files into restricted domains, partitioning capabilities and isolating them from other parts of the system. The performance functionality may also be isolated.

Subcomponent Details

Administrative Roles

In one embodiment, the CAB Guard and Translator have partitioned administrative roles. The responsibilities for each role may be provisioned by the principal of least privilege. The table below presents examples of the roles. Both Guard and Translator may have User, Policy, and Log administrative roles. For example, the User administrator maintains all administrative roles. The Policy role configures the system, except for those functions having to do with auditing and diagnostics. The Log role monitors the system and takes non-policy corrective action. The Guard may also have Client and Forensic administrative roles. For example, the Client administrative role manages client user accounts and profiles. The Forensic administrative role can examine some system logs and view live and recorded sessions.

| CAB Administrative Roles | | | | |
| --- | --- | --- | --- | --- |
| Role | Purpose | Actions | Notes | Systems |
| User | Administer administrators | Add, lock, and suspend administrators; Change administrator passwords | Dominates other administrative roles; some actions may only be carried out in maintenance mode | Guard and Translator |
| Client | Administer client users | Add, lock, and remove client users | | Guard |

CAB Administrative Roles

| Role | Purpose | Actions | Notes | Systems |
|---|---|---|---|---|
| Policy | Configure Guard operations and policy | Define user profiles Assign user profiles Configure all Inspection Engine parameters Configure system-wide session constraints (e.g., screen resolution) Backup system configuration | Cannot change Audit configuration | Guard and Translator |
| Log | Execute day-to-day operations and identify problems. | Configure the Audit and Alert policies View Audit logs Backup Audit logs View performance statistics Terminate user sessions Turn on the flight recorder for a live session | Cannot change policy or configuration, except Audit and Alert | Guard and Translator |
| Forensic | Incident prevention and analysis | View live or recorded sessions View some audit logs | May carry out Audit duties, as needed for analysis | Translator |

Administrative Functions

The following sections describe the administrative utilities.

System Administrative Utilities

In this embodiment, core administrative capabilities can include commands to shut down the system, view active sessions and terminate sessions.

In one embodiment, the Shutdown command may be a command line that is invoked by the Log Administrator to terminate Guard communications and shut down processes. The command sends a shutdown event to the Audit Event Manager, which initiates the system shutdown by signaling the Shutdown Manager.

In one embodiment, the View Sessions command prints each active session, including high-side user name, numeric session identifier, session start time, session state (i.e., "active" or "suspended") and other data. The command may parse the live session's data file generated by the Audit subsystem. The tool's output can be filtered using standard Linux tools such as grep or sed.

In this embodiment, a Kill Session command may terminate a session. It may take one or more session IDs as parameters. The Kill Session may send a terminate session event to the Audit Event Manager, which signals the High-Side Interface Listener to terminate the session. View Sessions and Kill Sessions may work in tandem, much like the UNIX-style ps and kill commands.

In this embodiment, a Generate Password command may manage passwords. There may be versions to administer both types of users: administrative and client. Each version may access a different password configuration file. The SELinux Security Policy preferably ensures that each version can access its file and do so during the appropriate policy mode. In production mode, preferably only client user passwords are modified. In maintenance mode, preferably only administrative passwords are modified.

In one embodiment, both versions may use a system encryption key for encryption and decryption. Old passwords within a policy-driven reuse constraint are decrypted and compared with the new password in plaintext form. If the new password is sufficiently different, it is accepted. An encrypted version replaces the old password, and the just-replaced password is appended to the user's list of old password.

Configuration File Edit Utility

In this embodiment, configuration files may be edited through vi, arguably the most ubiquitous text editor in UNIX and Linux. Each administrative role has permission to view and edit specific files, enforced by the SELinux Security Policy. In one embodiment, administrators edit files in the/etc/cab/config_admin directory, the offline editing directory. These edits do not affect the running CAB system processes.

In this embodiment, once files are ready to be incorporated in system operation, they may be committed by the Configuration File Commit utility.

Configuration File Commit Utility

In this embodiment, once an administrator has completed edits of one or more configuration files, the changes can take effect once they have been committed. The Configuration File Commit utility can verify the correctness of the modified files, posts the valid new versions and signals the relevant application to reload the configuration. The Configuration File Commit utility may perform the following exemplary tasks:

Verify that the configuration file is well formed (i.e., no syntax errors).
Verify that the configuration file matches the format defined in its schema file.
Create a unique transactional log file having the names of all files /etc/cab/config_transaction directory.
Generate a Beginning Configuration Transaction Audit event, which includes:
Administrator user name
Transactional log file name
Names of files modified
All file text changes.
Move the old configuration files to the/etc/cab/config_history directory, with a unique name having a timestamp.
Move the new configuration files to the/etc/cab/config-runtime directory.
Remove the transactional log file.
Generate a Completed Configuration Transaction Audit event indicating that the transaction was completed. The Audit subsystem signals the Shutdown monitor, which, in turn, notifies of all running processes to reread their configuration files.

In this embodiment, if there are validation errors when the administrator uses the commit utility, the utility can report those errors to the administrator, and sends them to the Audit subsystem to be logged.

Configuration Files

In this embodiment, CAB configuration files may be text-based XML files. Schemas may define the elements, configuration types and attributes. The Configuration File subcomponent may not trust the schema definition included in the XML file because the definition could easily be removed or substituted with an inappropriate schema. Instead, the validation routines may be preconfigured to read specific XML schemas.

In this embodiment, an exemplary configuration file directory may be laid out as follows:

| Configuration Files - Directory Structure | |
|---|---|
| Directory | Purpose |
| /etc/cab | Contain all CAB configuration files. |
| /etc/cab/config_admin | Staging area for configuration files edited by administrators. All files have types accessible only to the administrative roles (e.g., Policy Administrator or User Administrator) charged with their maintenance. This directory is readable only the administrator and Configuration File Commit Utility. The utility copies files from this directory to the config_runtime directory (described below). |
| /etc/cab/config_runtime | Live configuration file area, The "configuration commit" procedure audits the changes made in the config_admin directory after an edit, and copies the files contained in config_admin to config_runtime. |
| /etc/cab/config_history | Contains history of all configuration files, with each file name having a timestamp that shows when it was moved. |
| /etc/cab/config_transaction | Contains transaction rollback logs for pending transactions. If any files are present during system initialization, then a transaction was not completed. Administrative action is necessary. |
| /etc/cab/data | This file contains all binary data files, such as encrypted passwords, data dictionaries, and images for future administrator GUI. |

In this embodiment, exemplary initial definitions are described in the following subsections:

cab_guard_system.xml

In this embodiment, the Guard system-level configuration file contains global static boundary variables for the Guard processes and threads. This file defines the process defaults used during initialization.

cab_guard_policy.xml

In this embodiment, the Guard policy configuration file contains all data relating to policy and security decisions configured by the Policy Administrator.

cab_guard_hs_roles.xml

In this embodiment, the Guard Roles configuration file defines the roles for the client users. There are several types of roles that need to be defined include no-access, basic user, and priority user.

cab-guard_hs_users.xml

In this embodiment, the Guard user file contains the client user database.

cab_guard_hs_user_password.xml

In this embodiment, the Guard user password file contains the Client user passwords.

cab_guard_hs_ls_user_map.xml

In this embodiment, the Guard High/Low Mapper configuration file contains the mapping between the high-side user identity and the low-side user identity.

cab_guard_ls_users.xml

In this embodiment, the Guard low-side user configuration file contains the details of low-side user accounts.

cab_guard_user_prefs.xml

In this embodiment, the Guard user preferences configuration file defines all user preferences that have been determined based on the client system setup, and allowed guard session capabilities.

cab_guard_capabilities.xml

In this embodiment, the Guard capabilities configuration file contains all available and allowable session capabilities with regard to browse and collaboration data moving through the system via the VDP protocol. It allows the Administrator to limit the session settings that can be provided to a high-side user.

cab_guard_dirty_word.xml

In this embodiment, the dirty word configuration file contains all the dirty words checked during text input from the user. It also contains Dirty Word Search Filter tuning parameters.

cab_guard_clean_word.xml

In this embodiment, the clean word configuration file contains all clean words checked during text input from the user.

cab_guard_audit.xml

In this embodiment, the audit configuration file contains all configurable data related to the Audit Component and associated processes.

cab_guard_keyboard_filter.xml

In this embodiment, the keyboard filter configurable data related to the Guard Keyboard Filter, which is the keyboard inspection process.

cab_guard_init.xml

In this embodiment, the initialization configuration file contains all configurable data needed to initialize the system.

cab_translator_system.xml

In this embodiment, the translator system-level configuration file, defines global static variables for the Translator processes and threads. The file is used to tune the Translator.

cab_translator_policy.xml

In this embodiment, the policy configuration file contains all data relating to policy and security decisions configured by the Translator Admin.

cab_translator_audit.xml

In this embodiment, the audit configuration file contains all configurable data related to the Audit subsystem.

cab_translator_init.xml

In this embodiment, this initialization configuration file contains all configurable data need for system initialization.

Configuration File API

In this embodiment, to support code reuse and development efficiency, Configuration may include a configuration file access library. It can provide a common access mechanism for all configuration parameters, and adds a layer of abstraction supporting future enhancements to the interface. Depending upon licensing and security concerns, the Gnome libxml2 library could be extended for CAB purposes.

User Interface

In this embodiment, the user interfaces for the administration and performance reporting functions may be simple command line executables. For configuration files and performance data stores, the Administrator can use standard Linux utilities such as vi, cat, and more. The administrative functions of CAB interact with a large number of system subcomponents and data sources. To allow for least privilege enforcement, the administrative functions and any data they interact with can be modularized and isolated into their own security domains.

In this embodiment, the Administration and Performance Component may have tight integration with the configuration file subsystem and interacts with the Initialization and Audit subsystems. It can sit at a layer above the configuration file and relies on schema validation to ensure valid data types and values. The Performance Monitor receives performance data from the Audit Event Manager, along with other locations described previously. If it determines that performance data exceed policy-driven thresholds, it can generate an Audit event which can be used to cause a policy-driven response. In most cases, system policy would probably indicate that shutdown is necessary. The table below illustrates examples of a high level analysis of the interfaces:

| Administration and Configuration Functions - Interfaces | |
|---|---|
| Subcomponent | Interface Description |
| System Utilities (write) | System utilities, such as vi, require write access to CAB configuration files. To support the use of multiple process domains, these utilities may be placed in one of several wrappers that provide access only to a subset of configuration files. |
| System Utilities (read) | System utilities, such as cat and more, require read access to CAB configuration and log files. To support the use of multiple process domains, these utilities may be placed in one of several wrappers that provide access only to a subset of configuration files. |
| Configuration File Validation Library | Several administrative functions-specifically any function committing changes to configuration data-depends on this library. This library provides read and write interfaces to a variety of configuration files; access to those files is enforced by the SELinux Security Policy. |
| Audit Subsystem | Administrative functions and utilities send audit messages directly to the Audit Subsystem, using the common Wire Protocol. The messages include "begin configuration transaction," "configuration change error," and "configuration change successful." This is one-way communication. |
| Initialization Subcomponent | The Configuration File subcomponent creates transaction rollback log files in a well-known location. Once files have been committed, they are removed. If any files are present at system startup, the system halts so that an administrator can correct the problem. |
| Shutdown Subcomponent | The Configuration File subcomponent sends events to the Audit Subsystem. The Audit Subsystem, in turn sends event to the Shutdown subcomponent, indicating that processes need to reread their configuration file. In exceptional cases, such as configuration file disk write failures, a fatal event could trigger system shutdown. |

In one embodiment, the performance functions of CAB read from a large number of data sources throughout the system, and writes to a private data store. The data store may be text-based, in comma-separated-value format, so that it can be downloaded from the machine and analyzed using third-party programs. Examples are provided in the following table:

| Performance Reporting Functions - Interfaces | |
|---|---|
| Subcomponent | Interface Description |
| Audit (receiving performance messages) | Performance reporting functions receive CAB performance-related and session-related data, in the form of messages from the Event Manager subcomponent of the Audit subsystem, via the common Wire Protocol. This is the only path for CAB processes to send performance data to the Performance Monitor. This is one-way communication. |
| OS Data Sources | Performance reporting functions read data from system-wide sources and commands, such as top, ipconfig, and /proc. Data is read from these sources, and not written, however, execute access is required for the command executables. |

-continued

| Performance Reporting Functions - Interfaces | |
|---|---|
| Subcomponent | Interface Description |
| Performance Data Store | Performance reporting functions requires a writable/appendable private data store to store historical and consolidated data. |
| Initialization Process | The Initialization Process launches the performance data gathering element(s) to support the performance reporting functions, using an 'exec' call. No communications are established between these elements and the Initialization Process. |
| Configuration | The performance gathering and reporting elements may read configuration information from the Administration and Configuration subcomponent, using the interfaces provided by the Administration and Configuration subcomponent. This is one-way communication. |
| Heartbeat Monitor | Upon execution, the Performance Monitor subcomponent uses the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |
| Audit (sending audit messages) | Performance data gathering and reporting elements send audit messages directly to the Audit Subsystem, using the common Wire Protocol. This is one-way communication. |

Translator Component

In one embodiment, the main functionality of the CAB Browse Translator is to convert commercial thin-client protocols into the CAB-developed Virtual Desktop Protocol (VDP). VDP is preferred over existing commercial protocols because of its non-proprietary nature, which allows for more complete feature control, easier inspection, thorough feature reduction and mitigation of security risks posed by some commercial features.

In this embodiment, within the CAB system, the Translator preferably only performs conversion between protocols; it preferably does not perform the actual cross-domain functionality. That functionality may be done by the Guard.

Figure 23:
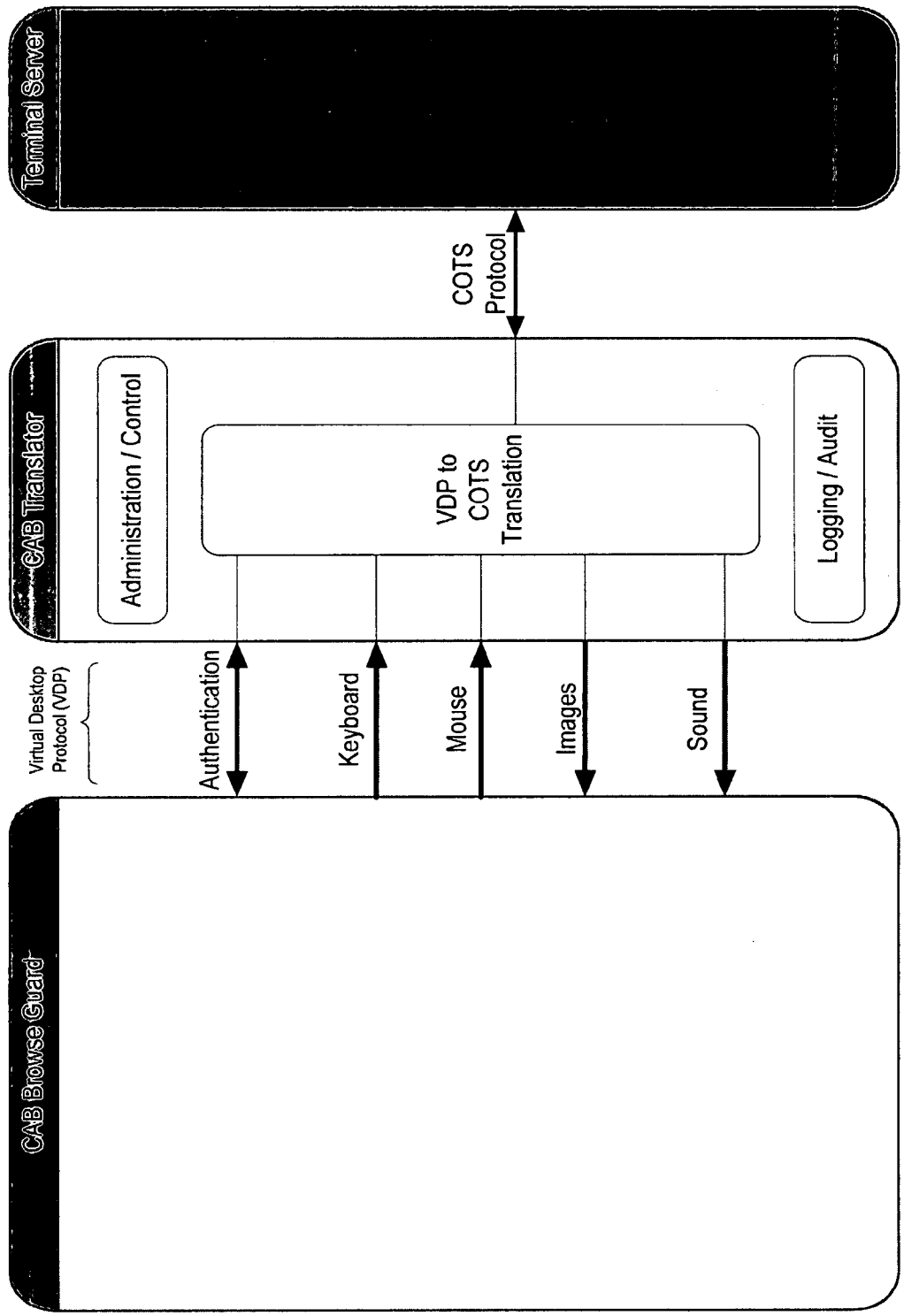
FIG. 23 shows an example of a functional view of the CAB Translator.

In this embodiment, essentially, the Translator converts and relays images, mouse events, keyboard events, and—in one embodiment—audio data between the Guard and the commercial Terminal Server. By reducing the native COTS protocol to VDP, the risks posed by elements such as mobile code, file share access, and viruses can be mitigated. A high-level functional view of the Translator is shown in FIG. 23.

Figure 24:
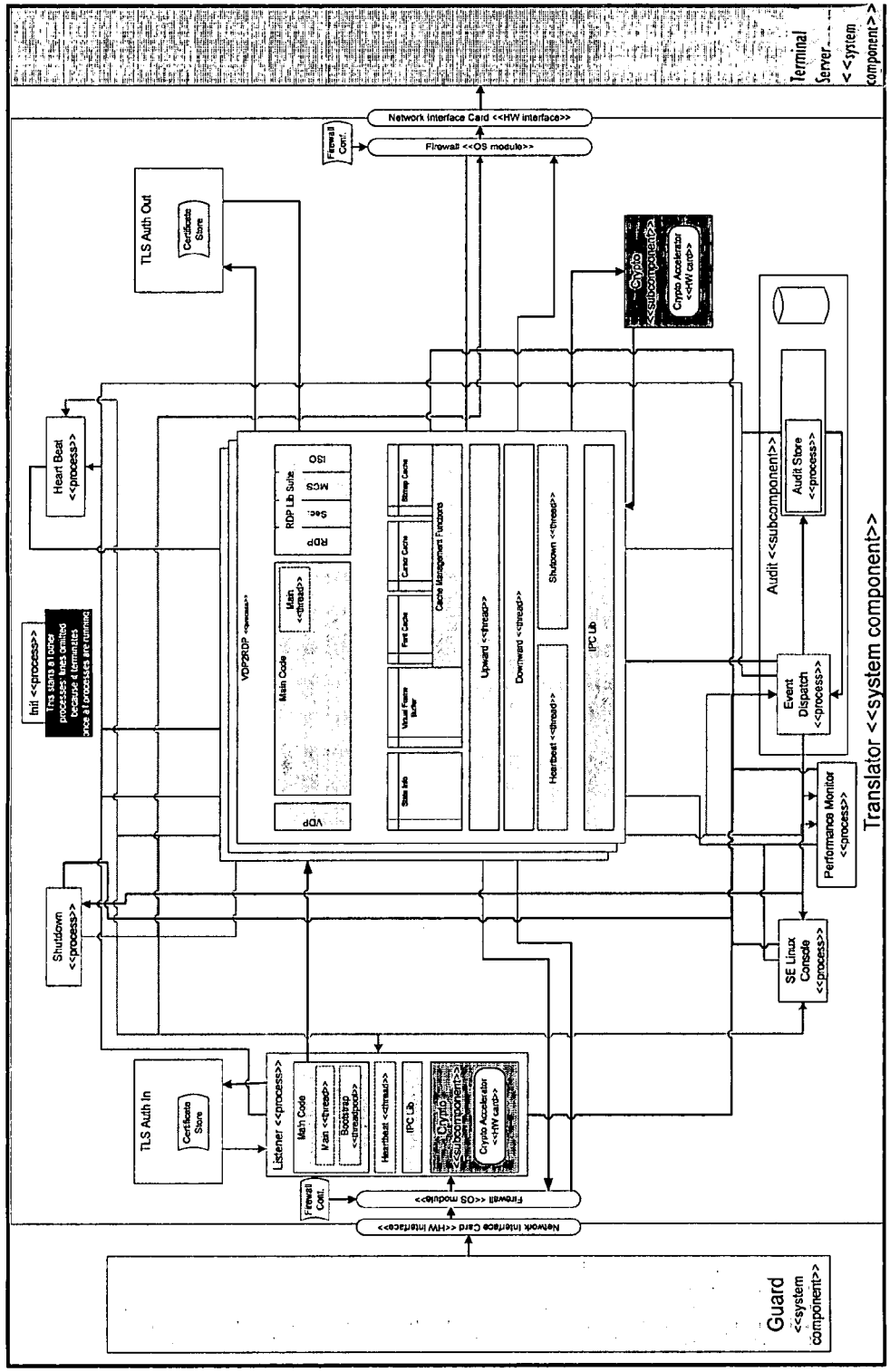
FIG. 24 shows an example of CAB Translator architecture.

FIG. 24 shows an example of a block diagram of the CAB Translator component. In this embodiment, as shown in the figure, the Translator may reuse many subcomponents and elements discussed above that are used for the Guard. Those subcomponents can include:

System Initialization (with some modifications as discussed below)
Operating System (SELinux)
SELinux Security Policy (with some modifications as discussed below)
Heartbeat Monitor
Performance Monitor
Shutdown Monitor (with some modifications as discussed below)
Wire Protocol/IPC Mechanisms
Audit Subcomponent
Administration and Configuration.

In this embodiment, in addition to those subcomponents shared with the Guard, the following subcomponents may be unique to the Translator:

Listener Process
VDP2RDP Processes.

The sections below will present these subcomponents in detail, and will further discuss design considerations and other minor differences between the Translator and the Guard.

General Design Decisions and Considerations

Terminal Server Support

In this embodiment, a design consideration for the Translator component is which brand(s) of terminal server products would be supported. A terminal server, a hardware platform running commercial off-the-shelf (COTS) software, provides the remote thin-client services on the low-side network, and hosts the low-side desktops to be accessed from the high-side client. Each manufacturer of terminal server products may use different thin-client protocols. Support for many of the different types of terminal server implementations is possible with the architecture.

For example, one embodiment of CAB interfaces with Microsoft's Windows Terminal Server, using the RDP protocol. Another embodiment of CAB interfaces with Citrix Corporation's MetaFrame Server, using the ICA protocol. These and similar protocols may be referred to generally as remote protocols.

Other embodiments can support additional types of terminal servers because the CAB architecture—through the use of its Translator component—is capable of supporting a large number of terminal server technologies.

(U) NOTE: The term "Terminal Server" has multiple meanings within this document. For clarification, the following notations are used "CAB Terminal Server": CAB's low-side hardware/software platform that hosts each user session. Also referred to as the "Terminal Server" (with capitalization).

"Microsoft Windows Terminal Server": Microsoft's product, built into their Windows server platforms that provides multi-user remote access.

"terminal server" (without capitalization): A generic term identifying any product providing multi-user remote access.

Operating System and Platform-Related Considerations

In one embodiment, the Translator can use the same hardened operating system and core system services as in the Guard. These core services can be engineered for use for both the Guard and Translator to satisfy a common set of requirements. Utilizing the same base operating system and core services that the Guard uses allows the Translator to:
  Reuse OS work and core services
  Ensure consistency across the system and implementation
  Allow for better patch management across platforms
  Provides a common operating experience as the Guard to the administrator
  Allows easier integration into the Guard later if desired.
  Performance In one embodiment, the Translator component can be architected primarily for performance. All traffic that is sent through the Translator preferably needs to enter and exit as fast as possible to ensure that the end-users' experience is not affected by the translation process.

In this embodiment, for this reason, Translator subcomponents can be designed to be thread-safe with minimal contention for the reasons described previously.

Subcomponents

Figure 25:
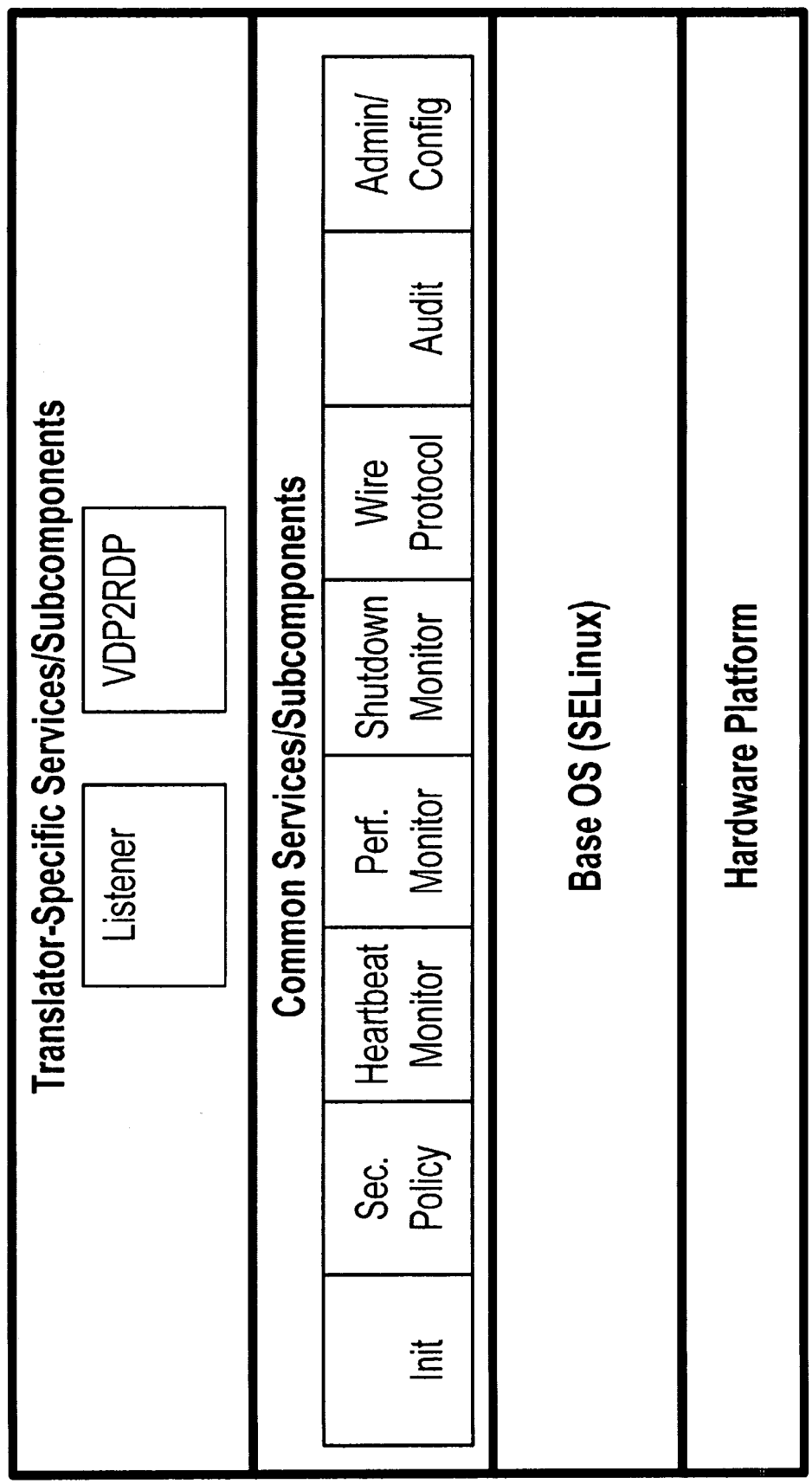
FIG. 25 shows an example of Translator core and shared subcomponents.

In this embodiment, as stated above, the Translator can use the same SELinux build and many of the system services used in the Guard. Additionally, the Translator can employ unique Listener and VDP2RDP subcomponents to perform its specialized tasks. FIG. 25 shows services that can be utilized by the Translator.

Listener Process

In this embodiment, the Listener Process can be responsible for managing incoming/outgoing connections to/from the Guard. This includes the setup of the incoming TLS sessions and the actual TCP connection managed through the socket API. Upon receiving valid VDP connections, the translator process can be responsible for spawning a new translator process and passing the connection to that process for translation.

In this embodiment, the Listener process may comprise two primary threads, and a thread pool:
  Main thread, which transitions to the Shutdown role
  Bootstrap thread pool
  Heartbeat thread.

In one embodiment, the Main thread is responsible for the process initialization steps as well as managing the incoming TLS/TCP connections from the Guard. The main thread may rely on, for example, the Berkley Socket API provided by the operating system to accept incoming connections. Once a connection is established, it can be handed off to a new thread from the bootstrap thread pool to begin the setup process. This newly spawned thread may be responsible for executing a new VDP translator process and handing off information that the new process needs to begin translating.

In this embodiment, the Main thread may also responsible for creating and managing a write-only channel with the audit subsystem. This channel can provide a process-wide logging capability. Since all threads in the system preferably need access to the audit subsystem, synchronization mechanisms are preferably present to ensure that all threads can efficiently log events without deadlock or starvation.

In this embodiment, the Heartbeat thread may be initiated by the Main thread at startup. Its function is to periodically receive a simple message from the Main thread that it is still working properly. The Main thread can establish a write-only IPC channel with the Heartbeat thread. The heartbeat interval may be received at startup from the configuration items read-in.

In this embodiment, when the Main thread has completed its startup operations, it transitions to the role of the Shutdown thread. The purpose of the Shutdown thread is to wait for control and shutdown events from the shutdown process. This thread will establish a read-only IPC channel with the shutdown process and wait for events. When this thread does receive an event to shut down it must gracefully start the termination of all running threads, clean up any state, and if necessary, notify the shutdown thread prior to closing.

In one embodiment, in addition to managing the incoming network connection, the Listener can also ensure that it has channels open with:
  Shutdown process: Allows the system to shut down the Listener when critical events are dispatched from the event manager.
  Heartbeat process: The Listener process preferably maintains a periodic heartbeat with the Heartbeat process so that the Heartbeat process can detect any loss of use, process or resource failure
  Audit Subsystem: Provides the listener the capability to send auditable events for later storage/lookup as well as a means to receive control events from the event manager.

In this embodiment, at start up, the Listener process can read configuration items for itself or the individual VDP translators to be invoked for session handling. These configuration items can be read once from persisted storage and stored in memory for later look up and hand off to the VDP translator processes.

Subcomponent Details

In one embodiment, upon being executed by the Init process, the Listener process begins by using the configuration subcomponent to read in each of the configuration items related to the Listener and any COTS protocol translators that are later executed (e.g., VDP2RDP, VDP21CA).

In this embodiment, exemplary configuration items include:
  The network interface to listen on for TCP/TLS connections
  The network port to listen on for TCP/TLS connections
  TLS card communication settings (anything the Listener needs to know to use the TLS card)
  A list of valid COTS protocol translators and the details for each
    Location of the physical process in the file system
    Fully qualified filename for IPC communications
    The network interface to use to connect to the CAB Terminal Server
    Threading model expected by the process (one process/session or multiple sessions/process using threads)
    Any process thread limitations for the multiple sessions/process model
  Audit subsystem communication settings
  Certificate store location and access details
  Heartbeat interval.

In one embodiment, the Listener continues by establishing a communication link with the audit subcomponent to preferably ensure that future events can be properly logged to the audit subcomponent.

In one embodiment, the Listener continues by first connecting to the shutdown process and then the heartbeat process using an IPC channel defined by each process. If both connections were successful, the Listener spawns a new thread to handle the heartbeat communications. The Listener then spawns a second thread to handle TLS/TCP listening operations. The Main thread then continues by waiting on the previously established channel with shutdown for shutdown events. The Heartbeat thread can be given a higher priority than the other threads in order to ensure that the Heartbeat thread is always responsive.

In one embodiment, the Listener thread begins by:
Creating a new TCP socket
Binding to the interface and port defined in the configuration
Starting to listen, and block waiting for connections to be accepted.

In one embodiment, when a new connection is accepted, the Listener thread retrieves a new thread from the local bootstrap thread pool and assigns it to the new connection. The Listener thread may be responsible for ensuring that the binding between this new thread and the connection are recorded for any future maintenance operations.

In one embodiment, once the new connection thread has been established, its first step is to wait for the first packet on the new connection and peek at it to determine which type of translator is required by the connection. Next, the thread will execute that the required VDP Translator (either RDP or ICA) process, setup an IPC new channel for communicating with this new process, and attempt to connect to the newly created translator process using IPC. When connecting to the translator process, the connection thread should use the filename specified in the configuration file for the translator type to which they are connecting, concatenated with the PID (process identifier) of the executed translator process. The executed process should take as its first parameter, the path and filename to use for this IPC channel.

In this embodiment, assuming the IPC channel between the connection thread and the executed translator was successful, the connection thread should send the translator the connection socket descriptor and any state needed to use that connection from within the VDP API connection component.

In this embodiment, following this, the connection thread preferably sends the configuration items specific to the translator process as defined by the previously read configuration state. Once completed, the connection thread should wait for a shutdown notification from the connected process. If the connected process fails before it can establish a connection with the audit subsystem, the process notifies the Connection thread via this IPC channel. If a failure response is returned, the connection thread should log the event and continue with the normal thread shutdown process. Shutting down the connection thread releases allocated resources, resets the managed state and adds itself back into the thread pool. The Listener thread and Listener process may have no knowledge of the previously executed translator process In this embodiment, the Listening thread continues accepting connections until it is signaled by the main thread that shutdown should be initiated. Once shutdown is initiated, the Listener process should wait until the Listener thread and Heartbeat thread have terminated before gracefully closing.

Interfaces

In this embodiment, within the Translator component, the Listener Process may interface with several other subcomponents. The table below provides examples of these interfaces:

| Listener Process - Internal Translator Interfaces | |
| --- | --- |
| Subcomponent | Interface Description |
| High-side TCP Stack | The Listener process communicates with the High-side TCP stack for all incoming network operations from the Guard. |
| VDP2RDP Process | The Listener Process launches each VDP2RDP Process, using an 'exec' call. An individual VDP2RDP Process is launched to support each active user session. The Listener Process then uses the shared Wire Protocol to pass configuration information to VDP2RDP. The following configuration information is passed: SocketDescriptor (for the individual session's incoming VDP connection), AllowedEncryption (to identify permitted encryption types when connecting to the RDP server), Keys (as required to perform TLS functions). |
| Initialization | The Initialization Process launches this subcomponent, using an 'exec' call. No communications are established between this subcomponent and the Initialization Process. |
| Configuration | This subcomponent reads configuration information from the Administration and Configuration subcomponent, using the interfaces provided by the Administration and Configuration subcomponent. This is one-way communication. |
| Encryption/Decryption | Listener Process interacts with this subcomponent to perform TLS functions, using the interfaces provided by the subcomponent. |
| Heartbeat Monitor | Upon execution, this subcomponent utilizes the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |
| Audit | This subcomponent sends audit messages directly to the Audit subcomponent, using the common Wire Protocol. This is one-way communication. |

VDP2RDP Process

In this embodiment, another major process that is unique to the Translator is the VDP2RDP process. The VDP2RDP process may be responsible for handling the packet translation between the VDP and RDP protocols. In one embodiment, the translator system may be set up so that one VDP2RDP process is executed to handle one and only one user session.

In this embodiment, the VDP2RDP can manage the packet flow using two socket-based TCP connections: one with the Guard from the high-side interface and one with the Terminal Server from the low-side interface.

Figure 26:
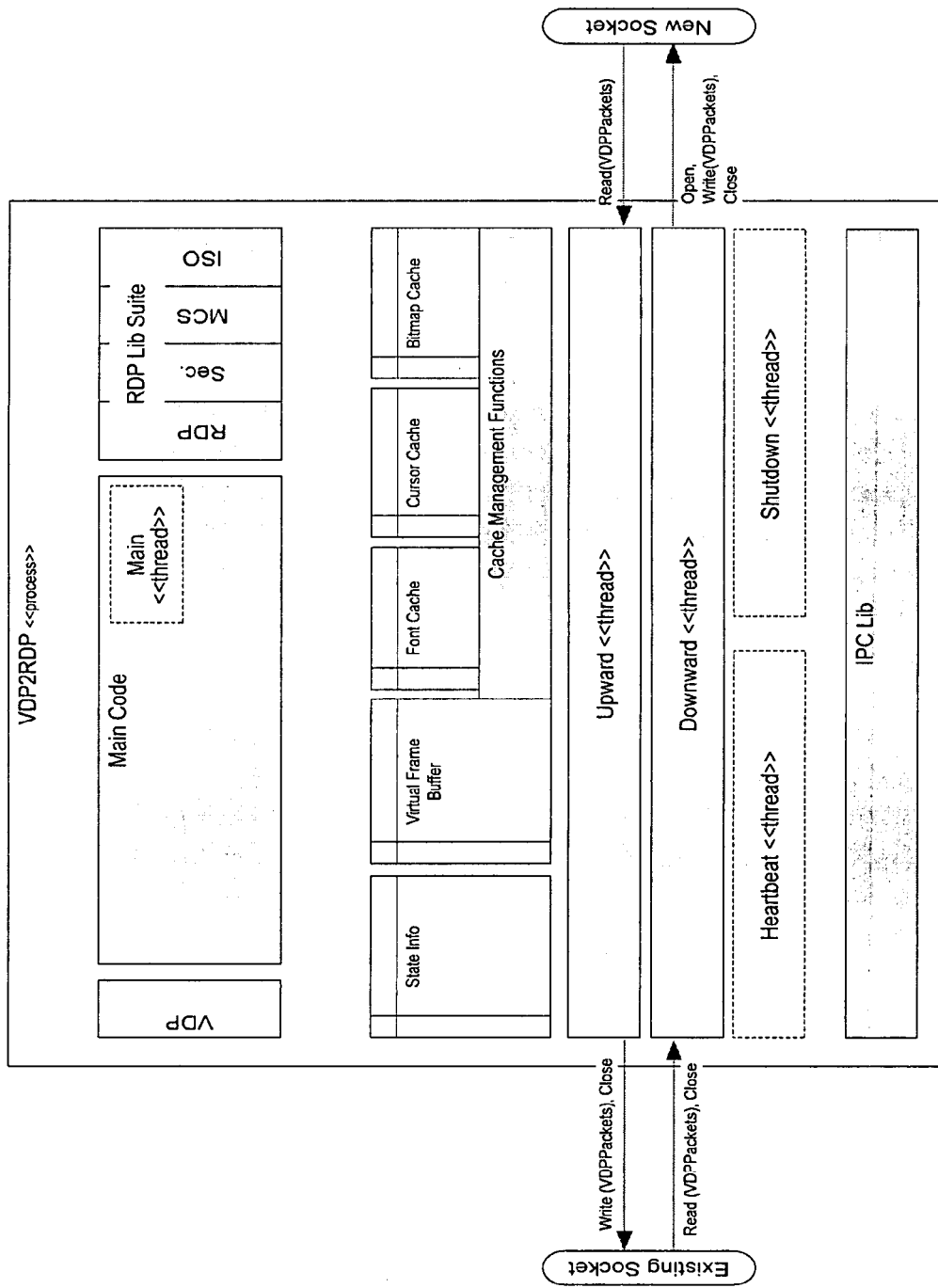
FIG. 26 shows an example of VDP2RDP process architecture.

In this embodiment, the VDP2RDP process comprises four threads that are preferably always running:
Main
Heartbeat
Upstream
Downstream In this embodiment, the architecture of the VDP2RDP process is shown as an example in FIG. 26.

In one embodiment, the Main thread is responsible for performing the startup operations as well as receiving shutdown operations once normal operations have commenced. Operations of the main thread may include:
- Accepting configuration items, including the high-side socket descriptor, from the Listener process
- Establishing IPC channels with the audit, shutdown, and heartbeat processes
- Connecting to the low-side Terminal Server and initiating a login.

In this embodiment, the Heartbeat thread may be started by the main thread to provide a periodic heartbeat with the heartbeat process. This thread can establish a write-only IPC channel with the Heartbeat thread and periodically send a simple message to the heartbeat process to notify the Heartbeat process that it is still working properly. The heartbeat thread should get the heartbeat interval from the configuration items sent to the VDP2RDP thread at startup.

In this embodiment, the Upstream thread may be responsible for handling RDP packets that are received from the low-side socket connection to the Terminal Server, translating them to VDP, and sending them out the high-side socket connection to the Guard.

In this embodiment, the Downstream thread may be responsible for handling VDP packets that are received from the high-side socket connection to the Guard, translating them to RDP, and sending them out the low-side socket connection to the Terminal Server.

In this embodiment, the VDP2RDP process preferably maintains connections with the following using IPC:
- Shutdown process: Allows the system to shut down the session when critical events are dispatched from the event manager
- Heartbeat process: The VDP2RDP process must maintain a periodic heartbeat with the heartbeat process so that the heartbeat process can detect any loss of use, process or resource failure
- Audit Subsystem: Provides the VDP2RDP process the capability to send auditable events for later storage/lookup as well as a means to receive control events from the event manager.

In one embodiment, at start up, the VDP2RDP process is preferably expected to set up an IPC channel with the executing thread in the Listener process using a command-line parameter identifying a file and the VDP2RDP processes PID. Once this channel is established, the process should wait for the configuration items needed by the process to run, and the socket descriptor for the incoming connection. Once the VDP2RDP process has everything it needs, it should begin the startup process and only close the channel with the Listener process once the audit subsystem connection has been successfully established.

Startup

In one embodiment, the VDP2RDP process is executed by the Listener process when a new high-side connection with the Guard is established for handling a new VDP user session. An exemplary first step in this process is to create a new IPC channel using the filename passed to it at runtime and its PID. Once the IPC channel has been created, the VDP2RDP may wait for the following items:
- Configuration Items
  - Outgoing interface for the session
  - Heartbeat settings (interval)
  - TLS and Certificate information
  - Connected socket descriptor: high-side socket descriptor to use for all high-side traffic.

In one embodiment, once the VDP2RDP process has received all of the items it needs to run from the Listener process, it will attempt to connect to the audit subsystem using IPC. If the connection with the audit subsystem is successful, the VDP2RDP process can release the IPC channel created between itself and the Listener process because any future fatal startup options can be sent through the audit subsystem.

In this embodiment, the VDP2RDP process can continue by connecting to both the shutdown process and the heartbeat process using IPC. If both are successful, the VDP2RDP process will spawn a heartbeat thread to periodically notify the system that it still exists. Once this is complete the VDP2RDP process enters the connecting phase of its startup.

In this embodiment, the VDP2RDP process continues by attempting to make a socket connection to the Terminal Server and initiating the low-side login process. If this connection fails the VDP2RDP process will notify the connected Guard using VDP and start the shutdown process. If successful, the VDP2RDP process will spawn two threads, one for upstream traffic (Low to High) and another for downstream traffic (High to Low). Once both traffic threads have started, the VDP2RDP process has entered the running phase and normal operations begin.

In this embodiment, once in a running state, the main thread becomes the shutdown thread by waiting for shutdown events from the shutdown process. This way, when shutdown events do occur, it will be easier for the process to shut down the remaining three threads.

Subcomponent Elements

In one embodiment, the following elements may be utilized by the VDP2RDP process.
- VDP API—The VDP2RDP process can use the VDP API whenever it needs to interface with the VDP protocol. The VDP API encapsulates the receiving and validation of incoming VDP packets so that the process can ensure that all packets received are valid for the current state.
- Cache Management—A portion of the RDP protocol uses image caching as a mechanism to reduce the overall bandwidth required for the user's session to perform effectively. While VDP does support some caching operations that are similar to one in RDP, not all are the same and there may be situations where the Guard only employs select features provided by VDP. In these situations, the translator preferably maintains its own local cache so that the requested cache-based drawing request can be drawn in a local virtual frame buffer and passed on to the Guard as image updates.
- Virtual Frame Buffer—The virtual frame buffer is an in memory representation of the end-users display as defined by the drawing commands and caching request passed to it by the Terminal Server via RDP. The VDP2RDP process preferably employs the use of a virtual frame buffer when the request VDP features do not map directly to features provided by the RDP protocol. In these situations, RDP commands and requests are preferably drawn to the local frame buffer and sent to the Guard as an image update.
- Upstream Thread—The upstream thread operates on both connected sockets. It waits for RDP packets on the low-side connection; when they are received, it can convert them into their corresponding VDP packets. Upstream traffic may be directly related to what gets displayed on the end-users screen and therefore, the upstream threat may need to employ the services of the local cache and frame buffer before a VDP message can be sent. Once the conversion is made, the upstream thread can send the converted packet to the Guard using the high-side socket connection.

Downstream Thread—The downstream can also operate on both connected sockets. It waits for VDP packets on the high-side connection: when they are received, it converts them into their corresponding RDP packets. All downstream traffic may be directly related to user input from the client. In certain situations, the received VDP packet will represent a compound action that requires multiple outgoing RDP packets. Once the conversion is finished, the downstream packages up the outgoing packets and send them to the Terminal Server using the low-side socket connection.

High-Side Network Interface

In one embodiment, the high-side network interface manages incoming network traffic from the Guard. This interface can employ a firewall so that only allowed ports and connecting IPs are used. Incoming connections are preferably required to authenticate and connect via TLS before any traffic can be received. VDP traffic can be received and sent over the previously established TLS connection with the Guard.

Low-side Network Interface

In one embodiment, the load side network interface is responsible for managing network traffic between the translator and the Terminal Server.

In this embodiment, the low-side interface can optionally support an SSL/TLS crypto board if the Terminal Server supports or forces that all traffic be sent through a secure port. The option is completely up to the site administrator and can be configured by the guard. When the Terminal Server does require an SSL/TLS, the same constraints apply to the set up of that connection. If SSL/TLS is supported, prior to any VDP traffic being accepted or processed, the secure link is preferably established.

The low-side network interface may control traffic directly connected to the Terminal Server and therefore must understand the Remote Desktop Protocol (RDP). In one embodiment, the RDP may comprise four basic network layers:

ISO: Based on the IS08073 Standard (RFC 905) using ISO Transport over TCP, also known as ITOT (RFC 2126).

MCS: Multipoint Communication Service Protocol, modified as defined in the ITU-T T.122 standard and implemented in the ITU-T Rec. T.125 standard Security: RDP layer for handling secure communications and licensing. All traffic from this point on can be encrypted and verified with an attached Message Authentication Code (MAC).

RDP: Based primarily on the ITU-T. 128 Application Sharing with modifications for use on a Windows-based platform. User input and image output is encoded in this layer.

RDP Translation Details

Information Sources

In this embodiment, there are two primary sources for public RDP knowledge upon which the translation assumptions have been based.

In this embodiment, the first source of information includes a collection of internationally recognized and standardized protocols. These protocols provide insight into the overhead, technology, and features involved with and provided by the Remote Desktop Protocol.

In this embodiment, the second information source available is an open source RDP client implementation called rdesktop. The rdesktop client provides an in-depth look into how the protocol works, how the packets are laid out, and the minimum protocol support needed to achieve basic functionality.

Protocol Specifics

In one embodiment, the Remote Desktop Protocol may be based on four documented standards:

RFC 2126, ISO Transport over TCP (ITOT): defines how an ISO based protocol is transmitted over a TCP connection RFC 905, ISO DP 8073 Transport Protocol: the specific ISO protocol used by RDP for transmission over a TCP connection and the ITOT rules ITU-T T.125, Multipoint Communication Service: channel based communication protocol design to stream content dynamically to multiple simultaneous users ITU-T T.128, Application Sharing: stream protocol that runs over the T.125 protocol and defines all of the communications necessary to remotely share a user session. The RDP protocol is largely based upon this standard.

As a result, one embodiment of the RDP protocol may be broken down into four distinct protocol layers that are derived directly from these standards:

ISO Layer: Based upon RFC 2126 and 905

MCS Layer: Based upon the T.125 Standard

Security Layer: Security layer defined by entirely by the protocol

RDP Layer: Derived almost exclusively from T. 128 with additions and exceptions made to fit the Windows platform.

Translation

In this embodiment, there may be two aspects of the RDP translation that preferably should be considered when implementing a VDP2RDP translator:

Control Operations: Many of the functions supported in RDP are used for control over the protocol. These functions are used to control how a session starts up and how it will operate throughout the life of the session. Control operations such as these do not have a one-to-one mapping to a feature supported in VDP and therefore, no direct translation is needed. Instead, most control operations will be processed entirely within the RDP side of the VDP2RDP translator. For the most part, configuration items that define the options for these control operations will be statically defined in configuration files or provided to the VDP2RDP translator at session startup.

Direct Translation: Many RDP features have a one-to-one or one-to-many mapping with VDP. In some situations the mapping of these features is very simple and little more than a transfer of information needs to be done, while in others more complicated scenarios arise that require internal processing or an expansion of the received packets. It is these more complicated scenarios that will often require session-specific state information.

In this embodiment, a third aspect of translation involves the dropping of RDP packets that cannot, or should not, be processed or passed to the VDP side.

Control

In this embodiment, control packets provide a mechanism for controlling how the user session runs and operates from the client perspective. There may be essentially thee types of RDP control packets that VDP is interested in for the purpose of translation:

Login: Login control packets are used for one purpose: activating a new user session. This is a control item not only because it is the entry point into a new user session, but because it contains many of the static configuration items that can only be configured once at the start of the session. Some of the configuration items included in the login control packets are:
Username/password (if automatic login desired)
Domain
Login flags (automatic versus user entered login)
Remote host and client information
Desired RDP version
Screen resolution (Width×Height)
Color depth
Keyboard layout
Security settings (strong versus week encryption)
Supported channels (clipboard, sound, device redirector, etc. . . . ).

Capabilities: RDP has been designed to support a capabilities negotiation phase, which allows a client to define and in some cases turn off many configuration items and features provided in the protocol. This is a great feature because it allows the client to suit the session to their needs and limitations (e.g., bandwidth, memory). In addition, the server gets an opportunity to deny certain requests because of configuration constraints defined at the server for the whole system. Some of the capability items included are:
Operating system and protocol version
Supported compression types and selected level
Display support (resolution, color depth, palettes)
Supported drawing and caching operations
Cache size support
Cursor options.

State: State control packets are any packets that affect the state of the user's session. For instance, if the server for some reason issues a disconnect message to the VDP2RDP translator, this is preferably propagated up through the Translator, Guard, and eventually to the Client. The translation in most cases for this type of packet is a one-to-one mapping from RDP to VDP packets and vice versa.

In this embodiment, configuration items the translator needs for login and capability negotiation can either be read in from local persistent configuration files or from the VDP connection request packet sent to the Translator from the Guard. The table below outlines examples of what configuration items the Guard will provide to the translator via the connection request message and which TLV type they are associated to.

| Available VDP Configuration Items | |
|---|---|
| TLV | Configuration Item |
| Display Settings | Resolution (Width and Height) |
| | Color Depth (8, 15, 16, or 24 bit) |
| Language Settings | Key Layout |
| Login | Terminal Server Username |
| | Terminal Server Password |
| Remote Host | Terminal Server IP Address and Port |
| | Which translator to use (RDP/ICA) |
| Cache Size | Cache Configuration: |
| | Bitmap Cache |
| | Font Cache |
| | Cursor Cache |
| | Palette Cache |
| Output Capabilities | Supported Drawing Operations |
| System Capabilities | Supported Clipboard Features |
| | Supported File Transfer Features |
| | Supported Audio Features |
| | Supported Video Features |
| | User pre-emption supported |
| | Timeout settings (idle, suspend, cache) |
| | User priority |
| | Availability of session performance |
| Security Settings | Low-side security setting (Translator ⇌ Terminal Server) |

RDP disconnect packet. In one embodiment, this packet may be sent either by the RDP client or server to notify it that they are terminating the session. The RDP disconnect packet provides a reason code that can be used by the translator to determine which VDP packet to send, either a Session Shutdown or Session Timeout message.

Direct Translation

In this embodiment, direct translation of RDP packets may be needed for user input coming from the client and visual output sent from the Terminal Server. The tables below outline example of the types of packets to be translated from VDP and RDP.

| VDP to RDP Packet Translation | | | | |
|---|---|---|---|---|
| VDP | | | RDP | |
| Packet | Type | Description | Packet(s) | Description |
| Keyboard Press | 0x040001 | User presses a keyboard key | Keyboard Event (Down) | Standard keyboard press any release event. Includes either a scancode or virtual key code for the key pressed. |
| Keyboard Release | 0x040002 | User releases a keyboard key | Keyboard Event (Up) | |
| Key string | 0x040003 | User enters a captured string | Multiple Keyboard Events (Down and Up) | Translated into multiple sequential RDP key events packaged into the same packet. One press and release event is needed for every character included in the string. |
| Mouse Press | 0x040004 | User clicks a mouse button | Mouse Event (Down) | Standard mouse click and release event. Includes a flag for the button pressed (1, 2, or 3) and the location of the cursor. |
| Mouse Release | 0x040005 | User releases a mouse button | Mouse Event | |
| Mouse Move | 0x040006 | User moves the mouse | Mouse Event (Move) | Standard mouse movement event. Includes the new cursor location. |
| Mouse Scroll Up | 0x040007 | User moves the mouse scroll wheel up | Mouse Event (Button4) | RDP assigns the flags for button 4 and 5 to the scroll up and down events. Thus, to scroll a standard |

-continued

VDP to RDP Packet Translation

| VDP | | | RDP | |
|---|---|---|---|---|
| Packet | Type | Description | Packet(s) | Description |
| Mouse Scroll Down | 0x040008 | User moves the mouse scroll wheel down | Mouse Event (Button5) | mouse down event needs to be sent using the flags for buttons 4 or 5, depending on the action (up or down) |
| Mouse Single-Click | 0x040009 | User completed a single mouse click | Mouse Events (Down and Up) | Client initiated single-click requires a mouse down and release event separated by at least 150 ms. This is so the message is only interpreted as a single click |
| Mouse Double-Click | 0x04000A | User completed a double mouse click | Mouse Events (Two quick Down and Up) | Requires two sets of mouse down and release packaged together in one packet so the Terminal Server will detect their closeness as a double-click |
| Mouse Triple-Click | 0x04000B | User completed a triple mouse click | Mouse Events (Three quick Down and Up) | Requires three sets of mouse down and release packaged together in one packet so the Terminal Server will detect their closeness as a triple-click |
| Mouse Drag | 0x04000C | User-initiated dragging | Mouse Event (Down) | A drag motion is simulated by sending a RDP mouse down event and sending mouse move events before the mouse release is sent. The VDP Mouse drag only sends the RDP mouse down event. A subsequent VDP Mouse Drop event results in the mouse release for the previous down, potentially at a different mouse location. |
| Mouse Drop | 0x04000D | User completed a drop | Mouse Event (Up) | |

RDP to VDP examples:

RDP to VDP Packet Translation

| RDP | | VDP | | |
|---|---|---|---|---|
| Packet | Description | Packet(s) | Type | Description |
| Disconnect | Sent by the client or server to close a session | Session Shutdown | 0x020001 | Sent for Terminal Server initiated shutdowns while the session is running |
| | | Session Disconnect | 0x020002 | Sent when the Terminal Server initiates a Disconnect because of a remote idle timeout |
| | | Connection Response | 0x030003 | If the disconnect is sent as the result of a Terminal Server login request the error message is denoted in the connection response to the Guard |
| Palette Update | Sent to update the active palette for future bitmap updates | Palette Update | 0x050001 | Close to a one-to-one mapping between the two protocols. VDP reduces a little bit of overhead. |
| Bitmap Update | Sent to paint a bitmap to the screen compressed or otherwise | CIF Paint | 0x050003 | Depending upon the compression algorithm allowed by the Guard, the image must be decompressed, potentially re-compressed using a Guard sponsored algorithm. Otherwise the translation is close to one-to-one. |
| System Pointer | Sent to reset the state of the current cursor pointer | Cursor Update | 0x050002 | Cursor related RDP messages are all sent as a VDP cursor update image. The VDP update message is for a monochrome (1 bit/pixel color) which requires the translator to down sample the color pointers. |
| Color Pointer | Sent to update the current cursor with a new cursor | | | |
| Cache Pointer | Sent to cache a cursor image in the cursor cache | Cursor Cache | 0x060001 | The cursor sent as the same format as the VDP cursor update packet with the addition of an index. |

-continued

| RDP to VDP Packet Translation ||||| 
| RDP || VDP |||
| Packet | Description | Packet(s) | Type | Description |
| --- | --- | --- | --- | --- |
| Raw Bitmap Cache<br>Raw Bitmap Cache v2<br>Bitmap Cache<br>Bitmap Cache 2 | Uncompressed bitmap sent specifically to be cached<br>Compressed bitmap sent specifically to be cached | Bitmap Cache | 0x060003 | Neglecting the down-sampling needed to drop the color this packet is close to one-to-one with eth RDP packet.<br>VDP Bitmap Cache packet is very close to its RDP counterpart, minus a little overhead. Only difference is the VDP version can handle both compressed and decompressed images. Compressed images may need to be decompressed and potentially re-compressed according to the algorithms allowed by the Guard. |
| Font Cache | Sent to cache multiple glyphs for a given font | Font Cache | 0x060004 | The VDP Font cache packet is very similar to its RDP counterpart minus a little overhead. This translation may require the glyph pixel maps be adjusted slightly to fit the format defined by VDP |
| DestBlt Order<br>Rect Order | Destination Block transfer sent to clear and area of the screen<br>Sent to clear an area of the screen with a specified color | Clear | 0x050004 | Translates to the VDP Clear packet which is used for general clearing operations of a rectangular region of the screen using a sent color. Also used to invert the region. |
| PatBlt Order | Sent to clear and area of the screen with a specified bruch | Pattern Clear | 0x050005 | The VDP Pattern clear packet is very similar to the RDP PatBlt packet. The VDP version is slimmer but the translation is close to on-to-one |
| ScreenBlt Order | Sent to copy one portion of the screen to another | Screen Copy | 0x050006 | The VDP Screen Copy packet is very similar to the RDP ScreenBlt packet. The VDP version is slimmer but the translation is close to on-to-one |
| DeskSave Order | Sent to save a portion of the screen to a client bitmap cache | Screen Cache | 0x060002 | The VDP Screen Cache packet is slightly different from the DeskSave RDP packet in that its based on indexes. The RDP desksave operation is saved based on an offset into the desktop image and therefore translation will need to be done to map the two. The RDP Desksave packet is primarily used for saving commonly viewed areas of the Desktop, whereas the Screen Cache can be used to cache any section of the screen for later display |
| MemBlt Order | Sent to copy a cached bitmap to the screen | Cache Copy | 0x050007 | The VDP Cache Copy packet is very similar to the RDP MemBlt packet. The VDP version is slimmer but the translation is close to on-to-one |
| TriBlt Order | Sent to do a combination of MemBlt and PatBlt commands | Pattern Clear and Cache Copy | 0x050005 and 0x050007 | The RDP TriBlt packet is translated into multiple sets of Pattern Clear and Cache Copy packets packaged together for transit. |
| Line Order | Sent to draw a line to the screen | CIF Paint | 0x050003 | These are unsupported operations that must be transmitted as bitmap updates. If these operation can not be turned off at startup then the translator will maintain a Virtual Frame Buffer to draw the operations in. The translator would then sent a CIF Paint message that contains the update. |
| Polyline Order | Sent to draw a poly-line to the screen | CIF Paint | 0x050003 | |

-continued

| RDP to VDP Packet Translation | | | | |
|---|---|---|---|---|
| RDP | | VDP | | |
| Packet | Description | Packet(s) | Type | Description |
| Text Order | Sent to draw text from a cached font | Cached Text Draw | 0x050009 | The VDP Cache text Draw packet is very similar to the RDP Text order packet. The VDP version is slimmer but the translation is close to on-to-one |

In this embodiment, depending upon the session configuration as managed by the Guard at session startup (using the Capabilities, Connection Request, and Response packets), some of these input events, drawing operations, or caching requests may be disabled.

In this embodiment, if an input event is sent when that input option is disabled, the packet preferably should be considered invalid, but it is up to the Guard to decided what action should be taken (drop packet or shutdown the session). Examples of this are:

Sending a Key press/release event for a character with a visual representation when direct input mode is disabled.

Using no visual key representations in the Key string packet

Sending Mouse Scroll events when the mouse wheel has been disabled

Sending Mouse Up/Down events for button 3 when the button has been disabled

Sending Mouse move events when movement has been disabled

Sending Mouse move events that break the frequency and hover rules as defined in the capabilities packet sent to the client.

In this embodiment, if a drawing command or caching request is disabled the translator may try to have the RDP session disable that feature so no translator processing needs to be done to handle the missing feature. If this is not possible, the translator may have to use a Virtual Frame Buffer (VFB) to locally draw the requested operation and send the resulting change in the users display to the client as a bitmap update. This applies to the drawing commands and capabilities that can be disabled on a per user or profile basis.

Interfaces

In this embodiment, within the Translator component, the VDP2RDP Process may interface with several other subcomponents, as shown by the examples in the table below:

| VDP2RDP - Internal Translator Interfaces | |
|---|---|
| Subcomponent | Interface Description |
| Listener Process | The Listener Process launches each VDP2RDP Process, using an 'exec' call. An individual VDP2RDP Process is launched to support each active user session. The Listener Process then uses the shared Wire Protocol to pass configuration information to VDP2RDP. The following configuration information is passed: SocketDescriptor (for the individual session's incoming VDP connection), AllowedEncryption (to identify permitted encryption types when connecting to the RDP server), Keys (as required to perform TLS functions). |
| Encryption/Decryption | VDP2RDP Process interacts with this subcomponent to perform TLS functions, using the interfaces provided by the subcomponent. |
| Heartbeat Monitor | Upon execution, this subcomponent uses the common Wire Protocol to provide regular heartbeat messages to the heartbeat monitor. This is one-way communication. |
| Shutdown Process | Upon execution, this subcomponent registers with the Shutdown Process, using the common Wire Protocol. Once registered, the heartbeat monitor listens for shutdown commands from the shutdown process. This is one-way communication. |
| Audit | This subcomponent sends audit messages directly to the Audit subcomponent, using the common Wire Protocol. This is one-way communication. |
| Low-side TCP stack | The VDP2RDP process communicates with the low-side terminal server using the low-side TCP stack. All network traffic goes through this interface and may require an additional SSL/TLS tunnel, which would require use of the encryption/decryption subcomponent. |

System Initialization

In one embodiment, the CAB Translator component reuses the Initialization subcomponent from the Guard, but is modified to support a different initialization sequence. In one embodiment, for the Translator, the CABInit process initializes in the following order:

Integrity checks
Heartbeat Process
Audit Subsystem
Shutdown Subsystem
Performance Monitor
Listener.

In this embodiment, note that VDP2RDP processes may be launched by the Listener as each new connection is made.

In this embodiment, the sequence shown above does not include the standard processes initialized as part of the SELinux boot. The Network Boolean (within the Security Policy) may not be enabled until all of the processes have successfully initialized. In complying with the core services design, the running Translator subcomponents preferably maintain links with the—

Audit Subsystem, for logging and event management
Heartbeat, for health management
Heartbeat Monitor domain (containing the system monitoring functions)
Other domains to be added.
Operating System In one embodiment, the CAB Translator component reuses the base operating system install from the Guard component. Very few deviations may occur. Most notably, the firewall configuration may differ for the translator.

In one embodiment, the firewall rules support Guard VDP traffic, Terminal Server protocol traffic, and trusted Network Time Protocol. Examples of these rules are shown in the following table:

Translator Firewall Rules

| Interface | Direction | Protocol | IP Addresses | Notes |
|---|---|---|---|---|
| Guard-side | Inbound TCP | VDP TLS | Individual Guard IP addresses or networks, as prescribed by site policy | Prescribed by site deployment |
| | Inbound/Outbound UDP | Network Time Protocol (NTP) | Single NTP server | Necessary for time synchronization; recommended deployment on secure switched network |
| Terminal-Server-Side | Outbound TCP | Proprietary Terminal Server TLS/SSL | Individual Terminal Server IP addresses or networks, as prescribed by site policy | |

Shutdown, for shutdown management.
Shutdown Monitor

In one embodiment, the CAB Translator component reuses the Shutdown Monitor subcomponent from the Guard; however, it is modified to shut down a different set of processes. For the Translator, the Shutdown Monitor may shut down the following:

Heartbeat Process
Audit Subsystem
Performance Monitor
Listener
VDP2RDP Processes.
Heartbeat Monitor In one embodiment, the CAB Translator component reuses the Heartbeat Monitor subcomponent from the Guard, modified to monitor a different set of processes. For the Translator, the Heartbeat Monitor monitors the following:

Shutdown Process
Audit Subsystem
Performance Monitor
Listener
VDP2RDP Processes.
SELinux Security Policy In this embodiment, though the Translator may share the same base operating system as the Guard, the Security Policy is preferably modified to allow for the differences in processes and functionality. The security domains within the Translator may include:

Listener domain (contains the Listener process)
VDP2RDP domain (contains VDP2RDP processes)
Audit domains (several domains containing audit related processes)
Administrative domains (several domains containing administrative and configuration processes)

Terminal Server Component

In this embodiment, the Terminal Server component may provide a low-side, multi-user platform on which the low-side presences can physically reside. In one embodiment, it may consist of a commercial off-the-shelf (COTS) platform that supports remote thin-client connections.

Figure 27:
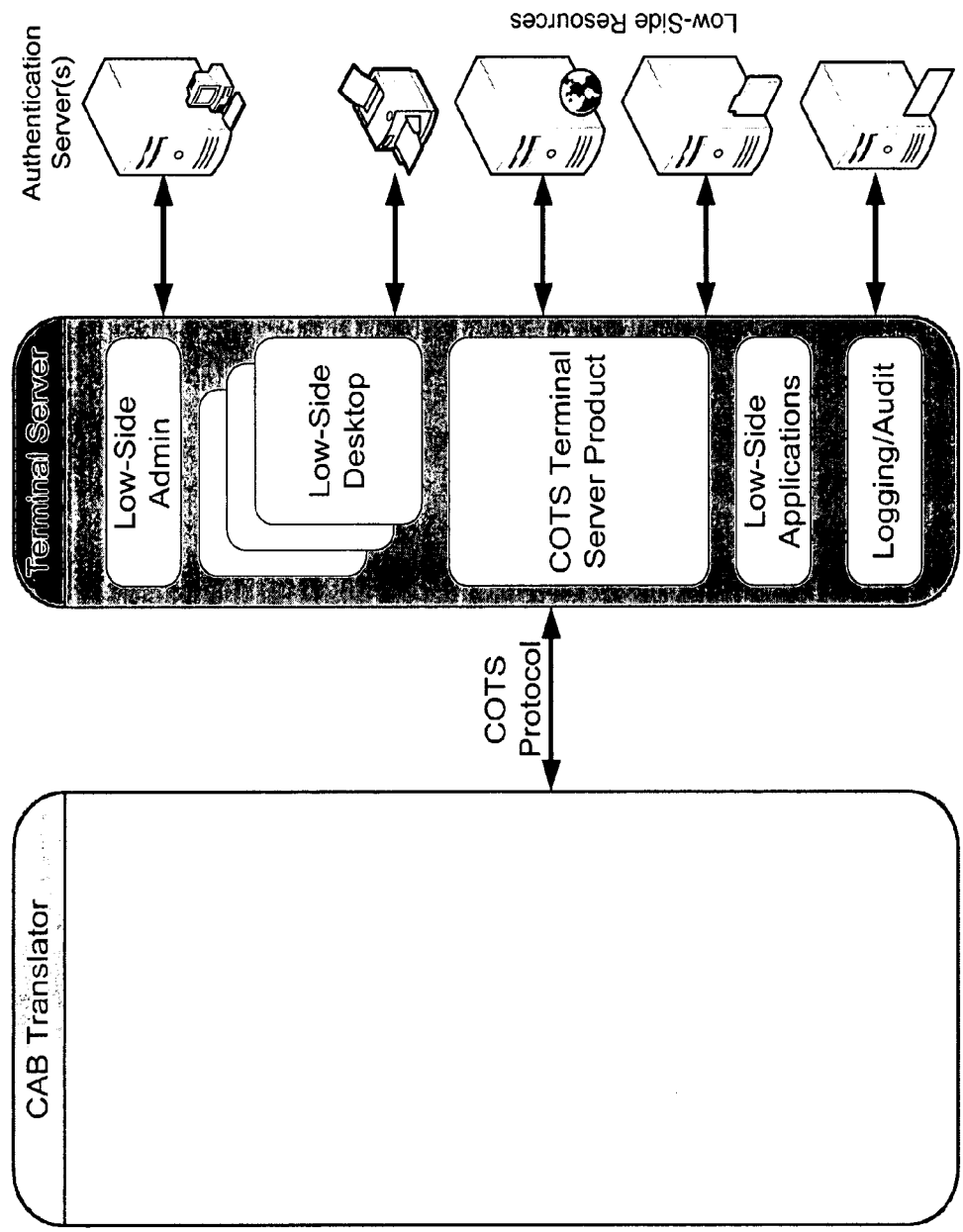
FIG. 27 shows an example of a functional view of the CAB Terminal Server component.

In this embodiment, the Terminal Server platform may be connected to the low-side network. This means that the Terminal Server can be configured, without any CAB-specific training, to support applications, resources and protocols natively available on that network. A functional view of the Terminal Server is shown in FIG. 27.

Design Decisions and Considerations
Terminal Server Products Supported

In this embodiment, CAB has been architected to support a variety of terminal server solutions. Because the native server protocol is translated to VDP, supporting additional protocols over time will require very few system changes outside of the Translator.

In this embodiment, there are over a dozen different terminal server solutions available; some are commercial products, some are open-sourced. While open-source solutions appear attractive from a cost perspective, their lack of technical support and limited reliability become major obstacles to ensuring system availability. Of the commercial products, Microsoft and Citrix Corporation dominate the thin-client market. Both offer features that meet the requirements needed of the terminal server functionality.

In one embodiment, Microsoft Windows Terminal Server, using the RDP protocol, may be supported. In another embodiment, Citrix Corporation's MetaFrame Server, using the ICA protocol may be supported. In yet other embodiments, support for other types of terminal servers may include, for example, VNC, Tarantella and X.

Platform Support Considerations

In one embodiment, Citrix is available on UNIX, Linux, and Mac. In another embodiment, Microsoft Windows Terminal Server is supported on Windows platforms, for example, Windows 2000 and 2003.

Scalability and Performance Considerations

In this embodiment, many issues contribute to scalability and performance. Some of the issues are listed below:

- Memory requirements and utilization—Determining the amount of memory necessary for a particular use of a terminal server is complex. It is possible to measure how much memory an application has committed—the memory the operating system has guaranteed the application that it can access. However, the application will not necessarily use all of that memory, and it certainly is not using all of that memory at any one time.
- Network usage overhead—A terminal server is confined by the bandwidth supported by its network interfaces, the amount of bandwidth each of the systems processors can sustain transmission of, and the utilization required by each processor to transmit network traffic.
- Effects of color depth—Sessions engaged with high-color depth (e.g., 24 bits/pixel) require significantly more bandwidth and subsequently reduce the total system effectiveness and scalability.
- Effects of login activity on CPU—Account first use and session startup are very resource-intensive actions and will affect the end performance of the connecting session and already active sessions.
- Effects of kernel address space limitations—The majority of operations performed by the Microsoft Windows Terminal Server are done in the Windows kernel. Thus, the more user sessions active the more memory that is necessary in kernel space. The Windows kernel has a hard limit to the size in which the kernel memory footprint can be. If that footprint is used up, additional sessions cannot be run regardless if there is sufficient free physical memory remaining for allocation.
- Effect of application processes—Studies have shown background grammar checking in Microsoft Word had a significant negative impact on scalability, reducing the number of users supported.
- Effect of User interactions—Such as typing rates on CPU utilization, user opening, and closing of applications.
- Support for audio/video—The effect of audio/video processing and transmission by the Microsoft Windows Terminal Server may be significant.

Component Architecture

In one embodiment, the CAB Terminal Server may consist almost entirely of Microsoft COTS products, thus the actual architecture of the Terminal Server is beyond the scope of this document. The CAB Terminal Server is presented here because it is a component of the overall CAB system. The CAB requirements that are solely met by the CAB Terminal Server component are preferably readily supported by any terminal server product chosen.

In this embodiment, while the CAB Terminal Server may be based on COTS products, proper configuration is preferable to ensure reliability and performance standards are met. In addition, low-side user accounts for CAB users may be maintained on the Terminal Server.

Virtual Desktop Protocol (VDP)

In this embodiment, the Virtual Desktop Protocol is a protocol for communications between CAB components. More specifically, VDP may be used for communications between the Client and Guard, and between the Guard and Translator.

In one embodiment, VDP communications may coordinate among multiple load-balanced Guards and multiple load-balanced Translators.

In this embodiment, it is preferably that each CAB component implement VDP in the same fashion. This consistency allows for code reuse and helps to ensure compatibility between components. The subsections below describe the consistent implementation and provide further details to support the consistency.

Protocol Definition

Session Startup

In one embodiment, VDP assumes that the client application knows the network location (IP address/port) and domain classification of the VDP server to which they are connecting. Thus, in this embodiment, VDP provides no negotiation regarding server discovery.

In one embodiment, VDP does not provide any inherent confidentiality or integrity mechanisms to protect the content of the packets transmitted. For this reason, the assumption is that VDP will be used from within a tunnel (SSL, TLS, IPSEC, L2TP and PPTP) that provides an adequate level of confidentiality and integrity.

In this embodiment, a VDP session may begin with the client connecting to the server using the Transmission Control Protocol (TCP). There may be no restrictions regarding the port number on which the server runs. Port assignment of the VDP server may be left up to the server itself.

In this embodiment, following a successful TCP connection, the authentication sequence preferably begins. This sequence begins with server sending an authentication capabilities packet that identifies the supported authentication methods available to the client. In one embodiment, VDP supports a simple form of user password authentication to identify the connecting user. In other embodiments, other known authentication methods may also be used.

In this embodiment, following successful authentication, the client preferably receives a capability packet including the allowed options for the current session and settings from the previous connection if they exist. The client preferably next sends a connection request packet that includes the options they wish to use during the session. Upon processing this request, the server will preferably first respond with a status message indicating whether the selected settings have been accepted or denied. If the selected settings are accepted, the server may be responsible for then establishing a connection with the remote desktop session and responding to the client with an indication of success or failure. Reasons for failure include an invalid user/password or password expiration. In this case, it is up to the client to initiate a password change request before future authentication requests.

In this embodiment, following a successful connection response, normal user input traffic can commence.

User Input

In this embodiment, there may be two basic forms of user input supported by VDP: Keyboard and Mouse input.

Keyboard

In one embodiment, VDP supports the keys available, for example, on a standard 101-key keyboard plus the two Microsoft window keys and one context key (effectively a Microsoft 104-key keyboard).

In this embodiment, VDP may use a key encoding consistent with the scan codes defined, for example, in the Microsoft Windows operating system for 101/104-key keyboard types.

In this embodiment, keyboard input may be transmitted in forms including:

Key string: Used to group a sequence of entered characters together into a string for submission all at once. This method may be used as the default input method for input keys with a visual representation.

Scancode: A virtual hardware code used to identify the key based on physical location on the keyboard. This allows any key on a 104-key keyboard to be handled independent of the keyboard layout.

Virtual Key: A standardized code used to represent special keys or key sequences such as (Ctrl-Alt-Delete or Alt-Tab).

Input Methods

In this embodiment, VDP may support types of text input methods including:

Buffered Input

Direct Input

In this embodiment, buffered input may be the default input method for keyboard keys that have a visual representation. This input method may be provided so that text input will be controlled by the end-client and transmitted at one time for entry into the system.

In this embodiment, direct input allows the user to send each character as a sequence of key-press and key-release events. This input method provides a more realistic user experience by simulating the normal keyboard input method that would be used on a local machine. When direct input mode is enabled, the client can send every key defined on their keyboard using the key-press and key-release packets.

Key Layouts

In this embodiment, variable keyboard layouts are supported because they allow the user to orient their keyboard to the language to which they are accustomed. When typing on a Windows system in another language, it helps to have the keyboard laid out in a way that is more conducive or standardized to fit that language.

In one embodiment, the default keyboard layout used by VDP is QWERTY, also identified as "en-us." The QWERTY keyboard gets its name from the first six top-level characters: "Q," "W," "E," "R," "T," and "Y" on a standard United States keyboard. The en-us keyboard layout is identified by the code 0x0409.

Another embodiment may support layouts or input methods that require text input in ways other than simply typing the keyboard (i.e., complex languages with thousands of character sets such as Japanese, Chinese or Korean).

Mouse

In one embodiment, VDP supports standard mouse input. Examples supported include those mouse with up to three buttons and a scroll wheel. It is preferable for mouse input use that there are at least two buttons.

In this embodiment, VDP may support two basic modes of mouse-click input:

Raw

Interpreted

In this embodiment, the raw mouse input mode may rely on the remote server for detection and handling of multiple click-and-drag based events. In this mode, the client will send press-and-release events for every mouse click that occurs. The remote server can then detect whether a double-click, triple-click, drag, or drop event occurred based on the frequency in which the event was received.

In this embodiment, in interpreted mouse input mode, it may be up to the client to detect when double-click, triple-click, and drag-based events occur. When detected, the client would send event-specific messages to the server instead of generic press-and-release events.

In one embodiment, interpreted mode has been provided for systems that regularly have inconsistent latency. In these situations, if the press-and-release events are not processed and sent to the remote desktop server in the speed in which they were received, the remote server may not detect quick key presses as double-clicks. Interpreted mode provides a way of bypassing this problem by leaving the detection up to the local client. By using the interpreted mode, the server can preferably guarantee that the respective click events would be packaged together so that the multiclick event is properly detected.

In this embodiment, in addition to the two different click-input modes, VDP may also support mouse movement and scroll wheel movement. For these two types of input, it may be up to the server to instruct the client if these types are currently enabled and the frequency in which they should be sent.

Server Output

In this embodiment, VDP Output messages sent from the remote server can be broken down into two basic categories:

Drawing Commands: Commands that affect the users' visual display of their desktop current session Caching Requests: Requests to store drawing content in the client's memory for later retrieval and drawing.

In one embodiment, VDP has been designed so that the administrating server can configure the operations to support for each user session it manages. This includes both caching requests and drawing commands. At connection time the server may inform the client which operations it can expect based upon the configuration settings on the server (via the connection response message).

In this embodiment, a VDP session preferably supports these basic operations:

Bitmap drawing: Painting bitmaps on the screen

Cursor updates: Changing the current mouse cursor

Palette updates (if 8-bit color is supported): Changing the palette for all future bitmaps.

Drawing Commands

In this embodiment, drawing commands may include any operation that directly or indirectly affects the user's visual picture of the screen. This may include the following commands:

Clear

Screen: Region of the screen is cleared with a color and bitwise operator

Pattern: Clearing of a region of the screen using a patterned brush and bitwise operator.

Draw

Bitmap: Drawing of a bitmap to the screen potentially decompressing it first

Text: Request to draw text based on a previously cached font

Cursor: Request to change the current cursor

Copy:

Memory: Copying of a bitmap from the cache to the screen using a bitwise operator Screen: Copy of one region of the screen to another using a bitwise operator In this embodiment, the copy and clear-based drawing commands may use some form of bitwise operator to perform their operations.

Image Formats

In one embodiment, there may be five relevant binary image or image-related formats that are defined by or referenced by this specification:

Bitmap Images: Major updates to the screen are performed with and on device-independent bitmaps. This may be defined by the Common Image Format (CIF) standard.

Bitmap Compression: Refers to the algorithms used to compress bitmap images for transit. This is also defined by the CIF standard.

Palettes: Palettes are needed for bitmap images with 8-bit or less color depth. This is also defined by CIF standard.

Cursors: Refers to the images used to display a user's mouse cursor.

Font Glyphs: Refers to the images used to display text-based output to the screen.

Caching Requests

In this embodiment, caching requests include operations that involves storing image-related data in the client's memory for later retrieval and lookup. The caching feature enables the system to store commonly used data with the client for later lookup and usage. This prevents the server from having to send the same image to a client numerous times.

In this embodiment, the following caching requests may be available:

Bitmap cache: Bitmap sent specifically to be cached
Screen Cache: Saving a region of the screen for later painting
Cursor Cache: Saving of a cursor bitmap
Font Cache: Font sent as an array of glyphs for later text output.

In one embodiment, when each of these commands is issued by the server, included is a cache index that tells the client where to store the data. The cache size in bytes and elements expected by the client is dictated by the administrating server via the capabilities packet using the "Cache Size" Type Length Value (TLV) type.

Capabilities

In this embodiment, following a successful authentication process, the client may receive a capabilities packet that includes various capability fields, for example, color depth, drawing capability and key layout. The capability fields may define what options are available to that user's session and any information about that client's previous settings from the last connection.

Shutdown and Error Management

In this embodiment, VDP may provide two basic packets for shutting down a session:

Session Shutdown
Session Timeout
Session Shutdown

In this embodiment, the session shutdown message may be sent whenever a node in the system that is aware of the current VDP session wishes the session be completely terminated. Accompanying the shutdown message may be a reason or status code that the sender can use to indicate to the end-client the reason for the shutdown. This reason could be both a fatal and non-fatal shutdown; there are no restrictions as to how this field is used. For example, the client can use the Session Shutdown packet to close the session completely or request that the session be suspended for later opening.

Session Timeout

In this embodiment, VDP may recognize different types of timeouts, including:

Idle Timeout: Refers to the amount of time that the user's session must remain idle for the server to forcefully shut down the connection Suspend Timeout: Refers to the amount of time the server will save the session upon receiving a user-initiated suspension. The suspend feature is initiated using a Session Shutdown message with the suspend reason set. This feature exists to allow the user pause their session and reconnect to it later or on a different machine.

Cached Timeout: Refers to the amount of time that the remote desktop server will cache a user's session before logging it out and completely removing all user states. By default, most remote desktop servers will cache a user's logged-in session locally for a specified time. This is done so every authentication to the remote session does not require the overhead of startup. This cached session remains for the cache timeout period unless the user explicitly logs them selves out of the remote session.

In this embodiment, the session timeout message may be sent to the end-client to indicate a system-enforced shutdown because of idle or suspend-based timeout. Included in this message may be specific details about the time that just expired and how long the session will be cached for later reconnection. When the client initiates a shutdown, the user can additionally receive a session timeout message indicating how long the connection will be cached on the remote desktop server in a suspended or cached state.

Protocol Structure

In this embodiment, Although not explicitly defined by each packet in this section, packets are preferably aligned to a 4-byte boundary. Any packet that does not already align to this boundary is preferably padded with zeros to ensure that the 4-byte boundary requirement is maintained.

Packet Header

In one embodiment, the packet header may be composed of five fields, as shown in the table below. Each packet described may start with the packet header defined below. The size and offset columns are represented in bytes.

| VDP Packet Header Layout | | | | |
|---|---|---|---|---|
| Offset | Size | Name | Type | Description |
| 0 | 4 | Identifier | ascii | Unique number used to identify the VDP packet (0x56445000 = "VDP\0") |
| 4 | 2 | Version | uint16 | Identifies what version of the protocol to use. The High order byte represents a major version and the low order byte represents a minor version (0x0100 = version 1 .0) |
| 6 | 2 | Packet Type | uint8 | Primary packet type use to categorize the packet. |
| 8 | 2 | Sub Packet Type | uint16 | Secondary packet type. |
| 10 | 2 | Payload Length | uint16 | Length of the payload in four byte words (0x0100 = 16 words * 4 bytes/word = 64 bytes). VDP packet can have a maximum length of 65535 words or 266,122 bytes. |

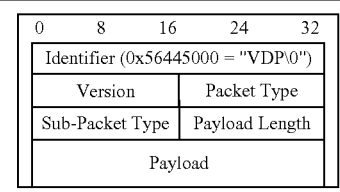

In one embodiment, the CAB implementation additionally subdivides the packet-type field into the following logical fields (offsets are from within the packet type field above):

CAB Packet Type Field

| Bits | | | | |
|---|---|---|---|---|
| Offset | Size | Name | Type | Description |
| 0 | 1 | Upstream | bit | Indicates if the packet is going upstream or downstream. Setting the bit means that the packet should be moving upstream. Otherwise, the packet should be moving downstream. |
| 1 | 7 | Segment | uint | ID indicating on which segment in the cab architecture the packet is being transmitted. |
| 8 | 8 | Type | uint8 | Type code for the packet |

In one embodiment, the CAB system refers to the terms Upstream and Downstream in the opposite way of conventional definitions. In the CAB system:

Upstream refers to packets moving from the low domain to the high domain (e.g., Terminal Server→Translator→Guard→Client)

Downstream refers to packets moving from the high domain to the low domain (e.g. Client→Guard→Translator→Terminal Server)

In this embodiment, the changes above result in the following exemplary packet header:

CAB VDP Header

| 0 | 8 | 16 | 24 | 32 |
|---|---|---|---|---|
| Identifier (0x56445000 = "VDP\0") | | | | |
| Version | | U | Segment ID | Packet Type |
| Sub-Packet Type | | Payload Length | | |
| Payload | | | | |

Exemplary CAB Segment IDs:

CAB Segment IDs

| ID | Segment | | Description |
|---|---|---|---|
| 0x0001 | Client | ↔ Guard | Packets sent between the client and guard |
| 0x0002 | Guard | ↔ Translator | Packets sent between the guard and the translator |
| 0x0003 | Guard | ↔ Guard | Packets sent between two guards for Inter Guard Communication (IGC). This is used for load balancing and guard synchronization |
| 0x0004 | Client | ↔ FTG | Packets sent between the client and the file transfer guard specifically for file transfers |
| 0x0005 | Translator | ↔ FTG | Packets sent between the translator and the file transfer guard specifically for file transfers |

Packet Types

In this embodiment, the packet type section may be used to identify valid packets supported in VDP, their corresponding packet type and subpacket type codes, as well as their physical make-up. This following table enumerates the exemplary packet types and subtypes. The length column in the table below is used to identify the preferably number of bytes needed for each packet (this does not include the 12 bytes required for the header).

VDP Packet Types

| Type | | Subtype | | Length | |
|---|---|---|---|---|---|
| ID | Name | ID | Name | (bytes) | Description |
| 0x0001 | Authentication | 0x0001 | User/Password Request | 76 | Standard user password request |
| | | 0x0002 | User/Password response | 4 | Standard user password response |
| | | 0x0003 | Change Password | 140 | Request to change the current password |
| | | 0x0004 | Change Password Response | 2 | Password Change Response |
| | | 0x0005 | Auth Capabilities | 4 | Describes the available authentication methods |
| 0x0002 | State | 0x0001 | Session Shutdown | 8 | Sent to indicate a shutdown of the session, forceful or otherwise |
| | | 0x0002 | Session Timeout | 14 | Sent to indicate a timeout based shutdown |
| | | 0x0003 | Client Notification | 518 | Sent to the client to notify it of some event |
| 0x0003 | Capabilities | 0x0001 | Capabilities | Var. | Sent to provide the client with a set of valid options for their current session |
| | | 0x0002 | Connection Request | Var | Send by the client to initiate a connection with the server |
| | | 0x0003 | Connection Response | Var | Sent by the server to confirm the connection response |

-continued

| VDP Packet Types ||||||
|---|---|---|---|---|---|
| Type || Subtype || Length ||
| ID | Name | ID | Name | (bytes) | Description |
| 0x0004 | User Input | 0x0001 | Keyboard Press | 4 | User presses a keyboard key |
| | | 0x0002 | Keyboard Release | 4 | User releases a keyboard key |
| | | 0x0003 | Key string | Var. | User enters a captured string |
| | | 0x0004 | Mouse Press | 6 | User clicks a mouse button |
| | | 0x0005 | Mouse Release | 6 | User releases a mouse button |
| | | 0x0006 | Mouse Move | 4 | User moves the mouse |
| | | 0x0007 | Mouse Scroll Up | 4 | User moves the mouse scroll wheel up |
| | | 0x0008 | Mouse Scroll Down | 4 | User moves the mouse scroll wheel down |
| | | 0x0009 | Mouse Single-Click | 6 | User completed a single mouse click |
| | | 0x000A | Mouse Double-Click | 6 | User completed a double mouse click |
| | | 0x000B | Mouse Triple-Click | 6 | User completed a triple mouse click |
| | | 0x000C | Mouse Drag | 6 | User-initiated dragging |
| | | 0x000D | Mouse Drop | 6 | User completed a drop |
| 0x0005 | Drawing Command | 0x0001 | Palette Update | Var. | Contains a new palette to use for all future 8-bit images. |
| | | 0x0002 | Cursor Update | Var. | Contains a new cursor image |
| | | 0x0003 | CIF Paint | Var. | Contains 1 . . . N new images to be drawn |
| | | 0x0004 | Clear | 12 | Clears a region of the screen using a specified color or operation |
| | | 0x0005 | Pattern Clear | 29 | Clears a region of the screen using a bitwise operation and patterned brush |
| | | 0x0006 | Screen Copy | 14 | Copies one area of the screen to the other using a bitwise operation |
| | | 0x0007 | Cache Copy | 16 | Copies a cached bitmap to the screen using a bitwise operation |
| | | 0x0008 | Cached Cursor Draw | 2 | Request to change the cursor from cache |
| | | 0x0009 | Cached Text Draw | Var. | Request to draw text from cache |
| 0x0006 | Cache Request | 0x0001 | Cursor Cache | Var. | Cursor to cache |
| | | 0x0002 | Screen Cache | 10 | Request to cache a section of the screen |
| | | 0x0003 | Bitmap Cache | 12 | A bitmap to store in the cache |
| | | 0x0004 | Font Cache | Var. | A array of font glyphs to cache |
| 0x0007 | Health | 0x0001 | Client Request | 6 | Request for health status information |
| | | 0x0002 | Client Response | 12 | Health status information |
| 0x0008 | Audit/log | 0x0001 | Remote Log | 284 | Send a log entry |

In this embodiment, the table below shows examples of the valid packets for each segment and the direction in which they are allowed.

| CAB Valid Segment ID and Packet Mappings ||||
|---|---|---|---|
| Segment | Dir. | Type | Subtype |
| C↔G(1) | Down | Authentication (0x01) | User/Password Request (0x0001) |
| | | Authentication (0x01) | Change Password Request(0x0003) |
| | | Capabilities (0x03) | Connection Request (0x0002) |
| | | User Input (0x04) | All Subtypes (0x0001-0x000C) |
| | | Health (0x07) | Health Client Request (0x0001) |
| | | Audit/Log (0x08) | Remote Log (0x0001) |
| | Up | Authentication (0x01) | User/Password Response (0x0002) |
| | | Authentication (0x01) | Change Password Response (0x0004) |
| | | State (0x02) | Session Timeout (0x0002) |
| | | State (0x02) | Client Notification (0x0003) |
| | | Capabilities (0x03) | Capabilities (0x00001) |
| | | Capabilities (0x03) | Connection Response (0x0003) |
| | | Drawing Ops (0x05) | All Subtypes (0x0001-0x0009) |

| CAB Valid Segment ID and Packet Mappings | | | |
|---|---|---|---|
| Segment | Dir. | Type | Subtype |
| G↔T(2) | Both | Caching Ops (0x06) | All Subtypes (0x0001-0x0004) |
| | | Health (0x07) | Health Client Response (0x0002) |
| | | State (0x02) | Session Shutdown (0x0001) |
| | Down | Capabilities (0x03) | Connection Request (0x0002) |
| | | User Input (0x04) | All Subtypes (0x0001-0x000C) |
| | Up | State (0x02) | Session Timeout (0x0002) |
| | | Capabilities (0x03) | Connection Response (0x0003) |
| | | Drawing Ops (0x05) | All Subtypes (0x0001-0x0009) |
| | | Caching Ops (0x06) | All Subtypes (0x0001-0x0004) |
| | Both | State (0x02) | Session Shutdown (0x0001) |

Packet Details

Authentication Packets

In this embodiment, VDP Authentication packet sequences may be used to verify and accept valid users into the CAB system.

In this embodiment, the authentication process can often require multiple roundtrip packet exchanges between the client and server before the authentication is complete. Therefore, authentication packets preferably begin with a 2-byte sequence number that is used to identify the current authentication step in the process. This sequence number should preferably be increased before each step in the authentication sequence, with the first sequence starting at one.

In this embodiment, as an example, a client node may use the User/Password Request Packet to initiate the authentication sequence. This may be the first packet to be sent by the client following a successful connection, assuming the User/Password authentication method is chosen. An exemplary packet structure is shown below:

| User/Password Request Packet | | | | |
|---|---|---|---|---|
| Offset | Size | Name | Type | Description |
| 0 | 2 | Sequence | uint16 | Authentication Sequence Number (Value = 1) |
| 2 | 2 | Length | uint16 | Length of the username string in bytes (2 * NumChars) |
| 4 | 40 | Username | unicode(20) | Unicode string identifying the user to log in as. The field can contain up to 20 Unicode characters. Usernames shorter than the max length should be padded with zero's |
| 44 | 32 | Password | binary | The connecting user's password hashed using the SHA-256 algorithm. The purpose of using the hash is not for security, but to prevent others (such as an administrator) from seeing the user's plain text password. |

State Packets

In this embodiment, state packets may include anything that directly or indirectly affects the normal running state of the system after authentication and connection have been established.

In this embodiment, the packets in this section may have implementation-specific fields. The fields for each packet that apply may be as follows:

Shutdown: Reason

Timeout: Reason

Notification: Type

In this embodiment, for example, the session shutdown message may be sent to indicate that the end-host is shutting down the session. Included in this packet may be a code used to identify the reason for the shutdown.

| Session Shutdown Packet | | | | |
|---|---|---|---|---|
| Offset | Size | Name | Type | Description |
| 0 | 4 | Timestamp | uint32 | Time in seconds since (00:00:00), Jan. 1, 1970, coordinated universal time (UTC). |
| 4 | 4 | Reason | uint32 | Reason for the shutdown |

Capability Packets

In this embodiment, capability packets may be a special kind of packet that enables the user to convey the options with which they wish to run and the options that the server will allow them to run. In order to remain flexible and still provide an acceptable level of inspection, some of the packets in this type may rely on the TLV construct.

Type Length Value

In this embodiment, type length value is a simple construct that states that all of your message should be pre-pended with a type and a length where the type indicates what kind of data is to come; the length represents the size of that data.

In this embodiment, based on this information the TLVs used in VDP may have the following structure:

| TLV Structure | | | | |
|---|---|---|---|---|
| Offset | Size | Name | Type | Description |
| 0 | 2 | Type | uint16 | A code that identifies the data content to follow |
| 2 | 2 | Length | uint16 | Length of the data to follow in bytes words (0x0010 = 16 |

TLV Structure (continued)

| Offset | Size | Name | Type | Description |
|---|---|---|---|---|
| 4 | Length | Value | binary | words * 4 bytes/word = 64 bytes) The binary data that makes of the information defined by the type and length |

In one embodiment, a TLV can have a maximum length of 65,534 words or 266,118 bytes. This leaves one word for the header of the TLV if the packet was at the maximum supported VDP packet size.

Valid TLV Types

In this embodiment, below is a table that enumerates exemplary valid TLV types supported by capability packets:

Valid TLV Types

| Type | Length (bytes) | Name | Description |
|---|---|---|---|
| 0x0001 | 8 | Display Settings | Settings specific to how the screen is displayed to the user |
| 0x0002 | 2 | Language Settings | Used to select any language specific input settings |
| 0x0003 | Var. | Login | Includes fields for remotely logging in such as username and password |
| 0x0004 | 8 | Remote Host | Identifies a remote server by IP address and port |
| 0x0005 | 588 | Domain | Identifies the current operating domain |
| 0x0006 | 18 | Cache Size | Identifies the size of the current drawing caches in elements and bytes. |
| 0x0007 | 8 | Display Capabilities | Includes any fields that identify the acceptable display options for the current session |
| 0x0008 | 12 | Input Capabilities | Includes any fields that identify the acceptable input options for the current session |
| 0x0009 | 4 | Output Capabilities | Includes any fields that identify the acceptable output options for the current session |
| 0x000A | 16 | System Capabilities | Includes any fields that identify the acceptable system options for the current session |
| 0x000B | 4 | Client Identifier | Sent by the client to identify itself to the server |
| 0x000C | 4 | Security Settings | Sent to specify any connection specific security settings |

In this embodiment, the table below outlines exemplary capability and settings that are preferably transmitted in the CAB architecture, the TLV to which they are assigned, and to which node that TLV should be sent.

| TLV | Capability/Setting | Sent to client | Sent to translator |
|---|---|---|---|
| Display Settings | Resolution (Width and Height) | X | X |
| | Color Depth (8, 15, 16, or 24 bit) | | |
| Display Capabilities | Maximum Resolution (Width and Height) | X | |
| | Supported Color Depth | | |
| Language Settings | Key Layout | X | X |
| Login | Terminal Server Username | | X |
| | Terminal Server Password | | |
| Remote Host | Terminal Server IP Address and Port | | X |
| | Which translator to use (RDP/ICA) | | |
| Domain | Low-side Domain Settings: | X | |
| | Identifier (U, S, TS) | | |
| | Banner Text | | |
| | Color Parameters | | |
| Cache Size | Cache Configuration: | X | X |
| | Bitmap Cache | | |
| | Font Cache | | |
| | Cursor Cache | | |
| | Palette Cache | | |
| Input Capabilities | Supported Mouse Events | X | |
| | Supported Key Layouts | | |
| | Mouse Movement Frequency | | |
| | Mouse Hover Setting | | |
| Output Capabilities | Supported Drawing Operations | X | |
| System Capabilities | Supported Clipboard Features | X | X |
| | Supported File Transfer Features | | |
| | Supported Audio Features | | |
| | Supported Video Features | | |
| | User pre-emption supported | | |

| TLV | Capability/Setting | Sent to client | Sent to translator |
|---|---|---|---|
| | Timeout settings (idle, suspend, cache) | | |
| | User priority | | |
| | Availability of session performance | | |
| Security Settings | Low-side security setting (Translator↔Terminal Server) | | X |

In this embodiment, the Login TLV, which may be used to pass basic authenticating fields onto a remote server, is shown below as an example:

Login TLV Data

| Offset | Size | Name | Type | Description |
|---|---|---|---|---|
| 0 | 64 | Username | unicode(32) | Unicode string that identifies the user's account. Unused characters must be zeroed. |
| 68 | 4 | Password Length | uint32 | Length of the password field in bytes (2 * NumChars) |
| 72 | Variable | Password | unicode(variable) | Unicode string that identifies the user's password in plaintext. Unused characters must be zeroed. |

Capabilities

In this embodiment, a capability packet may be sent by the authenticating server following the completion of a successful authenticating process to provide the client with its current session's capabilities. Also included may be the current user's last connection settings. Information may be provided via the TLV types that are defined above.

Allowed TLV Types

In one embodiment, the below table defines which TLV types are valid for use with the capabilities packet. In one embodiment, column three, labeled "Req" denotes TLV types that are "required" (they are highly preferable). TLV types that do not have this columned selected can be sent, but it is not required.

Allowed Capability Packet TLV Types

| Type | Name | Req. | Purpose |
|---|---|---|---|
| 0x0001 | Display Settings | | Last login display settings. Upon connecting for the first time this TLV won't be included |
| 0x0002 | Language Settings | | Last login language settings, Upon connecting for the first time this TLV won't be included |
| 0x0005 | Domain | • | Connecting Domain display requirements |
| 0x0006 | Cache Size | • | Caching options available to the user |
| 0x0007 | Display Capabilities | • | Display options available |
| 0x0008 | Input Capabilities | • | Input options available to the user |
| 0x0009 | Output Capabilities | • | Output options available to the user |
| 0x000A | System Capabilities | • | System options available to the user |

Connection Request

In this embodiment, the connection request may be sent by a client to initiate a connection to the server following a successful authentication process.

In this embodiment, the connection request may be used by both the client and guard to initiate a connection. This process begins with the client sending a connection request to the guard that includes its connection settings. The guard will then validate those options and if all the selected options are valid will send a connection response to the client indicating the settings were accepted. The guard will then initiate a similar connection request to the translator providing all the information needed for it to make the connection to the terminal server.

Connection Response

In this embodiment, the connection response message may be sent by a server in response to connection request message. This packet may optionally include some TLV types if necessary.

In this embodiment, upon successfully validating the clients connection request, the Guard preferably sends a connection response to the client indicating that its settings were accepted. The connection process will continue with the Guard initiating a connection request to the translator. The Guard should then wait for a connection response from the translator indicating the success or failure of the connection. The connection process will then complete when the Guard sends a connection response to the client indicating the final success or failure of the connection.

User Input Packets

In this embodiment, user input packets, like keyboard and mouse input, are preferably sent from the user's client in order to represent the current state of that user's keyboard and mouse.

In one embodiment, by default, the keyboard press-and-release events are preferably only used for control keys (keys with no visual character representation) unless direct input mode has been enabled. When direct input mode is enabled, all keys can be transmitted used keyboard press-and-release packets or using the key-string packet.

In this embodiment, the mouse move event should be sent by the user client based upon the frequency and hover settings defined in capability packet.

In this embodiment, several packet types in this section have the same structure and therefore are grouped with other types. The packets with the same structure that are grouped together are:

Keyboard Press and Release
Mouse Move, Scroll Up, Scroll Down, Drag and Drop
Mouse Press, Release, Single-Click, Double-Click, and Triple-Click.
Key String In this embodiment, the key-string packet may be used to send a large string of text at one time. This message is used by the text buffer to transmit large strings instead of one character at a time. The key-string packet is preferably not used to send sequences of scancodes (specifically ones that do not have visual representations) that do not conform to the text defined in the string field. For example, key-string packets with no Unicode text and multiple scancodes should be considered invalid.

In this embodiment, included with the packet is an array of scancodes that the remote server can use to decode the string. The scancode array may contain any scancode that maps to a visible character based on the current key layout and either of the two character modifiers (shift, alt gr). When modifier scancodes are used, the first occurrence of that scancode will signify that the key is being pressed and held, and the second occurrence indicates the release of that modifier key.

Implementation Details
CAB VDP (API)

In one embodiment, the VDP API used by the CAB system is an implementation of VDP as described above and in the VDP Protocol Specification, which is incorporated herein by reference. Both the Translator and the Guard may use this implementation as the default code-base for interfacing with and speaking the Virtual Desktop Protocol in order to maintain consistency across both nodes.

In this embodiment, exemplary goals of this implementation are:

To abstract as many details of VDP away from the Guard and Translator as possible
To provide flexibility in the management of the resources used
To remain independent of the threading model and IPC used on the host In this embodiment, to accomplish these goals, the VDP API may provide a set of C functions that the Guard and Translator can use to:

Monitor and maintain the resources needed for state management and packet storage
Read and Write VDP-based packets independent of the IO mechanism (i.e., Network, File, IPC)
Inspect and Validate VDP packets in transit for proper state and form
Control host-specific state transitions In this embodiment, a purpose of this API is to provide an interface to the VDP protocol from a functional perspective. While this API may provide helper functions to validate the form of VDP packets, it may not be the responsibility of this API to verify the correctness of the values stored within the fields beyond the scope of its defined type. This means that it may be the responsibility of the host process to use the VDP API to scan for and detect any anomalies that do not fall within the scope field's defined type (i.e., uint8, int16, etc.).

Design Decisions and Considerations
Decision to Develop or Reuse

In one embodiment, the VDP protocol is a completely new development and requires no re-use of any existing design or product. The VDP implementation is preferably developed from scratch based on the protocol itself and the requirements of the project. Preferably, no re-use will be employed until later revisions of the protocol are undertaken.

Component Design Decisions

In one embodiment, this API is intended for use with the Red Hat Enterprise distribution (version 4) of Linux and therefore preferably relies on the Berkley Socket API implemented therein for TCP-based connections.

In one embodiment, system constraints may dictate that the C programming language is preferred to be used where possible to implement CAB software, which includes this API. Therefore, code can preferably be built and compiled using a compiler that adheres to the C99 (ISO/IEC 9899:1999) programming language standard.

In this embodiment, this component may be organized in a way so that the core functionality of VDP is abstracted away from the user. This may ensure that the user does not have to make an excessive number of API calls and have an in-depth understanding of the sequencing required by the API for each VDP operation needed. Where possible, the implementation provides entry points into the core API in the form of callbacks, so that critical-use decisions can be answered directly by the host system.

Interface-Related Design Considerations

In this embodiment, the VDP API may be designed in such a way as to provide as much independence as possible from the context in which the API is used. For example, the host's code base should be able to use this library effectively in both thread-based and process-based execution environments. In situations where the host wants to provide a custom implementation of a feature, the API provides support for registering callbacks that will be invoked when a specific event is fired. This may ensure that the host has full control of the resources used on its system, but can still remain relatively naive about the protocol's internals.

In one embodiment, this API makes no attempt at managing or governing any buffers used for sending and receiving VDP-based packets. It may be up to the host code base to manage the allocation and de-allocation of the connection and packet buffers passed to the API. The VDP API may provide a group of headers and helper functions that are intended to help in interpreting the content of the fields within VDP.

In this embodiment, the VDP API is preferably signal-aware in order to ensure that blocking operations can be terminated gracefully and that VDP state is properly cleaned up when signals cause a forcible close of the component. Note however, that it may be the responsibility of the host to properly catch and handle signals and thus respond appropriately.

Performance-Related Design Considerations

In one embodiment, this API can be designed to accommodate two hundred active user sessions. In some cases, this requirement means that the host will need to maintain 400 active TCP connections (high-side and low-side) to facilitate the session's traffic flow through the host.

In this embodiment, IO-related functions within the API (such as read and write) may assume a blocking 10 model by default. The non-blocking model may also be supported, but may require a mode change or a flag to instruct the API to use the non-blocking mode.

In one embodiment, VDP fields may be stored in little-endian format. Guard and Translator components may be run on x86-based hardware and therefore keeping VDP fields in little-endian may improve system performance by removing any unnecessary byte swapping. This may affect the Java client because Java assumes network byte ordering, which conforms to BigEndian. Thus, the byte-swapping burden may be placed upon each client machine because they only have one connection to manage and can bear the extra clock cycles. The Guard and Translator, on the other hand, preferably handle a minimum of two hundred connections and therefore need to eliminate as much extra processing as possible.

Safety, Security, and Privacy Design Considerations

In one embodiment, the VDP API makes no attempt at managing the security of the connections that it maintains. It may be up to the host code base and operating system policy to ensure that socket operations are constrained to system call permissions needed by the recv, send, and setsockopt socket API calls. VDP traffic may be TCP-based and preferably may not rely on raw sockets.

In one embodiment, the VDP API may help manage the state of the packets sent through its interface. In this sense, it will provide security that ensures that packets are well formed, and that packets arrive and are sent in the right order.

In this embodiment, the VDP protocol may assume that it is tunneled through a secure stream-based protocol such as TLS or SSL to preferably ensure confidentiality, data integrity, and source integrity. However, the VDP implementation may assume it is wholly independent of the tunnel and/or security mechanisms used to protect the protocol transport.

Subcomponent Details

In one embodiment, the VDP API may comprise two main elements: a Listener element and a Connection element.

In this embodiment, the Listener element may encapsulate all operations involved in managing a TCP socket that can listen for, and accept connections. The Connection element may encapsulate all operations involved in receiving and sending packets, verifying the correctness of packets, and ensuring that packets are sent during valid states.

State Diagrams

In this embodiment, the Listener component may have the following exemplary states:

| \multicolumn{3}{c}{VDP Listener Component States} | | |
|---|---|---|
| Name | Value | Description |
| Unused | 0 | Indicates that the component is currently not in use, and that the Listener has not been created yet. This state is set to zero so that when a "memset" operation is performed on the containing structure, the zeroing operation effectively resets the structure for use. |
| Created | 1 | The Listener has been created using the "vdpCreateListener" function and all Listener-based callbacks have been assigned. |
| Allocating | 2 | The Listener has invoked a callback and is waiting for the host to release a new connection structure for use by the next connection |
| Listening | 3 | The Listener has been started using the "vdpStartListener" function and is waiting for a remote connection to be made. The state occurs after the listen and accept socket calls while the process is blocked waiting for connections. |
| Accepting | 4 | The Listener has accepted a connection and is waiting for the host to take control of the connection via a Listener invoked callback |
| Paused | 5 | The Listener has been paused via the "vdpPauseListener" function and is not accepting connections. |
| Finished | 6 | The Listener has been terminated and is not accepting any connections. The memory used for the Listener can be released or zeroed for reuse |

In this embodiment, the Connection component may have the following exemplary states:

| VDP Connection Component States | | |
|---|---|---|
| Name | Value | Description |
| Unused | 0 | Indicates that the component is currently not in use and that the connection has not been created yet. This state is set to zero so that when a "memset" operation is performed on the containing structure, the zeroing operation effectively resets the structure for use. |
| Open | 1 | The connection has been allocated and associated with a remote VDP connection, but no packets have been received to initiate the authentication process. |
| Authenticating | 2 | The connection has begun receiving authentication packets, but the authentication process has not completed yet. |
| Connecting | 3 | The authentication process has completed successfully. The connection has begun the connection process. |
| Connected | 4 | The connection process has completed successfully and normal traffic packet operations has begun (i.e., sending key and mouse input, receiving image output) |
| Suspended | 5 | The connection has been suspended to be resumed later. In this case, the Client-to-Guard connection should be terminated and the Guard-to-Translator connection should indicate the suspended state. |
| ShuttingDown | 6 | The connection is being terminated but is still connected. |
| Disconnected | 7 | The connection has been completely torn down and is ready to be cleared for reassignment. |

Software Architecture

In one embodiment, the software architecture for the VDP API may be designed to abstract away as much of VDP as possible while still providing the host control over critical resource-related operations such as memory allocation. To do this, the VDP API may employ the ability for the host to register custom callback functions.

In one embodiment, the two main elements of this architecture are:
Listeners
Connections.

Listener

In one embodiment, the Listener encapsulates operations involved in listening for and accepting connections. This includes the setup of a Listener socket, binding to a local address and the allocation delegation of new VDP connections. To do this the Listener preferably manages fields, such as:

Socket Descriptor: OS file descriptor that is used to identify the Listener socket with the socket API
Socket Address structure: Socket address that is used to identify the currently bound address and port on which the Listener is listening
Listener State: The current state of the Listener as defined in section 7.2.1.2.1
Registered Callbacks
  Connection Allocation: Invoked prior to accepting any TCP connections for the host to provide memory for a valid connection structure to use for the next accepted connection
  Connection Established: Invoked upon successful connection of a client VDP connection. This invocation passes control of the connection over to the host and connection component
  Listener Error: Invoked as a result of socket errors returned from the "listen" and "accept" socket calls Connection In one embodiment, the connection component encapsulates operations for receiving and sending VDP packets. In addition to the simple send-and-receive operations, the connection component may also verify packets for correct form and order before passing them on to the host. To do this, fields such as the following are managed:

I/O Structure: Structure that contains all of the information needed to read and write data used for VDP packets. See below for more details.
Remote Address Structure: Socket address structure used to identify the remotely connected host.
Connection State: The connection current state. See section 7.2.1.2.1 for valid states for this components.
Connection Statistics: Any connection-related statistics maintained by the connection.
Connected timestamp: The time and date at which the TCP connection was established.
  In/Out Octets: Counters that keep track of the number of input bytes received and output bytes sent for all VDP traffic on the connection.
  In/Out/Failed packet count: Counters for the total number of packets for all input, output, and dropped packets sent and received through the connection.
Registered Callbacks
  State Changed: Invoked when the state of the connection has changed.
  Protocol Error: Invoked following a packet read (vdpRead( )) or packet validate (vdpValidatePacketo) when the packet is either invalid, was received on the wrong segment, wrong direction, or out of order.
  System Error: Invoked when the send or recv socket calls return a system error that needs to be handled.
  Packet Received: Invoked when a packet has been received after it has been verified and validated as being correct.

In one embodiment, the I/O portion of this component may be separated from the connection so that the host can define the I/O routines desired to be used for packet reception and transmission.

In this embodiment, this abstraction may allow the host to define callbacks for reading, writing and buffer allocation that causes the operations to be performed on a file descriptor instead of the socket descriptors used by the connection component. When a connection component is assigned, and before the "Connection Established" callback, the default I/O routines and descriptors are set to the connection socket descriptor and socket recv/send functions. The I/O portion of this component (also called a ReaderWriter) may be responsible for managing the following fields:

I/O Descriptor: Any operating system I/O descriptor that can be used to read and write. This is used to do the actual read and write operations by the "vdpRead" and "vdpWrite" calls.
Buffer: Buffer that is used for all read and write operations. This is usually set by the return from the Allocate Buffer callback.
Buffer Length: Length of the buffer that is available for read and write operations. This is usually set by the return from the Allocate Buffer callback.
Registered Callbacks
  Read: Callback to use for all read base I/O operations.
  Write: Callback to use for all write-based I/O operations.
  Allocate Buffer: Invoked by the "vdpRead" and "vdpWrite" function to secure a valid buffer for use in the next read and write operation.

Error Management

In one embodiment, the VDP API manages errors consistent with the way that Linux system calls manage and report errors to the calling thread. Traditionally, when errors occur on Linux, the system call will record an error code in the "errno" global variable and then return an error via the system call return value that simply indicates success or failure. It is then up to the host thread that invoked the system call to look up the error using the "errno" variable. This variable is automatically kept in thread local storage and each thread has an independent copy of the variable. The Linux system currently reserves positive integers for the errno field.

In keeping with this model, in one embodiment, VDP API functions record their errors in the "errno" variable with a negative integer value. When a VDP API function returns, it similarly sets the error code in the "errno" variable and returns only an indication of success or failure.

In this embodiment, callbacks may optionally return similar indications of success or failure on a case by case basis. Callbacks will generally want to return some failure indication when they need the calling component to take some action in response to the callback invocation. Callback actions for various return values will be described in later sections. If the callback in question returns a type of int32_t and does not otherwise declare something, then it can be assumed that the callback is returning only a success or failure code. Callback error codes stored in the "errno" field should be kept logically separate from regular API errors codes.

In this embodiment, success may be denoted with the return of integer value "1" and failure is denoted with an integer value of "0." This may be done so the NOT Boolean operator can be applied to the return value to determine if success or failure occurred.

Hardware Architecture

In one embodiment, the security mechanism selected for providing VDP security may directly affect the VDP API. Ideally, the VDP API should be transparent of any SSL/TLS-based tunnel established between nodes. In the case, depending on the technology chosen, it may need to be integrated into the VDP API.

Interfaces

Structures

In one embodiment, exemplary structures used by this API may include:

| VDP API Structures | |
|---|---|
| Name | Purpose |
| Listener | Encapsulates all of the fields needed by the Listener component |
| Connection | Encapsulates all of the fields needed by a VDP connection |
| ReaderWriter | Encapsulates all of the fields needed to perform a Read or Write on a file descriptor |
| ConnectionCallbacks | Encapsulates all of the callbacks invoked during the normal operations of a connection |
| ConnectionStats | Encapsulates all of the statistics maintained for a connection |

In this embodiment, the Listener structure may include:

| VDP API Listener Structure | | |
|---|---|---|
| Field Name | Field Type | Purpose |
| socket | Socket Descriptor | Holds the socket descriptor for the listening socket connection |
| address | struct sockaddr_in | Local address/port that the Listener socket is bound to |
| state | VDPListenerStates | The current state of the Listener socket |
| allocateConnection | Callback | Invoked when a new connection structure is needed for a new incoming connection. |
| connectionEstablished | Callback | Invoked when a new connection has been established |
| listenerError | Callback | Invoked when the listen( ) or accept( ) socket calls return an error |

In this embodiment, the Connection structure may include:

| VDP API Connection Structure | | |
|---|---|---|
| Field Name | Field Type | Purpose |
| header | VDPHeader | VDP header structure used when receiving packets to peek the packet header data before pulling it off the socket buffer. |
| io | VDPReaderWriter | IO structure that contains all of the fields needed by vdpRead and vdpWrite to read and write VDP packets to and from an OS descriptor |
| remoteAddress | struct sockaddr_in | Socket address structure containing the address and port of the remote connecting client |
| state | VDPStates | The current state of the VDP connection |
| statistics | VDPConnectionStats | Structure containing all of the statistics of the connection object |
| callbacks | VDPConnectionCallbacks | Structure containing all of the callbacks used by the connection |

In this embodiment, the Reader Writer structure may include:

| VDP API readerWriter Structure | | |
|---|---|---|
| Field Name | Field Type | Purpose |
| descriptor | int32_t | Operating system descriptor to use for the IO operations. This could be a file, IPC, or socket descriptor. |
| buffer | void* | The buffer to use for the destination of read operations or the source of the send operation |
| length | int32_t | The length in bytes of the buffer field in this structure |
| read | Callback | Invoked when a read operation needs to be performed |
| write | Callback | Invoked when a write operation needs to be performed |
| allocatePacket | Callback | Invoked when the connection component needs a new packet buffer for an incoming packet. The connection component will provide the size buffer that is needed for the packet. |

In this embodiment, the ConnectionCallbacks structure may include:

| VDP API ConnectionCallbacks Structure | | |
|---|---|---|
| Field Name | Field Type | Purpose |
| stateChanged | int32_t | Invoked when the state of the connection has changed at any time |
| protocolError | void | Invoked when the connection received an invalid packet or an attempt was made to send an invalid packet |
| systemError | void | Invoked when a critical system call such as send or recv returns an error |
| packetRecieved | int32_t | Invoked when a valid packet has been received for processing |

In this embodiment, the ConnectionStats structure may include:

| VDP API ConnectionStats Structure | | |
|---|---|---|
| Field Name | Field Type | Purpose |
| connected | time_t | Timestamp for when the connection was made |
| inputPackets | uint32_t | Number of input packets received on the connection |
| outputPackets | uint32_t | Number of packets sent on the connection |
| ignoredPackets | uint32_t | Number of packets that were ignored or dropped |
| inputBytes | uint32_t | Number of bytes (from valid packets) received on the connection |
| outputBytes | uint32_t | Number of bytes (from valid packets) sent on the connection |

Functions

In this embodiment, there may be four basic function groups available to user of the VDP API:
Listener Functions
Connection Functions
Helper Functions.

In this embodiment, exemplary Listener functions may include:

| VDP API Listener Functions | |
|---|---|
| Function Name | Purpose |
| vdpCreateListener | Used to create a Listener component |
| vdpStartListener | Used to start a Listener component |
| vdpPauseListener | Used to pause a Listener component |
| vdpResumeListener | Used to resume a pause Listener component |
| vdpTerminateListener | Used to terminate a Listener component |

In this embodiment, exemplary Connection functions may include:

| VDP API Connection Functions | |
|---|---|
| Function Name | Purpose |
| vdpCreateConnection | Creates a client-based connection component |
| vdpRead | Reads a VDP packet from a I/O descriptor |
| vdpWrite | Writes a VDP packet to a I/o descriptor |
| vdpSendOOB | Sends a packet out-of-band |
| vdpReceivePackets | Main packet reception function. Blocks until the connection terminates. |
| vdpValidatePacket | Validates a VDP packet for content, state, and correctness |

| VDP API Connection Functions | |
|---|---|
| Function Name | Purpose |
| vdpShutdownConnection | Shuts down a VDP connection |
| vdpCreateHeader | Creates a VDP header using a passed buffer |

In this embodiment, exemplary Helper functions may include:

| (U) | |
|---|---|
| Function Name | Purpose |
| getInterfaceAddress | Returns the address of a passed interface name |
| getHostAddress | Returns the address of a passed hostname, local or otherwise |
| vdpPrintError | Generic function for printing VDP and system errors to stdout |
| vdpSetError | Sets "errno" a VDP specific error code |
| vdpChangeIO | Used to change the fields assigned to a ReaderWriter Structure |

Assured File Transfer (AFT)

In this embodiment, a purpose of the Assured File Transfer (AFT) Guard is to minimize risks introduced when a file passes between domains and to enforce the file transfer security policy of the site. The Guard may be located at the boundary point between the high-side domain and the low-side domain. When a user on either the high-side or a low-side wants to pass a file across domains, they may log into the Guard, upload their file and the Guard will either clean the document or reject it according to site policy,.

In this embodiment, during the content inspection process, if AFT finds content that is against site policy (i.e.: a specific file type not permitted) or if it can not determine the file type, the file may be rejected, and in the case of the high-side, the user is notified. Files that are permitted for submission may be checked by the AFT Clean processes.

In this embodiment, in the case of files submitted from high-to-low, the Clean processes within AFT can modify the submitted file to remove disallowed material. The modified file may then be presented back to the high-side user for review. If the high-side user determines the new file to be satisfactory, they can approve the file to continue processing. If they do not like the resulting file they can discontinue the process.

In one embodiment, AFT supports the option to include a Foreign Disclosure Officer (FDO) in the file transfer process. The FDO, for example, serves as the government release authority and many sites mandate a two-person release policy. Individuals may not disclose technical information without approval of the FDO. If configured to support an FDO review process, the FDO gets to review the modified file after it is approved by the high-side user. After reviewing the file, the FDO may either approve or disapprove of the transfer. If approved, the file is sent through a second part of the content examination process. If the file is disapproved by the FDO, the user will get notified and processing will terminate.

In this embodiment, if the high-side submitted file passes the final set of inspections (which may have a different security policy than the first set of inspection filters), the file may be sent to a low-side repository where it will be picked up by a registered low-side user.

In this embodiment, the AFT process to support low-side user submitted files may not be exactly the same process as from high-to-low. Low-side users are preferably not, at any point, given the chance to review after the first cleaning process. Files can be sent through both sets of inspection engines. If the files fail, the low-side user is notified that it failed but without reasons on why it failed. If the file is successful in passing the Guard filters, notification is sent to the high-side user whom the file is being sent to, where they can then log in a download the file unto their local computer.

General Functionality

In one embodiment, AFT provides user on both sides of the security boundary the ability to send and receive files to and from either designated users or user groups. To ensure the AFT is providing proper security checks and to maintain a record of security related activities, a robust audit system may be provided. In the transfer process described above, user and release authority actions may be recorded and stored in a fashion that preferably does not allow for user intervention.

In one embodiment of the AFT system, users do not push data into the other security domain, they transfer files into a protected repository where authorized users can retrieve them once they properly authenticate to the Guard. Transfers can be initiated by authorized users and can only send files to authorized users or user groups.

In this embodiment, files may be comprised of data in a number of formats. The AFT content inspection processes examine the files in a fashion dependant upon the file types. The AFT inspection processes may not address all known file types and those files that contain data in a format not addressed by an inspection process are preferably not transferred.

System Architecture

Figure 28:
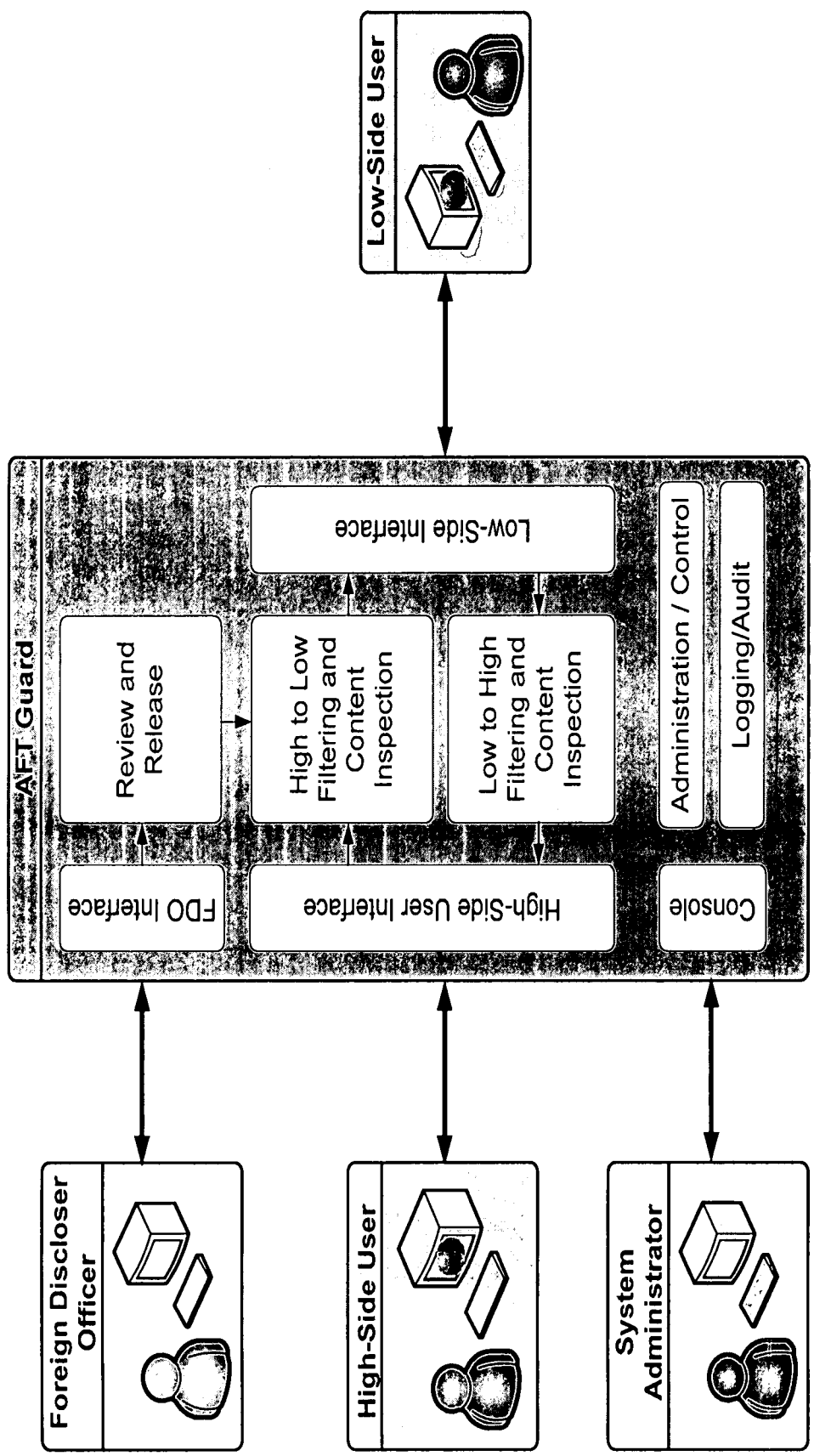
FIG. 28 shows an example of AFT high-level design.

In this embodiment, a high-level functional diagram of AFT and examples of the various people that use AFT is shown in FIG. 28.

In this embodiment, FIG. 28 illustrates four types of interactive AFT users; high-side users submitting and retrieving files, Foreign Disclosure Officers approving file transfers, low-side users submitting and retrieving files and systems administrators.

In this embodiment, AFT interfaces may be web-based. This allows maximum interoperability with end user workstations. Each interface may be logically separated within AFT to provide security separation. The processes that perform the actual content inspection may also be logically separated between the directions of the file flows.

In this embodiment, system administration may be done via a directly attached console port. The system administrators configure user accounts, inspection filter settings and lists, audit accounts and perform periodic maintenance on the systems. For security reasons, it is preferably to not have support for remote administration.

Figures 1, 29:
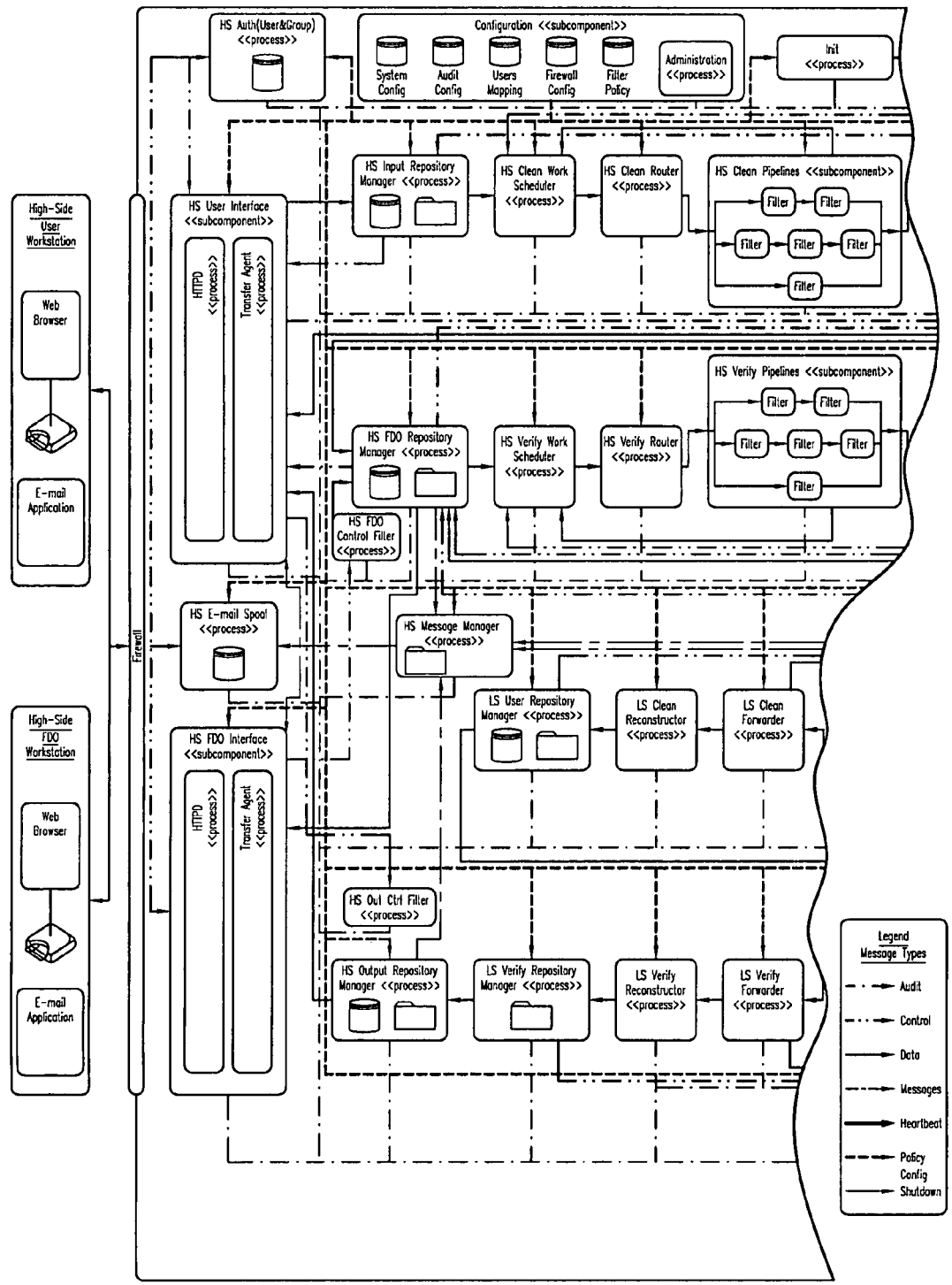
FIG. 29 shows an example of AFT low-level design.
Figures 2, 29:
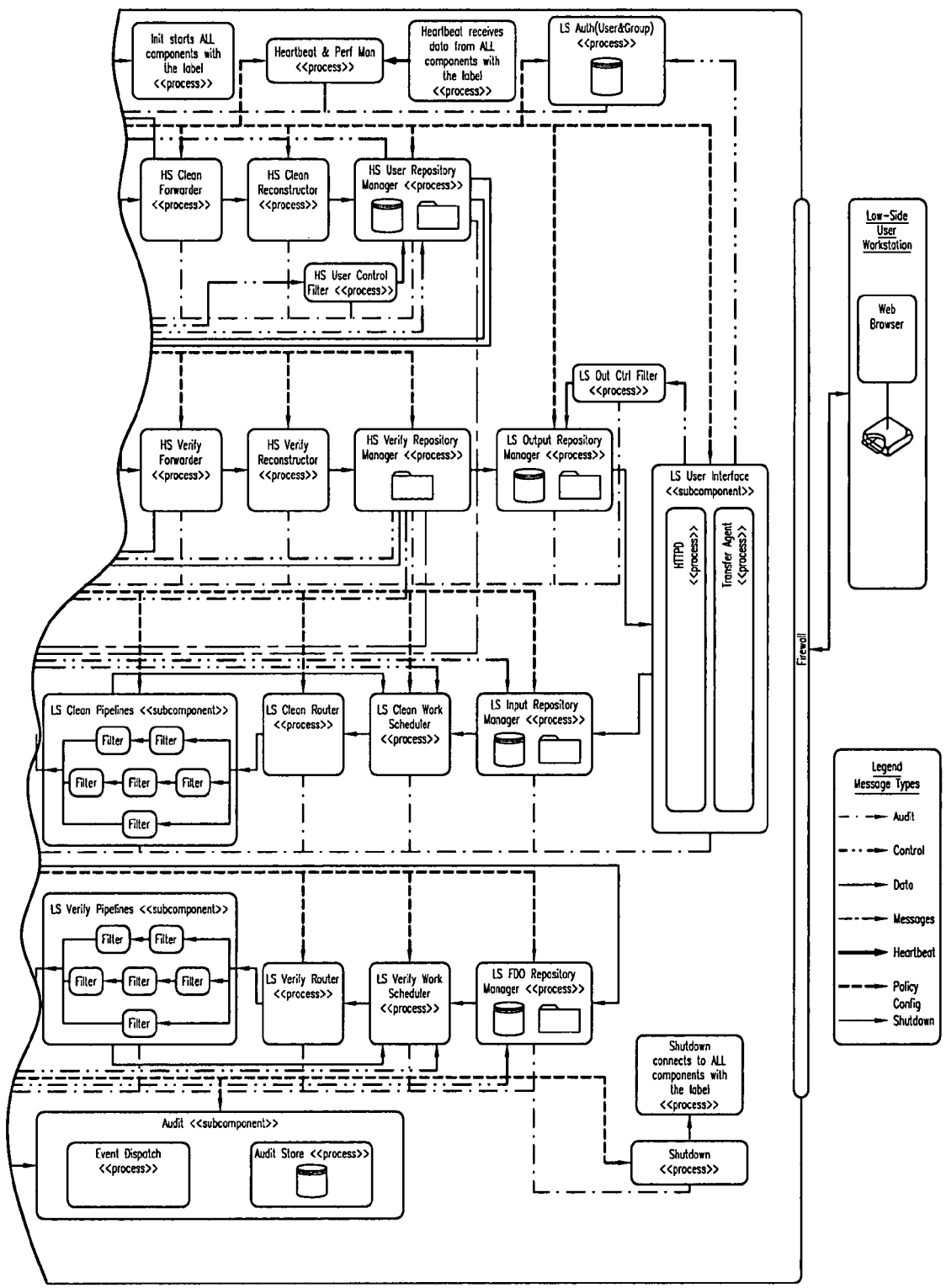

In this embodiment, FIG. 29 shows more details of an example of the AFT low-level architecture. The Guard may include many interconnected components and subcomponents. Each box in FIG. 29 may be a separate process that is controlled by the operating system. Strict enforcement by the operating system may limit the actions of each process. This enforcement creates a defense in depth mechanism to anyone looking to subvert the system.

Figure 30:
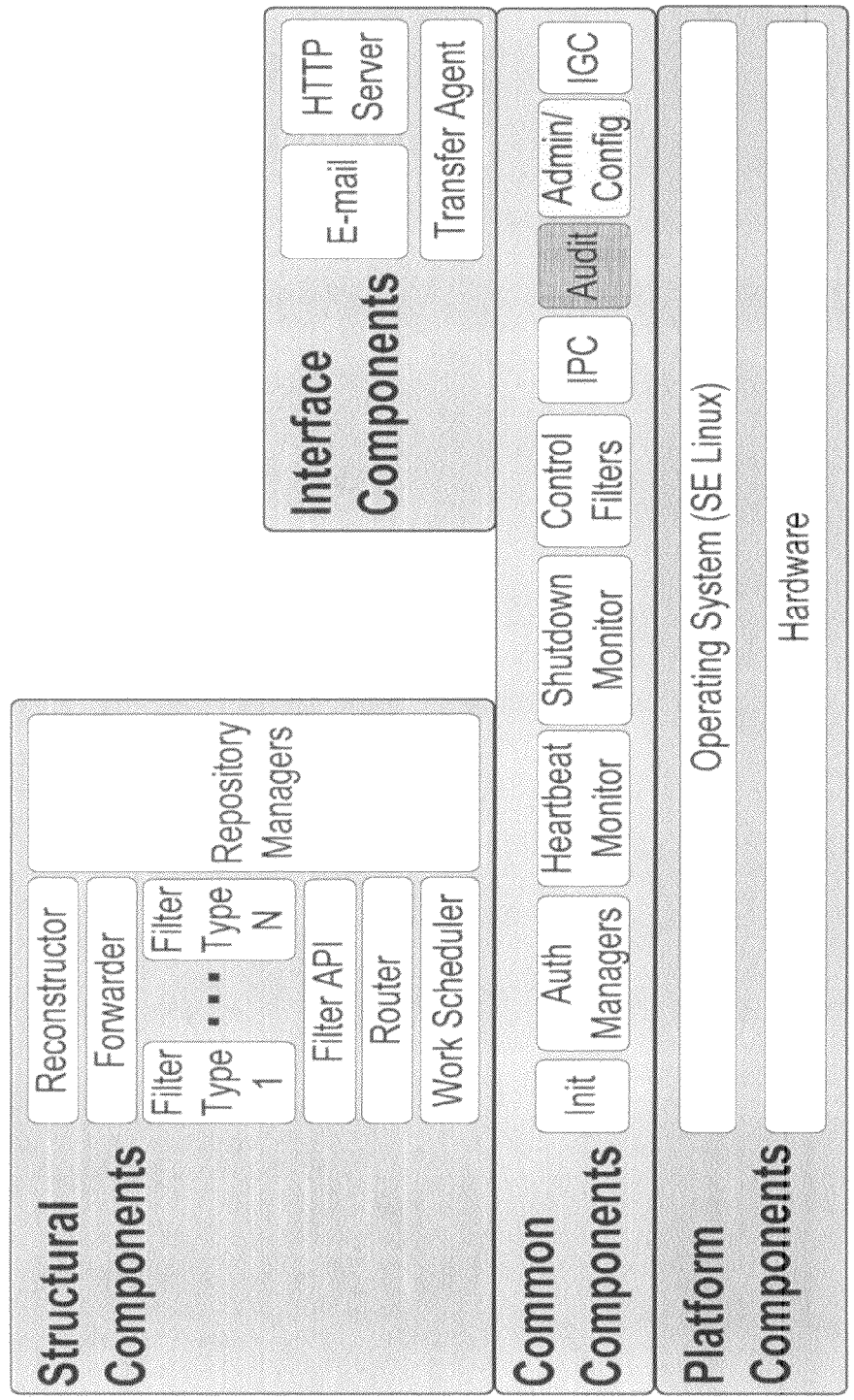
FIG. 30 shows an example of AFT logical design.

In this embodiment, to simplify discussion, the overall architecture has been broken down into four major components. The relationships of these components are shown, for example, in FIG. 30.

In this embodiment, the Platform Components describe the base functions of the AFT system. These may include:
Hardware
Operating System
  SELinux Security Policy (not shown)

In this embodiment, the next layer that utilizes the Platform Components are the Common Components. These components provide functions that support the initialization, communication and monitoring of the filtering processes. Processes that may be included as part of the Common Components are:
System Initialization Process (labeled "Init")
Authentication Managers
Heartbeat Monitor
Shutdown Monitor
Control Filters
Inter-Process Communication mechanisms (labeled "IGC")
Audit and Event Management
Performance Monitor
Administration and Configuration
Inter-Guard Communication (labeled "IGC")

In this embodiment, Structural Components perform the operations necessary to support recursive file filtering. The processes that may be included in this section are:
Work Scheduler
Router (for user submitted jobs)
A generic Filter Application Programming Interface (API)
Various Filter Pipelines for specific file types
Forwarder
Reconstructor
Repository Managers In this embodiment, the Interface Component handles communications with end users, FDOs and system administrators. It may include:
Hyper-Text Transport Protocol (HTTP) Server
User Interfaces
  High-Side User Interface
  Low-Side User Interface
  FDO User Interface
Transfer Agent
E-mail Server In this embodiment, the processing and data storage requirements for AFT may be different from those in CAB. While CAB is concerned with low-latency, small-packet sessions, AFT is more concerned with large file processing and file duplication. The storage subsystem for AFT may be developed with future inter-guard communication.

Processor Support

In this embodiment, AFT may use the same central processing unit (CPU) architecture as CAB, for example, AMD64/EM64T. AFT may also be based on a 64-bit kernel and where not constrained by third-party products, 64-bit applications. The primary advantage of 64-bit is the size of memory that is supported and the efficiency with which the memory can be accessed. 32-bit has a 4 GB limit after which memory segment registers are manipulated to address additional "chunks" of 4 GB.)

Network Interfaces

In this embodiment, the guard may need multiple network interfaces to support the user, security and availability requirements. These network interfaces may include to the:
High side network
Low side network
iSCSI network
iSCSI network for redundancy, if desired Network for intra-guard communication; could be combined with one if needed.

Disk Storage Subsystem

In this embodiment, AFT preferably handles large files, which, in one embodiment, may be up to 512 M, handle files from a large number of users (e.g., up to 20,000 in one embodiment), and preferably retain the processed files for weeks. AFT may be preferably scalable to support up to 3,000 simultaneous users, which, in one embodiment, may dictate that multiple guards will be needed and each of the guards will need to access the retained data. Examples for the disk storage subsystem include Direct Attach Storage (DAS), Network Attached Storage (NAS), and Storage Attached Network (SAN). SAN has the advantages of being easily expanded, easily shared by multiple guards, and is simpler than NAS. Therefore, in one embodiment, the preferable storage subsystem for AFT may be a SAN device. The method by which the SAN is managed may be determined by the hardware vendor selected. RAID arrays normally provide a GUI interface for configuring and monitoring the array. The GUI may provide facilities to define virtual volumes, modify volume size, define RAID levels, view status, and perform recovery operations. Some RAID arrays also provide an e-mail notification facility.

Multi-tiered Storage Subsystem

In one embodiment, use of a multi-tiered storage subsystem allows the selection of a much less expensive SAN architecture without significant performance impact. The "fast" tier of the storage subsystem may be high-speed (e.g., SCSI) DAS that is not shared between guards. In general, DAS may be used for the file systems used by the filters and SAN may be used for file systems associated with the repositories (High-Side Out, Low-Side Out, User R&R, FDO R&R), configuration files, and system files that will be shared between guards. In Linux, a storage device may be used by defining a file system on the device and then mounting the file system. Applications access the file system by the name with which it was mounted and do not need to know on which device(s) the file system resides. Since the application is not aware of which device the file system resides or on which tier the device resides, the tier on which files reside is transparent to the applications. Movement of the data between tiers is accomplished automatically as files are copied from one directory to another.

Storage Capacities

In one embodiment, the directories used by the filter and verify processes are not used for long-term retention of data, but are used while the data is actively being worked on. These directories may be referred to as "work" directories. Internal DAS (i.e.: hard drive) on each guard may be used for the "work" directories. Since the data may be read/written many times during processing in the clean and verify processes, these directories preferably have high throughput. Each guard preferably has a minimum 500 GB (effective capacity) of high-speed internal disk storage.

In one embodiment, a SAN with 6 TB to 8 TB effective capacity would be sufficient for most envisioned scenarios.

Connections

In this embodiment, examples of technologies for connecting the SAN to the AFT are Fiber Channel (FC) and Internet SCSI (iSCSI). FC has traditionally been used in high-end networks where reliability and performance concerns override the relatively higher cost. iSCSI is a newer technology that takes advantage of the riding over existing IP networks at the loss of some throughput. However, since GB Ethernet has become a commodity and with the emergence of 4 GB and 10 GB Ethernet, an iSCSI connection need not be slower than either 1 GB or 2 GB FC.

One of the disadvantages of iSCSI has been the additional load imposed on the host to process the IP packaging of the data. There are currently available iSCSI HBAs that offload the processing from the host. iSCSI HBAs may cost approximately 50 percent of the cost of an FC HBA. Either technology will preferably include a switch for connecting multiple hosts. To eliminate the switch as a single point of failure, dual paths with independent switches should preferably be used. An Ethernet switch may be approximately half the cost of an FC switch of similar capabilities.

Storage Array

In one embodiment, the SAN device can be a JBOD or RAID array. The advantages of using a JBOD array are lower cost as there is no "intelligence" in the array. Each disk may be exposed to the host as an independent volume. With a JBOD array, it may be necessary to use a Logical Volume Manager (LVM) to treat multiple disks as a logical unit, perform mirroring, stripping, parity generation, logical volume expansion, etc. With a RAID array, the array itself has the ability to perform these functions. The overhead on the host to perform mirroring, stripping, and volume expansion is relatively low. However, the overhead to do RAID 5 on the host may be significant both in the effect on host CPU utilization and throughput. In a multi-guard environment, the use of an LVM may require that the LVM configuration information be coordinated among the hosts, whereas on the RAID array the configuration information is in the array. For performance and operational ease, the RAID array is the preferred solution.

Most RAID arrays provide a Web or GUI interface for configuration and status information. Some also provide the capability of e-mail alerts for status/problem notification.

Disk Type

In one embodiment, the selection of the types of disk drives, SSD, SCSI or SATA II, may be primarily a matter of cost. SSD could provide higher performance than is needed at a prohibitive cost. SATA II drives are normally slower than SCSI drives (7200 RPM vs. 10000 RPM), are less reliable than SCSI drivers, and implement a less complete command set. SATA II drives are less expensive and tend to have a higher capacity. Since file access will be largely sequential rather than random, the slower seek time of the SATA drives is less important due to the operating system read-ahead support. The lower reliability of SATA drives can be offset by using mirroring or parity, which would be used even if SCSI drives are selected.

For the DAS subsystem, performance may be a very high priority. In one embodiment, it is on the DAS that the files will be copied multiple times as they move between processes. There is no requirement that the type of disk drive used in the SAN be the same type as those used for DAS.

Cryptographic Accelerator

In this embodiment, since the interfaces to AFT may be Web-based, the requirement for 3,000 simultaneous user sessions might put a burden on the AFT HTTP server.

In one embodiment, the AFT system uses Transport Layer Security (TLS) to provide confidentiality, integrity, and authentication services between users and the Guard. Under the expected network loads, the Guard is responsible for communicating across a large number of encrypted links. Given that asymmetric cryptography is an computer intensive operation and that numerous symmetric cryptographic operations would further burden the Guard CPU(s), the AFT Guard may employ specially designed cryptographic accelerator cards to free up core Guard processing for its core function, file inspection.

In this embodiment, the Guard may have separate interface processes for the high- and low-side user and FDO roles because each process preferably has its own cryptographic accelerator. Additionally, the different security domains of the connected networks dictate that it is preferably that no single process is permitted to communicate with more than one interface.

The AFT system may leverage the research performed on the CAB project, discussed above, by using, for example, the same nShield accelerator cards manufactured by nCipher. Because of the increased data transfer requirements of AFT, it may be necessary to substitute a higher performance card from the same family Time Synchronization In one embodiment, the guard requires access to a timeserver to ensure that the clocks between guards and between nodes within a guard are synchronized. Guard clocks may be synchronized using NTP. Each guard node will preferably access an NTP master of stratum I clock from the high side network.

Operating System

In this embodiment, the operating system (OS) is the system software responsible for controlling and managing hardware and basic system operations. In a self-protecting application such as the AFT guard, the OS may secure the flow of information and enforces the separation of sensitive data. In one embodiment, the AFT OS is based on the RedHat Enterprise Linux 4 Advanced Server (RHEL 4 AS), customized to remove all unneeded packages to eliminate excess code that might be vulnerable to exploits that yield unauthorized access to the system. RHEL 4 also includes Security Enhanced Linux (SELinux) facilities that separate guard components into security domains, and enforces mandatory access control (MAC) over the interactions between the domains. Access controls may be encoded in the SELinux type-enforcement policy, which embodies the architectural design of the system. The components and data flows reflected throughout the AFT architecture were specifically designed to fit well into a SELinux security policy.

In this embodiment, the OS component may also include the iptables firewall software that helps secure the system's network interfaces. Iptables provides the first line of defense against unauthorized access by restricting access to specific, approved network resources. It inspects network traffic as it comes off the wire, before it reaches the internal components, and accepts or rejects it based on a rule set that describes which traffic is or is not permitted. It can base its decision on Internet Protocol (IP) address, port, protocol, network interface, and traffic direction. It is configured to allow only encrypted connections with authenticated client machines. Any other connection attempts are logged and dropped.

Security Enhanced Linux

In this embodiment, RHEL 4 also includes Security Enhanced Linux (SELinux) facilities that separate guard components into security domains, and enforces mandatory access control over the interactions between the domains. With SELinux, root functionality is split into roles. Mandatory access control separates permissions for users, programs, processes, files, and devices. Specific applications are granted only the permissions they need to function. All access controls are encoded in the SELinux type-enforcement policy, which embodies the architectural design of the system. The components and data flows reflected throughout the AFT architecture were specifically designed to fit well into a SELinux security policy.

Firewall

In this embodiment, the OS component also includes the iptables' firewall software that helps secure the system's network interfaces. Iptables provides the first line of defense against unauthorized access by restricting access to specific, approved network resources. It inspects network traffic as it comes off the wire, before it reaches the internal components, and accepts or rejects it based on a rule set that describes which traffic is or is not permitted. It can base its decision on Internet Protocol (IP) address, port, protocol, network interface, and traffic direction. It is configured to allow only encrypted connections with authenticated client machines. Any other connection attempts are logged and dropped.

Network Time Protocol

The Network Time Protocol (NTP) is used widely on the Internet to synchronize computer time to a common clock. In this embodiment, in AFT, NTP is preferred to provide accurate time stamps on audit logs, across processes and across multiple guards in larger configurations. NTP provides comprehensive mechanisms to access national time services, time distribution by means of a local subnet and adjust the local clock in each participating node. NTP provides accuracies of 1-25 ms, depending on the characteristics of the synchronization source and network paths. NTP may be provided by the sites high side network.

File System

In this embodiment, for file systems on the SAN that will be shared R/W by multiple nodes, the standard Linux ext2 and ext3 file systems are insufficient. Without a file system that is designed to be write-shared by multiple hosts, the file system and the data in it would soon be destroyed. It is therefore preferably run a Cluster File System (CFS). Exemplary CFSs include GFS, Lustre, PVFS2, IBM's GPFS, and SGI's CXFS. Lustre may not be preferably because it only supports object-oriented devices. PVFS2 support for extended attributes is still under development and it is not POSIX-compliant, therefore it is not a preferably alternative. From a security perspective, a CFS that supports security xattrs is preferred to the context-mount labeling alternative.

Cluster Management Software

In this embodiment, GFS requires the cluster manager and a global lock manager available in the RedHat Cluster Package that comes with GFS. The cluster manager has the capability to provide a High Availability (HA) cluster, primarily through application failover in the event of a node failure. Since all nodes in the guard cluster may be running the same application, this feature is not very useful. However, the cluster management software is used in conjunction with GFS to monitor node health and fence failing nodes to prevent corruption of the file system.

Logical Volume Manager

In this embodiment, the Logical Volume Manager (LVM) is software that supports virtualization of disks. For example, using LVM, the user can define a logical volume that spans multiple physical disks so that a file system can be larger than any available physical disk, is stripped for increased performance, is mirrored for redundancy, etc. LVM can also be used to create multiple logical volumes on a single disk so that file systems can be smaller than the physical unit size. If the selected hardware for the SAN is a simple JBOD, LVM may be used to manage the storage on the SAN.

Directory Structure

In this embodiment, the AFT directory structure may be designed to maximize file-system sharing between multiple Guards. This simplifies system administration and Inter-Guard Communications (IGC). Towards that end, the Guards may use a custom kernel that allows them to mount their root partitions from the SAN during normal operation.

In one embodiment, the kernel, some configuration files, all temporary files, and system log files preferably reside on the local disk. In addition, an alternate boot option allows a minimal system to be loaded entirely from the local disk for low-level maintenance or troubleshooting tasks that require it. Therefore, the local disk may use the standard Linux directory structure. Shared configuration files, executables, databases, file repositories, and log files may be stored in similar directories on the SAN to meet disk space requirements, ease system administration, or facilitate IGC.

System-Specific Files

In one embodiment, system-specific configuration files in/etc are symbolically linked to a mount point on the local disk. These symbolic links are present on both the local and SAN-mounted root partitions so that boot, maintenance and normal processing can access the correct files for each individual guard system.

In this embodiment, each guard platform preferably requires its own set of OS kernel, configuration, temporary and log files. These files may reside in internal disk storage within each guard platform. These files are few in number, and some will be symbolically linked to locations outside the root (/) partition mounted from the SAN.

Kernel

In this embodiment, the kernel and modules required to initiate a boot sequence may be stored locally in the/boot partition of each Guard system.

Configuration Files

In this embodiment, the system configuration files in the/etc directory that are preferably unique between multiple Guards (i.e., be shared between them) are the/etc/sysconfig subdirectory. This subdirectory is symbolically linked to the/loc/sysconfig subdirectory. This allows the/etc directory to be mounted via the SAN without overlaying configuration files that must remain unique to each guard. These files set the system hostname and IP addresses.

Temporary Files

In one embodiment, temporary files reside on the local disk. The/tmp directory is always mounted locally, so temporary files created there are of no concern. The/var directory is mounted via the SAN, so temporary files created therein require symbolic links. Those files always reside in the/var/lock, Ivar/run and/var/tmp subdirectories, so they are symbolically linked to/loc/lock,/loc/run, and/loc/tmp, respectively, to ensure each system's temporary files do not collide when/var is mounted via the SAN.

Log Files

In this embodiment, system log files may reside in/var/log. It is symbolically linked to/loc/log so each system's logs don't collide when/var is mounted via the SAN.

Design Decisions

In this embodiment, security may be the most important aspect of the operating system subcomponent because the operating system allocates and controls resources. A failure in the operating system could violate the integrity of the AFT security model, resulting in contamination or unauthorized disclosure of data. Because of the AFT system processes' highly sensitive data, when unexpected behavior occurs, the system enters maintenance mode so that the system can be verified. Once an administrator has corrected any problems and verified system integrity, AFT can resume production mode. Maintenance mode is explained later.

Decision to Develop or Reuse

In this embodiment, AFT reuses operating system components developed for the CAB CDS wherever possible. In particular, the CAB startup and shutdown scripts and can be reused almost verbatim. Portions of the SELinux policy pertaining to startup and shutdown should be reusable. The firewall rules can be modified for the AFT interfaces. The RPM specification files can be modified to build AFT packages. Other OS-related objects will most likely be developed from scratch because of the differences between the CAB and AFT internal components.

Interface Related Design Decisions

In this embodiment, to function correctly, the AFT components may depend on services provided by the operating system, such as domain separation and control over data flows. In addition, AFT uses the operating system's boot and initialization procedure to start the AFT Initialization process, which in turn starts the various Guard components. When the AFT system shuts down or transitions into maintenance mode the AFT shutdown process must invoke the operating system's power management subsystem to enable the machine to physically turn off or reboot.

Performance Related Design Decisions

In one embodiment, the customized version of RHEL 4 AS built for AFT is a stripped down version, containing the minimum set of packages and processes. In addition to providing security, it improves performance. The AFT operating system may also use a standard SELinux kernel, performance-tuned for the AFT system.

Safety, Security, and Privacy Design Decisions

In this embodiment, RHEL 4 AS with SELinux may be the primary mechanism for enforcing separation of system objects into protected domains, thereby providing safety, security, and privacy. Objects in one domain can preferably only access objects in another domain if they are explicitly permitted to do so. Therefore, information preferably cannot be transferred between domains except through well-known mechanisms specified in the system's policy.

Installation Considerations

In one embodiment, the installation process may use a modified Red Hat Kickstart script. After the system has been installed, a hardening script may execute. The script may address the specific Guard needs.

Flexibility, Availability, and Maintainability Design Decisions

In this embodiment, in order for the system to be maintainable there preferably is a mechanism for installing and updating the packages on the system. For example, RHEL 4 AS uses the RPM package management system for maintaining groups of files on the system. RPM on the AFT system can preferably only be accessed by a system administrator in the AFT maintenance mode policy, described below.

Common Components

Overview

In this embodiment, the Common Components support the initialization, communication, monitoring and overall health of the AFT platform and its various filtering processes. Collectively, they provide the framework for the AFT system.

INIT

In one embodiment, the System Initialization component (also referred to as the AFTInit process) works with the system monitoring components (heartbeat monitor, performance monitor, and shutdown monitor) to establish, maintain, and monitor the state of the guard system components. The System Initialization component may consist of system integrity checks, file integrity checks, and the startup sequence.

In this embodiment, the Initialization subcomponent is charged with verifying that the system is in a trusted state before activating the AFT components. If the system detects an anomaly such as a file that fails an integrity check, the system preferably immediately stops initialization. In this event, initialization halts all processing and then puts the system into a maintenance mode or completely shuts the system off by powering it down. Because an anomaly of this sort should never occur while the system is booting, there is no attempt to automatically repair or recover the process or file. Such recoveries, if necessary, must be performed manually by an administrator.

In one embodiment, the AFTInit process subcomponent is the first AFT subcomponent to start during system boot. Its tasks include verifying integrity by checking the signatures of all AFT-related files in the system, verifying that/dev contains only the device files needed by AFT, and verifying that only necessary processes are running in the system. If any of the verification tasks return a failure error code or detect an anomaly, AFTInit notifies Audit (if available, otherwise, it logs to a file) and shuts the system down. Once the integrity checks have verified that the system is in a trusted state, it is safe to start up the remainder of the AFT processes. Each AFT process is executed by AFTInit, thereby causing an SELinux domain transition for each process into its own domain. When all AFT processes have been started successfully, the AFTInit process uses the shared Wire Protocol to send the shutdown monitor the process IDs of the processes that it has initialized. Once AFTInit has delivered the process IDs, it has completed all of its responsibilities and exits leaving the heartbeat monitor, performance monitor, and shutdown monitor to monitor system health.

In one embodiment, the file integrity verification mechanism used by AFT is supplied by the open-source file integrity tool, Samhain.

In one embodiment, AFTInit initializes the guard processes in the following order:
Samhain and other Integrity Checks
Heartbeat Monitor
Audit Subsystem
Shutdown Monitor
Performance Monitor
Review and Release Processes (High-Side User, FDO, Verify)
Clean Filters
Verify Filters
High/Low User Mapper
Transfer Agents (High-Side User, FDO, Low-Side User)
Interfaces (High-Side User, FDO, Low-Side User)

In this embodiment, as an implementation point, because the AFTInit child processes preferably remain functioning after their parent process exits, each AFT process preferably becomes a daemon. This may be achieved, for example, as follows:
Call fork( ) and have the parent exit( ). This ends the process from AFTInit's perspective, and ensures the child (daemon) is not the process group leader as required for the setsid( ) call done next.
Call setsid( ) so the child, among other things, becomes the leader of a new process group and has no controlling terminal that might send it signals.
Change the current working directory to the root directory so that the daemon process will not prevent a mounted file system from being unmounted if needed.
Set the file mode creation mask to something appropriate for the new daemon process, so that it doesn't depend on the inherited mask.
Close unneeded file descriptors so the daemon doesn't hold inherited open file handles.

Performance-Related Design Decisions

In this embodiment, the operating system and environment subcomponents are preferably designed to be as efficient as possible. However, security may be a greater concern and many of the elements only run during start up and shut down, making performance less critical. The file integrity check, for example, verifies that critical system files have not been tampered with by computing a cryptographic checksum—a somewhat resource-intensive operation. Because the file integrity check only runs at startup, performance is not a critical concern.

Security Design Decisions

In this embodiment, establishing and verifying a secure, known system state is the main goal of the System Initialization subcomponent. Because the initialization process includes the invocation and coordination of most of the AFT subcomponents, it preferably has a higher privilege of most processes. In one embodiment, the principle of simplicity, as applies to AFT, dictates that the most privileged components should be the simplest. Therefore, initialization may be decomposed into several pieces to reduce complexity.

In this embodiment, the decomposition may consist of creating multiple small initialization elements and assigning each one the absolute minimum of privileges needed and by limiting communication with other components using the underlying SELinux security policy. For example, the file integrity checks needs to read files spanning multiple security domains, and therefore execute in a separate domain from the AFTInit process from which they are invoked. The domain in which the AFTInit process executes does not require all of the privileges required by the file integrity checks; rather, the integrity checks perform domain transfers upon execution, and complete their execution with the appropriate privileges.

Inter-Process Communication

In one embodiment, the purpose of the AFT Inter Process Communication (IPC) Component is to create standard mechanisms for communication between processes and threads. AFT IPC may be comprised of two subcomponents:
CAB IPC
AFT Queues In this embodiment, most inter-process communication will occur using CAB IPC; AFT queues are used where additional functionality is required.

Decision to Develop or Reuse

In this embodiment, the CAB IPC component may be reused by AFT. For details on the CAB IPC component, see above discussion under CAB. AFT queues may be new development as the needed functionality may not exist with CAB IPC.

Interface-Related Design Decisions

In one embodiment, AFT queues will have the following characteristics:
1. Be file-system resident to facilitate sharing of queues between guard nodes.
2. A read on the queue always returns the oldest message of the highest priority.
3. Is message-based.
4. Updates to the queue are granular from the perspective of readers/writers.
5. Whether to block or not is a reader/writer option.
6. Able to provide the number of messages in the queue.
7. Support multiple readers and writers.

In this embodiment, items 1, 2, 6, and 7 are characteristics that differentiate CAB and AFT message queues. Item 1 may be required to allow sharing of the message queue between multiple guard nodes to facilitate load balancing. Item 2 may be needed to allow prioritization of messages, rather than a strict FIFO implementation as performed by CAB IPC. Item 7, in conjunction with item 1, may be used for load balancing and distribution of work between guard nodes (CAB IPC supports multiple writers/single reader). Item 6 may be a "nice-to-have" feature to allow components to control workloads and for performance monitoring, but may not be available for readers and writers because of domain separation considerations.

Performance-Related Design Decisions

In this embodiment, AFT queues may not have the severe latency requirements of the CAB IPC. Using memory-mapped files for the queues may provide enhanced performance.

Security Design Decisions

In this embodiment, the files associated with the AFT queues may be in directories protected by SELinux policy to ensure that only the appropriate processes can read/write into/from the message queue. High-to-low, and low-to-high queues may have different security context even when accessed by "similar" components. For example, the message queue between the input repository manager and the first stage of clean is different for high to low and low to high and has a different security context.

Authentication

In one embodiment, AFT supports both weak and strong authentication. Weak authentication occurs in two phases. First, the Guard authenticates itself to the Client during TLS session establishment, using certificate-based mechanisms provided by the organizational Public Key Infrastructure (PKI). Second, the user authenticates to the Guard with a username and password after TLS session establishment has completed. The two phases may be handled by the HTTP server and Transfer Agent components, respectively. Weak authentication is so-named because a Man in the Middle (MITM) attack is possible when the TLS session is established before both entities have authenticated.

In this embodiment, strong authentication preferably occurs only during TLS session establishment. Both the Guard and the User authenticate using certificates provided by the site's organizational PKI. Strong authentication is so-named because it prevents MITM attacks by completing authentication as part of TLS session establishment. If a PKI is not present, weak authentication may be used, in accordance with the accreditation guidance.

In this embodiment, the Guard Authentication subsystem may consist of three subcomponents: the High-Side Authentication subcomponent, the Low-Side Authentication subcomponent and the High/Low Authentication Mapper. The High- and Low-Side Authentication subcomponents may be identical in function, but access different databases associated with the respective user communities. The High/Low Authentication Mapper hides high-side user identities from low-side users.

In this embodiment, these components may be assisted by a cryptographic accelerator card. This hardware component allows the applications to offload most of their authentication and encryption tasks.

High-Side and Low-Side Authentication

In one embodiment, the High-Side Authentication subcomponent is a daemon that processes weak and strong authentication requests, password change requests, and user profile information requests from the High-Side User and FDO Interfaces. The Interface subcomponents communicate with it via separate IPC channels for the different request types. This simplifies the design by eliminating the need to delineate between message types for each request type. Dedicated thread pools in the Authentication daemon "listen" for requests on each IPC channel.

Weak Authentication

In one embodiment, for weak authentication, the Interface Transfer Agent subcomponent presents username and password credentials via the weak authentication IPC channel, and the Authentication component sends a response on the same channel indicating whether the credentials are valid. The following response types are possible, which enables the Transfer Agent to tailor its response to the user appropriately.

Credentials are valid (password matches that of the specified username)

Credentials are invalid (password does not match that of the specified username)

Credentials are expired (password is correct but requires updating)

Strong Authentication

In one embodiment, for strong authentication, the Interface HTTP Server presents a Public-Key Cryptography Standard (PKCS) message for validation against the user's certificate. The HTTP Server is the operative Interface subcomponent, not the Transfer Agent, because strong authentication is performed as part of TLS session establishment. In one embodiment, user certificates are preferably stored on the Guard. The HTTP Server sends the request via the strong authentication IPC channel, and the Authentication component sends a response on the same channel. Possible responses include:

Credentials are valid (message validated successfully against the user's certificate)

Credentials are invalid (message did not validate against the user's certificate)

Password Change

In this embodiment, weak authentication passwords may be changed via the associated IPC channel. The Interface Transfer Agent presents the username, current password, and new password on the channel, and the Authentication component responds on the same channel to indicate whether the request was successful. Response types that are possible, enabling the Transfer Agent to tailor its response to the user appropriately, include:

Credentials were successfully updated

Credentials are invalid (current password did not match that of the specified username)

New password is unacceptable (new password did not meet site password policy rules)

User Profile Information

In one embodiment, the High-Side Authentication daemon also processes requests for user profile information from the High-Side User and FDO Interfaces. Specifically, the Interface Transfer Agent subcomponents present a username on the user profile IPC channel, and the Authentication component sends the associated profile data on the same channel. This data includes the following items:

Group memberships (HS and LS User Interfaces)

Allowed recipients (HS and LS User Interfaces)

Assigned FDO (HS User Interface)

Assigned users (HS FDO Interface)

User interface preferences

High/Low Authentication Mapper

In this embodiment, the High/Low User Mapper subcomponent enables a non-attributable relationship between high-side and low-side user identities. It may be implemented as a database that maps the high-side user IDs to low-side user IDs. For each high-side user ID number, there may be a one-to-one mapping to a distinct low-side user ID number.

The Mapper, therefore, allows high and low Authentication subcomponents to translate from high-side- to low-side user identity.

In one embodiment, for high-to-low transfers, senders' high-side user IDs are mapped to their low-side user IDs so low-side recipients cannot discover high-side IDs when files are delivered. For low-to-high transfers, recipients' low-side user IDs are mapped to their high-side user IDs so low-side senders don't need to know high-side IDs to send files.

Design Decisions

In this embodiment, user authentication to the Guard is preferred to ensure that only authorized users can use the AFT system. Furthermore, confidentiality services are preferred to protect session traffic from eavesdropping. To address these issues, AFT may use TLS to authenticate the network ends and encrypt their traffic. Weak authentication requires a two-phased process in which the TLS session is established before the user presents username and password credentials. The individual phases are implemented via the HTTP Server and Transfer Agent components, which communicate with the High-Side User, High-Side FDO, and Low-Side User Authentication components. For strong authentication, all authentications are accomplished during TLS session establishment via the HTTP Server components, which communicate with the same Authentication components.

In this embodiment, TLS provides confidentiality services for session traffic and weak authentication by encrypting all network traffic. The encryption algorithms are implemented through dedicated cryptographic accelerator cards on the Guard.

Interface-Related Design Decisions

In one embodiment, the Authentication components communicate with other components via a dedicated, asynchronous IPC mechanism, keeping with the overall Security Policy. The IPC mechanism may be reused from the CAB project.

In this embodiment, the Authentication subsystem may use Certicom APIs to communicate with the nShield crypto accelerator cards manufactured by nCipher.

Performance Performance-Related Design Decisions

In this embodiment, TLS authentication uses asymmetric cryptography operations that are computationally intensive, and performing such computations in software puts an excessive burden on the Guard CPUs. TLS encryption uses efficient, symmetric cryptography, but it is used for all connections into and out of the Guard, including those for file transfers. Given the volume of data being encrypted, it is preferable to have optimized hardware perform the cryptography. As is common practice in high-load network servers, AFT is designed to take advantage of specialized cryptographic hardware.

Database Design Decisions

In one embodiment, the Authentication subsystem maintains certificates, user IDs, passwords, user settings, and user preferences. Because of the sensitivity of the data in question, it is preferable to store the data securely and efficiently.

In this embodiment, user passwords may be encrypted to protect them from compromise. Strong password requirements may be the same as those discussed above in CAB.

In this embodiment, session encryption occurring at both the high- and low-side interfaces is transient, and therefore need not be persisted in a cryptographic database.

Security Design Decisions

In one embodiment, the SELinux Security Policy preferably ensures domain separation and control over the direction of data flows between components.

In this embodiment, separate cryptographic operations can take place at the high-side and low-side interfaces, each interface transmitting data at a different level of security. For this reason, the Guard preferably has one cryptographic accelerator card for each security level.

One embodiment of AFT supports at a minimum 1024-bit RSA for key exchange and digital signatures, SHA-256 for hashing, and AES for confidentiality (128-bit blocks in CBC mode). Another embodiment may be "Suite B"—compliant.

In this embodiment, because TLS supports virtual connections, it is possible for the Guard and Translator to have one TLS network connection for multiple virtual user sessions.

Flexibility, Availability, and Maintainability Design Decisions

In one embodiment, the Authentication component generates "heartbeat" signals at regular intervals, as defined by the heartbeat monitor subsystem. If any subcomponent of the authentication subsystem were ever to terminate, the heartbeat signals would cease, thereby indicating a serious problem to the heartbeat monitor. Likewise, if any authentication subcomponent detects a condition rendering it unable to continue processing, it would shut down immediately, triggering the heartbeat monitor to initiate system shutdown.

Heartbeat Monitor

In one embodiment, the AFT Heartbeat and Performance Monitoring subcomponents are responsible for monitoring the health of the AFT system. Upon non-receipt of heartbeats or the inability to collect performance data, an audit message is sent and a shutdown initiated In this embodiment, the Heartbeat Monitor subcomponent interfaces with other AFT processes and tracks those processes that have checked-in. This minimally determines whether a component is still executing and initiates shutdown on heartbeat errors In this embodiment, the Performance subcomponent interfaces with the Admin Component to allow the admin to initiate performance collection and view the collected data in a report.

Heartbeat Monitor Description

In this embodiment, the Heartbeat Monitor's main functions are to:

Maintain an active status of system health

Initiates a system shutdown if an anomaly is detected.

In this embodiment, AFT components preferably will generate a "heartbeat" at regular intervals, which will allow the Heartbeat Monitor subcomponent to guarantee overall system health. This heartbeat interval is configurable and will be tuned to allow enough time for the process. If a component being monitored dies or enters an illegal state, its heartbeat should cease, thereby indicating a serious problem to the Heartbeat Monitor.

In this embodiment, the AFT process generating the heartbeat will communicate the heartbeat to the Heartbeat Monitor using the IPC. The IPC used by the heartbeat monitor limits blocking so that performance hits resulting from sending and receiving heartbeats will have minimal impact on overall system performance.

In this embodiment, each process that generates a heartbeat needs a thread to handle its heartbeat processing. This heartbeat thread may be started by the main thread of each process/component and sends a periodic heartbeat to the Heartbeat Monitor. The heartbeat thread receives the heartbeat interval from the configuration data sent to its initiating process at startup. The heartbeat thread will establish a write-only IPC channel to the Heartbeat Monitor and periodically send a simple message indicating that the process is working properly.

In this embodiment, after the basic AFT processes are up and running, and the system is ready to start accepting connections, it is the heartbeat monitor's job to notify audit that the system is ready. Audit will create a record in the audit log and based on the policy notify the shutdown monitor to change the Boolean value and allow access to the network interfaces.

In this embodiment, the heartbeat monitor may consist of two threads in addition to the AFT control threads. The first thread blocks on an IPC mechanism and waits for messages to process. Once a message is received, the thread updates the state table with the information conveyed in the message. Monitored processes are able to send messages without needing to block and wait for the heartbeat monitor to process the message. The second thread is responsible for monitoring the state table and ensuring that all processes contain current heartbeat entries. If a problem is detected, this thread will be responsible for notifying the audit subsystem of an error resulting in the shutdown of the system Performance Monitoring Description In one embodiment, the Performance Monitoring subcomponent stores current and historical performance data over a configured period. If for some reason the system is unable to collect performance data, the system cannot be trusted and is preferably shutdown.

In this embodiment, performance data will include, for example, CPU and memory usage data, as collected by operating system utilities, for each process. This data may be checked against configuration tolerances and either log warnings to audit or initiate system shutdown as specified by the action to take as specified in the configuration file.

Software Architecture

In this embodiment, the Heartbeat Monitor along with the Performance Monitor may be responsible for ensuring that processes on the AFT system are functioning properly and have the resources required for effective functioning.

In one embodiment, the Heartbeat Monitor is the first process started by the AFT Initialization process because it needs to be available when each of the other AFT processes starts running. The heartbeat monitor is capable of receiving types of messages such as:

A message stating that a process has just started running
A message reporting that the process is still running
A message notifying the heartbeat monitor that the process is shutting down.

In one embodiment, once a message is received, the heartbeat monitor will update a table that records the state of processes. The table may consist of two fields, a field for the current state of the process, and a field for the last time it was updated. Periodically, the heartbeat monitor will check its table to make sure that every running process has an entry in the table with a recent timestamp. Once a process starts up, it notifies the heartbeat monitor that the process is running and that it should start expecting to receive heartbeats periodically. While the system is running, the heartbeat monitor will monitor the table, and if a process has a timestamp that exceeds the defined heartbeat period, it is assumed that the process is no longer able to function. In the case where a process chooses to exit cleanly, the process preferably sends a shutdown message that notifies the heartbeat monitor that the process is explicitly exiting and that it should no longer expect to receive heartbeats. If however, a heartbeat is received after the process has sent a shutdown message, then that is an indication that something has gone wrong and the process was unable to shutdown. Not receiving a heartbeat in a reasonable time and receiving a heartbeat from a process that should have shutdown are both events that may result in the system being shut down.

In one embodiment, the heartbeat monitor starts up and enters the running state where it receives messages from processes announcing that they have started up. Once processes have started, the system waits to receive heartbeats. If a heartbeat is not received within the specified time, the message is overdue and a message is sent to audit. Once audit is notified, the heartbeat monitor waits for a message from the shutdown monitor instructing the process to shut down. The heartbeat monitor then transitions to shutdown and exits. Otherwise, when the shutdown monitor receives a shutdown message, the heartbeat monitor transitions from the receiveHeartbeat state to the shutdown state and exits.

In one embodiment, the heartbeat monitor will be used by the Guard system components. In each case, the heartbeat monitor will receive data from numerous processes on the system via the shared Wire Protocol. The first message sent to the heartbeat monitor may be a message containing the process id and the process type. This may be a one-way communication channel, where the heartbeat monitor will preferably receive data.

In this embodiment, in addition to receiving heartbeat messages, the heartbeat monitor may also interface with the Audit and Shutdown subcomponents.

In this embodiment, the Performance Component may be integrated with the configuration file subsystem and will interact with the init and audit subsystems.

In one embodiment, the performance monitor receives performance data from audit along and passes the results to the init performance component so that it can determine whether the machine is running within acceptable parameters, if not init performance will be able to shut the system down.

Decision to Develop or Reuse

In this embodiment, the AFT Heartbeat monitor may reuse software modules written for the CAB CDS to provide much of the Heartbeat monitor capability. AFT-specific functionality may be implemented as needed.

Performance-Related Design Decisions

In this embodiment, the Heartbeat Monitor subcomponent may use IPC to receive the heartbeat from the AFT processes. The IPC used by the heartbeat monitor limits blocking so that performance hits resulting from sending and receiving heartbeats will have minimal impact on overall system performance.

In this embodiment, the Performance Monitoring subcomponent of the system preferably has a minimal impact on performance whenever performance data is collected. Periodically the performance component will execute system utilities, read from files in the proc file system, and receive data from other AFT components. In addition to collecting the data, the performance component also processes it and sorts out all relevant data before storing the data.

Database Design Decisions

In this embodiment, the Performance Component may use a database to store and retrieve collected performance data.

Security Design Decisions

In this embodiment, the Performance Component preferably relies on the SELinux policy to provide security for the system. The policy confines the Performance Component in a separate domain reserved specifically for gathering performance information.

Flexibility, Availability, and Maintainability Design Decisions

In this embodiment, the performance monitor component preferably requires layers of abstraction so that it can remain flexible to changes in the underlying way in which it collects data from the system. Unlike other components that require rigid settings for security, the performance monitor preferably needs to remain flexible so that it can easily adjust it the format of data it receives from a file or program changes. It utilizes modularized components for parsing data that it receives so that should a programs output change, or a different mechanism for obtaining a certain metric is changed the system will require a minimal about of configuration changes. The performance monitor also needs to be customizable so that an administrator can select which metrics they would like to record.

Shutdown

In one embodiment, the Shutdown Monitor is responsible for making changes to the state of the system. It waits for a state change event, arriving through IPC, and then responds to it.

In this embodiment, the state change message may contain a number signifying to what state the system should transition.

In this embodiment, the Shutdown Monitor initiates transitions to system states such as:

Production Policy with Network Boolean set to TRUE
Production Policy with Network Boolean set to FALSE
Maintenance Policy
Power Off.

In this embodiment, the Production policy state grants privileges to the AFT components allowing them to run while the policy restricts the abilities of maintenance and configuration utilities. Certain configuration tasks cannot and should not be run while the system is processing and this policy ensures this. The Production policy also has two states controlled by a SELinux Boolean, which determine when to activate networking.

In this embodiment, the Network Boolean is a SELinux-related policy switch that either permits (TRUE state) or denies (FALSE state) network connectivity for the system. The default value for the Network Boolean is FALSE, which allows AFT processes to start up safely before allowing connections. After the system has verified that it is ready to receive connections the Boolean value get changed and network connectivity is permitted.

In this embodiment, the Maintenance policy state is designed to allow privileges that are required for performing maintenance on the system. The system transitions into Maintenance mode when initiated by an authorized administrator, or when directed by policy in response to specific error conditions. The Shutdown Monitor receives messages instructing it to transition into maintenance mode from the Audit subsystem or the administrator's shutdown utility.

In this embodiment, the Power Off policy state shuts the system down completely without transitioning into maintenance mode. When a severe error occurs, the Audit Subsystem sends a message to the Shutdown Monitor instructing it to power the system off. The administrative shutdown command can also send a power-off message to the Shutdown Monitor when an administrator would like to completely shut down the system.

In this embodiment, if the system is transitioning into maintenance mode or powering off, the Shutdown Monitor will send messages indicating to each process that they are to shut down and the monitor will send them though each processes' IPC connection to the Shutdown Monitor.

In one embodiment of the Shutdown Monitor, the initialization phase starts out by initializing variables and verifying that the system has adequate resources to start up the process.

In this embodiment, after initialization, two threads are created. The first thread receives a list of process IDs from AFTInit that the monitor needs to notify in the event of a shutdown. Certain processes may start up and shut down while the system is running. In order for these processes to work with the Shutdown Monitor, a process ID will have to be added and removed from the Shutdown Monitor while the system is running. If another process in the system creates processes, it is the responsibility of that process to make sure that Shutdown is told what processes it needs to shut down. Likewise, when a process shuts down, Audit notifies the shutdown monitor and based on the message, the shutdown monitor either removes the ID of that process, or shuts down the system.

In one embodiment, the processes that require shutdown notification are placed into a notification table (or "process vector"). The order in which the processes are shut down is not critical; however, the audit subsystem needs to be shut down last so that it can continue to receive audit events as long as possible. Note that the security policy's Network Boolean is set to FALSE before shutdown commences, ensuring that no data enters or exits the system during shutdown.

In this embodiment, the second thread created after initialization is a thread that waits for state change messages. If a "shutdown" or "change to maintenance mode" message is received, the monitor sets the Network Boolean, notifies the Audit Process that the Boolean has been changed, and then proceeds to notify all processes in the notification table to shut down.

In this embodiment, if the state change message simply requests a change of the Network Boolean, the change is made, Audit is notified, and it continues waiting for messages.

In this embodiment, once the processes have been notified, the system shuts down the system by transitioning into maintenance mode or running/sbin/init and powering the system off.

Implementation Decisions

In one embodiment, for processes to be able to interact with the Shutdown Monitor, each process will have been linked to a library that contains special functions for setting up the mechanisms that interface with the initialization subsystem. The library will contain functions that a program will call while it is starting up. The functions will create and control threads and setup IPC communication between the process and the Shutdown Monitor. The shutdown control thread establishes an IPC channel with the Shutdown Monitor, and blocks on read waiting for a message from the Shutdown Manager informing the process that it needs to shut down. When such a message is received, the process will call a shutdown function, which will clean up the Shutdown Monitor thread allowing the process to then return normally.

Subcomponent Details

In this embodiment, changing the Network Boolean value is straightforward. The process will open the appropriate Boolean file in the/selinux partition and set the value to 1 or 0 depending on the context. The shutdown process runs in a domain that allows write access to the Boolean file.

In this embodiment, transitioning to maintenance mode and powering off may be more complicated. First, it sets the network interface Boolean to FALSE so that no data can move through the session as components are shutting down. If the Boolean is not set to FALSE, it may result in partially processed data going through the system and interface. Second, the Shutdown Monitor sends a message to every process in the system informing them that the system is shutting down and that they must terminate.

In this embodiment, the shutdown monitor is aware of every process because it receives a list of process IDs from any process that execs new processes. As stated in the Initialization section, the AFTInit process sends the process IDs of the processes it has created to the shutdown monitor before exiting. If another process in the system creates processes it will be the responsibility of that process to make sure that shutdown is told what processes it needs to shutdown.

After the AFT processes have terminated, the system will either transition into maintenance mode or continue the shutdown process to turn off the system. If the system is transitioning into maintenance mode, it will first wait for all of the AFT processes to terminate. The shutdown monitor will then execute the load_policy command that will load the maintenance policy on to the system. If the system is shutting down, the shutdown monitor will execute/sbin/init and switch to runlevel 0 instead of calling the load_policy command.

Interfaces

In one embodiment, the Monitor will accept an IPC connection from, and send data to, many of the other processes within the system component. Each process will utilize connect to the Shutdown Monitor and begin listening for a shutdown message. This may be a one-way communication channel, where the Shutdown Monitor only sends data.

In addition to sending shutdown messages to monitored processes, the Shutdown Monitor also interfaces with the Audit and Heartbeat Monitor subcomponents.

Audit

The Audit Subsystem provides audit functions for an assured Guard and other self-protecting components. It preferably provides diagnostic logging capabilities to facilitate system troubleshooting and development. The Audit component also provides related subcomponents necessary for policy enforcement, including a security event response framework.

Diagnostic logging may be preferable to develop AFT components. It also provides wellness metrics not captured by security requirements but necessary for overall system maintenance. Diagnostic logging may be tightly associated with an application's security domain, as generally, a holistic system view is not necessary.

Security event auditing, on the other hand, preferably provides a complete picture of system security events, as observed by all system components. Event auditing satisfies security requirements for a secured, tamperproof record of security-relevant system events.

In one embodiment, persistent repositories can exist and be maintained by Audit to provide storage location for audit data and event policy information. These repositories may be physically located on the SAN. To support AFT journaling, Audit will save the file being journaled to a persistent directory along with the clean report. Reference information such as directory location, submitter name, receiver names will be stored in the audit database. Audit will provide an interface for the administrator to view these files and remove the files from Audit's directory and reference in the database.

Audit data is preferably backed off the system every month by the log operator. The log admin is responsible for deleting the audit file to free file system space. If the file system space is exceeded, the AFT system may shutdown and may not execute until space is available on the file system.

There may be two basic audit files that require backup, each to a separate tape. One contains all the submitted files that have been journaled and the other audit type contains event logs and clean reports of submitted files.

In one embodiment, Audit has the ability to store files for one month. Warnings to the administrator can be sent when the files approach this timeframe. Audit data is preferably copied to tape every month.

Software Architecture

The Audit Subsystem manages and maintains the Audit Store Database and may capture, for example, the following types of information:

Audit security and system events
  Support session auditing
  Login and logout
  Account for user activities
    Submitted files
      File names, recipients, send date, cleaned failure reports
    Received files
      File names, sender, receive date
Audit network access attempts
Audit Critical security functions
Each element within the system must exhibit trusted audit capability
Journal files that failed clean or are rejected by FDO
A configuration option to perform journaling will be available to the Administrator. This option will enable the following to be journaled:
Submitted files (file contents)
Cleaned files (cleaned copies of the submitted files)
Reports (i.e. any information associated with the clean process)
Allow Administrator access to audit information for review.

Audit Data

The Audit Data element provides a data model for Audit events and the operations to manipulate it. The data model may consist of data types, core kinds of data present in Audit records, and the taxonomy of events. The operations may consist of functions for manipulating fields, accessing common fields, and working with field types. It depends on session data defined in the Common::Session package and the safe, portable common types defined in the Common::Types package. The core objects are AuditField and AuditRecord. Helper objects include AuditRecordWrapper and AuditRecordIterator.

An Audit Record is essentially a container of multiple fields, some always present, some frequently used, and some specific to the component generating the record. The Container interface facilitates levels of commonality of fields while supporting software reuse.

Client Interface

In one embodiment, the Audit Subsystem provides extensible C and C++ interfaces for applications to record audit events.

Audit Client

In one embodiment, the AuditClient class provides the C++ interface for generating events. Part of its interface includes non-member functions to store values, similar to the C++IOStreams interface.

C Application Programming Interface

In one embodiment, the C Application Programming Interface (API) provides a C interface to the AuditClient class and includes operations to control event sources and sinks.

Event Source and Sink

The Audit Subsystem supports event sources and sinks to enable auditing failover, caching, and retrieval with minimal client interface. The AuditClient class and C API work polymorphically with the underlying sources and sinks. Audit API users can always create events without concerns about the underlying transport.

In one embodiment, a source, CacheDestination, enables processes (e.g., CABShutdown) to cache events until the Event Manager is ready to receive them. Once the Event Manager is ready, a process could send events from the cache.

Event sources enable the Audit interface to direct events regardless of the target. An event source preferably implements the AuditDestination Non-Virtual Interface (NVI). One embodiment subsystem supports three sources: CacheDestination (to store events), EventMgrDestination (to transmit events via IPC), and the EventMgrLocalDestination (for the Event Manager to transmit events to itself).

In one embodiment, binary serialization is implemented to support failover event recording, in the case that the Audit Subsystem is not available. The BinaryFileDestination class persists serialized events in a flat file. The BinaryFileSource class read serialized events from a flat file.

Audit Server

In one embodiment, the Audit Server is the central repository for all audit events. It receives AuditRecords via the EventManager over IPC.

Event Dispatch

In this embodiment, the Event Dispatch subcomponent provides a policy-driven capability to respond to security-relevant events. When a client detects an auditable event, it sends the event via the Audit client. The client, in turn, sends the message to the EventProcessor that decides which actions should occur when an event is triggered.

Alert

In one embodiment, the Alert subcomponent provides an interface for generating alerts to administrator. This embodiment implements a console-based alert. In another embodiment, there may be additional alerts, such as those to pop-up windows, alarms, etc.

Dynamic Design

In this embodiment, the AFTAudit Subsystem has a shutdown sequence to ensure consistent behavior.

Audit Subsystem Startup

In this embodiment, the Audit Server is preferably ready before vents are sent. Because the Event Manager and Audit Store are separate processes, their startup sequences are in parallel. Moreover, the CABInit process preferably cannot receive messages from processes it has started, so it is not possible for them to indicate success in failure. The Event Manager detects when the Audit Store is online because its IPC sends succeed. Should its IPC sends not succeed within a developer-configurable amount of time or should IPC sends fail after a connection is established, the Event Manager enters its shutdown sequence.

Audit Subsystem Shutdown

In this embodiment, the Event Manager enters its shutdown sequence when it receives an event whose policy rule triggers shutdown. For cases of Event Manager-detected fatal errors, such as an inability to send IPC events, the Event Manager generates events to itself.

Client Failover

In one embodiment, the Audit Client implements failover behavior. If a connection is unsuccessful within a required threshold of time, then events are stored on disk for later import.

Guard Log Admin

In one embodiment, the Log Administrator monitors the Guard to ensure that it is functioning properly and that users are behaving in accordance with policies. With that information, the Log Administrator can take appropriate administrative measures such as notifying other system administrators or site management.

Guard Policy Admin

In one embodiment, the Policy Administrator has operational and policy oversight over the Guard operation, such as auditing behavior, resource allocation, and threshold configuration. In conformance with separation of roles, the Policy Administrator has limited capabilities and should preferably used by highly-vetted individual.

Client Code

In one embodiment, the Client Code actor represents usage of an audit or logging capability external to the Audit component.

Audit Component

In this embodiment, the Audit Component actor represents actions taken by the Audit component.

Attacker

In one embodiment, the Attacker actor attempts to compromise the audit capability, including gaining access to audit data, causing a loss of availability, or altering audit data.

Log Administrator

In one embodiment, the Log Administrator has a view into the system for ordinary oversight. For Auditing, a Log Administrator need only view the local logs.

Audit Client

In one embodiment, the Audit Client has few states: connecting to the Audit Server, ready, and termination.

In one embodiment, client usage essentially consists of a few basic steps:

Prepare to send audit messages
Create and fill a record: sequences
Send the record to a destination: sequence
Prepare to Send Audit Messages In this embodiment, an Audit client, whether communicating directly with the Audit server or logging locally, preferably creates the appropriate destination object (local or Audit IPC). Next, the client registers the destination with the Audit-Client.

Create and Fill a Record

In this embodiment, the client creates a record through the AuditClient or by using a wrapper.

Send Record

In this embodiment, finally, the client sends the record by way of the AuditClient. It is also possible to reuse the record for multiple destinations (by way of multiple AuditClient instances) or to modify the record and send it as a new event.

Audit IPC

In one embodiment, the Audit component includes an inter-process client/server interface. The implementation of the interface may be via asynchronous IPC.

Event Dispatch

In this embodiment, when an event arrives at the Audit Server, it can trigger one or more actions, depending on the policy. Invariably, there is an action to record the event to disk. Additional actions include system shutdown, session termination, account lockout, console alerting, and flight recording.

Interface Descriptions

In this embodiment, the Audit interface consists of the client interface, callback interface, and the configuration items available to the administrator.

Client Interface

In this embodiment, the Audit Subsystem provides extensible C and C++ interfaces for applications to record audit events.

C++ API

In one embodiment, the AuditClient class provides the C++ interface for generating events. Part of its interface includes non-member functions, represented as AuditClientAux, to store values, similar to the C++ IOStreams interface.

C API

In this embodiment, the Audit C API provides functions to control event subsystem initialization and routing and a flexible C wrapper for code that cannot use the C++ API.

Callback Interface

In this embodiment, the Audit callback interface enables other components to receive callback messages from the Audit Server when security-relevant events occur. The callbacks may be registered using the wire protocol interface. An application can register to receive an asynchronous callback when an event occurs. The interface preferably complies with ISecurityAction in order to receive a notification. Examples include LogoutAction, GuardShutdownAction, AccountLockoutAction, and ConsoleAlertAction.

Configuration File Interface

In this embodiment, Audit Subsystem configuration consists of per-application and overall subsystem tuning.

Logging Configuration File Interface

In one embodiment, the logging configuration file interface defines logging settings understood by all applications. It is not modifiable by ordinary administrators.

Audit Client Configuration File Interface

In this embodiment, the audit client configuration file interface defines audit settings understood by all applications. It is preferably not modifiable by administrators.

Event Manager Configuration File Interface

In this embodiment, the Event Manager Configuration file defines the settings used for dispatching events.

Audit Store Configuration File Interface

In one embodiment, the Audit Store Configuration file defines the settings for recording events to disk.

User Interface Design

In this embodiment, the user interface for the Audit Subsystem includes utilities to configure and view the Audit Subsystem. Most utilities are preferably only available to an administrator and other utilities are only available to developers. The Audit Viewer and System Configuration have the highest priority for implementation.

Audit Viewer

In this embodiment, the Audit Viewer enables the administrator to view recorded audit events and execute ad hoc queries.

System Configuration

In this embodiment, the System Configuration utility enables the administrator to set the logging and auditing parameters for each process.

Audit Binary Importer

In this embodiment, the Audit Binary Importer imports binary audit events into the Audit Store database.

Audit Exporter

In one embodiment, the Audit Exporter exports recorded audit events into XML.

Decision to Develop or Reuse

In this embodiment, the AFT Audit Subsystem may reuse software modules written for the CAB CDS to provide most of the auditing capability. AFT specific functionality may be implemented as needed.

Interface-Related Design Decisions

In this embodiment, there are several considerations for the Audit interface:

Simplicity for clients
Extensibility for new events and types
Extensibility for new destinations
Extensibility for new transports
Concurrency for multiple threads and processes In this embodiment, to simplify client usage, the core-auditing interface offers three levels of data abstraction: data element, generic event record, and specialized event record. Orthogonal concerns such as event destination are separated from the data interface.

In this embodiment, the Audit interface is designed to cooperate with other common system components. Audit clients do not need to carry out synchronization of data, as the client interface provides synchronization under the covers.

Performance-Related Design Decisions

CAB's Audit Subsystem may be designed to meet performance requirements for soft real-time response. In this embodiment, the AFT system is not required to perform at the same high level but will take advantage of CAB's Audit performance optimizations.

Database Design Decisions

In this embodiment, the Audit Subsystem database schemas mostly follow Third Normal Form (3NF), to encourage data integrity. There may be two schemas: one for the Audit Store and one for the Event Manager Policy.

Audit Store Database Schema

In this embodiment, the Audit Store database schema is intended to capture live audit data and administrator-configurable static data lists. Static data lists contain normalized choices, such as mappings of fixed names to numeric identifiers (e.g., country names to numbers).

Event Manager Policy Schema

In this embodiment, the Event Manager policy is stored in a database schema to facilitate the numerous relationships between the values stored in it and in the Audit Store database.

Safety, Security, and Privacy Design Decisions

In this embodiment, the Audit component is designed for partitioned security domains. The primary security issues include:

Integrity of audit data
One-way transmission of audit data from multiple, partitioned client security domains to a single audit server
Configuration of client diagnostic policy by a system administrator
Configuration of audit server policy by a system administrator
Viewing of audit data by a different security administrator
Separation of event management from data store recording.

In this embodiment, the primary design principle to meet these security issues are least privilege and minimality. The Audit Server operates in a security domain that enables it to write persistent data to disk with an "audit data type." The Log and Forensic administrator are permitted to read the persistent data having "audit data type." A separate "audit configuration" type identifies configuration files modifiable solely by a Policy Administrator.

Flexibility, Availability, and Maintainability Design Decisions

In this embodiment, the Audit component is instrumental in system maintainability. Security event and diagnostic data support developers and administrators who need to understand the system function. The interface flexibility enables a rich diagnostic capability.

In this embodiment, the Audit component is flexible. It supports in-process and inter-process aggregated logging. The design also supports future development by enabling different persistent stores and transports to be incorporated without affecting the overall implementation.

In this embodiment, the Audit component has implications for system availability. Audit trails are preferably tamper-proof and guaranteed to occur for security-relevant events. Therefore, the Audit component becomes a bottleneck that can affect availability or a target for a denial-of-service attack. Audit components are designed to be contention-free as much as possible, so that multiple clients can simultaneously record their events asynchronously.

Administration

In this embodiment, the Administration functional area will manage aspects of system configuration and operation. Role-based privilege enforcement allows the following responsibilities to be divided among one or more administrators, depending on site requirements.

Administration of user and FDO accounts
    Site policy (e.g., Review and Release policy, auditing policy, dirty/clean word lists)
    System patches
    Audit log review and alerts
    System initialization and shutdown
    File validation.

In this embodiment, the Administration component can customize the configuration of the system and provide interface to view audit and performance information. The implementation for system administration may be GUI based. Any modifications to configuration data will verified to insure that and configuration changes make sense in context to the field before those changes are committed to the system. Verification of the configuration file schema can be handled by Samhain integrity tool. Samhain is a file system integrity checker that can optionally be used as a client/server application for centralized monitoring of networked hosts. Databases and configuration files can be stored on the server. In addition to forwarding reports to the log server via authenticated TCP/IP connections, several other logging facilities (e-mail, console, tamper-resistant log file, and syslog) are available In this embodiment, AFT will use version numbers on each filter policy configuration. The Administration Component will put the updated configurations to their configuration directories. Submit jobs that are in progress will continue to use the configuration version that existed when the submit job was initiated. New submit jobs will pickup the new version.

In this embodiment, Authorization and Access control will be mitigated by the AFT defined role model. The role model will define the access limits for data and processes, e.g., certain roles have access to certain applications at certain times. The role model can be maintained on the guard in a database and will map to SE Linux roles.

Configuration Data

In this embodiment, the Administration Component can provide a GUI for maintaining configuration data. GUI's may be developed for configuring the following:

User Management
a. First and last name
b. Role
c. High side and Low side account information
   i. Username
   ii. Password
   iii. Status (login/enabled/login disabled)
d. E-mail address
e. Group memberships
f. E-mail address for approved receivers
g. Enable/disable e-mail notification for file submittal status. Default will be to receive e-mail.
h. Telephone number
i. Set message feedback level on GUI status panel (show all, show high priority only, show low priority only)

Role management
a. Role name (primary and secondary)
b. privileges
c. Session timeout
d. Idle timeout
e. Priority Group Management
a. Group name
   i. member name list
   ii. Administrator name Admin Management
a. First and last name
b. Admin role
c. E-mail address
d. Telephone number
e. Status (login/enabled/login disabled)

Event Management
Event name and its resultant system reaction. Each event that occurs in the system will have an associated system response. System response can range be to just audit log the event to a complete shutdown of the system.

Policy
a. Password limitations—minimum and maximum length, required characters (numeric, Upper/lower case, punctuation), maximum failed login attempts, change password warning days, number of days until access expires.
b. Dirty word list directory
c. Directory list of defined trusted schemas
d. Directory list of all trusted macros
e. List of trusted links based on domain name and IP address
f. Each filter has configuration data for each item to be checked by that filter. Since each filter may require a unique configuration setting to enable features such as dirty word search, the Administrator GUI will present a generic option for that item. This generic option will be translated by the filter's configuration translator to the unique configuration settings required by the filter. A state level will be associated with the generic option indicate the action to perform should that item be encountered by the filter.
   i. Filter identifier
   ii. File types and their extension that this filter will process
   iii. For each filter define the generic filter options Action levels will initially be:
a. Enable/disable checking for this item
b. Failure—fail the file being cleaned
c. Warning—issue a warning for the file
d. Report—send audit message to report the occurrence of the item
e. Directory to store filter's configuration
f. Filter pipeline definitions
g. Pipeline Identifier
h. Filter Identifier list
i. File type Information
   i. File extension
   ii. File aspects be checked (TBD)
   iii. Trusted metadata System Administration
a. Session expiration period
b. Message polling interval which allows messages to be written to the browser message panel.
c. Longevity of submit job. This will limit the length of time submitted files are permitted to remain in AFT persistent data stores.
d. Directory cleanup interval e. Length of time allotted for FDO review. If the FDO does not review the submitted job within this timeframe, an e-mail will be sent to sender and FDO to indicate FDO has not performed the necessary review.
f. Enable/disable journaling
g. Process configuration
  i. Component/process name
  ii. Heartbeat—Allow each process to have different heartbeats to facilitate those processes that may take longer such as the filters. Each process will get their configuration data at startup time
  iii. Log threshold level
  iv. Log file name and directory
  v. Maximum number of threads Firewall Configuration Interface Descriptions In this embodiment, the Administration Component is integrated with the configuration file subsystem and may interact with the init and audit subsystems. This component sits at a layer above the configuration file and is passed data types and values that are then verified.

In this embodiment, the Administration Component will invoke process defined library functions that will access the Admin databases to create configuration information specific for that process. This permits the flexibility to provide configuration information in the specific form needed by the process such as flat files or xml files.

User Interface Design

In this embodiment, a GUI will be available to view performance data and to enter configuration for the AFT Subsystem that will be stored in Administration maintained databases.

Decision to Develop or Reuse

In this embodiment, AFT will reuse software modules written for the CAB CDS to provide much of the Administration capability. AFT-specific functionality will be implemented as needed.

In this embodiment, the administration verification tools will be written specifically to validate GUI inputs.

In this embodiment, because of the high-assurance qualities of the system, privileged administrative and maintenance users will require direct physical access to several individual components using a set of administrative interfaces with a common "look and feel."

Interface-Related Design Decisions

In this embodiment, the Administration component obtains and verifies data from the configuration file and configuration databases. If the configuration file passes verification the only output from this component is a successful error code, however if the file does not pass inspection, an error message describing the failure is printed and an unsuccessful error code is returned.

Database Design Decisions

In this embodiment, the Administration Component will use databases to store and retrieve configuration data. The databases (System config, Audit config, User Mapping, Firewall config, and filter policy) are preferably persistent and therefore will all be stored on the SAN.

Security Design Decisions

In this embodiment, the Administration Component relies on the SELinux policy to provide security for the system. The policy confines the administrative binaries and configuration files into a restricted domain isolating them from other parts of the system.

In this embodiment, virus definition files, clean and dirty word lists and system components are preferably maintained by an authorized system administrators or by designated maintenance personnel who have been properly cleared and trained. The administrators are preferably fully trusted and will not conduct operations outside the security policy.

In this embodiment, AFT supports a flexible configuration that adheres to the security policies in place at each deployment site.

Flexibility, Availability, and Maintainability Design Decisions

In this embodiment, the Administrator Component will maintain data needed to allow the Guard to communicate with other guards for facilitating load and administrative data sharing.

Control Message Filter

In this embodiment, the AFT control message filter component accepts a control message from a Transfer Agent (TA) then validates the format and content of the message before forwarding the control message to a Repository Manager (RM). The control message filter provides content and format filtering for the control messages sent to the repository managers. It should be noted that control messages do not transverse the guard nor are they visible to any user.

Software Architecture

In this embodiment, the AFT Control Message Filter (ACMF) receives input from a TA, validates, and filters the control message, then passes the control message to a RM. There is a different instantiation of the ACMF for each TA/RM "pair." All control message flows are preferably one way.

Messages

In this embodiment, the control message filter accepts three different control messages: Delete (requests that a job be deleted from the repository), Release (requests that a job be released by the repository manager) and Reject (Informs the repository manager that a job has been rejected and provides the location of a comments file).

Message Format

In this embodiment, ACMF control messages are fixed length messages. There are two different control message formats, a common format for delete and releases, and an extended format for reject.

The message for delete and release contains:
Username
Command (delete or release)
Jobid
The extended message for reject contains:
Username
Command (delete or release)
Jobid
Path to comments file Filtering In this embodiment, the ACMF validates that the command specified in the message is a valid command for the recipient. If the command is not valid, the event is audited and the message deleted. For a valid command, the username and jobid are validated to ensure that they only contain permissible characters. The ACMF does not check to ensure that the username actually has permission to perform the requested function, that checking is the responsibility of the RM.

In this embodiment, for the reject command, the ACMF validates that the path name is valid and that the specified comments file exists. The contents of the contents file are then processed by an appropriate subset of the txt file filters. Failure of any validation is audited and results in the rejection of the message.

Inter-Guard Communication

In this embodiment and as described in the Hardware section, the guard may consist of multiple guard nodes connected to a common SAN and to each other.

In this embodiment, the design of the inter guard communication component is driven by the following considerations:

The guard must be able to support up to 3000 simultaneous users.

Failure of a node within the guard must not cause loss of functionality.

Failure of a node within the guard should not cause the loss of a job currently running on that node.

Failure of a node within the guard should not cause data in the repositories to become unavailable or corrupted.

Load should be balanced across the guard.

In this embodiment, the IGC development may be largely based upon commercially available products that provide the needed tools and/or functions.

Data Sharing

In this embodiment, the data sharing criteria for the guard nodes is satisfied by placing those files that must be shared on the SAN. The following repositories may reside on the SAN:
1. High Side In
2. High-side user Review & Release
3. High Side FDO Review & Release
4. High Side Out
5. Low Side In
6. Low Side Out
7. Low-side user Review & Release
8. Low Side FDO Review & Release
9. Audit In addition, global configuration files, and global queues may reside on the SAN in one embodiment.

Preventing Job Loss

In this embodiment, when the Work Order (WO) for a job, and the files associated with the WO reside on the SAN other nodes in the guard can access the information in the event of a node failure. However, once the work either moves from a repository into a node for the clean or verify process, if that node fails the information becomes unavailable to other nodes unless a copy is left in a repository. The clean process will not delete the job from the input repository, but will simply copy the job into its directory. After the User R&R process has successfully copied the job into its repository, it will then delete the job from the input repository. Similarly the verify process will not delete the accepted job from its repository. The job will be deleted from the FDO repository by the verify R&R process.

Load Balancing

In this embodiment, load balancing may be addressed in two separate ways. The first way is to balance the network load amongst nodes; the second is to balance the actual filtering work between nodes.

Network Load Balancing

In one embodiment, the simplest method of load balancing is round robin DNS rotation. The advantage to this approach is that there is no additional software required since it is implemented in the connecting host's DNS server(s).

In one embodiment, a second option for load balancing is to use Piranha. Piranha is the clustering product from RedHat. It includes the LVS kernel code, a GUI-based cluster configuration tool and cluster-monitoring tool. Piranha supports multiple different load scheduling algorithms such as Round Robin, Weighted Round-Robin, and Least-Connection. Piranha use a router/server tied architecture.

In one embodiment, a third option is to add re-direct support to the Transport Agent (TA).

In one embodiment, a fourth option is a hardware switch that performs the same function as DNS rotation.

Whichever solution is selected should preferably ensure that needless SSL credential handshaking is not required. Two methods to achieve this are to provide "persistent" affinity for at least the SSL session time to or provide some means of sharing the SSL cache between nodes.

Filter Load Balancing

In this embodiment, balancing of the filter load between nodes may be accomplished by placing the message queues that are used to communicate work to the clean and verify processes on the SAN. Therefore the clean or verify processes on all nodes share an "input" queue.

Performance-Related Design Decisions

In this embodiment, there will be multiple file systems defined on the SAN. Preferably, only those that must have shared write access need be CFS file systems. Those shared read only can be a standard Linux file system type.

The standard RedHat supported Linux file systems are ext2 and ext3. Reiserfs is often considered a higher performance file system than ext3, but is not supported by RedHat and does not support extended security attributes without patching. XFS is also a high performance file system that has been designed and tuned over the years to handle large files. If the clustering file system selected is CXFS, using XFS for the SAN resident r/o file systems is appealing since XFS and CXFS use the same format on disk.

Structural Components

In this embodiment, the Clean subsystem of the AFT Guard implements the document sanitization process for the AFT Guard.

Overview

Architecture Overview

In this embodiment, the Clean subsystem of the AFT Guard is a series of software components that collectively fulfill the requirements for sanitizing and verifying the target files transferred by the AFT.

In this embodiment, the software subsystem described will be separately instantiated four times in the AFT, to create the following components of the overall AFT system architecture:

The High-to-Low Clean
The High-to-Low Verify
The Low-to-High Clean
The Low-to-High Verify In this embodiment, the same subsystem architecture is used for both Clean and Verify. If the subsystem is installed as Clean, the components may be configured to be able to modify files. If the subsystem is installed as Verify, the components may be configured for analysis only.

In this embodiment, for any given sanitization task, the Verify functionality will be a different implementation than was used in the Clean. For example, the virus scan used by Clean will be from Vendor A, while the virus scan used by Verify will be from Vendor B. This is done to implement a true double check of the file.

In this embodiment, the Clean subsystem is composed of a series of smaller components. Each component implements one step in the process. Clean and Verify differ in that Clean will change the files in order to sanitize them, while Verify does not change the files, it only checks them for security concerns. In this document, the architecture description of Clean also applies to Verify.

In this embodiment, the input process will submit a file sanitization job by writing the files into a directory. This directory holds the target files to be sanitized and the associated overhead files needed for AFT processing. Then a pointer to the job is put into the input queue for the first process in Clean, the Work Scheduler.

In this embodiment, the Work Scheduler begins a series of filter components that operate on the job. The Work Scheduler, Router, Forwarder and Reconstruct are structural components that manage the work flow. The file sanitization is done in the Filter Stage.

Following is a brief summary of responsibilities of each component. Each component is specified in more detail later in the document.

Work Scheduler—Evaluate the sanitization that must be done, pick a filter stage to send the job to, and create job information files to direct and document the job in this pass through the filters.

Router—Pull out the specific files that will be worked on this time around and send them to the appropriate filter stage.

Filter—Implement specific Clean sanitization.

Collator Separate files that have completed all Clean sanitization from those which have not. Completed files will be saved in the Forwarder area. Files not completed will be taken back to the Work Scheduler area.

Forwarder—Decide whether the job is completed yet. Create and update the top level job information file. If the job is not done, send it back to the Work Scheduler. If the job is done, send it to Reconstruct.

Reconstruct—Verify that all processing is complete and re-archive files if necessary.

Component Overview

In this embodiment, all the components of the Clean subsystem share some basic characteristics.

In this embodiment, each component of the Clean subsystem is envisioned as a process which will read input events from an associated queue, and then dispatch worker threads to process the jobs from the queue. The maximum number of threads the component can use will be configurable.

In this embodiment, each component will have its own designated type-enforced working directory area. This is done to prevent one component from overwriting or corrupting the work of another.

In this embodiment, in general, files are moved from component to component by a copy-delete method. The component sending the files will put a message into the queue of the component receiving the files. The receiving component will pull the message out of its queue, read the current directory location of the files from the message, and then copy the files into its own working directory. The receiving component will then delete the files and their directory from the sending component's directory. The job now exists only in the directory which the current component has read and write permission for. Any previous references to the files are now invalid. This moves the job through the system in a type-safe manner.

Repository Manager

In this embodiment, within the AFT Guard, there are points in the system where the files to be sanitized (jobs) must be held for an indeterminate length of time while awaiting some type of event to move them to the next stage of processing. These points in the system are handled with the Repository components. A "job" is defined as one submission of a file or files to be sanitized, plus whatever meta-data is needed to shepherd these files through the AFT system. The repositories will secure the jobs into a dedicated disk area and keep a separate database detailing the jobs and their disk locations. The database and dedicated disk areas will be on the attached Storage Area Network (SAN), so as to be a shared resource between all guard nodes when the configuration demands more than one node. The database will allow queries so that job statuses can be ascertained.

In this embodiment, the Repository component implements job management in the repository. It sends out notifications of job status to users, cleans up expired jobs, and executes the following commands to manage the jobs:

Delete (job id)
Release (job id)
Reject (job id)

In this embodiment, a "job" is defined as one submission of a file or files to be sanitized, plus whatever meta-data is needed to shepherd these files through the AFT system.

Decision to Develop or Reuse

In this embodiment, the architecture for these components may make use of design patterns and relevant reusable code.

Interface Related Design Decisions

In this embodiment, the databases which the Repository controls will be queried in a read only manner by the Transfer Agent(s). This is done for efficiency, to avoid the need for a temporary file area and the associated cleanup utilities. To address security, the Transfer Agent component will only be allowed to create specific queries from a library and will verify the query for all applicable parameters.

Database Design Decisions

In this embodiment, an existing open source database can be used in the Repository. The main consideration for the database is that it be a lightweight in-process database.

In this embodiment, unless specifically noted otherwise, the databases and associated file directories for each Repository will be stored on the SAN disks to allow them to be shared between all the guard nodes.

Security Design Decisions

In this embodiment, the design principles employed in meeting security issues are least privilege and minimality. Each instantiation of the Repository component will have its own database to enforce least privilege and privacy of data. The URR and FRR are separate components in the system in order to enforce separation between the two stages of processing. The Verify Repository enforces separation between the high and low domains.

Software Architecture

In this embodiment, within the AFT Guard, there are points in the system where the files to be sanitized (obs) must be held for an indeterminate length of time while awaiting some type of event to move them to the next stage of processing. These points in the system are handled with the Repository components. The Repository will secure the jobs into a dedicated disk area and keep a separate database detailing the jobs and their disk locations. The database and dedicated disk areas will be on the SAN, so as to be a shared resource between all guard nodes. The database will allow queries so that job statuses can be ascertained.

Basic Repository Component Functionality

In this embodiment, here is basic component functionality that applies across all Repository components:

The Repository preferably copies the input job in via a copy/delete type move. The input job will come in the form of a queue message stating the current directory where the job is residing. The Repository will copy it from that directory into its own disk directories and update its database with the job. Then the Repository will delete the job from the input disk area.

Any commands that a user can input to a Repository are filtered through a separate command filter process to ensure that commands are cleaned before being accepted.

All input, whether jobs or commands, will come into the Repository through the input queue.

The Transfer Agents of the system will have the ability to query the database the Repository manages, and to read disk files from the Repository disk areas. The Transfer Agent access will be read only. Transfer Agent queries will be implemented as library calls, to allow only the necessary queries and not just any query the database would allow. Transfer Agents only have access to their related Repository databases and files as necessary.

Each Repository will have a set of rules, specifying such things as who to send notifications to upon what events. These rules are its configuration.

Every Repository will be able to pick up its own configuration from the system wide configuration information area.

Whenever taking any action, the Repository will write to audit as required.

The Repository will be able to handle rules for User Groups, and hence be able to manage jobs appropriately when the user is part of a group.

Overview of High-to-Low Processing

Figure 31:
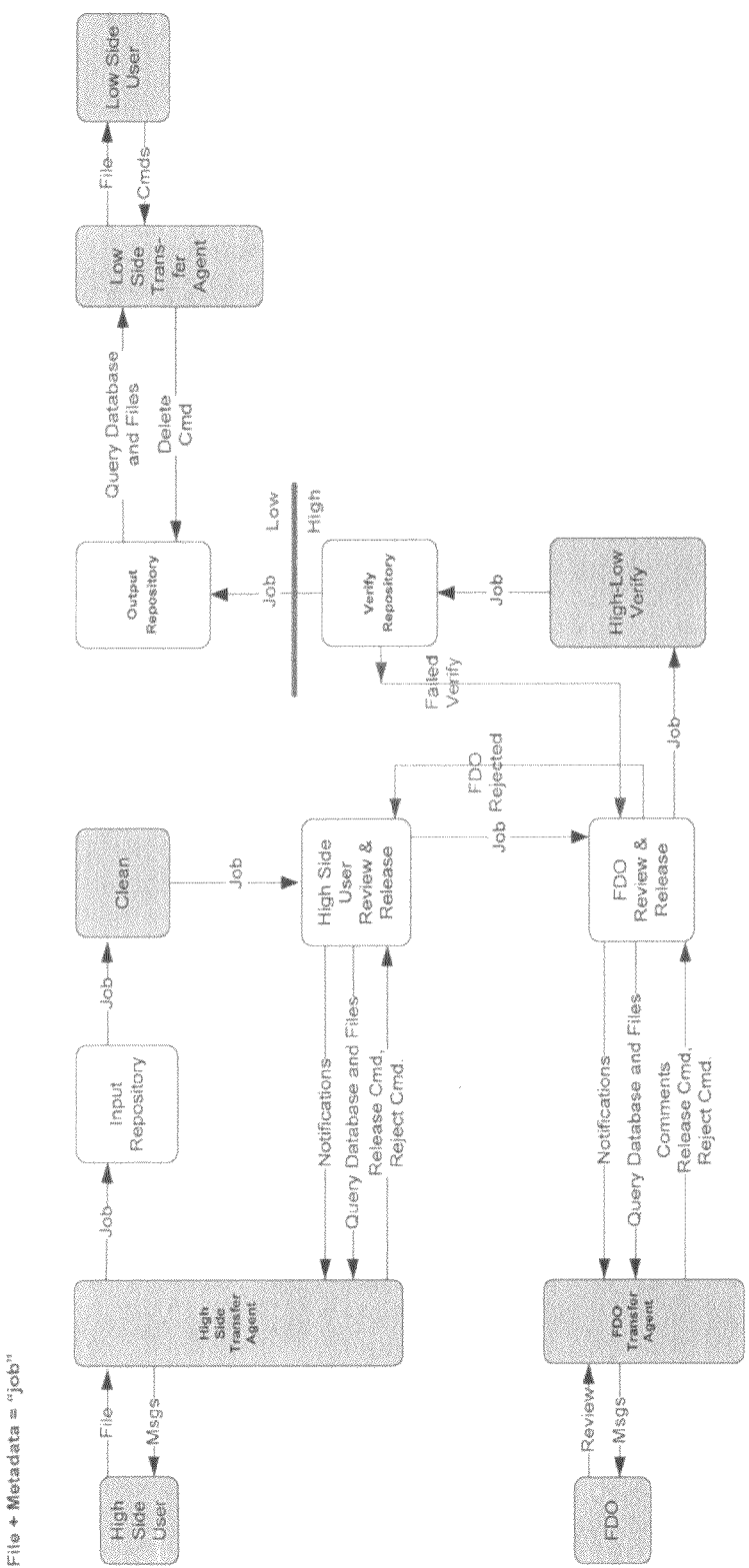
FIG. 31 shows an example of AFT High-to-Low processing showing repositories.

In this embodiment, the Repositories needed for one direction in the system are:

Input Repository—IR
User Review and Release—URR
FDO Review and Release—FRR
Verify Repository—VR
Output Repository—OR In this embodiment, both directions, High-to-Low and Low-to-High, will have all these same components. FIG. 31 shows an example of High-to-Low processing showing repositories. For the Low-to-High, the URR and the FRR will be in a "quiet mode," where they do not send notifications or provide review capability, but do continue to fulfill their other system functions. This also puts the components in place to provide all functionality for both directions in the future.

Each of the five types of Repositories is next explained in more detail.

Input Repository (IR)

In this embodiment, the Input Repository holds user input jobs. If necessary, it can send back notifications that the job has been accepted by the system. If due to volume, the job must wait for Clean processing, it will wait in the IR. When the job is first picked up by Clean, it will not be deleted immediately from this repository, but rather will be deleted by the URR after the job has passed the Clean stage of the system. This ensures not losing the job in flight if one node of the guard goes down.

Configurable items for this component:

Whether to send back a notification to the submitting user upon receiving the job. This notification states that the guard system has accepted the job.

User Review and Release (URR)

In this embodiment, basic operation of the URR:

The input job comes from the Clean component.

Upon receiving the job, the URR must send the Delete command back to the appropriate input repository. This moves the job forward in the system past the Clean stage.

All commands that the user can input to the URR are filtered through a separate command filter process to ensure that commands are cleaned before accepted by the URR.

If instantiated in the High-to-Low chain, the URR holds cleaned jobs until the High-side user releases them.

Upon receiving the job, send the "delete" command to the high side input repository.

Send notifications out to the high-side user as necessary.

To high-side user—File is ready for review.

To high-side user—File has failed clean.

These notifications may also need to be sent via email as well as within the guard system.

The high-side user can then review the job. The Transfer Agent is the component of the system that allows the review to take place by querying the database and copying the files to the user to allow him to review the job. The URR simply holds the job in the system while this takes place.

If the job has passed Clean, the user may issue a Release command. The URR will then transfer the job to the next step in the processing, the FRR component.

If the job has failed Clean, the user may review the job. The Transfer Agent component allows the review to take place. The user may then issue the Delete command. The URR will then clean up the failed job by writing as necessary to audit and then deleting the job from the system.

The user may choose not to send the job forward even if it has passed Clean. In this case, the user sends the Delete command. The URR will then clean up the job by writing as necessary to audit and then deleting the job from the system.

A job may also be sent back to the URR if it has been failed by the FDO. In this case, the URR will take back the failed job and allow it to stay in the system for high-side user review. When the high-side user sends the Delete command, the URR will then clean up the job by writing as necessary to audit and then deleting the job from the system.

Jobs will have a configurable expiration time. Any job still in the system past it's expiration time will be automatically deleted by the URR. If instantiated in the Low-to-High chain, the URR is in "quiet mode" and only fulfills the basic system requirements of Upon receiving the job, send the "delete" command to the low side input repository.

Could send notifications out if necessary. Presently the only notification allowed is to the Administrator, and that requirement may be filled by audit messages.

Clean up failed jobs by writing as necessary to audit and then deleting the job from the system. For the Low-to-High processing, the low-side user cannot review the job. Hence the clean up and delete of a failed job is done immediately, without the necessity for a Delete command.

Pass the job on to the next step in the processing, the FRR component.

For efficiency, the URR in Quiet Mode will not write to the SAN, but will have its database and disk files locally. This can be done because the job is sent immediately to the FRR.

Configurable items for this component

Quiet Mode, On or Off. If Quiet Mode is On, the component is configured for the Low-to-High functionality and will not send notifications or allow user review and release of the job. Any configurable settings for notifications and user commands only apply if the component is not in Quiet Mode.

If not in Quiet Mode, notification will always be sent to the submitting high-side user that the job passed Clean and is ready for review. Whether this notification should also be sent via email is configurable.

FDO Review and Release (FRR)

In this embodiment, basic operation of the FRR:

It is the next component in the chain after the URR, hence its basic input jobs are coming from the URR component.

When the job leaves the FRR for the Verify component, it is not deleted from the FRR. The job will be deleted by the Verify Repository after the job has passed Verify. This ensures not losing the job in flight if one node of the guard goes down. The FRR supports the Delete command sent by the Verify Repository.

All commands and comments that the FDO can input to the FRR are filtered through a separate command filter process to ensure that commands are cleaned before being accepted by the FRR.

If instantiated in the High-to-Low chain, the FRR holds cleaned jobs until the FDO releases them. Its functionality includes Upon receiving the job, send notifications out to the FDO as necessary.

To FDO—File is ready for review. This notification may also need to be sent via email as well as within the guard system.

The FDO can then review the job. The Transfer Agent is the component of the system that allows the review to take place by querying the database and copying the files to the FDO to allow him to review the job. The FRR simply holds the job in the system while this takes place.

If the job is acceptable, the FDO issues a Release command. The FRR will then transfer the job to the next step in the processing, the Verify component.

If the job is rejected by the FDO, the FDO may write comments about his findings. These comments are input through the command filter and stored with the job. The job is then sent back to the URR, so that the user may review the job.

After the FDO has issued the judgment of the job, the FRR sends out notification to the high-side user FDO has released job or FDO has rejected a job:

An input job could also possibly come back from the Verify Repository. Such a job would be one that has failed Verify. It would be marked as such in the database information. It would only be subject only to the Delete command. The Release command would not apply to it. It is sent back to the FRR to allow the FDO to review it.

When the FDO has finished the review of a job that failed Verify, then the FDO will send the Delete command for that job.

Jobs will have a configurable expiration time. Any job still in the system past its expiration time will be automatically deleted by the FRR.

If instantiated in the Low-to-High chain, the FRR is in "quiet mode" and only fulfills the basic system requirements of Support the Delete command from the Verify Repository.

Pass the job on to the next step in the processing, the Verify component.

In this embodiment, configurable items foreseen for this component:

Quiet Mode, On or Off. If Quiet Mode is on, the FDO review and release is effectively configured out of the system. The FDO is put in Quiet Mode for Low-to-High processing and may also be put in Quiet Mode for High-to-Low processing. Any configurable settings for notifications and user commands only apply if the component is not in Quiet Mode.

If not in Quiet Mode, notification will always be sent to the FDO that the job is ready for his review. Whether this notification should also be sent via email is configurable.

If not in Quiet Mode, notification will always be sent to the submitting high-side user informing him of the FDO's judgment. Whether this notification should also be sent via email is configurable.

Verify Repository (VR)

In this embodiment, the Verify Repository serves as a boundary process between the two domains High and Low. This boundary process will prepare the job to go from one domain to the other, including substituting names/ids as needed. The boundary process will send all notifications associated with the job. It will clean up any failed jobs so that they never cross the domain boundary.

(U) Verify Repository functionality:

VR will move the job from the output of Verify into its dedicated disk area via a copy/delete move.

VR will send back a Delete command to the FRR component in the chain, in order to move the job past the Verify stage.

VR will send out notifications:

If this is the High-to-Low processing:

Notify high-side user of job passing Verify.

Notify high-side user of job failing Verify.

Notify FDO of job passing Verify.

Notify FDO of job failing Verify.

If the job has failed Verify, and this is the High-to-Low processing, send the job back to the FRR for FDO review.

Substitute user names for the transfer into the other domain.

Rewrite the job information as necessary in order to transfer the job into the other domain.

Place a message in the queue for the Output Repository. It is at this point that the job transfers into the other domain.

Jobs will not be kept in the Verify Repository. They will be immediately moved to the next stage. For this reason, the Verify Repository will use local disk area to store the jobs. This component probably will not need a database, but will just manage disk files.

Output Repository

In this embodiment, Output Repositories hold the sanitized jobs for user pickup.

Output Repository functionality:

The Output Repository will move the job into its database and dedicated disk area via a copy/delete move.

The recipient side Transfer Agent will then be able to query the database and pick up the files for the recipient.

The recipient and/or designated users will be able to send a Delete command for this job to remove it from the repository. The Delete command will be filtered through a separate command filter.

Jobs will have a configurable expiration time. Any job still in the system past its expiration time will be automatically deleted by the output repository manager.

High-to-Low Messaging

In this embodiment, in High-to-low processing, the notifications and command messages include:

Delete command to IR from URR upon job completing Clean.

Notification to High-side user from URR—Job has failed cleaning

Notification to High-side user from URR—Job ready for review

Command to URR from High-side user—Release job to FDO

Command to URR from High-side user—Delete job

Notification to FDO User from FRR—Job ready for review

Figure 32:
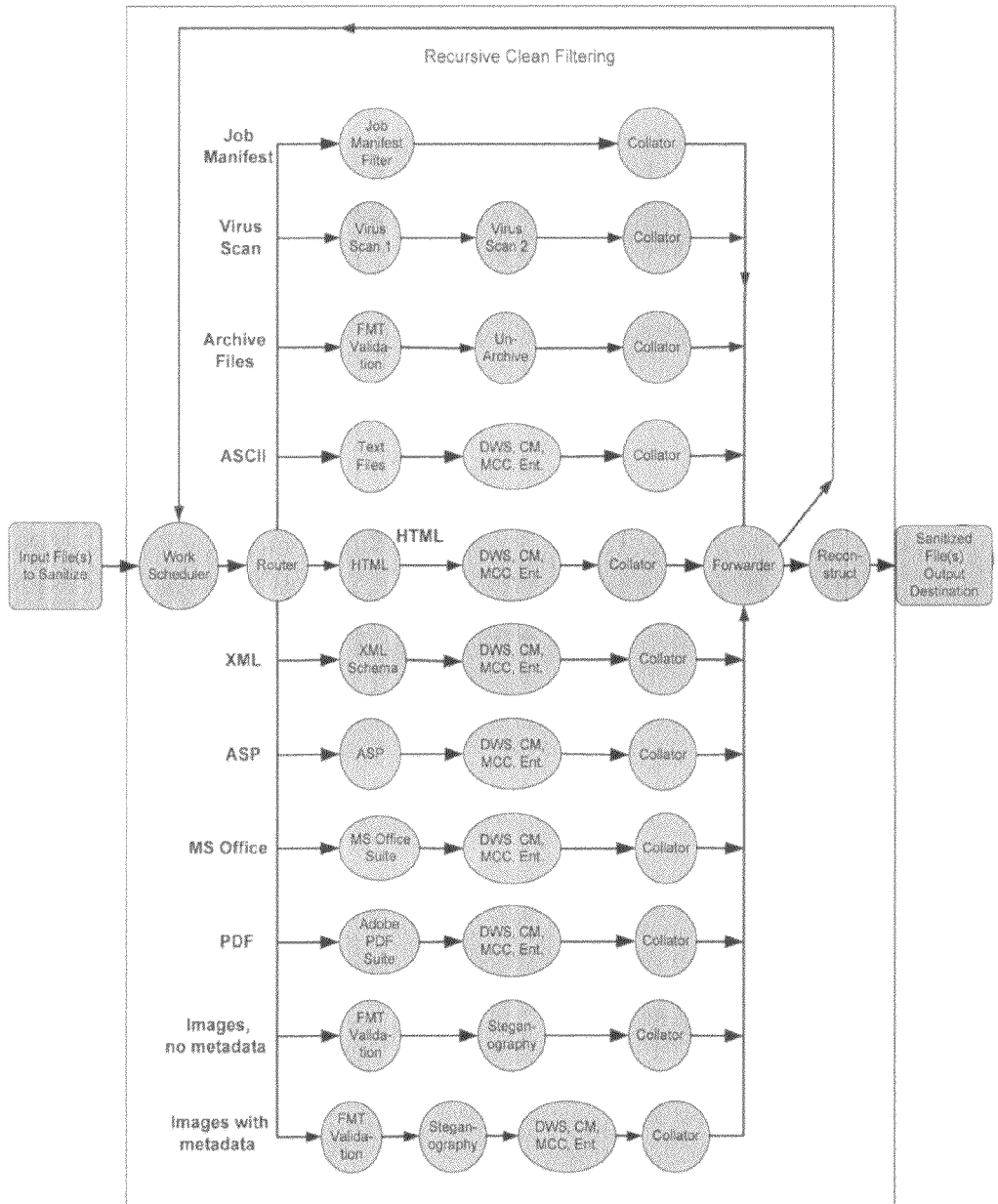
FIG. 32 shows an example of a summary of the filter pipelines in AFT.
Figure 33:
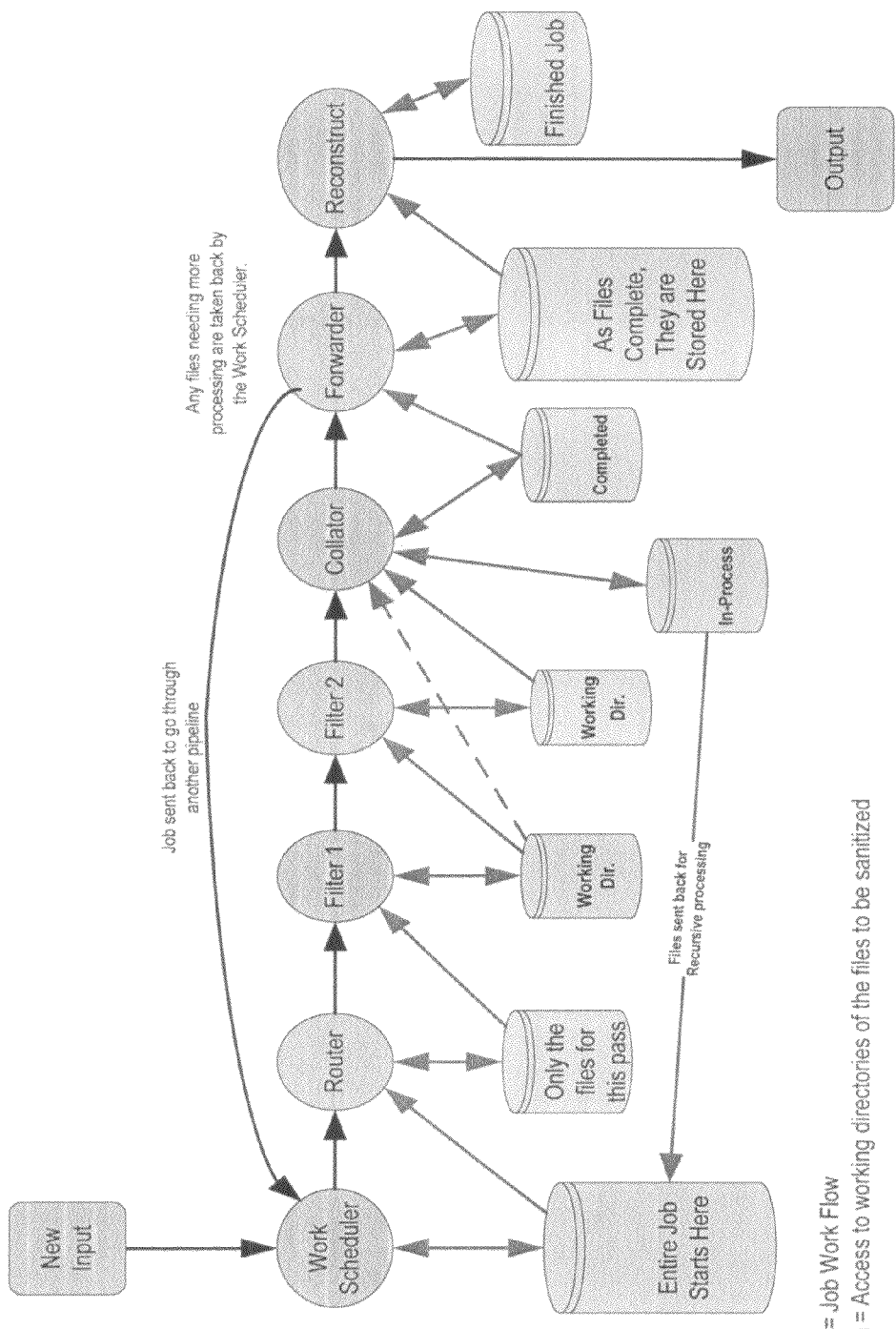
FIG. 33 shows an example of the use of directories and the control points for one pass through a filter pipeline in AFT.

Command to FRR from FDO User—Release job to Verify
Command to FRR from FDO User—Reject job
Notification to High-side user from FRR—FDO released job
Notification to High-side user from FRR—FDO rejected job
Job Transfer to URR from FRR—FDO rejected job is sent back for High-side user review
Delete command to FRR from VR upon job completing Verify.
Notification to High-side user from VR—Job successfully transferred
Notification to High-side user from VR—Job failed verify
Notification to FDO User from VR—Job successfully transferred
Notification to FDO User from VR—Job failed verify
Job Transfer to FRR from VRR—job that failed Verify is sent back for FDO review.
Low-to-High Messaging
In this embodiment, in Low-to-high processing, the notifications and command messages include:
Delete command to IR from URR upon job completing Clean.
Notification to Low-side user from IR—Job has been accepted into system
Delete command to FRR from VR upon job completing Verify.
Transfer Agent Access to RM Databases
In this embodiment, the Transfer Agents of the system are allowed to query the Repository controlled databases. They may also read files from the disk areas of the Repositories. The queries are allowed for the jobs relating directly to that specific user. The queries are implemented as library calls to allow only the necessary queries.
In this embodiment, High-side user Transfer Agent may:
For jobs which the High-side user has submitted for Cleaning:
Query High Side IR database to find jobs waiting there.
Query URR database to find jobs waiting there.
Read URR disk files to copy those files to the high-side user for review.
Query FRR database to find jobs waiting there.
For jobs waiting for High-side user Pickup:
Query High Side OR database to find jobs waiting there.
Read High Side OR disk files to download those files.
FDO User Transfer Agent may:
Query FRR database to find jobs waiting there.
Read FRR disk files to download those files to the FDO for review.
Query URR database to find FDO failed jobs waiting there.
Low-side user Transfer Agent may:
For jobs which the Low-side user has submitted for Cleaning:
Query Low Side IR database to find jobs waiting there.
For jobs waiting for Low-side user Pickup:
Query Low Side OR database to find jobs waiting there
Read Low Side OR disk files to download those files.
Interface Descriptions
In this embodiment, the Repository Manager preferably sends notifications back to the user interface. The RM will create a message which has the following:
Recipient(s)
Job id
Message to relay
Whether email notification is also needed In this embodiment, this message will be relayed back to the relevant Transfer Agent(s).
Filter Pipelines
In this embodiment, filters are organized into document processing paths called pipelines, where each pipeline operates on a specific type of file in the job. FIG. 32 shows an example of a summary of the filter pipelines. The "DWS, CM, MCC, Ent" bubbles denote a suite of filters; the Dirty Word Search, Classification Markings, Mobile Code Check and Entropy filters. The MS Office Suite and the PDF Suite also denote more than one filter.
In this embodiment, the incoming files to be sanitized may consist of several types of files, all included in one job submission. For example, a Word doc file, an Adobe pdf file, and a zip file may comprise one job submission. Recursion through the filter pipelines may be needed to complete all the needed sanitization for the different file types. Recursion is implemented by sending the job back from the Forwarder to the Work Scheduler. The Work Scheduler then sends the job through the next pipeline needed for the job.
Pipeline Management
In this embodiment, FIG. 33 shows an example of the use of directories and the control points for one pass through a filter pipeline. In this diagram, the filter pipeline consists of Filter 1, Filter 2, and the Collator. The Work Scheduler, Router, Forwarder and Reconstruct are the structural components shared between all pipelines.
In this embodiment, the filtering process is controlled with job information files, which direct all the components in their work.
Job Information Files
Job Manifest file
In this embodiment, this file has the top system level data associated with this job. The Job Manifest will follow the job throughout the system. The information in the Job Manifest can include
Originator of job
Recipient(s)
FDO
Unique job name
Time/date of job
Configuration version to use in processing this job
Priority of job
What notifications should be sent, including whether e-mail notification is needed
Filenames of the files to be sanitized
In this embodiment, the Job Manifest is originally written by the Transfer Agent. Upon being sent to the Work Scheduler of the clean, the first step of the Clean process will be to send the Job Manifest through a filter to check all its contents.
Job Tracking File (JTF)
In this embodiment, the JTF contains the information needed to control this job's sanitization processing; it is the master roadmap for job processing. This file persists across all the sanitization processes within the Clean subsystem. It details the work to be done to each file, and has a record of the work already done to each file.
In this embodiment, the JTF is created and written to by only the Forwarder. The Work Scheduler may only read this file. The JTF is not read or written by the filters. To enforce these access rules, the JTF is kept in a separate directory.
In this embodiment, the information in the JTF includes of the following elements:
Job identification
Job priority
Configuration version to use in processing this job
A section for each file in the job:

The roadmap of every pipeline and filter which this file must be sent to

A check-off of every pipeline and filter which this file has completed

Job Transaction Ledger (Ledger)

In this embodiment, the Ledger files are specific to one pass through a filter pipeline; they are the tickets for one journey from Work Scheduler to Forwarder via a specific pipeline.

In this embodiment, the Ledger is created by the Work Scheduler. It contains applicable instructions for the journey through the pipeline. As an example, the Ledger may start with this information:

Job identification
Job priority
Configuration version to use in processing this job
A section for each file in the job
    Name of this pipeline
    Name of every filter in the pipeline this file must go through
    Any special instructions In this embodiment, the Ledger is placed in a separate directory which all the Filters in the pipeline can read.

In this embodiment, as each Filter operates on the file, it will record the processing of the file in the Ledger, including any findings or cleaning done on the file. The Filter has an append-only ability to write the Ledger, in order to ensure that one filter cannot over-write the results of a previous filter.

In this embodiment, when the job arrives at the end of the pipeline at the Forwarder, the Forwarder merges the relevant Ledger results into the JTF file. The Forwarder merges the findings and cleanings done on each file into the Clean Report. After all information from the Ledger has been transferred to the JTF and Clean Report, the Forwarder deletes the Ledger.

Clean Report

In this embodiment, the Clean Report file is the record of all cleanings and findings for this job. This report will be the basis for all reports seen by the High-side user and the FDO, and will be saved in Audit as the official record of the cleaning done on this job. The Clean Report is created and updated by the Forwarder and kept with the cleaned job files. The Clean Report is updated after each pass through the filter pipelines as the Forwarder analyzes the Ledger files.

Collator Role in Pipeline Management

In this embodiment, the Collator's function is to ensure the Forwarder does not have any access, including read access, to files which have not yet passed all the Clean steps. The Forwarder may read about these files and what has happened to them by reading the Ledger information. The Forwarder can then use this Ledger information to decide what to do next. However, the Forwarder may not have read access to the file itself.

In this embodiment, the Collator separates the cleaned files from the files still in process. The Collator puts the files which have passed all Clean steps into a directory which the Forwarder may read. The Forwarder can then pull these files into its working directory.

In this embodiment, the Collator puts the files which are still in process into a directory which the Forwarder does not have any access to. The Work Scheduler can then pull these files back into its working directory, to prepare them for the next pass through the filter pipeline.

Handling Extracted Files

In this embodiment, files may be created from other files, either by un-archiving or by extraction of embedded files, for example, extracting out a file embedded in an MS Office document. Such files will be documented in the Ledger, detailing their extraction process so that the original file can later be reconstructed. The extracted files will be placed in a dedicated directory which the current filter only has write access for, effectively putting them in a quarantine area.

In this embodiment, the extracted files will not be available to the next filter in the pipeline. They will stay in the quarantine area until the job arrives at the Collator. The Collator will then move these files into a section of its in-process directory, so the Work Scheduler can pick them up and integrate them into the overall job as appropriate.

Consumable Files

In this embodiment, in its processing, a filter may create a subset or variant of the information in a file it is sanitizing. This information may be written out into another working file, to be used by that filter or by another filter in the same pipeline. In that case, this newly created working file is a "consumable", and will be written into the filter's working directory. It must be deleted before the job leaves the pipeline; it may be deleted by one of the filters or it may be deleted by the Collator.

As an example of this, for an MS Word.doc file, one thing that might be done is write all the content of that file, text plus any other fields, into an XML file. The XML file would then be processed by the Dirty Word Search (DWS), as it is now in a form which the DWS can process. Then the XML file is deleted after the DWS. The XML file was used by the filter chain and deleted before the job left the pipeline; it qualifies as a consumable file.

Usage of Type Enforced Directories

In this embodiment, to support the pipeline management goals, type enforced directories may be used. For example, non-components may be type enforced directories, with type-enforced access. "RW" denotes Read/Write access, and "R&D" denotes the Read and Delete access needed for copying the job from component to component. "RA" indicates read access and append-only write access.

Processing Failed Files

In this embodiment, when a file fails the clean processing, the failure notification is written to audit. The processing of the file will be ended gracefully, and the failed file is sent to the audit. The Ledger is updated with all information about the file failure. Then the failed file is deleted from the job. If a failed file does reach the Collator, the Collator will delete it from the job.

In this embodiment, if this failure means the entire job has failed, then after writing to audit as required, all the job files will be deleted. The filter discovering the failure will write the job failure information into the Ledger, and delete files as it can. The Ledger then goes forward in the system and the job failure is recorded in the JTF and the Clean report. This will instruct the Collator, Forwarder and Work Scheduler to execute their procedures to clean up failed jobs. The Clean report, with the history of the processing of the job, will be sent forward into the Repository. The Repository will send out failure notifications and provide failure reports as required.

Synopsis of Pipeline Processing

In this embodiment, each file preferably starts from the Work Scheduler area, goes through the appropriate Filter processes and gets placed in the Forwarder area. If its processing is not yet completed after the current pass through the pipeline, then the file will be caught by the Collator and will be pulled back to the Work Scheduler area.

In this embodiment, when the job first comes into the Work Scheduler, the Work Scheduler will send the Job Manifest file through its filter pipeline. When the Forwarder gets the cleaned Job Manifest, it will analyze the Job Manifest and write the Job Tracking File (JTF). Then, the second time around, there will be a JTF written for the Work Scheduler to refer to for processing instructions.

In this embodiment, the Work Scheduler will read and analyze the JTF. It will copy/delete back any unfinished files and newly extracted files that are currently in the Collator area. It will integrate the newly extracted files into the job. If any files need a file extension and "magic number" checks for file type, the WS will do this. Then the WS will choose the next files to process and the next pipeline to send them to. The Work Scheduler writes the Ledger with this information and sends the job to the Router.

In this embodiment, the Router uses the Ledger as instruction, and pulls out only the necessary files from the job and sends them to the correct pipeline.

In this embodiment, each filter operates on the files, putting their findings into the Ledger. If new files are extracted, the extracted files are put into the "quarantine" directory, to be pulled back later and integrated into the job by the Work Scheduler.

In this embodiment, when the job reaches the Collator, it will sort out the cleaned files. Files finished all clean processing are put into the directory for the Forwarder. All other files are put into the directory for the Work Scheduler to pull back. The Collator then sends the job to the Forwarder.

In this embodiment, the Forwarder reads and analyzes the Ledger. It updates the Job Tracking File and the Clean Report with the Ledger information, and then deletes the Ledger. It pulls in any finished files. If the entire job is not complete, the job is sent back to the Work Scheduler.

In this embodiment, when the job completes, the Forwarder knows. At this time, all the files will be out of the Work Scheduler area. But the Work Scheduler has not cleaned up the directory yet, as it could not know if the files will succeed in moving into the Forwarder area or whether they will be returned. So in order to clean up the empty directory in the Work Scheduler area, the Forwarder will put a delete command in the queue for the Work Scheduler for that job. The Work Scheduler will recheck to ensure the directory is empty and delete it. The Forwarder can then move the job to the Reconstruct process.

Work Scheduler

In this embodiment, the purpose of the Work Scheduler is to perform the following functions:

Read the Job Tracking File (JTF) to determine the processing to be done upon this pass through the filters.

Write out Ledger files to direct the processing for this pass through the filters.

If this is the first pass through the filters for a new job, there will not yet be any JTF for this job. In this case, send the Job Manifest through the Job Manifest filter pipeline.

If this is the first time the job is seen, copy the job into the WS area. Do not copy/delete the job in, only copy it, as a backup of the job must remain in the input repository.

Run the file extension check and the "magic number" check on all job files as necessary. The "magic number" check refers to reading an easily available metadata signature from the file to confirm its type. These two checks are not the definitive validation of file type, but rather are a pre-check that must be passed before any processing is allowed on the file.

Take back the unfinished files from the Collator area.

Merge any newly extracted files into the job.

Keep track of the levels of embedded and archiving when merging new files into the job. Fail the job if there are too many.

Send the job to the Router.

Accept the delete command for a job id. The command is just a notice that the job really did finish all cleaning. The action the Work Scheduler must take is to check that the directory is really empty and then delete it.

Router

In this embodiment, the functions of the Router are:

Read and interpret the Ledger file.

Move only the job files to be worked on during this pass.

Send the job to the appropriate filter pipeline. Pipeline is read from the Ledger.

Filter Components

In this embodiment, the function of a filter component is to run one related set of analysis/clean functions on the document to be sanitized. Filter components will be run in series to implement all the required Clean functionality.

In this embodiment, filters will have management code, Common Control Functions, which allows it to run as part of the Guard system.

In this embodiment, the Common Control Functions include:

Take the job from the input queue. The information taken from the queue consists of the directory where the job is now residing.

Implement the copy/delete move to bring the job into this filter's own working directory.

Read the Ledger file to determine the configuration version which this job must be processed with.

If this configuration version does not match the version which the filter is currently operating with, read the new version information and set up to use the new configuration.

Read the Ledger file to find any relevant information regarding the processing already done to the job.

Determine the processing to be done for this file.

Direct the file sanitization software, which may be a third-party package, to implement the processing.

Write the results of the processing into the Ledger.

Send any necessary audit messages to the system audit.

Handle failed files and jobs.

Once the job is finished, place the job into the queue of the next filter or component in the chain.

In this embodiment, the filter component may call third-party software to implement the actual cleaning of the input files. If the third-party software needs to be executed from a command line, the filter component will fork a child process to handle the job. If the third-party software uses threading, the filter component will create and use threads.

In this embodiment, the filter checks for new policy. The policy version to use for each job is specified in the Ledger file. The filter will check the Ledger policy version against the policy version it is currently running. If there is a discrepancy, the filter is updated by reading its new policy from the system configuration area.

In this embodiment, the AFT system-level configuration for the filter components will be viewed in terms of administrative concerns for site security policy. The configuration instructions sent to the filter component to implement this policy must necessarily be much more detailed and written in the format is needed for the specific filter. A translation library will interface these two levels, allowing policy updates to be done efficiently.

Collator

In this embodiment, the Collators performs the following functions:

Read and interpret the Ledger file, including what the filters write as their results.

Move files which have completed all cleaning into the Completed-Files directory, for the Forwarder to pick up.

Move files which need more clean processing into the In-Process directory, for the Work Scheduler to take back.

Move any newly extracted files into an appropriate subdirectory of the In-Process directory, for the Work Scheduler to take back.

Update the Ledger.

Send the job to the Forwarder.

Forwarder

In this embodiment, the function of the Forwarder is the following

Read and interpret the Ledger file.

Merge relevant results from the Ledger into the Job Tracking File (JTF).

Merge relevant results from the Ledger into the Clean Report.

Delete the Ledger file.

In this embodiment, if this is a new job, there will be no existing JTF for it. In this case, read the Job Manifest file and create the JTF for this job.

In this embodiment, pick up the files which are waiting in the Collator's Completed Files directory.

In this embodiment, if the job has completed all processing, send the Delete command back to the Work Scheduler. Delete the Job Tracking File (any needed information is now in the Clean Report). Send the job to the Reconstruct component.

In this embodiment, if the job still has more processing to be done, send the job back to the Work Scheduler.

Reconstruct

In this embodiment, the functions involved in the Reconstruct component are:

Move the job in from the Forwarder.

If any files need to be re-archived, do the re-archive.

Verify the files being sent out match the files in the Job Manifest.

Update the Clean Report with all relevant information.

Send job to next step—a Repository.

Filter Types

In this embodiment, the following table shows examples of sanitization/verification capabilities which apply to file types:

| Sanitization/Verification Capabilities in AFT | |
|---|---|
| Capability | Notes |
| Virus Scan | The virus identification capability must be updatable through the Administrative interface. There will be 2 separate virus scans for every file, McAfee and Norton are required. |
| Dirty Word Search (DWS) | DWS must use configurable Dirty Word and Clean Word lists. These lists will be configured by a policy administrator. A standard algorithm may be used in implementation of the DWS. All files must go through the DWS, including image files which may have text in metadata fields. |
| Classification Markings | The Markings must be configurable by the policy administrator, both for the words used in the markings and where the markings are placed in the document. |
| Mobile Code Check | Category 1 and Category 2 Mobile Code are not allowed. Category 3 Mobile Code is allowed to be transferred. The AFT Guard will be compliant with DOD policy for mobile code. |
| Hidden Data | If hidden data is found, the action taken may be to remove it and report it, or it may fail the file. |
| Metadata | Removing metadata will be done as much as possible, with the exception that for some file types there are certain metadata fields which must be left in the file or the file will become unusable. The AFT Guard will inspect all files for meta data and allow for policy driven modification of meta data. |
| File Type Check | The first method to check file type is be the file extension check. No file without a file extension in its name will be allowed through the AFT guard.<br>A second method used will be a "magic number" validation. This refers to the fact that most file types have some internal metadata which can be easily checked to confirm file type. Note that not all file types have a "magic number".<br>These initial checks will determine if a file can proceed into the guard filtering. These checks are not a complete format validation. |
| Format Validation | The detailed format validation will necessarily be done by a filter specific to the file type. Format validation filter will check the format and data within the file for anomalies. |
| Nested Objects | The term "nested objects" refers to archived or compressed files. The mandate is extract all nested objects out into separate files which are then sent through all the Clean processing required for their file type. The AFT must also ensure the parent file stays within the configurable nesting level. |

| Sanitization/Verification Capabilities in AFT | |
|---|---|
| Capability | Notes |
| Embedded Objects | The term "embedded objects" refers to files held within another file as, for example, OLE objects. Embedded objects must be detected and extracted and cleaning done upon the extracted files. Detection and extraction will be done by filters specific to the file type. The AFT must also ensure the parent file stays within the configurable embedding level. |
| Steganography Check | Steganographic information is information hidden in plain sight by use of alternative formats For example, steganographic information may be hidden in image files by stealing the least significant bits of the image data, or could be hidden in text files by Mime-encoding non-text data. The AFT guard will check for this type of information. |

In this embodiment, the table below shows examples of file types supported:

| Target File Types | |
|---|---|
| File Category | File Type |
| MS Office Files | Word, .doc |
| | Excel, .xls |
| | PowerPoint, .ppt |
| | Rich Text, .rtf |
| Adobe PDF files | Only Version 1.3 and previous |
| Archive Files | .zip |
| | .Z |
| | .tar |
| | .gz |
| | .rar |
| | .bz |
| ASCII | Only ASCII files of a known format will be allowed through the Guard. |
| | All such files must have a file extension. |
| | The format and file extension information will be entered into the Guard by the site policy administration. |
| HTML | .htm, .html |
| | Only html files of a known schema will be allowed through the Guard. The schema information will be entered into the Guard by the site policy administration. |
| XML | .xml |
| | Only xml files of a known schema will be allowed through the Guard. The schema information will be entered into the Guard by the site policy administration. |
| Active Server Page | .asp |
| | Only asp files of a known schema will be allowed through the Guard. The schema information will be entered into the Guard by the site policy administration. |
| | The processing for the .asp files needs more research concerning content validation and the configurations the policy can set. The information presented in this design is a starting point, to be modified further when more is known about the problem space. |
| Image files | .jpg, .jpeg |
| | .bmp |
| | .tif, tiff |
| | .wmf |
| | .gif |
| | .png |

In this embodiment, the following table applies to types of MS Office files (Word, PowerPoint, Excel, Rich Text).

| Filtering for MS Office Files | |
| --- | --- |
| Requirement | Pipeline and Filter Implementing Requirement |
| File Type Check - check file extension and check "magic number" information if it is available. | Work Scheduler |
| Virus Scan | Virus Scan pipeline, Virus Scan 1 and Virus Scan 2 |
| Hidden Data - Discover and scrub out any hidden data. | MS Office pipeline, Hidden Data filter within the MS Office Suite |
| Metadata - Discover and scrub out metadata. | MS Office pipeline, Metadata filter within the MS Office Suite. There may be some metadata fields which will be allowed to remain in the document; this must be configured by site policy. |
| Format Validation - Detailed format and data validation. | MS Office pipeline, MS Office Format Validation filter within the MS Office Suite. This filter will also extract all fields of the document into a searchable text based format (xml in this case) so that the information can be searched by the later filters in the pipeline. |
| Embedded Objects - Pull out embedded objects into their own separate files for further processing. | MS Office pipeline, MS Office Embedded filter within the MS Office Suite. This filter will extract embedded objects out into separate files. The files names will be assigned by the Embedded filter, and as such will be trusted, the filenames will not need filename validation or dirty word search. |
| Link Processing - Check all document links against policy approved links. | MS Office pipeline, MS Office Link filter within the MS Office Suite. This filter will use the extracted file. Document links will be checked against the site approved links. Any links not on the approved list will be scrubbed out. |
| Macro Processing - Check all document macros against policy approved macros | MS Office pipeline, MS Office Macro filter within the MS Office Suite. This filter will use the extracted file. Macros will be checked against the site approved macros. Any macros not on the approved list will be scrubbed out. |
| DWS - Dirty Word Search | MS Office pipeline, DWS within the DWS Suite. The DWS Suite runs filters which apply to all text within files. This filter will use the extracted file. Clean and dirty word lists are configured by site policy. |
| Classification Markings - Verify correct classification markings. | MS Office pipeline, CM filter within the DWS Suite. This filter will use the extracted file. Rules for classification markings are configured by site policy. |
| Mobile Code Check - Check for Category 1 and Category 2 Mobile Code. | MS Office pipeline, MCC filter within the DWS Suite. This filter will use the extracted file. |
| Entropy - Runs a statistical analysis of the file to verify this truly is ASCII text. | MS Office pipeline, Entropy filter within the DWS Suite. This filter will use the extracted file. |

In this embodiment, a special consideration is the requirement to maintain trusted links and macros in MS Office documents.

In this embodiment, in general, what vendors can offer is the ability to extract fields from the document out into an xml file. Additional drivers and filters will make use of this ability to fill the requirement to maintain trusted links and macros.

In this embodiment, the AFT mechanism for configuring the list of trusted macros and the list of approved links will have the policy administrator enter a reference file which has all the trusted macros or trusted links in it, and no other. All macros and links from this file will be extracted and saved as site policy. During Clean processing, the Macro and Link filters will refer to the site policy to evaluate which links and macros are approved.

In this embodiment, other file types may be filtered based on similar requirements.

Interface Components
Overview

Figure 34:
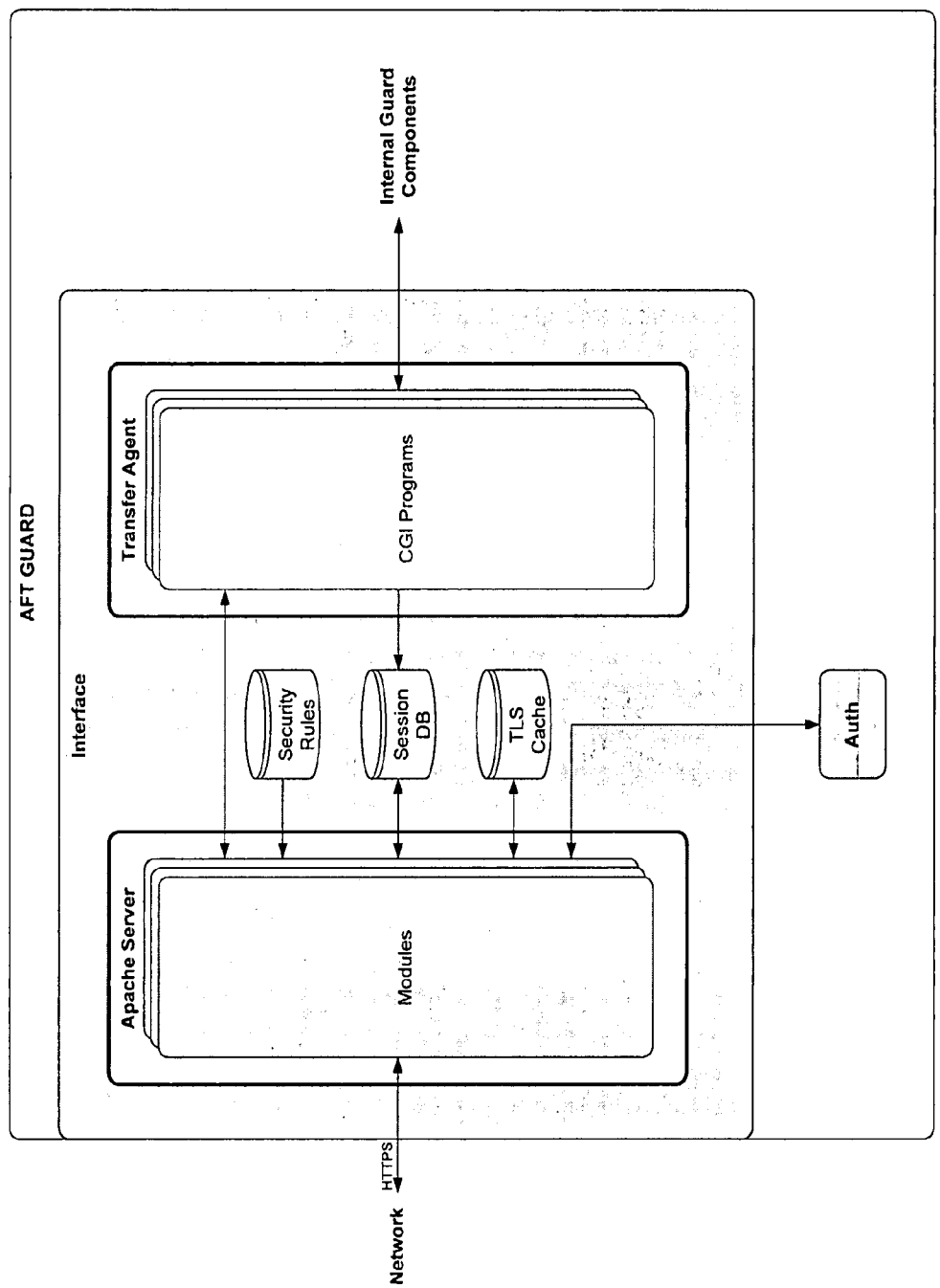
FIG. 34 shows an example of AFT Guard Interface subcomponents.

In this embodiment, the AFT Interface supports the Hypertext Transport Protocol (HTTP) encapsulated in TLS; together, the two protocols are usually called HTTPS. The first Interface subcomponent, the Apache Server, controls HTTPS communications between the users and Guard via the network. A separate Apache Server supports each of the Interface roles (high-side user, FDO, and low-side user). The roles themselves are implemented by a second Interface subcomponent, the Transfer Agent. A separate Transfer Agent is associated with each Apache Server. The Apache Server and Transfer Agent communicate with other Guard components via the third Interface subcomponent, the AFT Application Programming Interface (API). FIG. 34 shows an example of three AFT Interface subcomponents and some internal detail.

HTTP Server

In this embodiment, the Apache Web server was chosen as the AFT HTTP server because it offers a flexible and highly customizable architecture, which will enable enhanced security by tailoring to include only the modules that are required. It is the most-used Web server on the Internet, with more than 70% of all Web sites using it, and the associated SELinux policy is well established and widely distributed.

In this embodiment, the Apache Server supports communications between the user and the Guard by implementing the following functions.

Common Gateway Interface (CGI)
TLS Session Management and Encryption
Authentication
User session tracking.
HTTP-level security
Transfer Agent In this embodiment, the Transfer Agent provides the application support needed for the Interface role. It is implemented as a set of Common Gateway Interface (CGI) programs. These CGI programs communicate with other Guard components via the AFT Application Programming Interface (API).

AFT API

In this embodiment, the AFT API was developed to shield the Interface from the details of communicating with the Guard's internal components. It provides the following core capabilities in a set of easily understood library functions that the Interface can call. Examples of services provided by the API are listed below:

int AFTstrongAuth(const strongCred * const, userInfo * const); /* call Guard Auth component to validate strong authentication credentials (X.509 certificate), and receive user information if successful */
   int AFTweakAuth(const weakCred * const, userInfo* const);/* call Guard Auth component to validate weak authentication credentials (username/password), and receive user information if successful */
   int AFTputFiles(const fileContainerDir * const, const manifest* const); /* input directory of files for delivery according to info in the manifest */
   int AFTlistFiles(fileList* const, const userInfo* const); /* get list of files awaiting user action */
   int AFTgetFiles(const fileList * const, const userInfo* const); /* download specified output files for user */
   int AFTgetMsg(char [MAXMSGSZ], const userInfo * const); /* read a message sent to the user by the Guard, and return the length (0 means no message waiting) */
   int AFTcontrol(const controlMsg * const, const userInfo* const); /* forward control message from user to Guard */
   int AFTaudit(const auditMsg * const, const userInfo* conts); /* send a message to the audit component */
Apache Server
Component Description In this embodiment, the Apache Server supports communications between the user and the Guard by providing the following capabilities.

Figure 35:
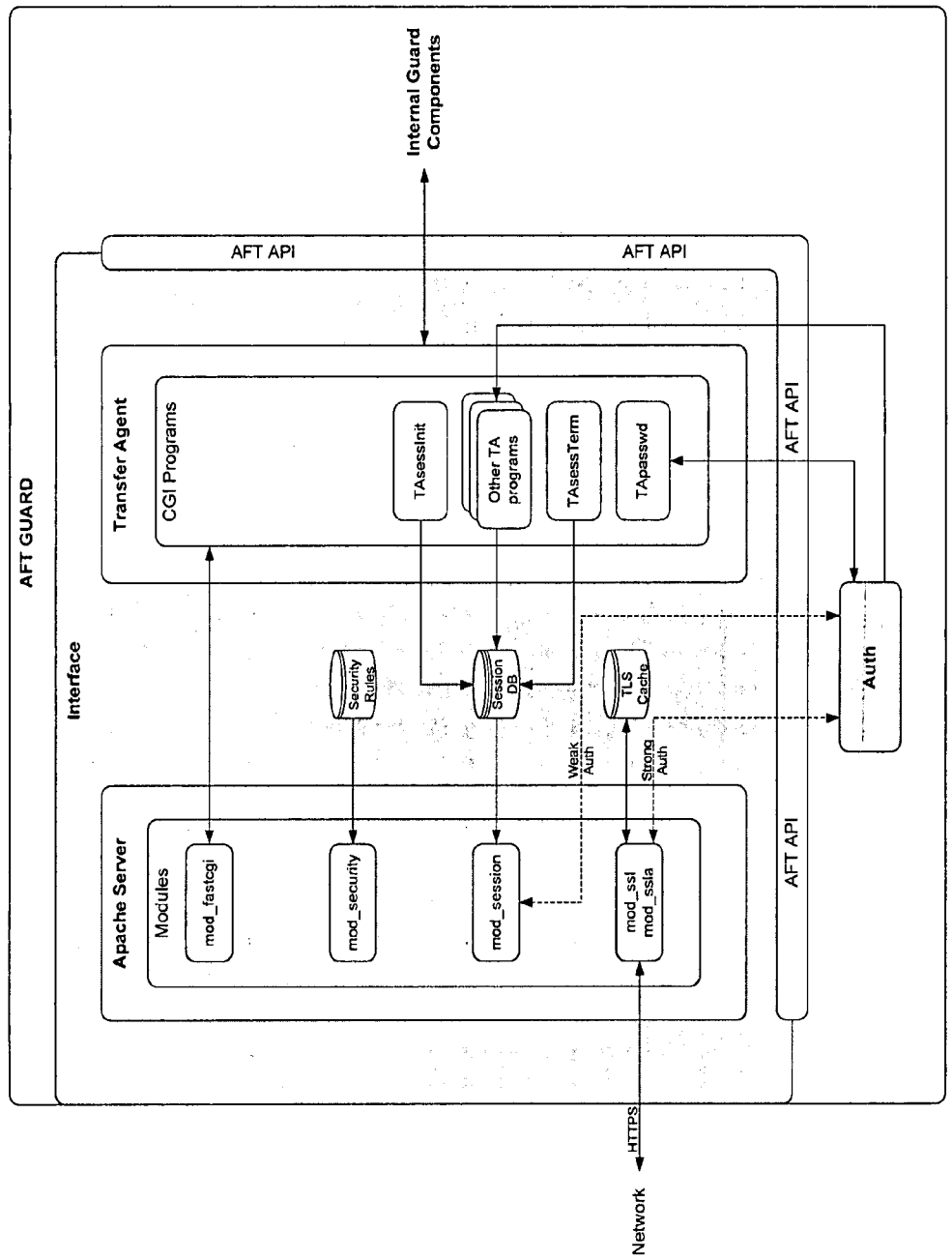
FIG. 35 shows an example of AFT Guard Interface detail.

Common Gateway Interface (CGI)
TLS Session Management and Encryption
Authentication
User session tracking
HTTP-level security
Component Design In this embodiment, much of Apache's functionality is provided by modules, which are external libraries loaded at start time as specified by configuration options. The Apache functions important for AFT are controlled or affected by modules that are either distributed with Apache, or will be developed by the AFT developers. FIG. 35 shows an example of the AFT Guard Interface detail, which includes the Apache Server subcomponent and associated modules.

In this embodiment, although not shown in the diagram, error conditions described in this document are reported to the Audit component via the AFTaudit function of the AFT API described in a separate section of this document.

Common Gateway Interface (CGI)

In this embodiment, when the Apache Server gets a request for a CGI program, it executes the CGI program as another process (i.e., a separate application); Apache passes this process some parameters and collects its output, which it then returns to the client just as if had been fetched from a static file. This provides a very flexible and dynamic application environment on the Apache Server, because CGI programs can tailor the HTML returned to the browser that initiated the request. From an SELinux perspective, CGI also provides a method to separate the Apache Server and application domains because executing a program is one way to transition from one domain to another.

In this embodiment, the CGI capability is implemented as a module in Apache. AFT uses a third-party module, mod_fastcgi, which enables CGI programs to be implemented as long-running daemons, avoiding the fork/exec overhead of normal CGI execution. These daemons communicate with mod_fastcgi via a TCP or UNIX socket by calling FastCGI library functions. This enables them to retrieve variables that are passed to normal CGI programs via the environment, and to redirect their standard input and output over the socket to read HTTP POST data and write responses back to the client.

TLS Session Management and Encryption

In this embodiment, TLS encryption is implemented by the mod_ssl module. Users may connect to the Guard using HTTP over TLS, or HTTPS, so they must specify an https:// prefix on the URL they type into their browser. Establishing a TLS session is computationally expensive, so mod_ssl caches information to avoid full session set-up requirements for subsequent HTTPS requests. AFT stores this cache on the SAN so that the TLS session may be redirected to any node without interruption as the user clicks through the application.

TLS Session Types

In this embodiment, two flavors of HTTPS connections are possible, depending on whether weak or strong authentication is used. For weak authentication, only the server (Guard) side of the connection presents an X.509 certificate to initialize the TLS session. This means the user is assured that they're communicating with the Guard (not another machine masquerading as the Guard), but not vice versa. For strong authentication, both the Guard and user present certificates, so both sides are assured they're communicating with the correct entity.

Encryption Types

In this embodiment, AFT employs nCipher's nShield Hardware Security Module (HSM) cards to reduce encryption and decryption overhead. These cards are driven by Certicom's Apache mod_ssl replacement module. AFT will support the intersection of the encryption types supported by the Certicom mod_ssl module and the users' browsers.

Authentication

In this embodiment, the Apache Server supports both weak and strong authentication. Weak authentication is based on username and password pairs. Strong authentication requires an X.509 certificate issued by an organization's Public Key Infrastructure (PKI). The type of authentication is configurable, based on the Apache 'Require' directive for location specified by the URL.

Weak Authentication

In this embodiment, weak authentication, based on username and password, is provided by the mod_session module. This is an AFT replacement for the mod_auth Apache module, which enables session tracking in addition to authentication. It provides the check_user_id and auth_checker Apache hooks invoked by the other modules to ensure the request is authenticated. The authentication algorithm is configurable, and may be Basic or (more secure) Digest, depending on what the users' browsers support.

In this embodiment, if an unexpired session record doesn't exist for the user, mod_session instructs the browser to prompt the user for username and password. Upon receipt of the username and password, mod_session validates the information by calling the AFTweakAuth function of the AFT API, which communicates with the Auth component. If validation fails because the password has expired, it audits the event and redirects the browser to the Passwd CGI program that helps the user create a new password. If validation fails for another reason, it audits the event and repeats the authentication process a configurable number of times. If all attempts fail, it calls AFTweakAuth with a null credentials parameter, which instructs the Auth component to disable the user account, and audits the result.

In this embodiment, if authentication is successful, mod_session updates the memory-resident request record so other modules can verify that authentication has occurred. Part of this update includes the AFT userID returned by the Auth component, which is used throughout the system to uniquely identify a user without revealing the username. Mod_session also stores the userID in, and deletes other authentication credentials from the CGI environment used to pass information to the Transfer Agent. It then redirects the browser to the SessInit program, which creates and stores a new session record in the session database, so that it can track the session.

Strong Authentication

In this embodiment, strong authentication, based on an X.509 certificate, is provided by the mod_ssl module as part of TLS session establishment. Because mod_ssl is provided by a third party, Certicom, and isn't easily modified, the mod_ssla AFT module hooks in with it to validate the certificate. Mod_ssla calls the AFTstrongAuth function of the AFT API, which communicates with the Auth component. If validation fails, mod_ssla immediately calls AFTstrongAuth with a null credentials parameter, which instructs the Auth component to disable the user account, and audits the action. Additional authentication attempts are not allowed because any failure indicates the certificate is invalid.

In this embodiment, if authentication is successful, mod_ssla updates the memory-resident request record so other modules can verify that authentication has occurred. Part of this update includes the AFT userID returned by the Auth component, which is used throughout the system to uniquely identify a user without revealing the user's name or other information stored in the X.509 certificate. The mod_session module subsequently uses the request record to store the userID in, and delete other authentication credentials from the CGI environment used to pass information to the Transfer Agent. Mod_session then redirects the browser to the SessInit program, which creates and stores a new session record in the session database, so that it can track the session as described in the next section.

User Session Tracking

In this embodiment, the AFT mod_session module performs most user session tracking functions to satisfy two requirements.

Limit each user to a single session at a time.
Expire sessions when the user hasn't executed a request for a configurable period.

In this embodiment, the session tracking algorithm benefits from the following session characteristics.

All communications are authenticated and protected by TLS and authenticated, the former of which assures that session traffic originates from the machine that performed the authentication This protects against session spoof attacks, so mod_session doesn't have to.

Limiting a user to a single session involves a simple, Boolean test. This means that the very existence of a session record for the user determines whether a session exists.

Session expiration can be accomplished by comparing a timestamp value stored in the session database (updated whenever the user executes a request) with the current time. This obviates the need to send a session ID to, or store it on the browser side.

In this embodiment, these session requirements and characteristics eliminate any need for session ID tokens, so session tracking requires only a very simple session database. The session database records are keyed (searched) by userID. The record values are the timestamp of the associated user's last request.

In this embodiment, the mod_session module reads the session database, but does not update it. All updates are performed by the CGI application programs. If necessary, mod_session redirects the browser to another CGI program that performs an update as part of its processing. These redirects can occur for the following situations.

A session record does not exist for the authentication username. Authentication is executed as described in Section 2.1.3, and the browser is redirected to the SessInit CGI program.

A session timestamp has expired. The browser is redirected to the SessTerm CGI program In this embodiment, updating the session record timestamp is done by the CGI programs because some requests, those submitted automatically by the browser on behalf of the user, should not affect session expiration. Automatic updates are controlled by the CGI programs; ergo, timestamp updates are controlled by the application, and mod_session doesn't need to be modified whenever an application change affects an automatic request.

HTTP-Level Security

In this embodiment, the AFT Apache Server employs the mod_security third-party module, open source intrusion detection and prevention engine for Web applications. It performs the following functions.

Anti-evasion techniques
   Remove multiple forward slash characters
   Treat backslash and forward slash characters equally (Windows only)
   Remove directory self-references
   Detect and remove null-bytes (% 00)
   Decode URL encoded characters
Special built-in checks
   URL encoding validation
   Unicode encoding validation
   Byte range verification to detect and reject shellcode
Rules
   Any number of custom rules supported
   Rules are formed using regular expressions
   Negated rules supported
   Each container (VirtualHost, Location, . . . ) can have different configuration
   Analyses headers
   Analyses individual cookies
   Analyses environment variables
   Analyses server variables
   Analyses individual page variables Analyses POST payload
Analyses script output
Actions
  Reject request with status code
  Reject request with redirection
  Execute external binary on rule match
  Log request
  Stop rule processing and let the request through
  Rule chaining
  Skip next n rules on match
  Pauses for a number of milliseconds
File upload
  Intercept files being uploaded through the Web server
  Store uploaded files on disk
  Execute an external script to approve or reject files (e.g., anti-virus defense)
Other
  Change the identity of the Web server
  Easy to use internal chroot functionality
  Audit logging of complete requests
Performance-Related Design Decisions In this embodiment, nCipher's nShield HSM cards reduce overhead associated with TLS encryption. Certicom's mod_ssl Apache module replacement offloads encryption and decryption tasks to the card.

In this embodiment, the mod_fastcgi module enables CGI programs to be implemented as long-running daemons, avoiding the fork/exec overhead of normal CGI execution. These daemons communicate with the module via a TCP or UNIX socket by calling FastCGI library functions. This enables them to retrieve variables that are passed to normal CGI programs via the environment, and to redirect their standard input and output over the socket to read HTTP POST data and write responses back to the client.

Database Design Decisions

In this embodiment, most databases used in the AFT Guard are simple, filesystem-resident, dbm files for two reasons.
  Dbm databases are filesystem-resident, which facilitates sharing between multiple Guard nodes via the SAN.
  Most Guard processes don't need relational database capabilities. Rather, they need a simple indexing capability, where data is stored in key/data pairs and retrieved by key, as with dbm files. A notable exception is the Audit component.

In this embodiment, the following Apache server databases are implanted as dbm files on the SAN.
  TLS Cache
  Session DB Security Design Decisions In this embodiment, a separate nShield HSM card is used for each Guard Interface to eliminate security and performance concerns associated with shared cards, which would require low-level routines to clean hardware registers or other data caches when switching between Apache processes. Each Certicom mod_ssl module is "bound" to a specific card.

In this embodiment, one reason we chose the CGI Web application model was because it offers SELinux domain separation between the Apache server and the application programs.

In this embodiment, TLS-based (strong) authentication by a CGI program is infeasible, so a CGI program would need to "talk back" to a module to reliably destroy a TLS session and force another authentication exchange when it closes a user session. This would require a module that understands what the CGI is trying to say.

User Interfaces

In this embodiment, the AFT User Interface (UI) component is the interface that enables users to transfer files from one classification domain to another. Requirements may dictate that the client accomplishes this using the standard software base on the user workstations. This requirement drives the UI design towards a Web-based solution that may utilize the existing Java runtime environments on the workstations.

In this embodiment, the UI will be implemented through a Web browser. The browser may need to download Java applets from the guard to meet near real-time feedback requirements.

In this embodiment, in providing the above functions, the client preferably has a minimal amount of impact on the high-side client in the areas of performance, configuration, and maintenance.

Component Description

In this embodiment, the AFT UI component provides secure for access into the AFT Guard from a user's workstation. Users will be required to authenticate to the system to gain access. User's authentication information will be sent to the AFT Guard for log on verification.

In this embodiment, the UI will be designed in a modular fashion, as much as possible, to support plug-and-play UI capability in the future. This will ease the implementation of alternative UI front-ends that can access the functionality to clean and transfer files.

In this embodiment, the UI displays will be implemented as a graphical user interface (GUI) executed from a Web browser using HTML. This design minimizes software installation on both the High-side and Low-side user environments needed to support the AFT application. The High-side and Low-side workstations may have a Web browser, specifically a Java-enabled (version 1.4 or greater) browser. The AFT is not responsible for providing the Web browser or for its installation.

In this embodiment, AFT displays for the three defined AFT user roles (high-side user, low-side user, and FDO) will have similar navigation and visual appearance for consistency. These roles are controlled by the guard.

In this embodiment, the high-side AFT Client provides displays required to:
  Submit file(s) for cleaning. Documents sent by high-side users from the high-side domain will retain the document's native format.
  Review and retrieve the cleaned files and their respective clean reports
  Release cleaned files to low-side user
  Review FDO comments on rejected files.
  Review submittal status on each file (i.e., clean complete, in FDO review).
  Retrieve files sent by low-side user.
  View active feedback (messages) from AFT Guard while AFT Client is connected.

In this embodiment, the low-side AFT Client provides displays required to:
  Submit file(s) for transfer to high-side user
  Retrieve files sent by high-side user.
  View limited active feedback (messages) from AFT Guard while AFT Client is connected. Low-side user feedback will be limited as required by security requirements.

In this embodiment, the FDO AFT Client provides displays required to:
  Review copies of files submitted by high-side users and approve or disapprove the transfer.
  View active feedback (messages) from AFT Guard while AFT Client is connected.

Component Design

In this embodiment, the main goal of the GUI design is to make the AFT Client application as familiar as possible to the user by employing techniques of other windows-based applications. This familiarity aids the user in the successful use of the application and decreases learning time.

Use Cases

In this embodiment, these use cases only address the AFT application as a stand-lone alone application and does not include CAB interaction.

Assumptions/Pre-Conditions

In this embodiment, the following conditions have occurred for each use case:
The user opens a workstation browser
The user types in the AFT URL within the browser
The user accesses AFT Logon Web page Transfer Agents Description In this embodiment, the AFT Guard Transfer Agent performs the bulk of Guard processing pertaining to the user and FDO Interfaces by providing the following functions.
Format browser display content
Track sessions
Check file status
Transfer files
Display notification messages
Change password Design In this embodiment, a separate Transfer Agent (TA) sub-component supports each of the three Guard Interfaces: the High-Side User TA (HSUTA), High-Side FDO TA (HSFTA), High-Side, Low-Side, and FDO Use Cases

| Use Case id | User role | Description | Notes |
|---|---|---|---|
| 1 | HS, LS, FDO | The user logs onto the AFT system | cab/aft option - cab only, aft only, cab/aft |
|  | HS, LS, FDO | a. User enters name and password and clicks logon button |  |
|  | HS, LS, FDO | b. On successful login the user is presented the Received page |  |
|  | HS, LS, FDO | c. On logon failure, user denied access and is sent a denial message |  |
| 2 | HS, LS | The user wants to submit file(s), and/or directory(ies) | Uses "Submit File" menu option |
| 3 | HS, LS | The user selects submit recipient (individual(s), group(s)) | Submit Form |
| 4 | HS, LS | The user want to search for submit recipient (individual(s), group(s)) | Submit Form - uses "find" button |
| 5 | HS, LS | The user wants to enter a comment to accompany submittal | Submit Form |
| 6 | HS, LS | The user wants to traverse directory to select file for submittal | Submit Form |
| 7 | HS, LS | The user adds file(s) and/or directory(ies) to submit list | Submit Form - uses "add to list" button |
| 8 | HS, LS | The user wants to remove items from the submittal list. | Submit Form |
| 9 | HS, LS | The user wants to commit the selected files for cleaning, or clicks reset to clear entire list of files. or click remove from list button to remove file(s) from list | Submit Form - clicks send button to commit |
| 10 | HS, LS | The user wants to clear all information (To, Comment, selected files) on submit form | Submit Form - clicks reset button to clear user input on form |
| 11 | HS, LS | The user wants to cancel submit window that has list of file(s) to be sent which returns user to welcome page? | Submit Form - clicks cancel button. The Submit form is cleared. |
| 12 | HS | The user wants to review cleaned files |  |
| 13 | HS, FDO | The user wants to read the clean report associated with the cleaned files | User clicks on the Review & Release folder |
| 14 | HS, LS | The user wants to cancel a submitted job | HS: Review & Release folder - Review Report button |
|  |  |  | FDO: Review - Review Report button |
| 15 | HS | The user wants to terminate the AFT session. |  |
| 16 | HS, LS | The user wants to customize GUI presentation | Review & Release folder - Delete button |

Interface Descriptions

Figure 36:
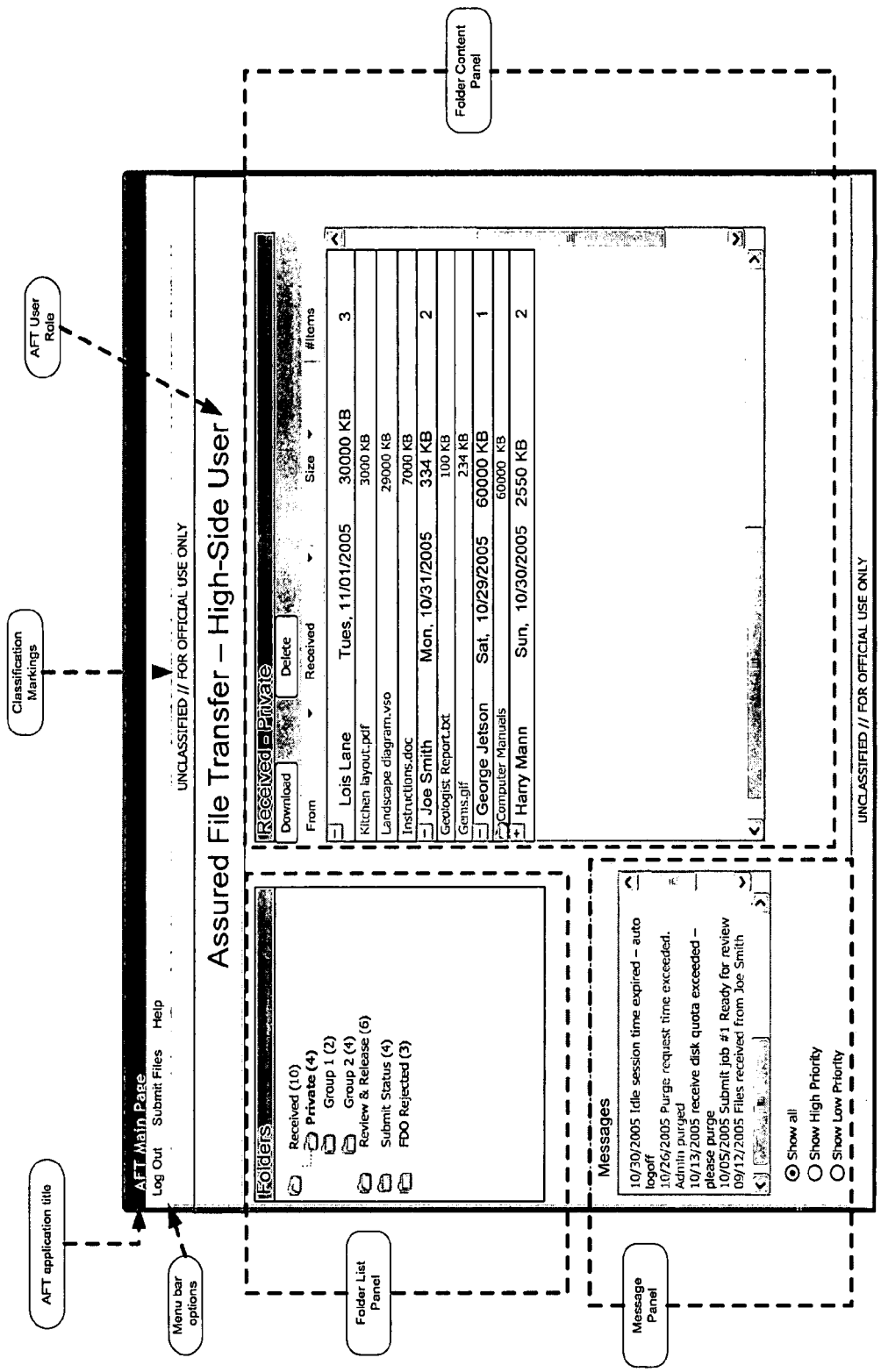
FIG. 36 shows an example of a notional AFT user interface.

In this embodiment, the AFT UI manages visual displays and user input/output for the client application using the Web browser. This includes mouse and keyboard inputs, message displays, and file transfers. Communication to the AFT guard is accomplished by using HTTP for file transfers, message transmissions, and authentication to the guard. FIG. 36 shows an example of a notional AFT user interface.

and Low-Side User TA (LSUTA). Each is implemented as a set of Common Gateway Interface (CGI) programs invoked by a user or FDO through their respective Interface. With the few exceptions noted in this document, each TA has an identical set of programs. Although a given program may function identically in each TA, its SELinux context and the system resources it may access are "hard-coded" at installation time. Therefore, the program descriptions in this document are not delineated by TA, though this delineation is detailed in the resource access requirements tables.

In this embodiment, the TA programs are invoked by the Apache Server subcomponent of the Interface when the user executes a request through the browser. The Apache Server ensures the requests are associated with an authenticated session, and stores the userID, returned by the Auth component, in the environment. This environment variable is read TA programs to establish the identity of the user.

Figure 37:
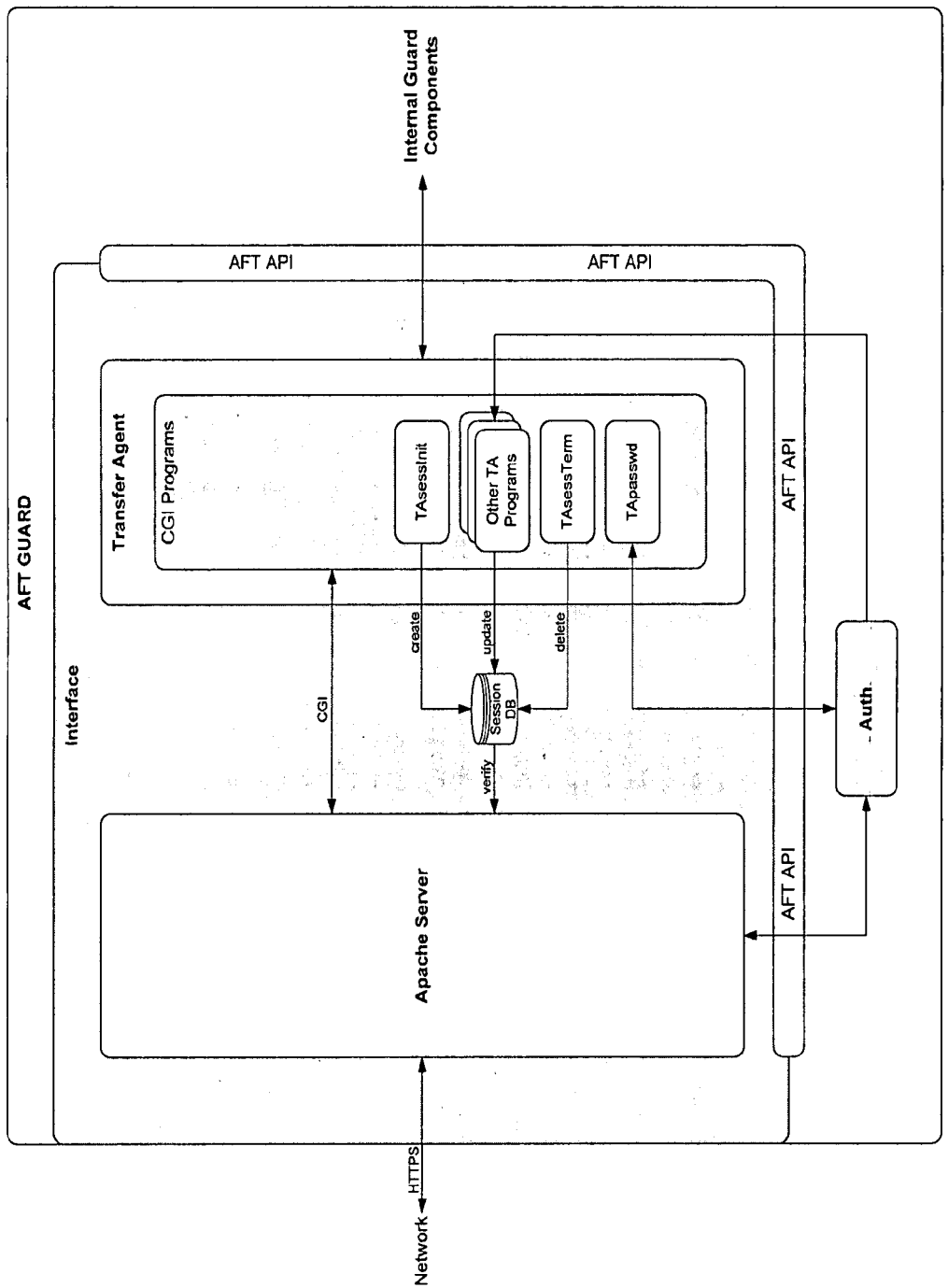
FIG. 37 shows an example of AFT Guard Interface architecture with some Transfer Agent detail.

FIG. 37 shows an example of the Interface architecture with some Transfer Agent detail. This architecture provides SELinux domain separation between the Interfaces and Transfer Agents. Wherever possible, the TA programs perform a single function so they access a minimal set of resources and thereby maximize the aforementioned domain separation.

Format Browser Display Content

In this embodiment, TA programs format HTML responses for display in the user or FDO browser. The formatting logic is therefore implemented as shared modules in the TA programs.

Track Sessions

In this embodiment, an AFT session begins when a user authenticates to the system, which is controlled by the Apache Server. It ends when the user's session record is revoked by the user (i.e., a Logout button is clicked) or by the system (the session expired). During the session, the user is free to use the application to perform the AFT functions. Afterwards, the user must login again before using the application. AFT must track sessions to meet two requirements.

Allow only one session at a time for a given user.

Terminate (expire) a session after a period of inactivity.

In this embodiment, the Apache Server subcomponent of each Interface performs authentication tasks, and ensures all requests are associated with active sessions. This section describes the TA programs that do most of the session tracking work: TAsessInit, TAsessUpdate, and TAsessTerm in this embodiment.

TAsessInit Program

In this embodiment, each TA includes a TAsessInit program that initializes a user session by performing the following tasks.

Create the session database record. The record overlays an existing record, if it exists, which may occur if the user re-authenticates, say from another machine, before the original session expires. In that case, the Apache Server terminates the old TLS session and redirects the browser window to the TAsessTerm program before redirecting to the TAsessInit program. This ensures all resources are cleaned up, and only one user session is active for a given user at a time.

Create the session message queue used to transmit messages from internal Guard components to the user.

In this embodiment, functionality

Read the userID from the environment

Create timestamp from current time

Store the userID key and timestamp value in the session database

Create a session message queue named after the userID (high-side user and FDO sessions, only)

Write a session initialization message to the session message queue

TAsessUpdate Module

In this embodiment, each TA program executed because of a user request (i.e., not an automatic transaction) updates the user's session database record. TAsessUpdate, then, is not a separate program but a shared module called by those TA programs.

In this embodiment, functionality

Read the userID from the environment

Create timestamp from current time

Store the userID key and timestamp value in the session database, which replaces an existing record Resource Access Requirements In this embodiment, because TAsessUpdate is a module that all request programs execute, they all require write access to their corresponding session database.

TAsessTerm Program

In this embodiment, each TA includes a TAsessTerm program that terminates a user session by performing the following tasks.

Delete the user's session database record

Delete the user's session message queue

Functionality

Read the userID from the environment

Delete the session record whose key matches the userID

Delete the session message queue whose name matches the userID (high-side user and FDO sessions, only)

Check File Status

In this embodiment, this TA function encompasses all the programs that enable a system user or FDO to check the status of their files. Two TA programs return status of the following file categories.

Waiting Files. These are files the system or another user sent and are ready for the user to download.

Submitted Files. These are files the user submitted for transfer to someone else, and are being processed by the system. This includes related reports, generated by the system or FDO, that explain the processing done on the files.

TAfiles Waiting Program

In this embodiment, this program enables users to check the status of files that have been transferred through the system and are awaiting their download. This may include files sent to a group, if the user is a member of the group. For a high-side user or FDO, this also includes reports the system generated that need to be reviewed. Low-side users may not receive reports in this embodiment, and therefore may only receive status for files that were sent to them by high-side users.

In this embodiment, functionality

Read the userID from the environment

Create a timestamp from the current time

Replace the timestamp value for the userID key in the session database

Query the Auth component for the userID group memberships (HS and LS user only)

Query the repository database for files delivered to the userID and groups

Format and send the list of files to the browser

TAfilesSubmitted Program

In this embodiment, only high-side users may check the status of files they submitted. The TAfilesSubmitted program provides this functionality by querying the databases for the following repositories.

High-Side Input Repository

High-Side User Repository

High-Side FDO Repository (if the system is configured for FDO processing)

Functionality

Read the userID from the environment

Create a timestamp from the current time

Replace the timestamp value for the userID key in the session database

Query the repository databases for files submitted by, and reports to the userID Format and send the file list to the browser Transfer Files In this embodiment, this is the core function of the AFT Guard, and encompasses the largest set of programs performing the following tasks.

Retrieve files
Submit files
Release in-process files
Delete Files

TAretrieveFiles Program

In this embodiment, this program enables a user to download files from the AFT Guard. Both high- and low-side users can download files that have completed processing and are addressed to them or a group to which they belong. Only high-side users can retrieve files and reports produced by the Clean process so that they can review the changes before releasing them for further processing.

In this embodiment, an FDO cannot download a file that has completed processing (i.e., an FDO cannot be designated as the final recipient of a file); for that, an FDO would require a separate user account. Rather, the system stores files that have completed the Clean process so that a designated FDO can perform a final review before releasing them for Verify processing. Therefore, the TAretrieveFiles program also enables an FDO to download files and reports produced by the Clean process so they can perform the review.

In this embodiment, functionality
Read the userID from the environment
Create a timestamp from the current time
Replace the timestamp value for the userID key in the session database
Read the file name to be retrieved from the HTTP POST data
Validate the file name by querying the repository database to ensure the file name was delivered to the userID
Download the file to the browser TAsubmitFiles Program In this embodiment, each TA includes a program to submit files into the system. The TAsubmitFiles program performs the following tasks to validate and accept the files for transfer.

Validates the request by ensuring the userID is allowed to send to the specified recipients
Generates a job ID that uniquely identifies the job throughout the transfer process
Generates a job manifest containing the sender userID, recipients, and file list
Uploads the files into the system
Dispatches the input repository manager to start processing the job In this embodiment, functionality
Read the userID from the environment
Create a timestamp from the current time
Replace the timestamp value for the userID key in the session database
Read recipients from the HTTP POST data
Query the Auth component to validate file recipients against those to whom userID is allowed to send
Read current time
Generate a unique job ID based on userID and current time
Create a job directory in the TA input directory named after the job ID
Read the submitted file names from the HTTP POST data
Generate a job manifest, named after the job ID, containing sender userID, recipients, and file names
Store job manifest in job directory
Receive and store files in job directory
Dispatch the Input Repository Manager by writing the job directory URI into its input AFT queue Release In-Process Files In this embodiment, both TA subcomponents on the high side require functionality to release in-process files. The system holds these files at the HS User Repository and the HS FDO Repository. The reason for the hold is to enable the user and FDO, respectively, to review cleaned files and approve them for transfer. The TAreleaseFile program performs this function for both repositories. The FDO TA provides additional functionality with the TArejectFile program, which enables the file to be "released" in the negative sense, along with explanatory comments for the high-side user.

TAreleaseFile Program

In this embodiment, for files held in the HS User Repository, TAreleaseFile enables the user to release the file to the HS FDO Repository (or the Verify component if the system isn't configured for an FDO). For files held in the HS FDO Repository, TAreleaseFile enables the FDO to release the file to the Verify component.

In this embodiment, functionality
Read the userID from the environment
Create a timestamp from the current time
Replace the timestamp value for the userID key in the session database
Read the file names to be released from the HTTP POST data
Validate the file names by querying the repository database to ensure each file was delivered to this userID
Dispatch the Repository Manager by sending it a release request through its control filter. This ensures SELinux domain separation for write access to the repository, which remains under the control of the repository manager.

TArejectFiles Program

In this embodiment, this program "releases" files from the HS FDO Repository, but instead of going forward to the Verify component, they go backward to the HS User Repository where the user can review them. TArejectFile requires the FDO to enter comments to explain the rejection to the high-side user, which are sent back as a separate file, along with the files that were rejected.

In this embodiment, functionality
Read the userID from the environment
Create a timestamp from the current time
Replace the timestamp value for the userID key in the session database
Read the file names to be released from the HTTP POST data
Validate the file names by querying the HS FDO Repository database to ensure each file was delivered to this userID
Upload the FDO comments to a file in the FDO TA input directory
Dispatch the HS FDO Repository Manager by sending it a negative release request through its control filter. This ensures SELinux domain separation for write access to the repository, which remains under the control of the repository manager.

Delete Files

In this embodiment, only the High-Side User Transfer Agent includes a program to delete cleaned files. This functionality is needed to remove files after the user reviews them and finds unacceptable alterations were performed by the Clean process.

TAdeleteFiles Program

In this embodiment, functionality

Read the userID from the environment
Create a timestamp from the current time
Replace the timestamp value for the userID key in the session database
Read the file names to be deleted from the HTTP POST data
Validate the file names by querying the HS User Repository database to ensure each file was delivered to this userID
Dispatch the Repository Manager by sending it a delete request through its control filter. This ensures SELinux domain separation for write access to internal Guard component domains.

Display Notification Messages

In this embodiment, both High-Side Transfer Agents include a program to display messages sent by internal Guard components to a messages area in the browser display. These messages are "pushed" to the user and FDO in the sense that the user doesn't need to specifically request them. They are retrieved automatically. Low-side users do not receive such messages.

TAdisplayMsgs Program

In this embodiment, this program is invoked periodically via a meta tag (<meta http equiv="refresh" content="refresh_seconds">), or whenever a user action causes a screen update. The meta tag causes the browser to automatically send a request that invokes the TAdisplayMsgs program, which sends another meta tag in its response, and so on, ensuring the updates continue until the session terminates.

In this embodiment, TAdisplayMsgs is currently the only TA program that does not update the session timestamp. This ensures a session will expire after a configurable interval, even though the TAdisplayMsgs program continues to execute periodically.

In this embodiment, functionality
Read the userID from the environment
Read the message queue, whose name is based on the userID, for new messages
Format and send the messages to the browser message area Change Password In this embodiment, AFT requirements dictate that users must change their passwords periodically. The TApasswd program enables them to accomplish this through their browsers. The Apache Server subcomponent may redirect their displays to this program when it detects and expired password, or they may invoke it proactively.

TApasswd Program

In this embodiment, this program prompts the user for the current and new passwords. It then communicates with the Auth Component to verify the current password and validate the new password. The Auth component ensures site password policy rules are met.

In this embodiment, functionality
Read the userID from the environment
Send a password change form to the browser that requests current and new passwords
Read current and new passwords from the HTTP POST data in the resulting request
Verify the current password with the Auth component
Validate the new password with the Auth component to ensure it meets site password policy rules
Send the password update to the Auth component Message Manager In this embodiment, the Message Manger component enables AFT to "push" messages to users. These messages are initiated by the Administrator or Guard and are not in response to a direct request from the recipient. Only high-side users receive them, although the design does not preclude low-side users, as well.

The messages described below comprise the full set the Message Manager handles.

Administrator Broadcast. General purpose message mechanism for the administrator.

File Receipt Notification. Sent by the High-Side Output Repository Manager to the high-side user when it stores a file in the output repository for which the user was listed as a recipient.

Clean Completion Notification. Sent by the High-Side User Repository Manager to the high-side user when it stores a file submitted by the user, i.e., one that has completed Clean Component processing.

FDO Completion Results. Sent by the High-Side FDO Repository Manager to the high-side user when it stores a file submitted by the user, i.e., one that has completed FDO processing.

Verify Completion Notification. Sent by the High-Side Verify Repository Manager to the high-side user and FDO when it stores a file submitted by the user and approved by the FDO.

Software Architecture

In this embodiment, Message Manager I/O is through AFT Queues. It leverages the following AFT Queue characteristics.

Asynchronous. Input messages are queued immediately and held until the Message Manager is ready to read them. It then writes the message to the destination queue and, because the queue accepts it immediately, it is quickly freed up to accept another message.

Atomic I/O. This frees programs and threads from locking a queue when they need to read or write it.

Filesystem resident. This enables the queues to reside on the SAN, so that message processing is independent of which Guard node is reading or writing them. From the users' perspectives, they will receive messages from any node that happens to be processing one of their files.

Persistent. This enables short-lived processes such as the Interface Transfer Agent CGI programs to retrieve messages when they execute.

Prioritized FIFO. The writer process can specify a message priority that affects whether it is read before others. Higher priority messages are read before lower priority messages. Within a given priority, messages are read in "First In, First Out" (FIFO) order. The Message Manager writes messages to the destination queues with the same priorities read from the input queue.

In this embodiment, the Message Manager accepts messages from the repository managers through a single input AFT Queue. The Message Manager creates this queue when it starts during system initialization. In this embodiment, the following fields comprise the message format.

Component: sending component ID
UserID: the message recipient
Message: content of the message In this embodiment, each message also has an inherent priority attribute that is specified by the sending component. Higher numeric values indicate higher priority messages, which affect the order the messages are read and may be used by the receiving component to format message displays for the user.

In this embodiment, the sending component is responsible for formatting the message content. Depending on site configuration, the format may be HTML. This enables the sending repository manager to include clickable links to files within its repository.

In this embodiment, upon receiving a message, the Message Manager validates its format and looks in the High-Side User and/or High-Side FDO message area, depending on the message Component field, for an AFT Queue whose name matches the UserID field. These queues are created by the Transfer Agent login subcomponent and deleted by the logout subcomponent, so the presence of a queue means the user has an active session. If the queue is found, the message is copied to it with the same priority value that was read from the input queue. Otherwise, if the site is configured for e-mail delivery, the message is copied unaltered to the E-Mail Spooler AFT Queue. The E-Mail Spooler uses the userID message field to look up the recipient's e-mail address for delivery via the site e-mail server.

In this embodiment, this architecture enables immediate message delivery to users' browsers when they're logged on to the system, or delayed delivery via the site's e-mail infrastructure when they aren't.

Interface Related Design Decisions

In this embodiment, the Message Manager writes messages to asynchronous, filesystem-resident AFT Queues. These queues are created by the Transfer Agent login subcomponent and deleted by the logout subcomponent, so a given queue only exists for the life of the user's session. Their names are based on userID, so they're easily located from the userID contained in each message.

In this embodiment, the Transfer Agent periodically reads the accumulated messages, whenever the user's HSUMD (High-Side User Message Display) or HSFMD (High-Side FDO Message Display) CGI program is executed.

In this embodiment, for systems configured to send e-mail messages, the Message Manager may forward the message, unaltered, to the E-Mail Spooler component when a user's message queue doesn't exist (i.e., when the user is not logged onto the system).

Flexibility, Availability, and Maintainability Design Decisions

In this embodiment, the message queues reside on the SAN so that any Guard node can write to them, and a given user can login on any Guard node and receive messages.

E-Mail Spooler

In this embodiment, the AFT E-Mail Spooler is a long-running daemon process that accepts messages from the Message Manager and delivers them via the site e-mail infrastructure to the users specified in the messages. Because it does not receive messages over the network, it is not another interface for submitting files to the system. Its only function is to implement an alternative conduit for notification message delivery when the user is not logged onto the AFT Guard. Notification messages are initiated by the Guard and are not in response to a direct request from the recipient. Only high-side users receive them, although the design does not preclude future support for low-side users, as well.

In this embodiment, the E-Mail Spooler exists only if the system is configured to support e-mail notification messages. In that case, it is started during system initialization.

Software Architecture

In this embodiment, the Message Manager forwards messages unchanged from the repository managers. The E-Mail Spooler accepts messages from only the Message Manager, through a single input AFT Queue. It creates this queue when it starts during system initialization. The queue resides on the SAN, so any Guard node's E-Mail Spooler can process the messages.

In this embodiment, the sending repository manager is responsible for formatting the message content. Depending on site configuration, the format may be HTML. This enables the sending repository manager to include clickable links to files within its repository.

In this embodiment, upon message receipt, the E-Mail spooler queries the Authentication component to obtain the e-mail address associated with the username field of the message.

In this embodiment, after looking up the e-mail address, the E-Mail Spooler queries the Domain Name Service (DNS) to ascertain the mail server associated with the address. At least one DNS server must be specified in the E-Mail Spooler configuration. The server must allow recursive DNS queries from the Guard's IP address.

In this embodiment, after obtaining the mail server, the E-Mail Spooler sends the message via a Simple Mail Transport Protocol (SMTP) exchange.

Administrative Interface

In this embodiment, the Administration functional area will manage all aspects of system configuration and operation. Role-based privilege enforcement allows the following responsibilities to be divided among one or more administrators, depending on site requirements.

Administration of user and FDO accounts

Site policy (e.g., Review and Release policy, auditing policy, dirty/clean word lists)

System patches

Audit log review and alerts

System initialization and shutdown

File validation and inspection override.

In this embodiment, the Administration component will customize the configuration of the system and provide interface to view audit and performance information. The implementation for system administration may be GUI-based. Any modifications to configuration data may be verified to insure that and configuration changes make sense in context to the field before those changes are committed to the system. Verification of the configuration file schema may be handled by Samhain integrity tool. Samhain is a file system integrity checker that can optionally be used as a client/server application for centralized monitoring of networked hosts. Databases and configuration files can be stored on the server. In addition to forwarding reports to the log server via authenticated TCP/IP connections, several other logging facilities (e-mail, console, tamper-resistant log file, and syslog) are available In this embodiment, AFT will use version numbers on each filter policy configuration. The Administration Component will put the updated configurations to their configuration directories. Submit jobs that are in progress will continue to use the configuration version that existed when the submit job was initiated. New submit jobs will pickup the new version.

In this embodiment, Authorization and Access control will be mitigated by the AFT defined role model. The role model will define the access limits for data and processes, e.g., certain roles have access to certain applications at certain times. The role model will be maintained on the guard in a database and will map to SE Linux roles. The following is a list of exemplary AFT roles.

In this embodiment, the Administration Component will provide a GUI for maintaining configuration data. GUI's will be developed for configuring the following examples:

1. User Management
   a. First and last name
   b. Role
   c. High side and Low side account information i. Username
　　ii. Password
　　iii. Status (login/enabled/login disabled)
　d. E-mail address
　e. Group memberships
　f. E-mail address for approved receivers
　g. Enable/disable e-mail notification for file submittal status. Default will be to receive e-mail.
　h. Telephone number
　i. Set message feedback level on GUI status panel (show all, show high priority only, show low priority only)
2. Role Management
　a. Role name (primary and secondary)
　b. privileges
　c. Session timeout
　d. Idle timeout
　e. Priority
3. Group Management
　a. Group name
　　i. member name list
　　ii. administrator name
4. Admin Management
　a. First and last name
　b. Admin role
　c. E-mail address
　d. Telephone number
　e. Status (login/enabled/login disabled)
5. Event Management
　a. Event name and its resulting system reaction. Each event that occurs in the system will have associated system reaction. System reactions can range be to just audit log the event to a complete shutdown of the system.
6. Policy
　a. Password limitations—minimum and maximum length, required characters (numeric, Upper/lower case, punctuation), maximum failed login attempts, change password warning days, number of days until access expires.
　b. Dirty word list directory
　c. Directory list of defined trusted schemas
　d. Directory list of all trusted macros
　e. List of trusted links based on domain name and IP address
　f. Each filter has configuration data for each item to be checked by that filter. Since each filter may require a unique configuration setting to enable features such as dirty word search, the Administrator GUI will present a generic option for that item. This generic option will be translated by the filter's configuration translator to the unique configuration settings required by the filter. A state level will be associated with the generic option indicate the action to perform should that item be encountered by the filter.
　　i. Filter identifier
　　ii. File types and their extension that this filter will process
　　iii. For each filter define the generic filter options
　　　1. Action levels will initially be:
　　　　a. Enable/disable checking for this item
　　　　b. Failure—fail the file being cleaned
　　　　c. Warning—issue a warning for the file
　　　　d. Report—send audit message to report the occurrence of the item
　　　　e. Directory to store filter's configuration
　g. Filter pipeline definitions
　　i. Pipeline Identifier
　　　1. Filter Identifier list
　　h. File type Information
　　　i. File extension
　　　ii. File aspects be checked (TBD)
　　　iii. Trusted metadata
7. System Administration
　a. Session expiration period
　b. Message polling interval that allows messages to be written to the browser message panel.
　c. Longevity of submit job. This will limit the length of time submitted files are permitted to remain in AFT persistent data stores.
　d. Directory cleanup interval
　e. Length of time allotted for FDO review. If the FDO does not review the submitted job within this timeframe, an e-mail will be sent to sender and FDO to indicate FDO has not performed the necessary review.
　f. Enable/disable journaling
　g. Process configuration
　　i. Component/process name
　　ii. Heartbeat—Allow each process to have different heartbeats to facilitate those processes that may take longer such as the filters. Each process will get their configuration data at startup time
　　iii. Log threshold level
　　iv. Log file name and directory
　　v. Maximum number of threads
8. Firewall Configuration Interface Descriptions In this embodiment, the Administration Component has tight integration with the configuration file subsystem and will interact with the init and audit subsystems. This component sits at a layer above the configuration file and is passed data types and values that are then verified.

In this embodiment, the Administration Component will invoke process defined library functions that will access the Admin databases to create configuration information specific for that process. This permits the flexibility to provide configuration information in the specific form needed by the process such as flat files or xml files.

User Interface Design

In this embodiment, a GUI will be available to enter configuration for the AFT Subsystem that will be stored in Administration maintained databases.

Decision to Develop or Reuse

In this embodiment, AFT will reuse software modules written for the CAB CDS to provide much of the Administration capability. AFT-specific functionality will be implemented as needed.

In this embodiment, the administration verification tools will be written specifically to validate GUI inputs.

In this embodiment, because of the high-assurance qualities of the system, privileged administrative and maintenance users will require direct physical access to several individual components using a set of administrative interfaces with a common "look and feel."

Interface-Related Design Decisions

In this embodiment, the Administration component obtains and verifies data from the configuration file and configuration databases. If the configuration file passes verification the only output from this component is a successful error code, however if the file does not pass inspection, an error message describing the failure is printed and an unsuccessful error code is returned.

Performance-Related Design Decisions

In this embodiment, the only impact on performance will be when a data is committed to the system.

Database Design Decisions

In this embodiment, the Administration Component will use databases to store and retrieve configuration data. The databases (System config, Audit config, User Mapping, Firewall config, and filter policy) need to be persistent and therefore will all be stored on the SAN.

Safety, Security, and Privacy Design Decisions

In this embodiment, the Administration Component relies on the SELinux policy to provide security for the system. The policy confines the administrative binaries and configuration files into a restricted domain isolating them from other parts of the system.

In this embodiment, virus definition files are maintained by an authorized system administrator.

In this embodiment, clean and dirty word lists are maintained by an authorized system administrator.

In this embodiment, system components will be maintained by authorized system administrators or by designated maintenance personnel who have been properly cleared and trained. The administrators are fully trusted and will not conduct operations outside the security policy.

In this embodiment, AFT must support a flexible configuration that adheres to the security policies in place at each deployment site.

Flexibility, Availability, and Maintainability Design Decisions

In this embodiment, the Administrator Component will maintain data needed to allow the guard to communicate with other guards for facilitating load and administrative data sharing.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed is:

1. A cross-domain information exchange computer network system, comprising:
a client comprising computer executable instructions stored in a memory of the computer network, the client being configured to provide a user interface and a security policy, the security policy comprising a plurality of unique communication process channels, wherein each of the plurality of unique communication process channels is configured to provide a one-way data flow,
a translator comprising computer executable instructions stored in the memory of the computer network, the translator being configured to communicate with the client,
a guard comprising computer executable instructions stored in the memory of the computer network, the guard being associated with the client and the translator, and
a terminal server comprising computer executable instructions stored in a memory of the computer network, the terminal server being associated with the translator,
wherein the guard is configured to communicate with the client and the translator over the computer network via a first protocol, and the guard is further configured to filter data stored in a body of data packets transferred to and from the client, wherein the filtering is based on a search of the data stored in the body of the data packets,
wherein the translator is configured to communicate with the terminal server over the computer network via a second protocol,
wherein the first protocol is configured to provide remote, securable virtualization of a graphical user desktop to the client and to implement the plurality of unique communication process channels for displaying and controlling graphical duplications of applications from the terminal server to the client and preventing execution of portable code provided via the plurality of unique communication process channels at the client,
wherein the second protocol is a standard remote desktop protocol, and
wherein the translator is configured to operate as a standard remote desktop protocol client when communicating with the terminal server and is configured to operate as a virtual desktop server when communicating with the guard.

2. The system of claim 1, wherein the client comprises an application executing on a user's workstation of the computer network system, wherein the client is configured to provide access to a session on the terminal server.

3. The system of claim 1, wherein the client comprises an applet executing on a user's workstation of the computer network system and is configured to provide access to a session on the terminal server.

4. The system of claim 1, wherein the guard is configured to provide secure communications between the client and the terminal server through the translator.

5. The system of claim 1, wherein the terminal server is configured to provide a multi-user computer platform on which one or more presences reside.

6. The system of claim 1, wherein the remote desktop protocol is the remote desktop protocol (RDP).

7. The system of claim 1, wherein the remote desktop protocol is the independent computing architecture (ICA) protocol.

8. The system of claim 1, wherein the guard is configured to initiate a connection with the translator only in response to an access request from the client.

9. The system of claim 1, wherein the plurality of unique communication process channels prevents file sharing from the server.

10. A cross-domain file exchange computer network system, comprising:
a first client comprising computer executable instructions stored in a memory of the computer network,
a second client comprising computer executable instructions stored in the memory of the computer network, and
a guard comprising computer executable instructions stored in the memory of the computer network, the guard being associated with the first client and second client, wherein the guard is configured to provide secure bi-directional file transfer through a plurality of unique communication process channels between the first client and second client across the computer network system, wherein each of the plurality of unique communication process channels is configured to provide a one-way data flow, wherein the guard filters data stored in a body of data packets transferred between the first client and the second client, wherein the filtering is based on a search of the data stored in the body of the data packets,
wherein the guard is configured to facilitate displaying and controlling graphical duplications of applications from the second client to the first client via the plurality of unique communication process channels and preventing file sharing and execution of portable code provided via the plurality of unique communication process channels at the first client, wherein the first client is a browser executing on a first workstation of the computer network, and the second client is a browser executing on a second workstation of the computer network.

11. The system of claim 10, wherein the secure bi-directional file transfer is implemented using HTTPS.

12. A method for cross-domain file exchanges across a computer network system, the method comprising:

receiving, from a client application executing on a first network computer of the computer network system, a request for access to a computing resource located on at least one second network computer of the computer network system via a first network protocol;

translating the request for access into a second protocol, wherein the first protocol is a virtual desktop protocol (VDP) configured to implement a plurality of unique communication process channels for displaying and controlling graphical duplications of applications from the terminal server to the client, and preventing execution of portable code provided via the plurality of unique communication process channels at the client, and the second protocol is the remote desktop protocol (RDP) or the independent computing architecture (ICA) protocol, wherein each of the plurality of unique communication process channels is configured to provide a one-way data flow;

forwarding the translated request to the computing resource across the computer network in the second protocol;

establishing a connection between the client application and the computing resource across the computer network; and filtering data stored in a body of data packets transferred to and from the first network computer across the established connection, wherein the filtering is based on a search of the data stored in the body of the data packets.

13. The method of claim 12, wherein the filtering further comprises searching text characters transferred to and from the first network computer across the established connection.

14. The method of claim 13, wherein the first network computer contains data assigned a first security level, and the computing resource contains data assigned a second security level lower than the first security level.

\* \* \* \* \*